(12) United States Patent
Castro, Jr. et al.

(10) Patent No.: US 8,262,162 B2
(45) Date of Patent: Sep. 11, 2012

(54) BIASING MECHANISM FOR A SEATING STRUCTURE AND METHODS FOR THE USE THEREOF

(75) Inventors: Elindo G. Castro, Jr., Wyoming, MI (US); Christopher C. Hill, Zeeland, MI (US)

(73) Assignee: Herman Miller, Inc., Zeeland, MI (US)

(*) Notice: Subject to any disclaimer, the term of this patent is extended or adjusted under 35 U.S.C. 154(b) by 0 days.

(21) Appl. No.: 13/083,963

(22) Filed: Apr. 11, 2011

(65) Prior Publication Data

US 2011/0241399 A1    Oct. 6, 2011

Related U.S. Application Data

(63) Continuation of application No. 12/012,002, filed on Jan. 28, 2008, now Pat. No. 7,922,248.

(60) Provisional application No. 60/898,421, filed on Jan. 29, 2007.

(51) Int. Cl.
*A47C 3/00* (2006.01)
*A47C 31/00* (2006.01)
(52) U.S. Cl. ..................... 297/285; 297/463.2
(58) Field of Classification Search .................. 297/290, 297/299, 300.4, 196, 198, 296, 302.3, 301.3, 297/268.1, 463.2, 285; 267/41, 47
See application file for complete search history.

(56) References Cited

U.S. PATENT DOCUMENTS

| | | | |
|---|---|---|---|
| 144,349 A | 11/1873 | Morrison et al. | |
| 245,639 A | 8/1881 | Lay | |
| 416,324 A | 12/1889 | Cross | |
| 581,986 A | 5/1897 | Gould | |
| 638,534 A | 12/1899 | Welch | |
| 979,149 A | 12/1910 | Gay | |
| 1,260,032 A | 3/1918 | Perpick | |
| 1,927,491 A | 9/1933 | Gabb | |
| 2,063,732 A | 12/1936 | Gailey | |
| 2,083,838 A | 6/1937 | Goenen | |
| 2,271,925 A | 2/1942 | Niles | |
| 2,272,980 A | 2/1942 | McLellan et al. | |
| 2,307,621 A | 1/1943 | Dorton | |
| 2,313,023 A | 3/1943 | Ruegger et al. | |
| 2,369,580 A | 2/1945 | Koenig | |
| 2,410,871 A | 11/1946 | Fields et al. | |
| 2,603,275 A | 7/1952 | Kuebler | |
| 2,720,912 A | 10/1955 | Light | |
| 2,818,911 A | 1/1958 | Syak | |
| 3,215,470 A | 11/1965 | Swenson et al. | |
| 3,224,807 A | 12/1965 | Welch et al. | |
| 3,232,574 A | 2/1966 | Ferro | |
| 3,235,308 A | 2/1966 | Conner | |
| 3,351,379 A | 11/1967 | Street | |

(Continued)

FOREIGN PATENT DOCUMENTS

EP    0 284 272 A1    9/1988
(Continued)

*Primary Examiner* — Milton Nelson, Jr.
(74) *Attorney, Agent, or Firm* — Brinks Hofer Gilson & Lione

(57) ABSTRACT

A seating structure includes a leaf spring and a body support structure biased by the leaf spring. One of the leaf spring and the body support structure has a cam with a concave cam surface, while the other of the leaf spring and body support structure has a cam follower with a convex cam surface. The cam follower engages the cam.

21 Claims, 93 Drawing Sheets

U.S. PATENT DOCUMENTS

| | | | |
|---|---|---|---|
| 3,369,840 A * | 2/1968 | Dufton | 297/300.1 |
| 3,382,000 A | 5/1968 | Sully | |
| 3,602,537 A | 8/1971 | Kersholt et al. | |
| 3,740,792 A * | 6/1973 | Werner | 16/298 |
| 3,829,157 A * | 8/1974 | Lange, Jr. | 297/263.2 |
| 3,982,785 A | 9/1976 | Ambasz | |
| 4,012,158 A | 3/1977 | Harper | |
| 4,036,525 A | 7/1977 | Howk | |
| 4,043,592 A | 8/1977 | Fries | |
| 4,077,596 A | 3/1978 | Pinaire et al. | |
| 4,084,850 A | 4/1978 | Ambasz | |
| 4,102,549 A | 7/1978 | Morrison et al. | |
| 4,145,020 A | 3/1979 | Webster | |
| 4,154,477 A | 5/1979 | Swenson et al. | |
| 4,155,593 A | 5/1979 | Swenson et al. | |
| 4,156,544 A | 5/1979 | Swenson et al. | |
| 4,165,901 A | 8/1979 | Swenson et al. | |
| 4,181,357 A | 1/1980 | Swenson et al. | |
| 4,221,430 A | 9/1980 | Frobose | |
| 4,239,282 A | 12/1980 | White | |
| 4,240,663 A | 12/1980 | Locher | |
| 4,244,623 A | 1/1981 | Hall et al. | |
| 4,333,683 A | 6/1982 | Ambasz | |
| 4,384,741 A | 5/1983 | Flum et al. | |
| 4,384,742 A | 5/1983 | Wisniewski | |
| 4,390,206 A | 6/1983 | Faiks et al. | |
| 4,438,898 A | 3/1984 | Knoblauch et al. | |
| 4,451,084 A | 5/1984 | Seeley | |
| 4,471,995 A | 9/1984 | Wisniewski | |
| 4,479,679 A | 10/1984 | Fries et al. | |
| 4,494,795 A | 1/1985 | Roossien et al. | |
| 4,516,811 A | 5/1985 | Akiyama et al. | |
| 4,536,031 A | 8/1985 | Latone | |
| 4,537,445 A | 8/1985 | Neuhoff | |
| 4,595,236 A | 6/1986 | Rizzoli | |
| 4,595,237 A | 6/1986 | Nelsen | |
| 4,621,864 A | 11/1986 | Hill | |
| 4,629,249 A | 12/1986 | Yamaguchi | |
| 4,639,039 A | 1/1987 | Donovan | |
| 4,640,547 A | 2/1987 | Fromme | |
| 4,640,548 A | 2/1987 | Desanta | |
| 4,647,109 A | 3/1987 | Christophersen et al. | |
| 4,653,806 A | 3/1987 | Willi | |
| 4,660,885 A | 4/1987 | Suhr et al. | |
| 4,662,681 A | 5/1987 | Favaretto | |
| 4,668,012 A | 5/1987 | Locher | |
| 4,691,890 A | 9/1987 | Han | |
| 4,709,961 A | 12/1987 | Hill | |
| 4,709,962 A | 12/1987 | Steinmann | |
| 4,709,963 A | 12/1987 | Uecker et al. | |
| 4,711,491 A | 12/1987 | Ginat | |
| 4,718,726 A | 1/1988 | Estkowski | |
| 4,720,142 A | 1/1988 | Holdredge et al. | |
| 4,749,230 A | 6/1988 | Tornero | |
| 4,761,033 A | 8/1988 | Lanuzzi et al. | |
| 4,763,950 A | 8/1988 | Tobler | |
| 4,773,706 A | 9/1988 | Hinrichs | |
| 4,776,633 A | 10/1988 | Knoblock et al. | |
| 4,779,925 A | 10/1988 | Heinzel | |
| 4,786,108 A | 11/1988 | Dauphin | |
| 4,790,600 A | 12/1988 | Behringer | |
| 4,795,212 A | 1/1989 | Bailey et al. | |
| 4,796,950 A | 1/1989 | Mrotz, III et al. | |
| 4,818,019 A | 4/1989 | Mrotz, III et al. | |
| 4,834,454 A | 5/1989 | Dicks | |
| 4,840,426 A | 6/1989 | Vogtherr et al. | |
| 4,861,106 A | 8/1989 | Sondergeld | |
| 4,865,384 A | 9/1989 | Desanta | |
| 4,872,727 A | 10/1989 | Rye | |
| 4,887,866 A | 12/1989 | Rusin | |
| 4,889,384 A | 12/1989 | Sulzer | |
| 4,889,385 A | 12/1989 | Chadwick et al. | |
| 4,892,354 A | 1/1990 | Estkowski et al. | |
| 4,911,501 A | 3/1990 | Decker et al. | |
| 4,943,115 A | 7/1990 | Stucki | |
| 4,951,995 A | 8/1990 | Teppo et al. | |
| 4,966,411 A | 10/1990 | Katagiri et al. | |
| 4,981,326 A | 1/1991 | Heidmann | |
| 5,007,678 A | 4/1991 | DeKraker | |
| 5,024,484 A | 6/1991 | Buchacz | |
| 5,029,940 A | 7/1991 | Golynsky et al. | |
| 5,035,466 A | 7/1991 | Mathews et al. | |
| 5,037,158 A | 8/1991 | Crawford | |
| 5,046,780 A | 9/1991 | Decker et al. | |
| 5,050,933 A | 9/1991 | Tornero et al. | |
| 5,080,318 A | 1/1992 | Takamatsu et al. | |
| 5,080,435 A | 1/1992 | Desanta | |
| 5,112,107 A | 5/1992 | Doughty | |
| 5,121,934 A | 6/1992 | Decker et al. | |
| 5,127,621 A | 7/1992 | Uecker et al. | |
| 5,150,948 A | 9/1992 | Völkle | |
| 5,176,356 A | 1/1993 | Lorbiecki et al. | |
| 5,203,853 A | 4/1993 | Caruso | |
| 5,224,758 A | 7/1993 | Takamatsu et al. | |
| 5,242,138 A | 9/1993 | Kornberg | |
| 5,265,938 A | 11/1993 | Melhuish et al. | |
| 5,288,138 A | 2/1994 | Stulik et al. | |
| 5,295,731 A | 3/1994 | Dauphin | |
| 5,308,144 A | 5/1994 | Korn | |
| 5,312,160 A | 5/1994 | Davis et al. | |
| 5,318,347 A | 6/1994 | Tseng | |
| 5,324,096 A | 6/1994 | Schultz | |
| 5,326,154 A | 7/1994 | Williamson et al. | |
| 5,333,368 A | 8/1994 | Kriener et al. | |
| 5,335,969 A | 8/1994 | Yamaguchi et al. | |
| 5,346,284 A | 9/1994 | Dauphin | |
| 5,348,372 A | 9/1994 | Takamatsu et al. | |
| 5,354,120 A | 10/1994 | Völkle | |
| 5,356,199 A | 10/1994 | Elzenbeck et al. | |
| 5,366,272 A | 11/1994 | Lebrun | |
| 5,368,365 A | 11/1994 | Feldberg | |
| 5,388,892 A | 2/1995 | Tornero | |
| 5,393,124 A | 2/1995 | Neil | |
| 5,393,125 A | 2/1995 | Watson et al. | |
| 5,397,165 A | 3/1995 | Grin et al. | |
| 5,423,594 A | 6/1995 | Hancock et al. | |
| 5,425,566 A | 6/1995 | Buchacz | |
| 5,435,626 A | 7/1995 | Lai | |
| 5,439,267 A | 8/1995 | Peterson et al. | |
| 5,486,035 A | 1/1996 | Koepke et al. | |
| 5,499,861 A | 3/1996 | Locher | |
| 5,511,852 A | 4/1996 | Kusiak et al. | |
| 5,547,253 A | 8/1996 | Schwartz et al. | |
| 5,556,163 A | 9/1996 | Rogers, III et al. | |
| 5,588,766 A | 12/1996 | Lai | |
| 5,599,067 A | 2/1997 | Schuelke et al. | |
| 5,658,045 A | 8/1997 | Van Koolwijk et al. | |
| 5,660,439 A | 8/1997 | Unwalla | |
| 5,683,139 A | 11/1997 | Golynsky et al. | |
| 5,810,439 A | 9/1998 | Roslund, Jr. | |
| 5,810,440 A | 9/1998 | Unwalla | |
| 5,871,258 A | 2/1999 | Battey et al. | |
| 6,250,715 B1 * | 6/2001 | Caruso et al. | 297/303.1 |
| 6,547,206 B1 * | 4/2003 | Dickie | 248/575 |

FOREIGN PATENT DOCUMENTS

| | | |
|---|---|---|
| EP | 0 626 146 A1 | 11/1994 |
| FR | 631285 | 12/1927 |
| GB | 23621 | 0/1915 |
| GB | 636573 | 5/1950 |
| GB | 1346420 | 2/1974 |
| GB | 2 142 231 A | 1/1985 |
| GB | 2 193 884 A | 2/1988 |
| GB | 5254 | 4/1990 |
| WO | WO 92/19132 | 11/1992 |
| WO | WO 93/19644 | 10/1993 |
| WO | WO 93/19649 | 10/1993 |
| WO | WO 93/25121 | 12/1993 |
| WO | WO 95/15101 | 6/1995 |

* cited by examiner

BIASING MECHANISM FOR A SEATING STRUCTURE AND METHODS FOR THE USE THEREOF This application is a continuation of U.S. application Ser. No. 12/012,002, filed Jan. 28, 2008 now U.S. Pat. No. 7,922,248, which claims the benefit of U.S. Provisional Application No. 60/898,421, filed Jan. 29, 2007, the entire disclosures of which are hereby incorporated herein by reference.

FIELD OF THE INVENTION

The present invention relates generally to seating structures, and in particular, to a chair having unique kinematics, a body supporting seat and back, and an adjustable seat depth, and methods for using and/or adjusting the chair, including without limitation one or more of the seat and backrest.

BACKGROUND

Chairs of the type typically used in offices and the like are usually configured to allow tilting of the seat and backrest as a unit, or to permit tilting of the backrest relative to the seat. Typically, however, the seat and back are not individually adjustable, and are not individually articulated during tilting. Such chairs therefore sometimes cannot be easily adjusted or customized by the user to accommodate the particular size, shape and/or desired posture of the user.

For example, the seat is typically formed as a relatively rigid, or fixed component, without any articulation between various body-supporting portions of the seat. As such, when a user tilts rearwardly in the chair, the user may tend to slide forward in the seat, even when tilting rearwardly. At the same time, any adjustment of the depth of the seat, measured from the front leading edge to the rear thereof, typically is provided by moving the entirety of the rigid, unitary seat in a fore-aft direction, which can lead to an unsightly gap forming at the rear of the seat and can also form a pinch point at that location. Moreover, such chairs must provide for structure to allow the seat to move relative to the backrest while at the same time bearing the load of the seat and user. Moreover, such chairs typically must employ an extra support member which allows the seat to move thereon, for example, when the seat and/or support member are integrated into the linkage assembly.

In typical tilt chairs, a static angular position of the chair back relative to the seat is typically fixed when the chair is in an unloaded upright position, which may not be particularly well suited for a wide range of users. Moreover, the back is typically formed as a relatively rigid, or fixed component, again without any articulation between various portions of the back. As such, the chair back does not allow the user a full range of motion, precluding for example the ability of the user to stretch or arch their back in a concave contour.

Tilt chairs normally employ compression and/or tension springs, torsion springs and/or torsion bars, or leaf springs to bias the seat and back upwardly and to counterbalance the rearward tilting of the user. The mechanisms used to adjust the load on the spring(s), or the load capability of the spring(s), typically are complicated, and/or require multiple, excessive rotations of a knob or other grippable member to obtain the desired setting. Moreover, the chairs lack any indicia for the user to determine the setting of the return force of the spring before the user sits or applies a load to the backrest.

Moreover, such tilt chairs often do not provide a balanced ride throughout the range of tilting motion of the chair. Specifically, the restoring force or torque of the chair, and in particular the spring, does not match the force or torque applied by the user throughout the tilting range. Although the applied force and restoring force may balance out at a particular tilt position, such balance does not typically occur throughout the tilting/recline range. Moreover, such balance typically cannot be achieved for a variety of users having different weights and body sizes. As such, the user must exert energy and/or apply an external force to maintain the chair in a particular location.

SUMMARY

The present inventions are defined by the claims, and nothing in this section should be read as a limitation on those claims. Rather, by way of general introduction and briefly stated, various preferred embodiments are described that relate to a tiltable chair having an articulated seat and back, an adjustable seat depth, various control mechanisms and linkage assemblies, and methods for the use of the various aspects.

For example and without limitation, in one aspect, the preferred embodiments relate to a seating structure having a seat with a forward portion and a rear portion. The seat is tiltable between at least an upright tilt position and a reclined tilt position. The rear portion is automatically pivotable relative to the forward portion as the seat is tilted between the upright and reclined tilt positions.

In one embodiment, a back is coupled to the seat and is tiltable between at least an upright tilt position and a reclined tilt position. The back includes a lower portion and an upper portion. The upper portion is pivotable relative to the lower portion between a neutral position and an extended position, with the upper portion being pivotable relative to the lower portion independent of the tilt position of the back. In a preferred embodiment, the upper portion is pivotable relative to the lower portion when the rearward tilting, or tilt position, of the lower portion is limited.

In another aspect, a seating structure includes a base component, a first link member pivotally connected to the base component at a first horizontal pivot axis and a second link pivotally connected to the first link at a second horizontal pivot axis spaced from the first pivot axis. A portion of the second link extends in a longitudinal direction. A third link is pivotally connected to the second link at a third horizontal pivot axis spaced from the second pivot axis in the longitudinal direction, and the third link is pivotally connected to the base component at a fourth horizontal pivot axis spaced from the first pivot axis. The third link also includes a portion extending in the longitudinal direction.

A seat includes a front, thigh supporting region coupled to the longitudinally extending portion of the second link and a rear buttock supporting region coupled to the longitudinally extending portion of the third link. The rear buttock supporting region is spaced rearwardly from the thigh supporting region in the longitudinal direction. The third link is pivotable in a first direction relative to the second link about the third pivot axis between an upright position and a reclined position. An upper surface of the rear region of the seat forms an angle of greater than 180 degrees relative to an upper surface of the front region when the third link is in the reclined position.

In a preferred embodiment, a backrest has a lower portion non-pivotally coupled to one or both of the rear region of the seat and the third link. In one embodiment, the backrest includes an upper portion coupled to a back support member, with the back support member being pivotally connected to the base component about a fifth horizontal pivot axis, which is coincidental with the fourth pivot axis in one embodiment.

In yet another aspect, a seating structure includes a base component and a back support member having a lower support member pivotally connected to the base component about a first horizontal pivot axis and an upper support member pivotally connected to the lower support member about a second horizontal pivot axis spaced from the first pivot axis. At least one backrest component is coupled to the upper support member. An adjustment mechanism is coupled between the lower support member and the upper support member. The adjustment mechanism is operable between at least first and second positions. The upper support member is pivotable relative to the lower support member about a horizontal axis between at least first and second support positions as the adjustment mechanism is operable between the at least first and second positions.

In another aspect, a seating structure includes a base component and a body support member pivotally coupled to the base component. A spring biases the body support member toward an upright position. A force-adjusting member engages the spring and is moveable between at least first and second force applying positions. An actuator is coupled to the force-adjusting member and includes a grippable member that is translatably moveable relative to the base component between at least first and second adjustment positions. The force-adjusting member is moved between the first and second force applying positions as the grippable member is moved between the first and second adjustment positions.

In one embodiment, the spring is configured as a leaf spring and the force-adjusting member is configured as a fulcrum member. The fulcrum member is moveable in a fore-aft direction along a longitudinal axis between at least first and second fulcrum positions, with the actuator, and in particular the grippable member, moveable therewith in the fore-aft direction.

In yet another aspect, a seating structure includes a base component having a support surface and a fulcrum member moveable in opposite first and second longitudinal directions. The fulcrum includes a first roller rotatably supported by the support surface of the base component and a second roller contacting the first roller. The first roller is rotatable in first and second rotational directions as the fulcrum member is moved in first and second longitudinal directions respectively, while the second roller is rotatable in first and second rotational directions as the fulcrum member is moved in the second and first longitudinal directions respectively. In essence, the first and second rollers rotate in the opposite directions as the fulcrum is moved longitudinally. In one embodiment, at least one leaf spring is supported by the second roller.

In yet another aspect, a seating structure includes a leaf spring and a body support structure biased by the leaf spring. One of the leaf spring and the body support structure has a cam with a convex cam surface, while the other of the leaf spring and the body support structure has a cam follower with a concave cam surface. In operation, the cam follower engages the cam with the cam surfaces contacting one another.

In yet another aspect, a seating structure includes a support structure and a carrier moveably supported by the support structure. The carrier is moveable relative to the seat support structure in opposite first and second longitudinal directions. A flexible body support member includes a first portion fixedly coupled to the seat support structure, a second portion coupled to the carrier, and a third curved portion positioned between the first and second portions. The third portion is moveable toward and away from the support structure as the carrier is moved relative to the seat support structure in the first and second directions respectively. In one preferred embodiment, a cover member is disposed over an outer surface of the body support member and covers the third portion of the body support member.

The various aspects and embodiments provide significant advantages over other tilt chairs and seating structures, including chairs and seating structures having backrests, seats and tilt controls. For example, in one preferred embodiment, a rear portion of the seat automatically pivots rearwardly relative to a front portion, with the rear and front portions opening up and forming an angle greater than 180 degrees relative to each other, as the user tilts rearwardly in the chair. In this way, the rear portion provides support for the ischial tuberosities or buttock region of the user and prevents the user from sliding forwardly on the front portion of the seat. By separating the ischial tuberosities or buttock support region from the thigh support region, the entirety of the seat support surface does not have to tipped or pivoted as the user tilts rearwardly. As a result, the hip drop (the amount the hip joint of the user drops during recline) is reduced, thereby providing for tighter package space between the seat surface and tilt control, less energy stored in the tilt (as required to lift the user back up), and lower torques at the given angular travel.

In addition, the static angle of the back in an upright, neutral position can be easily and quickly adjusted relative to the seat so as to allow the user to customize the fit of the chair for their particular body size and shape. In addition, in one embodiment, the upper portion of the back can be independently pivoted relative to the lower portion of the back, for example when the user arches their back or extends their arms and shoulders rearwardly, while simultaneously supporting the user's back in the arched position. The upper portion will return automatically to a neutral position when the biasing force of the user is relieved.

The biasing mechanism also provides advantages. For example and without limitation, the actuator, and in particular the grippable portion, for adjusting the return force of the spring is translatable relative to the base component. By viewing the position of the grippable portion, or any other visible portion of the actuator, the user is provided with visual indicia as to the setting of the return force before they sit down and/or apply a force against the backrest.

In addition, when a leaf spring and adjustable fulcrum are used to apply the return biasing force to the seating structure, the first and second rollers used to support the spring on the base component allow for easy, relatively frictionless movement of the rollers relative to the base component and spring. As such, the position of the fulcrum can be easily adjusted even when the leaf spring is loaded.

The cam surfaces formed on the spring and the body support structure also provide advantages. In particular, the cam surfaces provide a balanced ride to all types of various users throughout the normal tilting range of the seating structure. In essence, this provides tailored torque outputs as disclosed for example and without limitation in U.S. application Ser. No. 10/738,641, filed Dec. 17, 2003 and entitled "Tilt Chair and Methods for the Use Thereof," the entire disclosure of which is hereby incorporated herein by reference. The cam surfaces eliminate the need for a spring link as disclosed in U.S. application Ser. No. 10/738,641, filed Dec. 17, 2003.

The embodiments of the adjustable seat also provide advantages. For example, the depth of the seat can be adjusted without having to move the entire seat, or in other words, while maintaining a rear portion of the seat in the same position. Such construction avoids the need for additional support members. In addition, the adjustment mechanism can be easily grasped and manipulated by the user to adjust the depth of the seat. Moreover the curved front portion of the seat provides transitional support for the user's legs when sitting down or standing up from the chair. At the same time, the curved portion is relatively flexible, thereby avoiding pressure points along the thighs of the user.

Of course, it should be understood that the various aspects disclosed herein can be used individually or in combination, with various combinations providing additional advantages. The present invention, together with further objects and advantages, will be best understood by reference to the following detailed description taken in conjunction with the accompanying drawings.

BRIEF DESCRIPTION OF THE DRAWINGS

FIG. 17A is a cross-sectional view of the seat cover engaging the seat frame.

DETAILED DESCRIPTION OF THE PRESENTLY PREFERRED EMBODIMENTS

General

Figure 1:
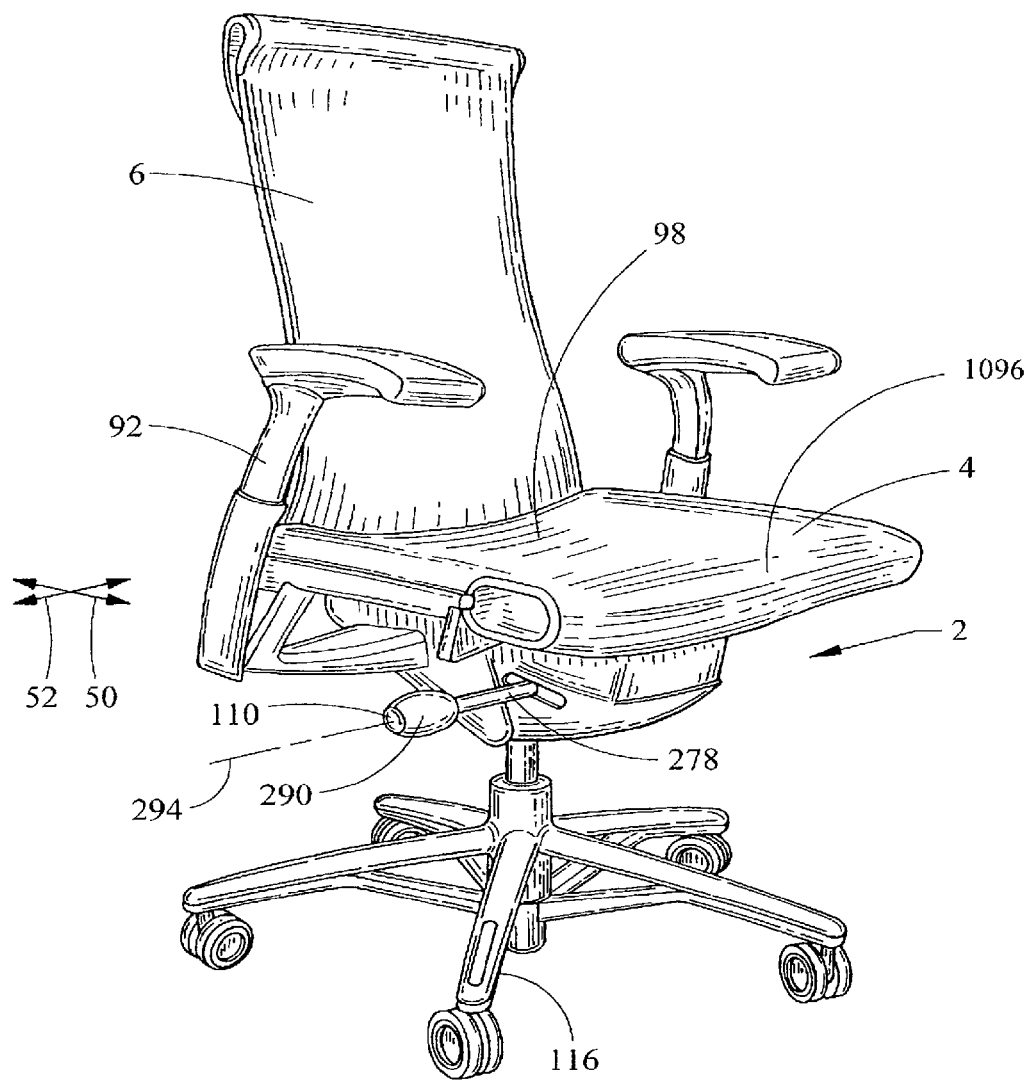
FIG. 1 is a perspective view of one embodiment of a chair.
Figure 2:
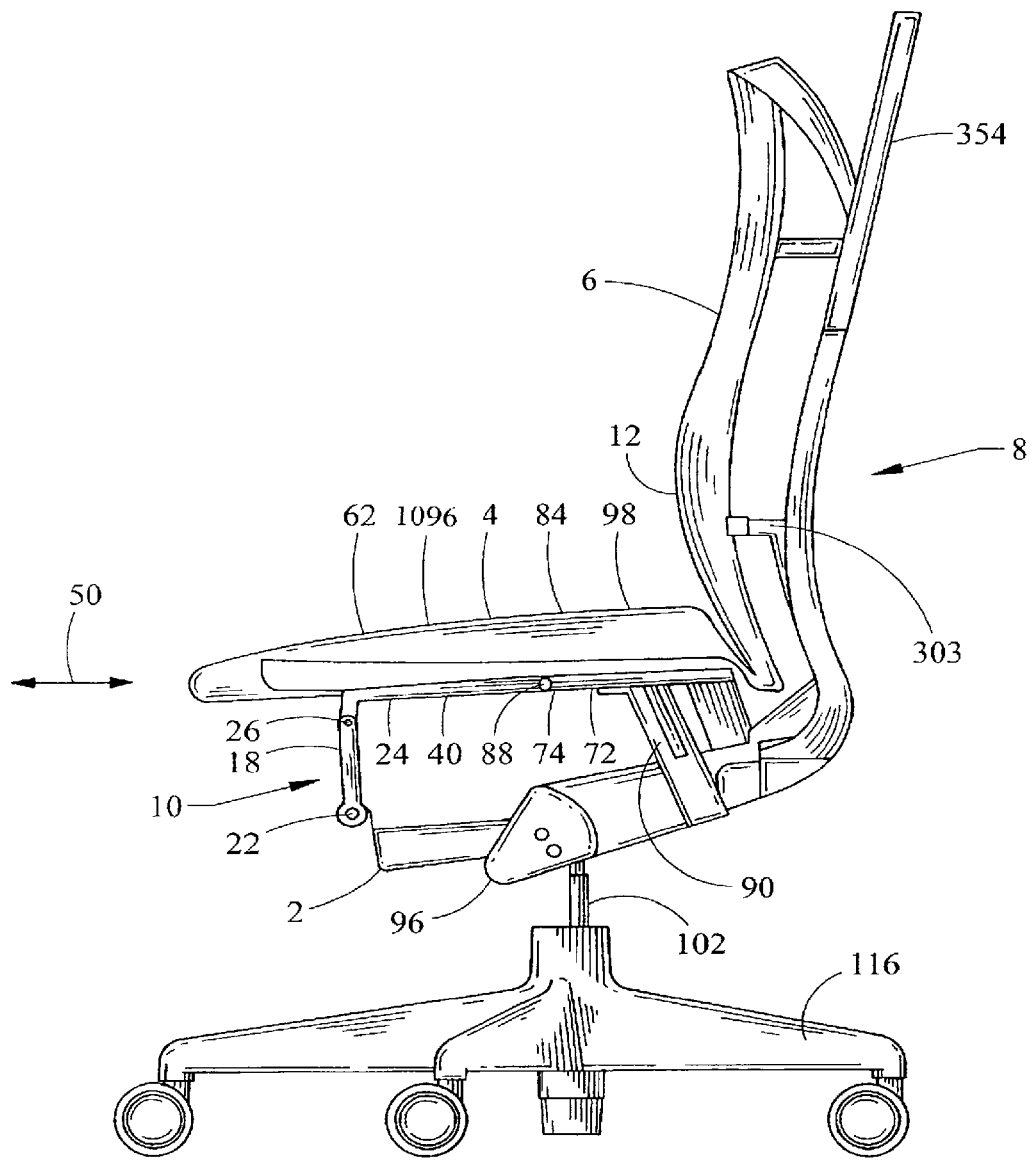
FIG. 2 is a schematic side view of a chair in an upright position.

The terms "longitudinal" and "lateral" as used herein are intended to indicate the directions 50, 52 of the chair from front to back and from side to side, respectively. Similarly, the terms "front", "side", "back", "forwardly", "rearwardly", "upwardly" and "downwardly" as used herein are intended to indicate the various directions and portions of the chair as normally understood when viewed from the perspective of a user sitting in the chair. It should be understood that the terms "mounted," "connected", "coupled," "supported by," and variations thereof, refer to two or more members or components that are joined, engaged or abutted, whether directly or indirectly, for example, by way of another component or member, and further that the two or more members, or intervening member(s) can be joined by being integrally formed, or by way of various fastening devices, including for example and without limitation, mechanical fasteners, adhesives, welding, press fit, bent-over tab members, etc. The term "plurality" means two or more.

Linkage Assembly:

Referring to the drawings, FIGS. 1-6, 18-20, 42, 48-54 and 58-60 show a preferred embodiment of the chair having tilt control housing 2, seat 4, back support member 8 and back 6. It should be understood that the term "housing" generally refers to any support member that supports another member, and includes, but is not limited to a structure that provides an enclosure. The seat 4 and a lower portion 12 of the back are supported by a linkage assembly 10, which is pivotally connected to the tilt control housing 2. The tilt control housing 2 forms a base component of the linkage assembly. The tilt control housing is formed by an upper bracket 14 and lower bracket 16, which are joined, for example by welding.

Figure 47:
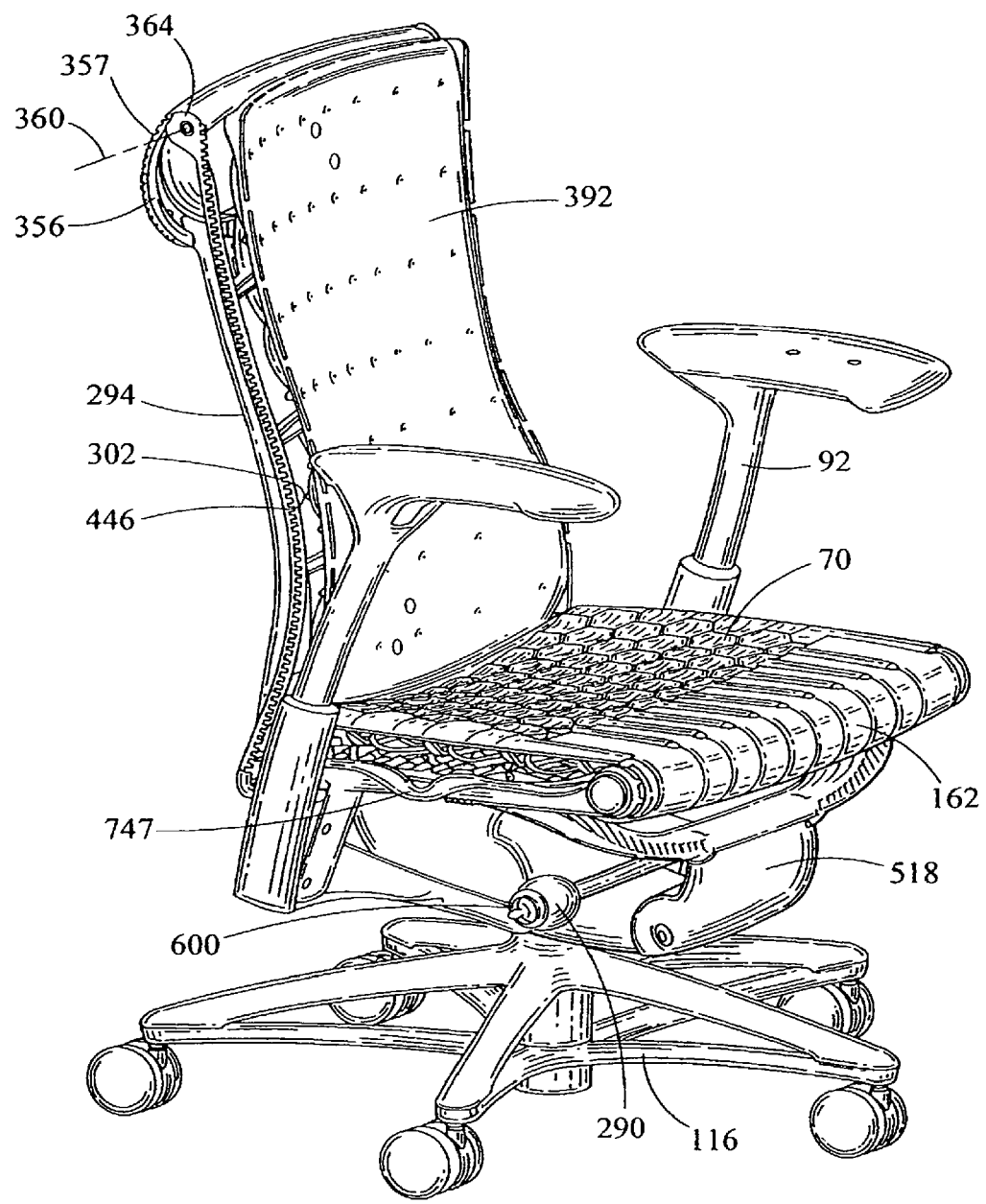
FIG. 47 is a front perspective view of the chair without the fabric cover.
Figure 48:
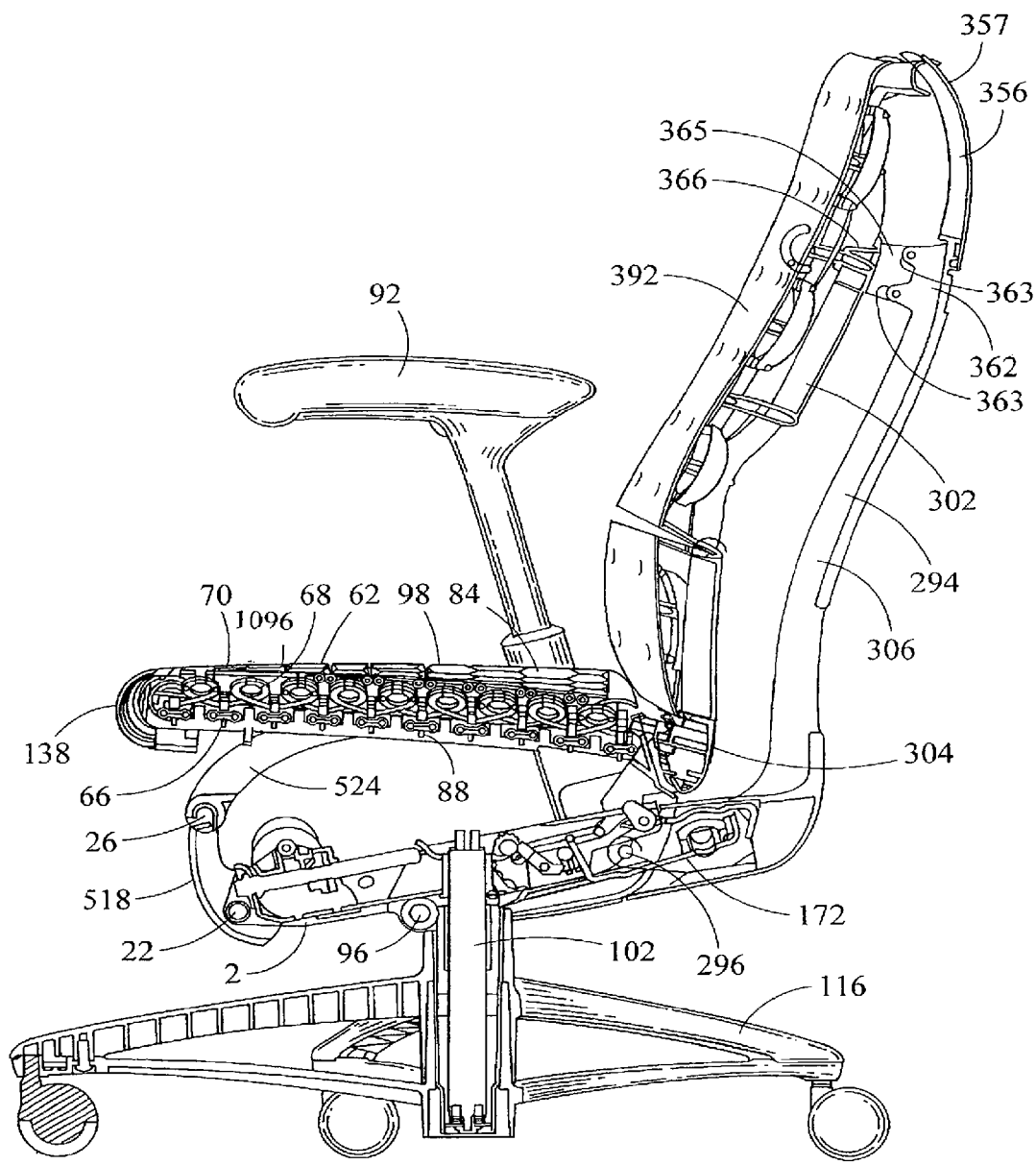
FIG. 48 is a side view of the chair without the fabric cover in a rearward, neutral, upright position.
Figure 49:
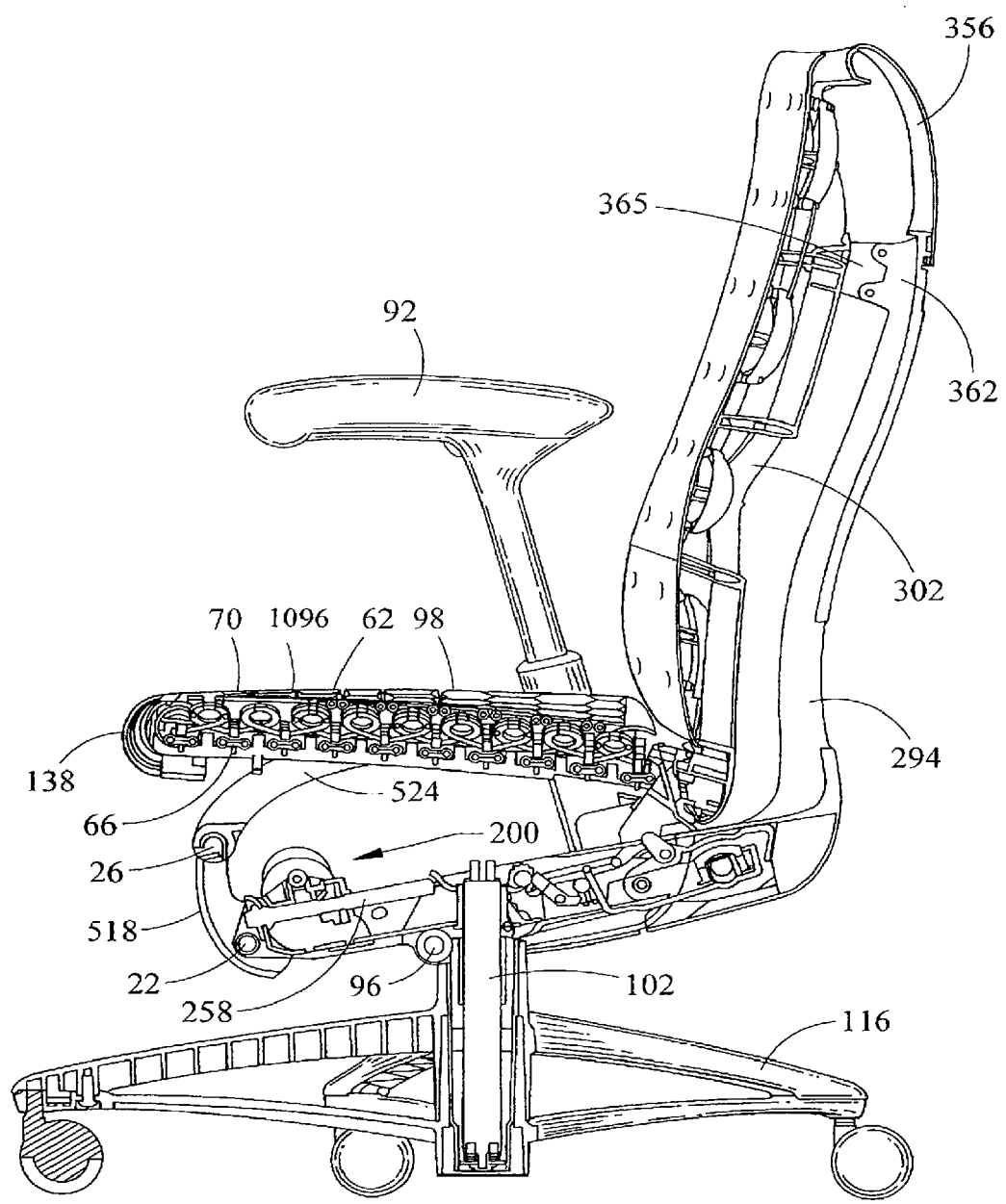
FIG. 49 is a side view of the chair without the fabric cover in a nominal, neutral, upright position.
Figure 50:
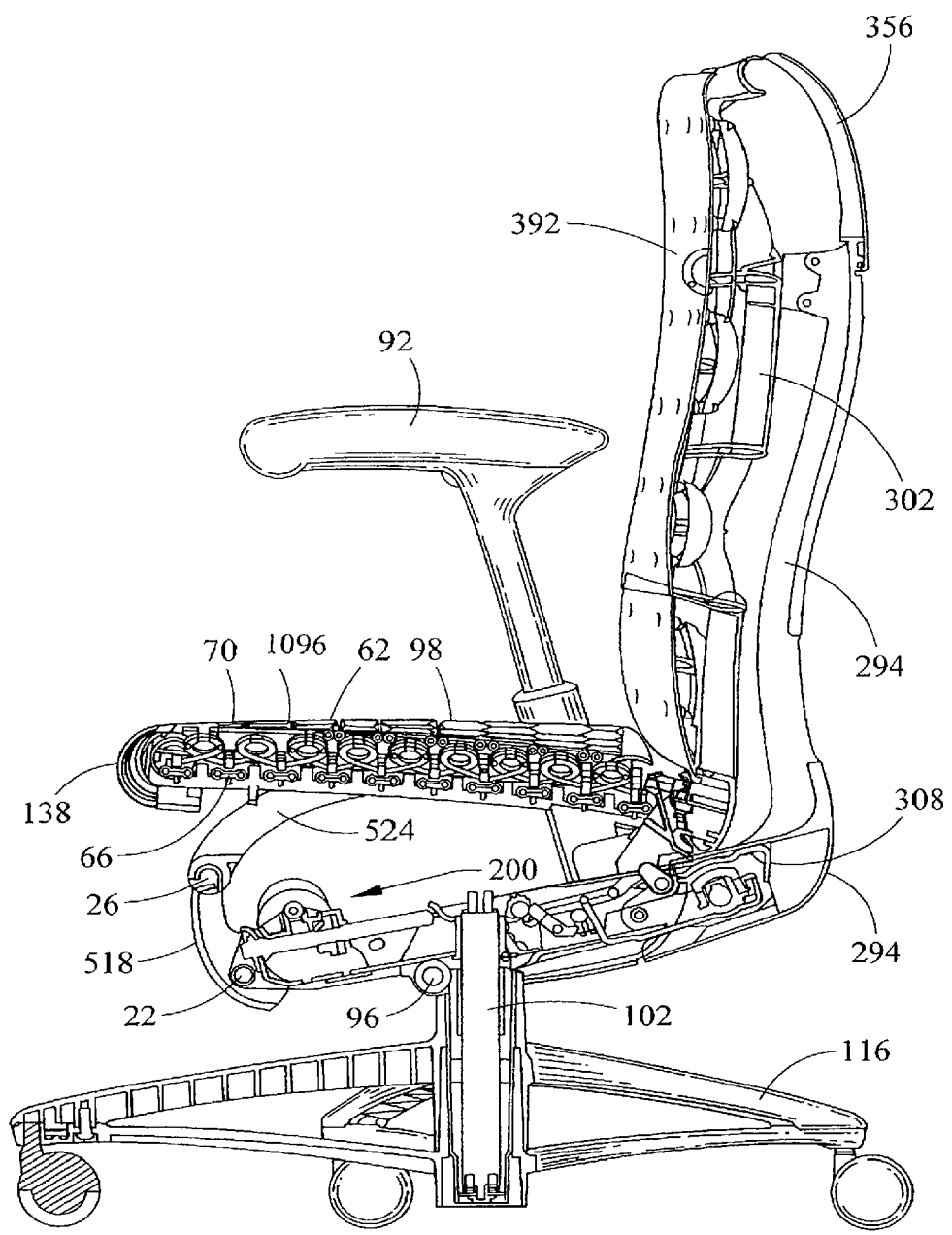
FIG. 50 is a side view of the chair without the fabric cover in a forward, neutral, upright position.
Figure 51:
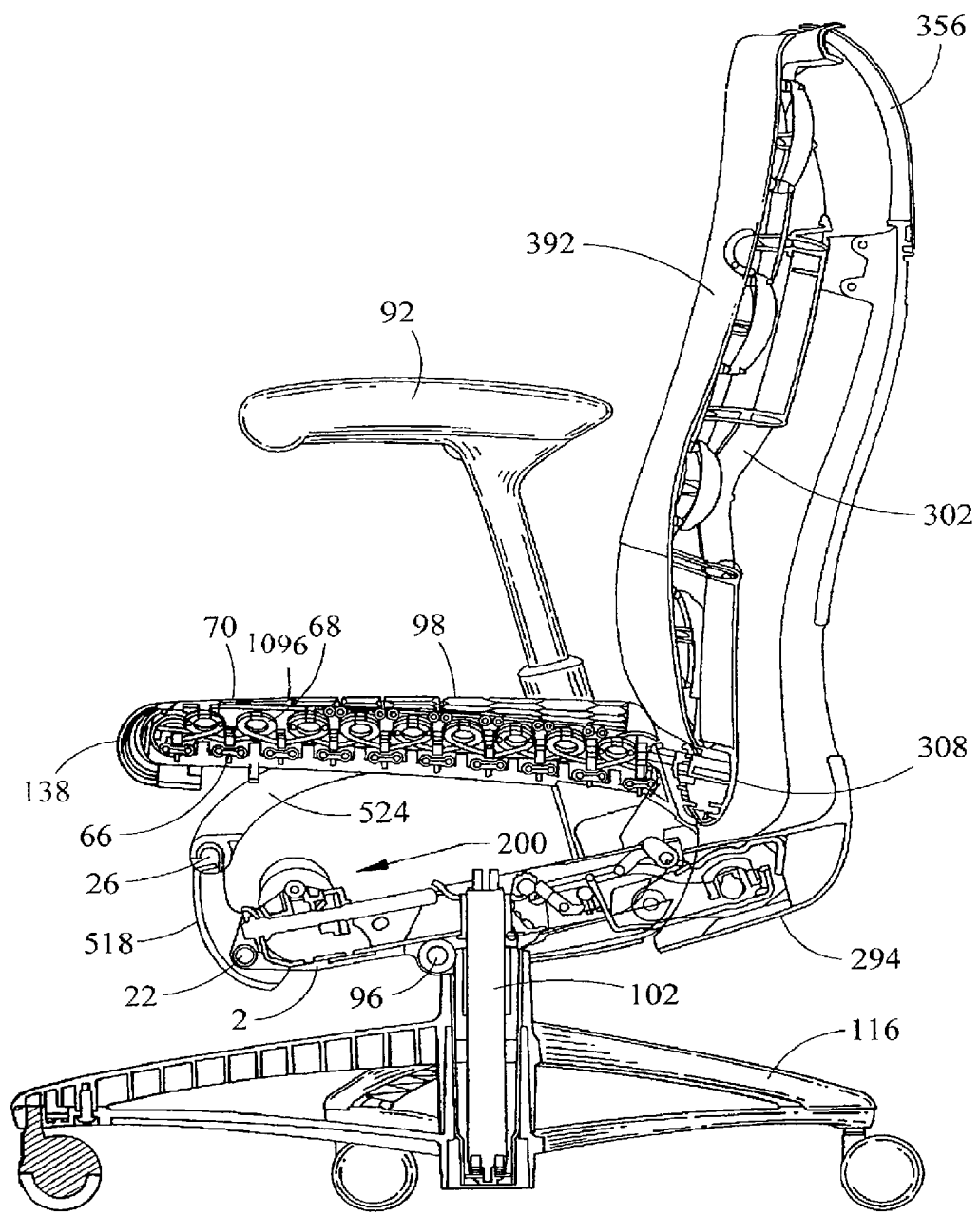
FIG. 51 is a side view of the chair without the fabric cover in a nominal, upright position, with the upper portion in an extended position.
Figure 52:
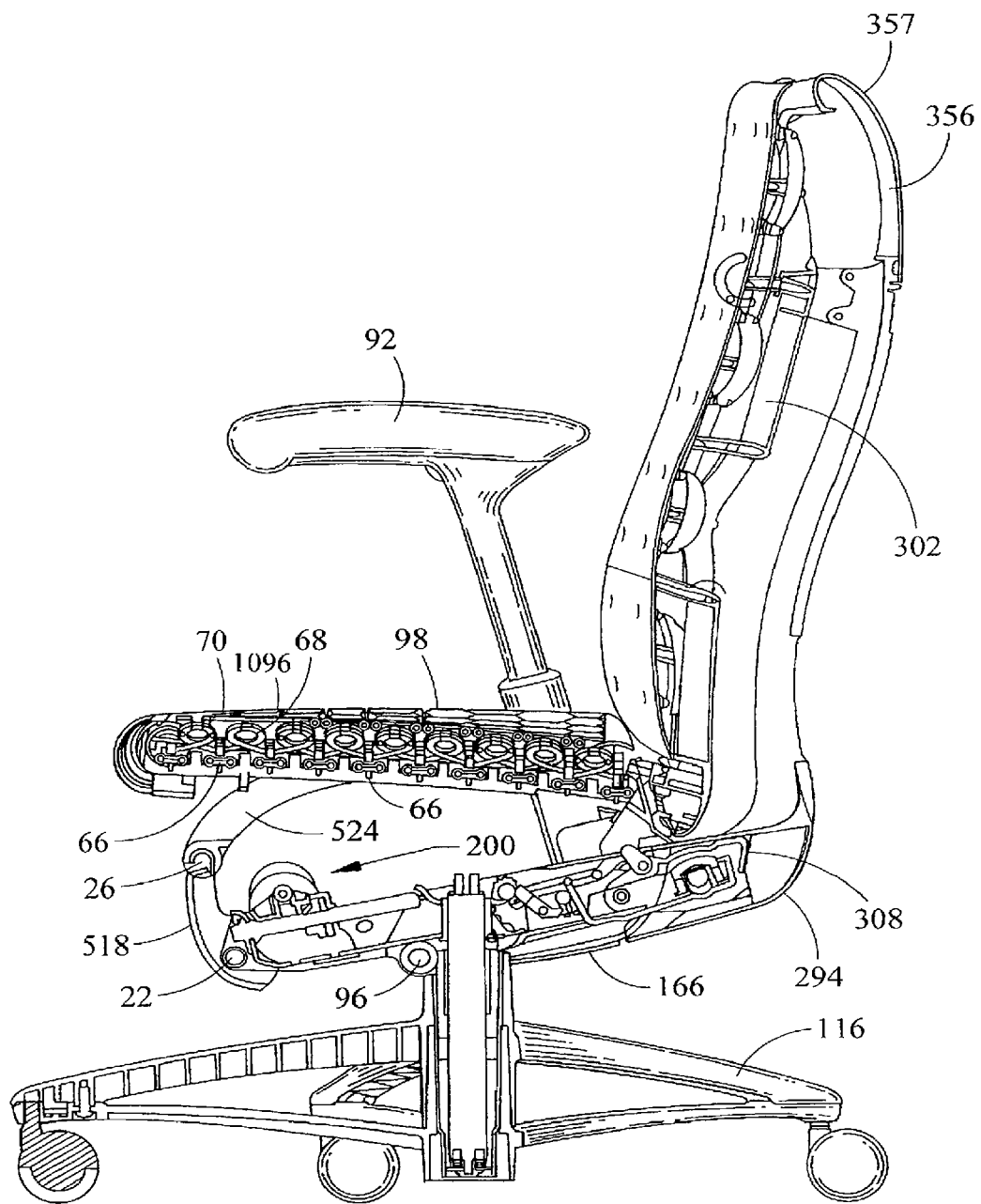
FIG. 52 is a side view of the chair without the fabric cover in a nominal, neutral, intermediate recline position.
Figure 59:
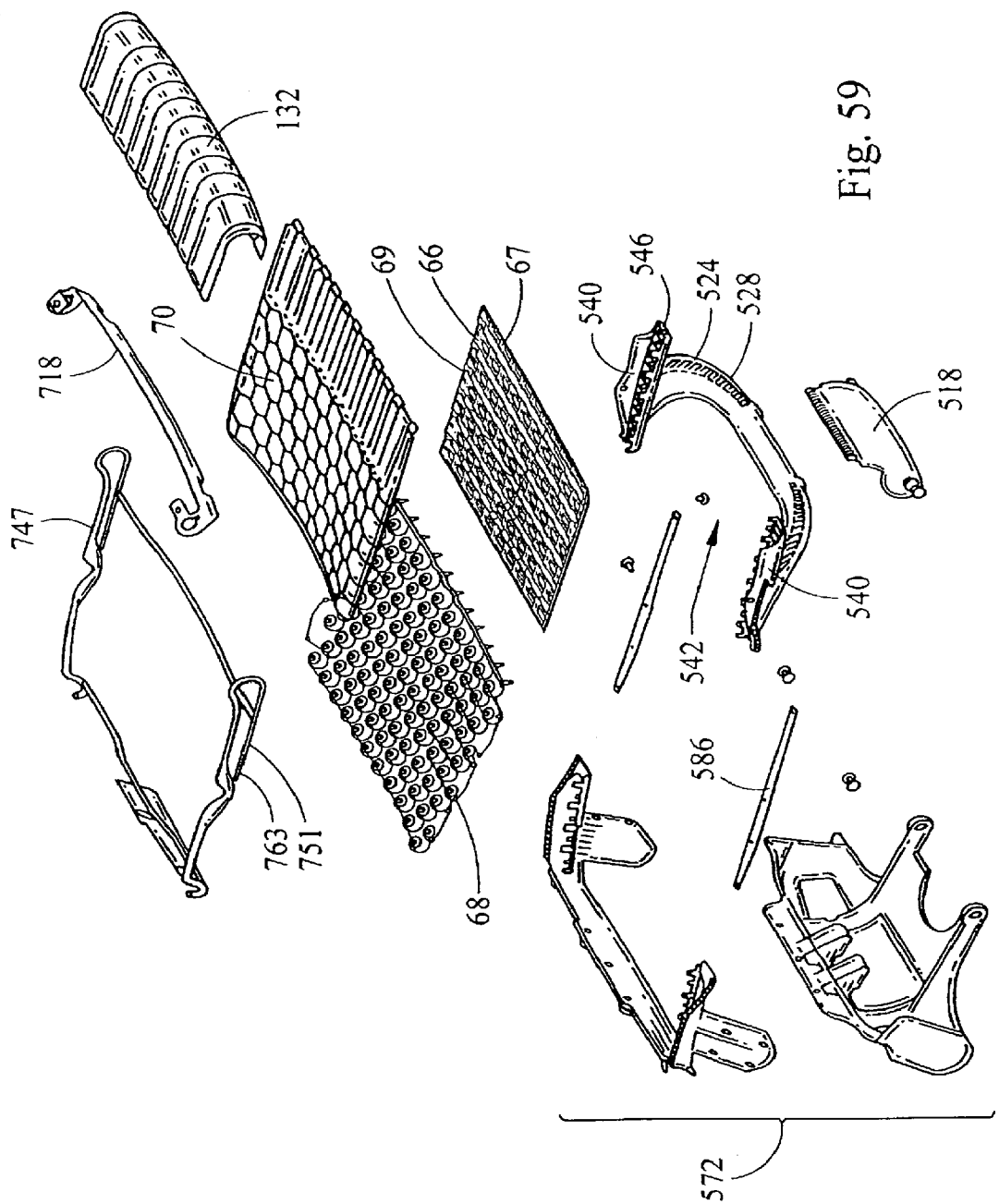
FIG. 59 is an exploded view of the seat shown in FIG. 58.
Figure 60:
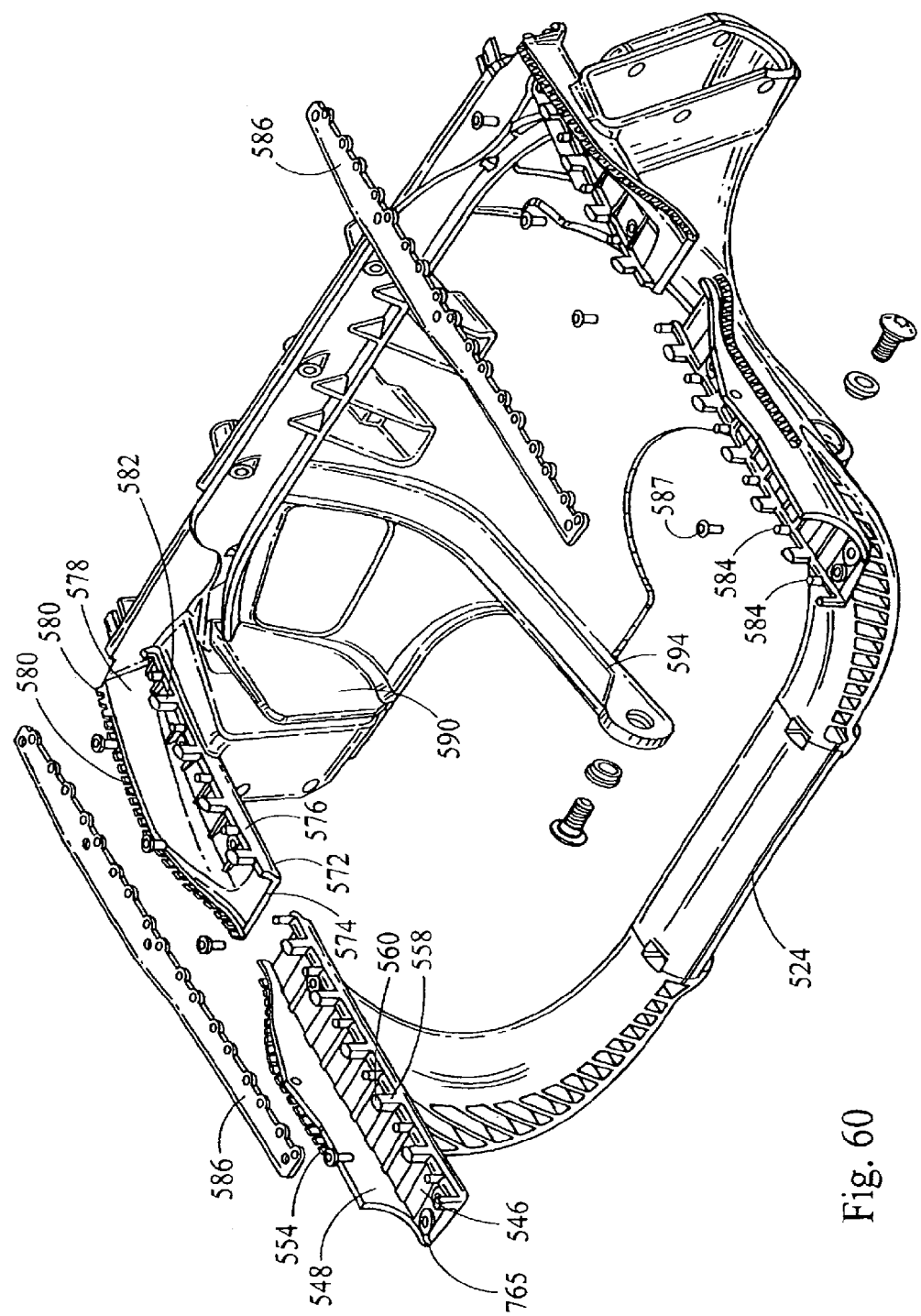
FIG. 60 is an exploded view of various components of the linkage assembly.
Figure 61:
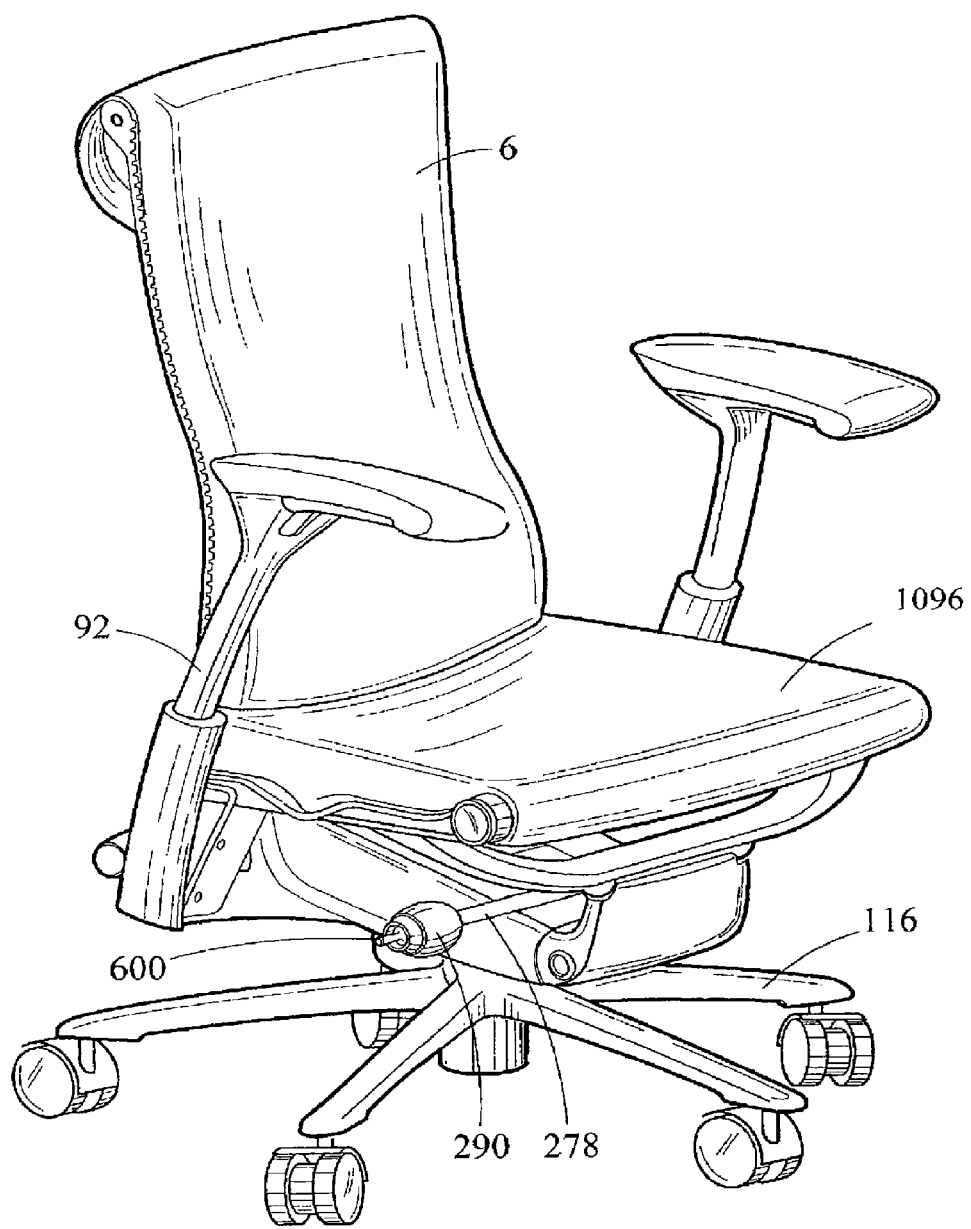
FIG. 61 is a perspective view of the chair.

The linkage assembly 10 includes a first link 18, 518 having a first end pivotally connected to a pair lugs 20, extending forwardly from a front portion of the tilt control housing or base component, at a first horizontal pivot axis 22. The first link 18, 518, or front link, can be formed from any suitable material, including metal or a plastic, such as a 30-33% GF nylon. The first link extends upwardly and has a second end pivotally connected to a front seat frame 24, 524, which forms a second link, at a second horizontal pivot axis 26 formed on a downwardly extending U-shaped support or leg 28, 528. Preferably, only a single first link is provided, and is secured to the middle of the support 28, 528. As shown in FIGS. 47 and 59, the upstanding portions of the support 528 are curved in two planes and extend upwardly and rearwardly from the pivot axis 26. Alternatively, a pair of first links can be provided along opposite sides of the seat. A pivot axle 32 can be integrally formed on one or the other, or both, of the first and second links 18, 518, 24, 524. Alternatively, a separately formed axle can be used to secure the first and second links. In one embodiment, the axle 32 is formed on the first link, which includes a plurality of round ribs that ride along a bushing 30 secured between the first and second links. The end portions of the axle 32 snap into the second link, while the round ribs carry the load. A socket or recess 36 is formed in the second link to receive the axle, bushing and ribs. A cover member 38 is disposed and connected over a forwardly facing portion of the seat frame to provide an aesthetically pleasing appearance. The seat frame is preferably made of glass filled nylon, although it should be understood that it can be made form a variety of materials, including metal, plastic, composites, and combinations thereof.

Figure 98:
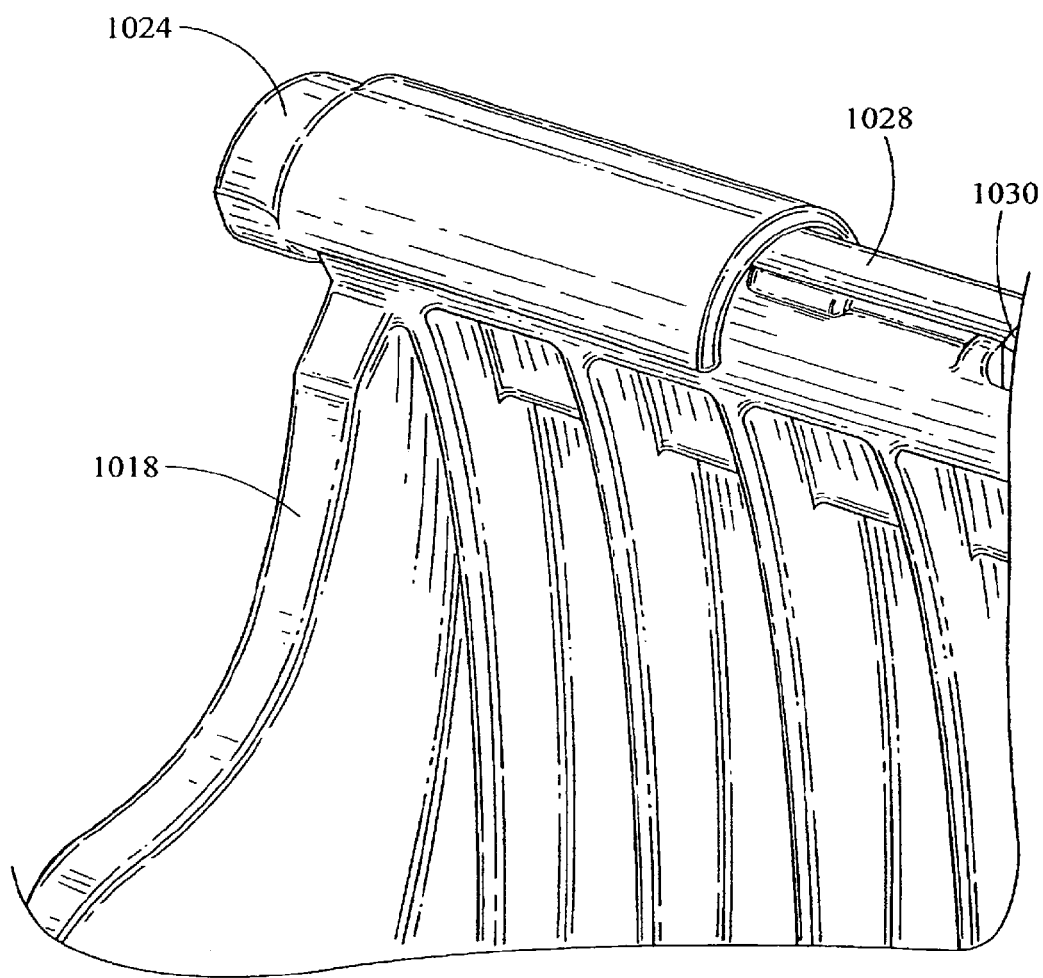
FIG. 98 is a partial perspective view of a link with a snap-fit rotation device.
Figure 99:
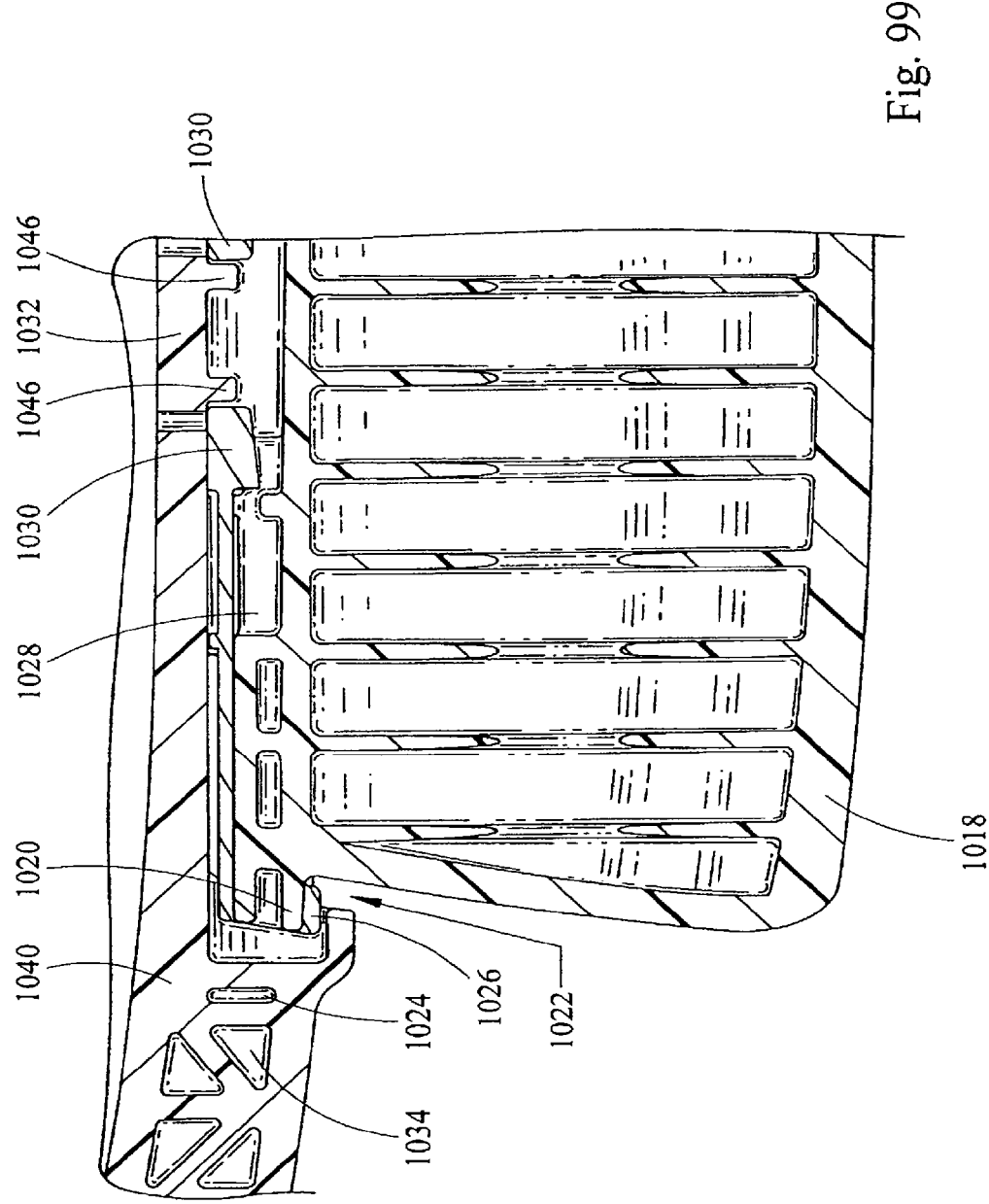
FIG. 99 is a cross-sectional view of the link shown in FIG. 98 secured to a frame member.

In another embodiment, shown in FIGS. 98 and 99, a front link 1018 includes a pair of axles or posts 1020 extending laterally outwardly from opposite sides of the front link. A pair of bushings 1026 are axially disposed on the posts, and include an inwardly extending resilient arm 1028 with an enlarged end portion defining a catch member 1030. A seat frame 1040 includes a laterally extending recess 1042 shaped to rotatably receive the pivot member and attached bushings. The frame 1040 includes a pair of spaced apart radially extending catch members 1032. The catch members 1032 are positioned such that opposite outer walls 1046 thereof are substantially aligned with the outer catch portions 1030 of the resilient arms when the link and frame are engaged, so as to prevent relative axial movement between the link and frame and with the engagement between the posts and socket preventing relative radial movement between the link and frame, thereby rotatably securing the link to the frame. The end of the recess is formed as a socket 1024 shaped to rotatably receive the bushings 1020. The overall length of the recess 1042, or the individual depth of each socket 1024 on each side thereof, are greater than the overall length of the link (from one post end to the other), or greater than the individual length of the axle and hub, with a gap 1022 formed between the edge of the link and mouth of the frame on each side of the link.

In operation, an assembler slides one end (e.g. left side) of the bushing/axle 1020, 1026 all of the way into a corresponding socket 1024 such that the gap 1022 on that side is eliminated and such that an opposite bushing/axle 1020, 1026 clears the mouth of the recess on the other side (e.g., right side) and is aligned along a pivot axis 1034. At this initial insertion stage, an opposite catch member 1030 (e.g., right side) is biased radially outwardly by a corresponding catch member 1032 (e.g., right side) on the frame. The user then moves the link 1018 in an axial direction along axis 1034 toward the opposite end until the biased catch member 1030 (right side) slides past the catch member 1032 on the frame and snaps into place, thereby rotatably securing the link to the frame. As shown, the link can be installed from either side, and is therefore not left or right handed. It should be understood, however, that the mechanism could be configured with a single catch member on the link and a single catch member on the frame, with an opposite elongated socket in the frame to initially receive the link axle. It should be understood that this device can be used to rotatably secure any two components, and is not limited to the frame and link for a chair as shown and described. It should also be understood that the resilient arm and/or bushing can be integrally formed with the link component. In addition, the arm and catch portions can be used to secure any two components in a non-rotatable engagement, for example where the configuration of the socket or end post, or other non-rotation members, are configured to prevent such rotation. The device provides for two components to be non-axially and non-radially moveable relative to each other without having to provide an opening or access for a pin to be inserted along the rotation axis.

Referring to FIGS. 6-8 and 57-60, the front seat frame 24, 524, or second link, has a pair of substantially horizontal arms 40, 540 that are spaced apart in the lateral direction and form an opening 42 therebetween. The arms 40 extend rearwardly in the longitudinal direction 50 from the front to the rear of the chair. Each arm is configured with a guide 44, 544 or track that opens to the front of the frame. Each arm preferably has an L-shaped cross section defining a substantially horizontal flange 46, 546 and a vertically oriented flange 48, 548. A plurality of fingers 54, 554 extend upwardly from a top of the vertical flange and are adapted to anchor a fabric 56 by way of a carrier member, shown in FIG. 17, which snaps onto the frame. For example, the fingers can be configured with barbs or catch members at the ends thereof for engagement with a carrier or other cover component. In other embodiments, the seat frame is formed with a female receptacle that receive a male portion formed on the carrier member. Various suitable embodiments for forming the fabric and carrier, and securing them to a support structure, are disclosed in U.S. application Ser. No. 10/796,406, filed Mar. 8, 2004 and entitled "Fabric Attachment Device," the entire disclosure of which is hereby incorporated herein by reference. In the embodiment shown in FIGS. 59 and 60, the flange 548 is not linear, but rather has a slight concave profile, and then tapers or slopes downwardly toward the horizontal flange 546 toward the rear portion of the second link 524.

Figure 79:
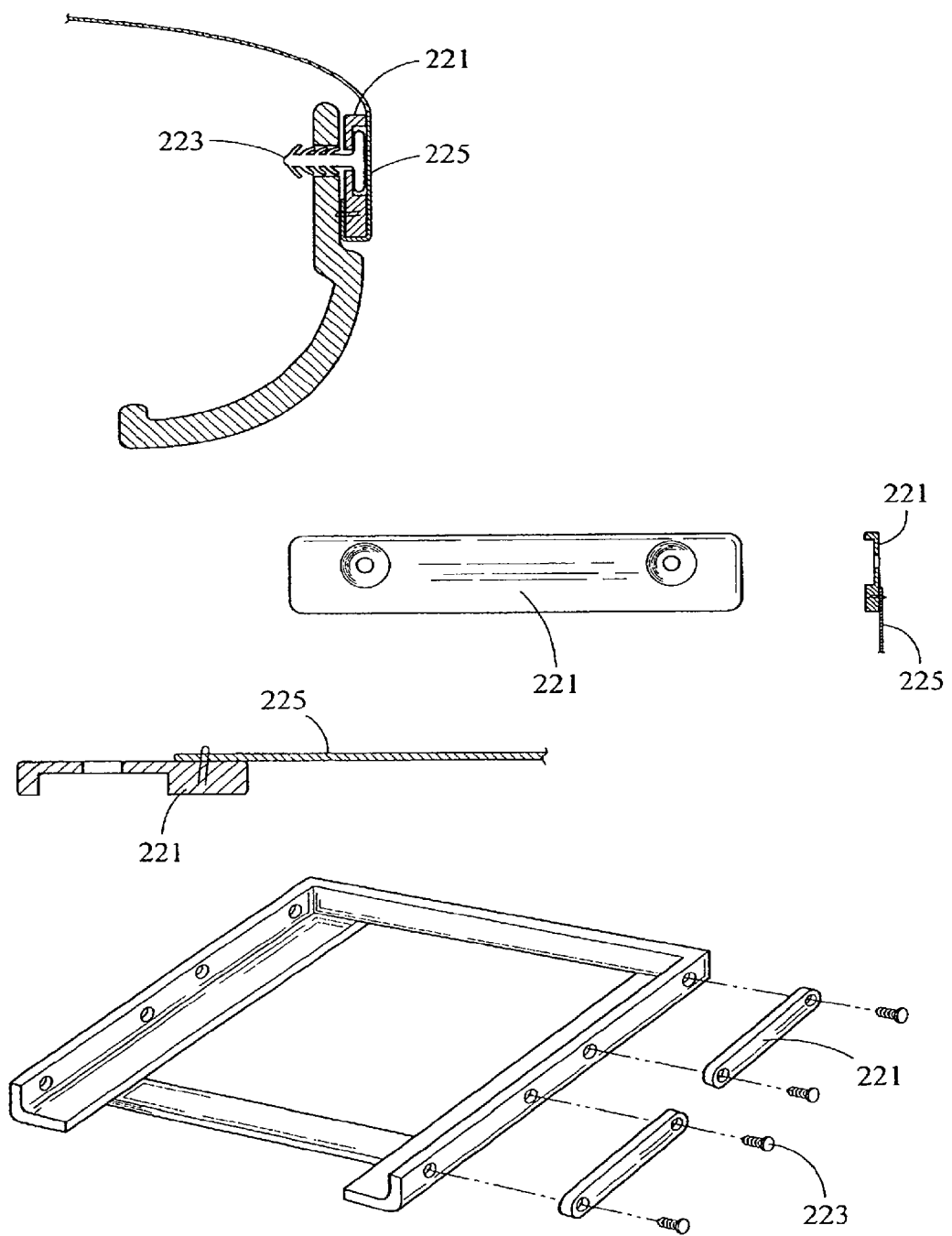
FIG. 79 is an exploded view of a fabric attachment assembly for a seat.

In an alternative embodiment, the carrier member is omitted. Instead, the fabric is provided with a plurality of fastener components, such as Christmas tree fastener or snap-fit fastener, that engage openings in the frames with a snap fit. The fabric can also be secured with other mechanical fasteners, by bonding, or by various combinations thereof. For example, as shown in FIG. 79, a frame member 221 is attached to an edge portion 225 of the cover, e.g., fabric or textile material, with a staple, bond, sewing etc., or combinations thereof. A Christmas tree fastener 223 is then secured through the frame member 221 and into the seat frame, with the cover wrapping around the inner frame and covering the head of the fastener 223.

Figure 80:
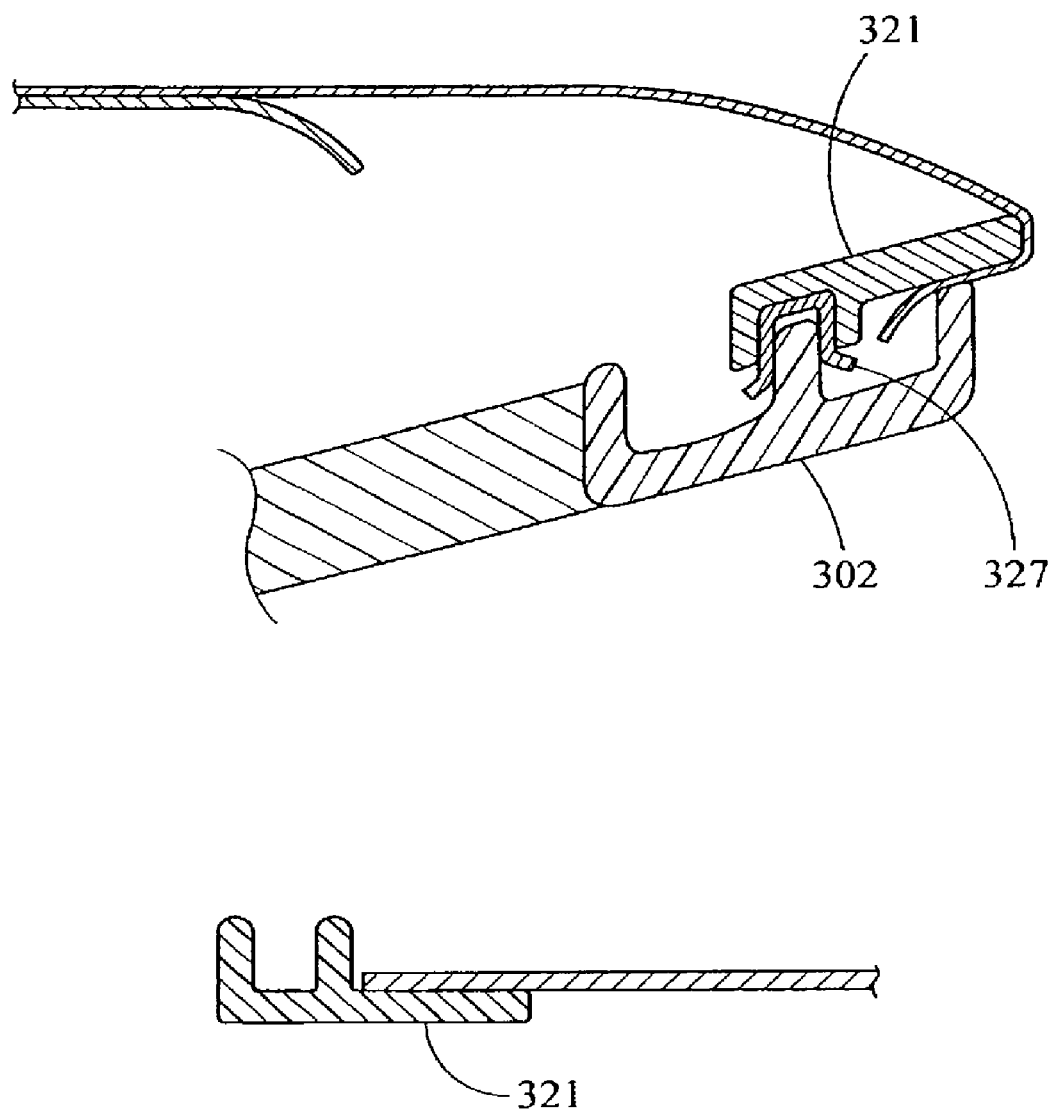
FIG. 80 is an exploded view of a fabric attachment assembly for a backrest.

Referring to FIG. 80, a frame member 321 is again secured to an edge portion of the cover with bonding, stapling, sewing etc., or combinations thereof. The frame has a U-shaped socket in which a retainer clip 327, e.g., tinnerman clip, is inserted. The clip 327 releasably engages a forwardly facing flange portion of the backrest frame 302, with the fabric wrapping around the edge of the frame member 321 and then across the front of the pad structure.

Referring to FIGS. 6-8 and 57-60, a plurality of engagement/support arms 58, 558 extend upwardly from an inboard edge of each horizontal flange 46, 546. The support platforms are each configured with an enlarged head portion 60, 560. The engagement/support platforms are joined to a suspended body support member, which defines a portion of the seat. In particular, a front, thigh-supporting region 62 of the seat is coupled to the arms of the front seat frame.

For example, a membrane can be disposed across the opening and be engaged with the support platforms or fingers on each arm, as shown for example in U.S. application Ser. No. 10/738,641, filed Dec. 17, 2003, published as U.S. Publication No. 2004/0183350 A1 and entitled "Tilt Chair and Methods for the Use Thereof," the entire disclosure of which is hereby incorporated herein by reference. In one alternative embodiment, the suspended body support member is configured as a suspended pixelated seat structure, as shown for example and without limitation in U.S. application Ser. No. 11/433,891, filed May 12, 2006 and entitled "SUSPENDED PIXELATED SEATING STRUCTURE", the entire disclosure of which is hereby incorporated herein by reference. In particular, as shown in FIGS. 12-17, the suspended pixelated seat structure has a frame component 64 having plurality of openings through which the support arms are disposed, with the enlarged heads engaging the frame with a snap-fit. The suspended pixelated seat structure further includes a macro compliance layer 66, including for example a plurality of primary support rails, joined to the frame, a micro compliance layer 68, including for example a plurality of spring elements, joined to the macro compliance layer, and a load support layer 70, including a plurality of pixels connected to the springs.

Figure 56:
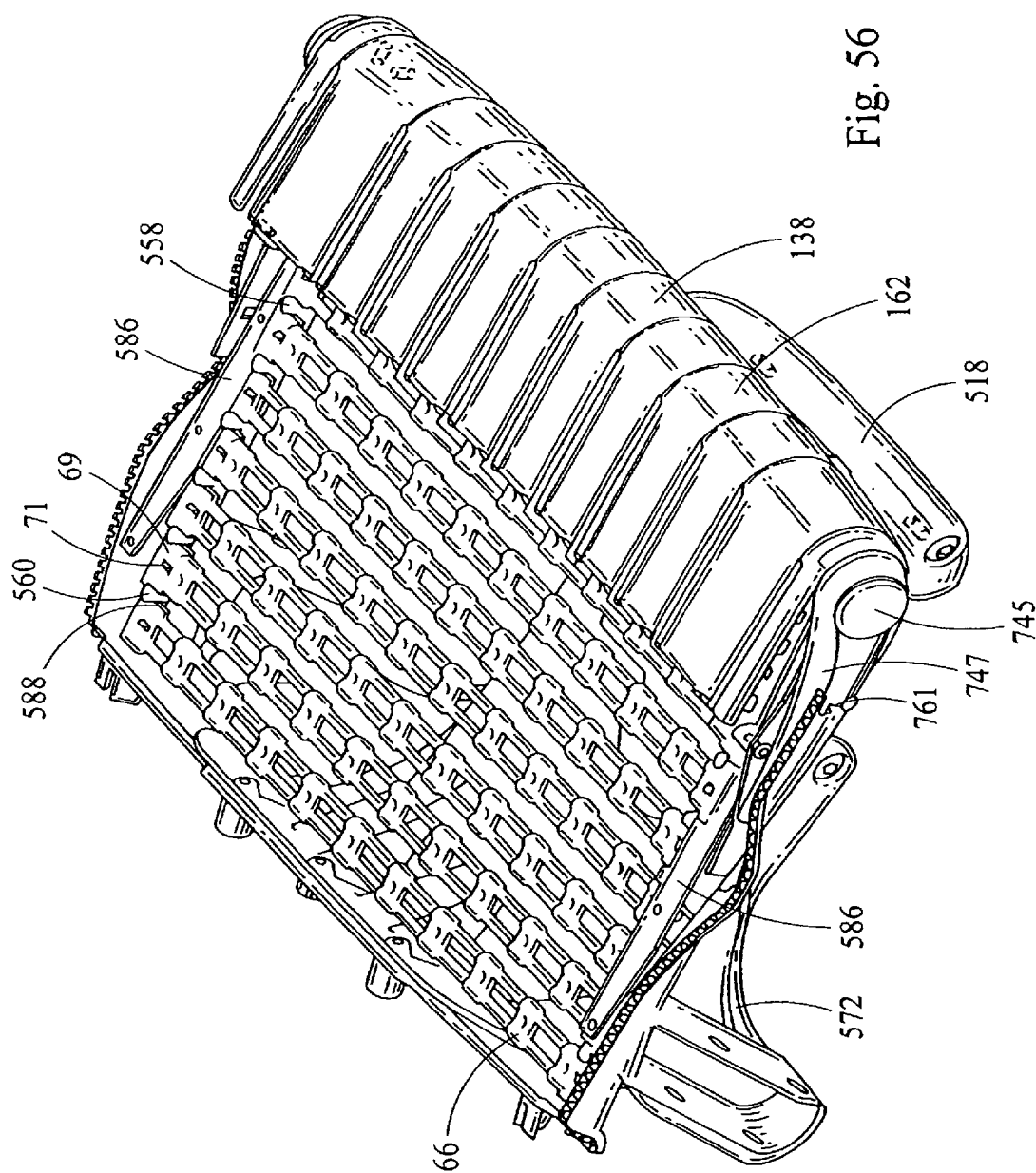
FIG. 56 is a partial, perspective view of the seat.

In one embodiment, shown in FIGS. 56 and 59, the macro compliance layer 66 is connected directly to the frame. In particular, each strip 67 of the macro layer has a T-shaped head portion 69, which is disposed in the opening between two adjacent support arms 558. The enlarged head 560 extends over the T-shaped head portion and holds the strip to the frame. The head 69 also has an opening therethrough which receives one of the posts 71 positioned between adjacent arms 558.

Referring again to FIGS. 6-8 and 57-60, a rear seat frame 72, 572, which forms a third link, has a pair of arms 74, 574 extending forwardly in the longitudinal direction 50. The arms are spaced apart in the lateral direction 52 and are substantially aligned with the arms 40, 540 of the forward seat frame, with the free ends of the arms 40, 540, 74, 574 substantially abutting. The arms 74, 574 are configured similar to the arms of the front seat frame, and include horizontal and vertical flanges 76, 576, 78, 578 upwardly extending fingers 80, 580 and upwardly extending engagement/support members 82, 582 and posts 71 which are configured to support a suspended body support member as just explained. In particular, a rear, buttock-supporting region 84 of the seat is coupled to the arms of the rear seat frame, where the buttock-supporting region 84 is spaced longitudinally rearwardly from the thigh-supporting region 62. In the embodiment shown in FIGS. 59 and 60, the flange 578 is not linear, but rather has a slight concave profile, and then tapers or slopes downwardly toward the horizontal flange 576 toward the front portion of the third link 524. The flanges 548 and 578 in combination form a V-shaped opening when viewed from the side. The opening helps prevent the carrier member or other component of the fabric, from experiencing excessive tension as the rear seat frame 572 pivots relative to the front seat frame 524.

A pair of leaf springs 86, 586 bridge or span the gap between the free ends of the arms 40, 540, 74, 574 of the front and rear seat frames and are secured, for example with adhesive and/or fasteners 587, to the horizontal flanges 46, 546, 76, 576 of each of the arms. A plurality of posts 589 further support the macro compliance layer 66. The leaf springs 86 pivotally connect the front and rear seat frames, or second and third links, at a virtual horizontal pivot axis 88. In an alternative embodiment, the second and third links can be pivotally connected at a hard pivot axis, for example with a pivot member. It should be understood that the pivot axis can be defined as a compliant joint allowing two components to pivot relative to each other, and that the position of the axis (actual or virtual) may change or move over the range of pivoting between the two components.

The rear seat frame has a pair of downwardly extending support members 90, 590, positioned along each side of the frame. A pair of armrests 92 are connected to and extend upwardly from the support members. The rear seat frame can be made from two parts, each of which can be a different material, for example glass-filled nylon and aluminum.

The rear seat frame 72, 572, or third link, also includes a pair of forwardly extending lugs 94, 594 that are pivotally connected to the tilt control housing 2, or base component, at a fourth horizontal pivot axis 96. In this way, the base component 2, or tilt control housing, front pivot link 18, 518 and front and rear seat frames 24, 524, 72, 572 define the four links of a four-bar linkage.

Figure 3A:
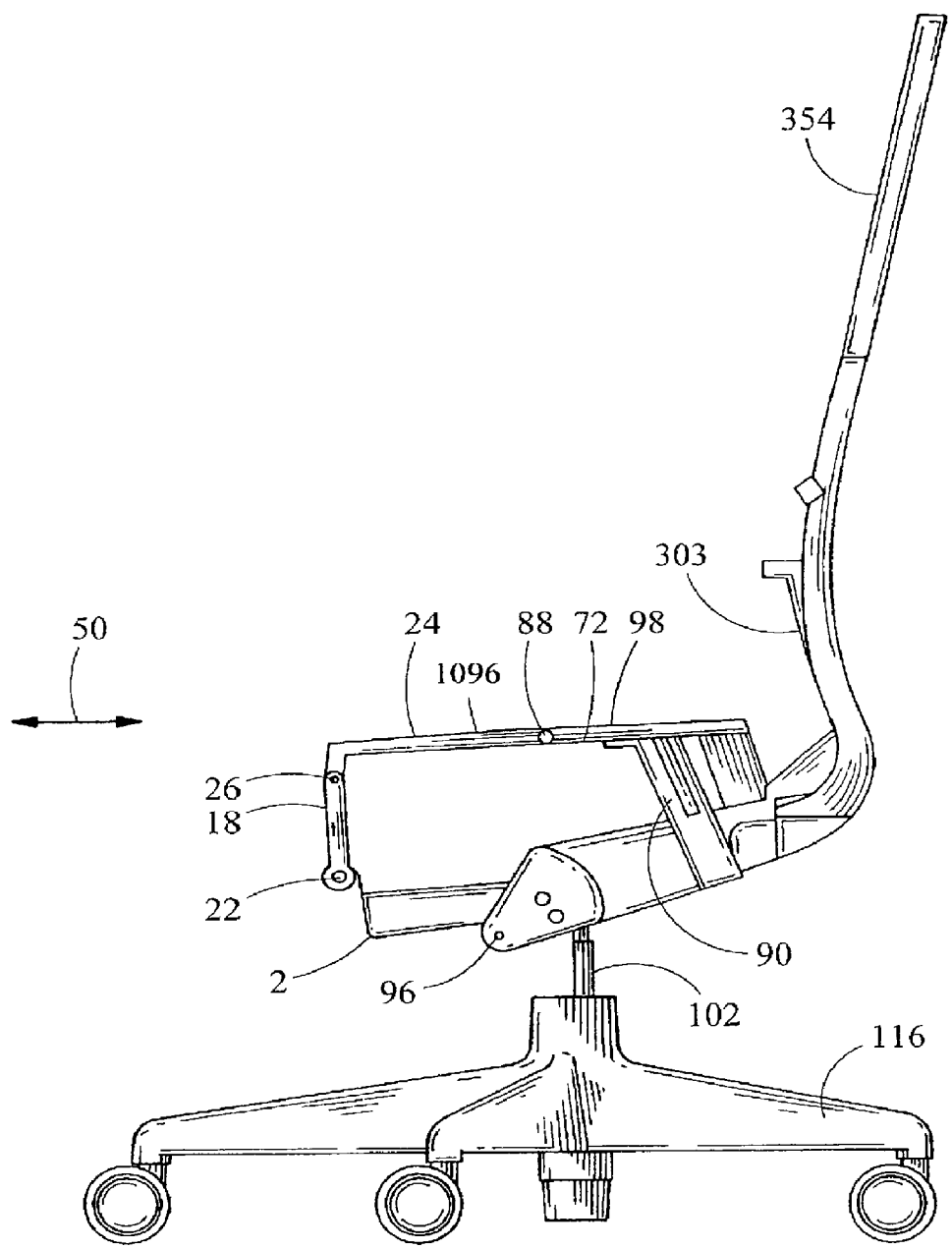
FIG. 3A is a schematic side view of the linkage assembly for the chair shown in FIG. 2.
Figure 3B:
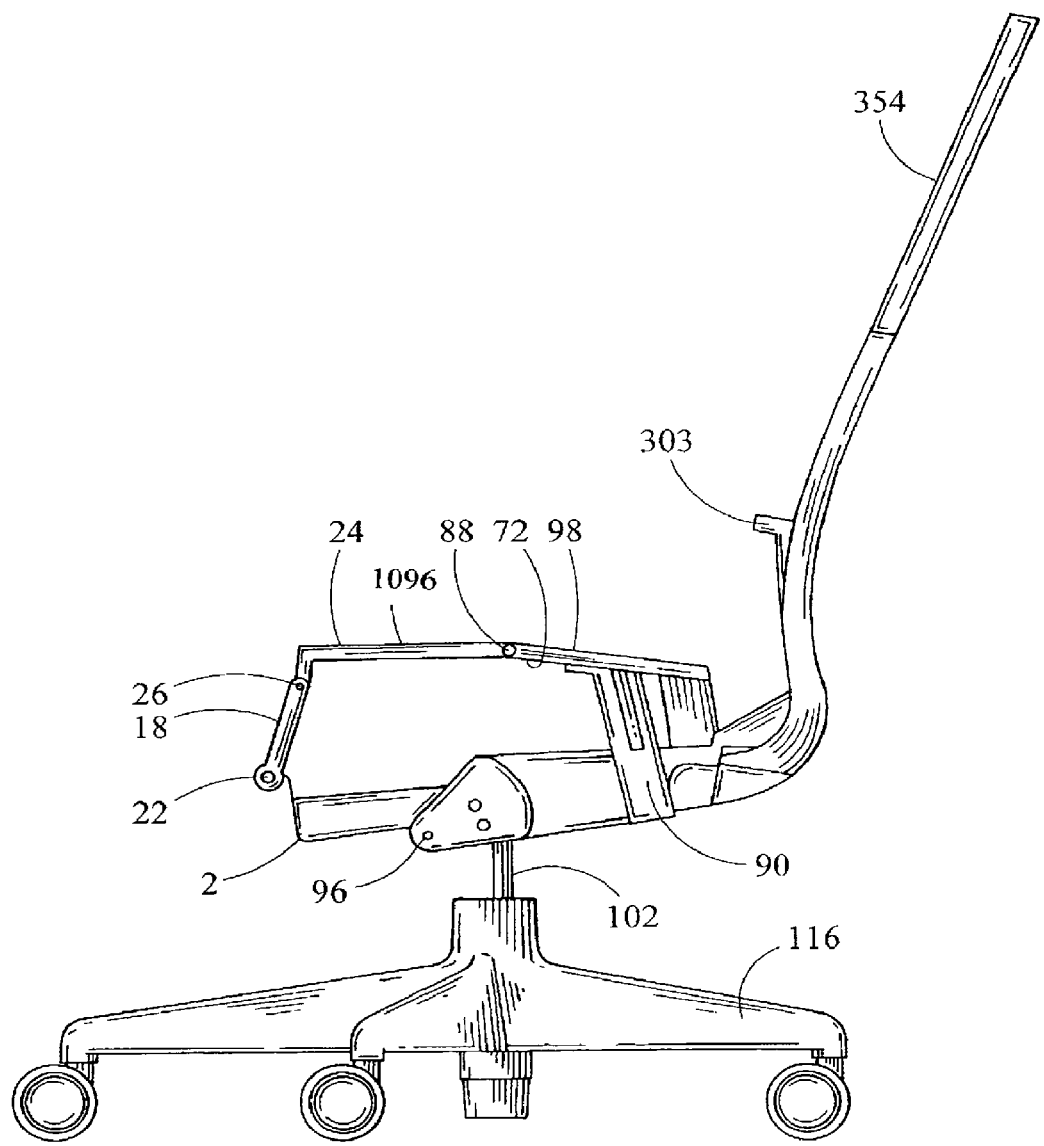
FIG. 3B is a schematic side view of the linkage assembly for the chair shown in FIG. 2 in an intermediate reclined position.
Figure 3C:
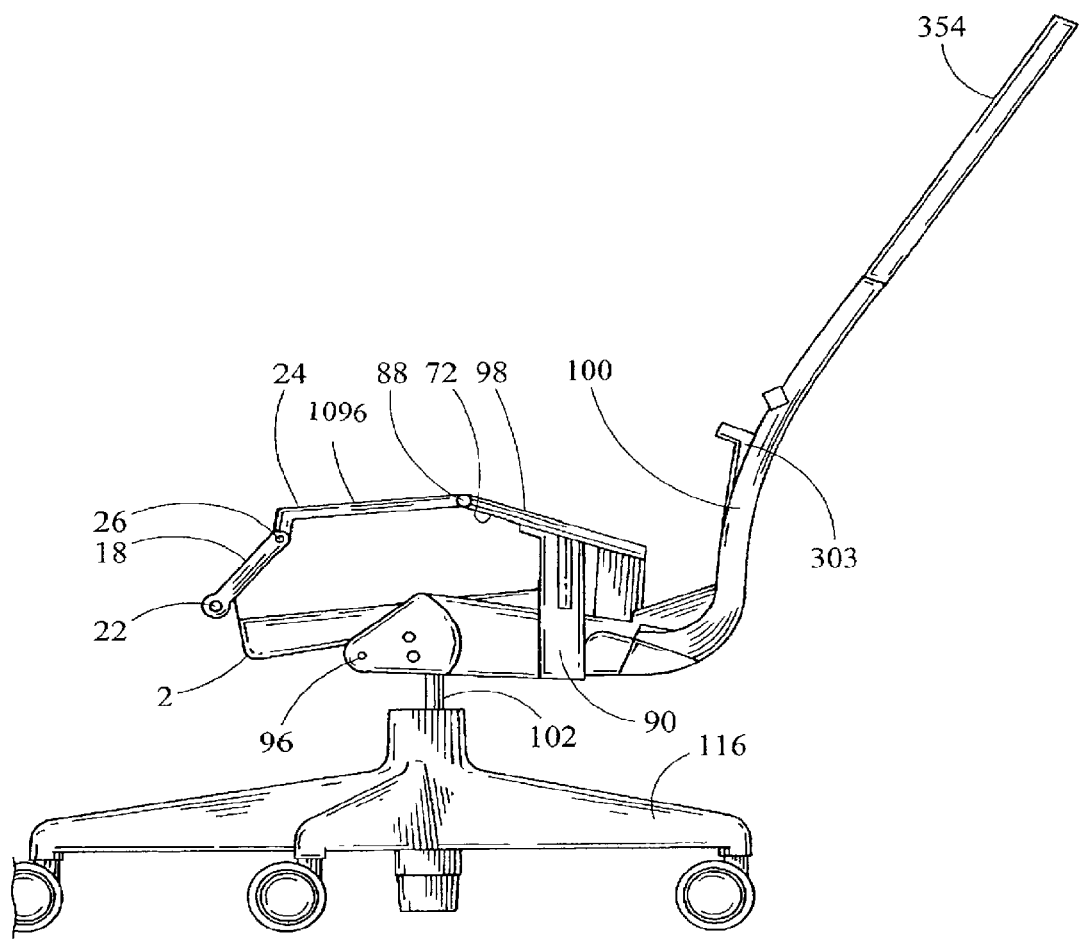
FIG. 3C is a schematic side view of the linkage assembly for the chair shown in FIG. 2 when in a fully reclined position with an upper back support member in a neutral position.
Figure 53:
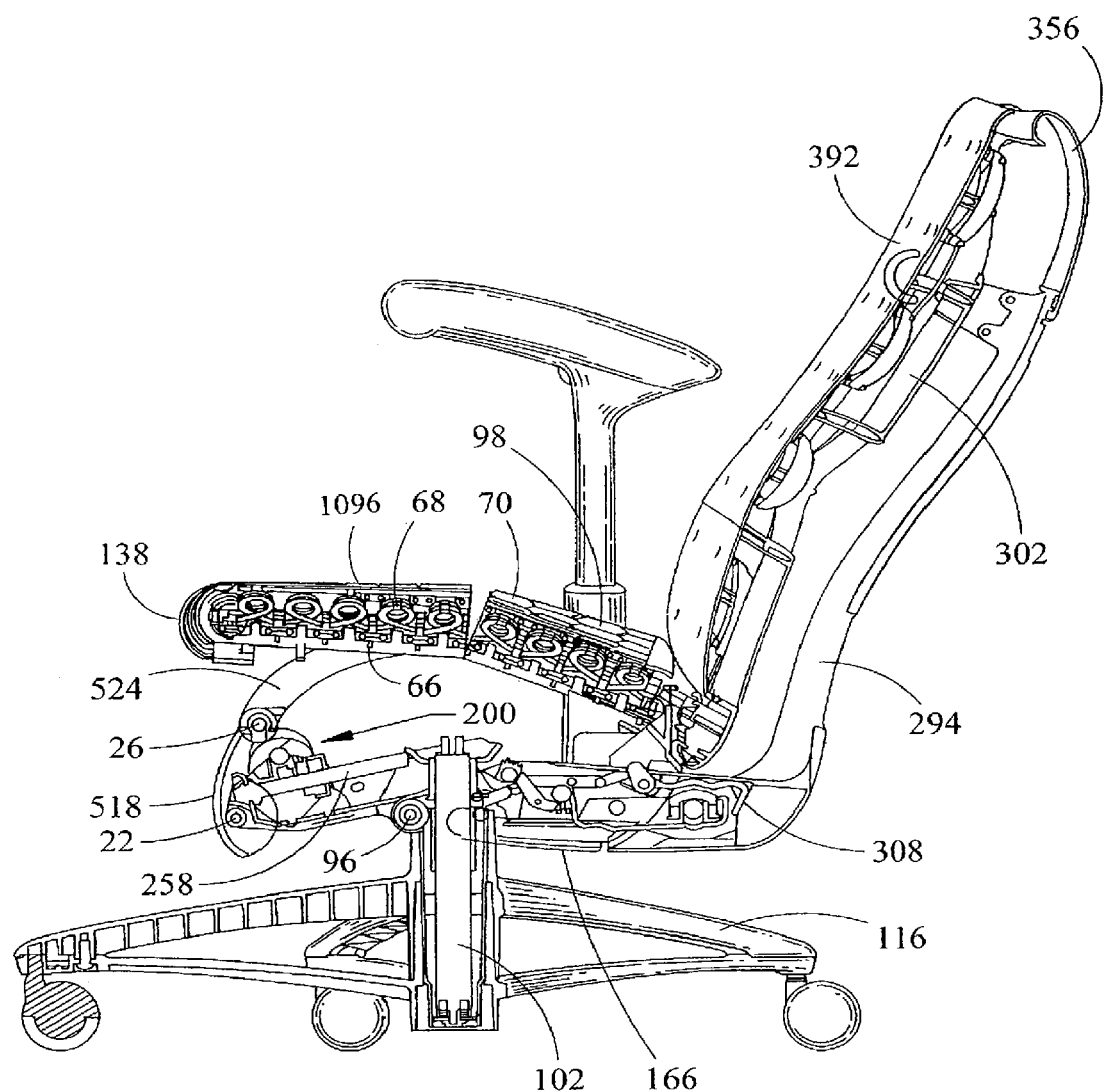
FIG. 53 is a side view of the chair without the fabric cover in a nominal, neutral, full recline position.

In operation, and as best shown in FIGS. 3A-3D and 48-54, the user tilts rearwardly in the chair, and in particular the seat, from an upright position (FIGS. 3A and 48-51) through an intermediate recline position (FIGS. 3B and 52) to a fully reclined position (FIGS. 3C and 53). As the user tilts rearwardly, the first link 18, 518 is pivotable relative to the base component, or tilt control housing, about the axis 22 in a first rotational direction (clockwise when viewed from the left-hand side). At the same time, the third link 72, 572 or rear seat frame, pivots in the first rotational direction relative to the second link 24, 524 or front seat frame about the pivot axis 88, such that the angle between the upper surface 96 of the front region 62 of the seat and the upper surface 98 of rear region 84 of the seat opens up as the user tilts rearwardly, and forms an angle of greater than 180° when the seat is in the reclined position, and preferably in any reclined position rearwardly of the upright position. Indeed, in the initial upright position, the upper surface of the front region and the upper surface of the rear region forms a slight crown, with an angle greater than 180°, and desirably about 183°. In one embodiment, the rear seat region 84 pivots rearwardly 18° relative to ground as the seat moves from the upright position to the fully reclined position, while the front seat region 62 pivots only 3° relative to ground, such that the rear region pivots 15° further than the front region, and forms an angle greater than 180°. In various embodiments, the angle between the upper surface of the front region and the upper surface of the rear region in the fully reclined position can vary between about 185° and 200°, and preferably is about 195°. In this way, the rear region 84 of the seat provides support for the ischial tuberosities or buttock region of the user, and prevents the user from sliding forwardly in the seat as the user tilts rearwardly in the chair. At the same time, the front region 62 of the seat is maintained in substantially the same orientation (3° pivot) throughout the tilt range of the chair. By separating the rear, ischial support region from the front, thigh support region, the entirety of the seat support surface does not have to be tipped or pivoted as the user tilts rearwardly. As a result, the hip drop is reduced, thereby providing for tighter package space between the seat surface and tilt control, less energy stored in the tilt, and lower torques at the given angular travel.

Preferably, the first pivot axis 20 formed between the first link 18, 518 and the tilt control housing 2 is positioned forwardly of the fourth pivot axis 96 formed between the third link 72, 572 and the tilt control housing 2, with the fourth pivot axis 96 positioned forwardly of the third pivot axis 88 formed between the forward and rearward seat frames in one embodiment (FIGS. 2-3C), such that the third link 72, and connected back support member 100 tilt rearwardly at a greater rate and angle than does the second link. In another embodiment, the fourth pivot axis 96 and the third pivot axis 88 are substantially aligned vertically (FIGS. 48-54). The pivot axis 88 is aligned with the pivot axis 96, or disposed rearwardly therefrom, so as to prevent the sensation of pressure or lift mid-thigh on the user.

Figure 77:
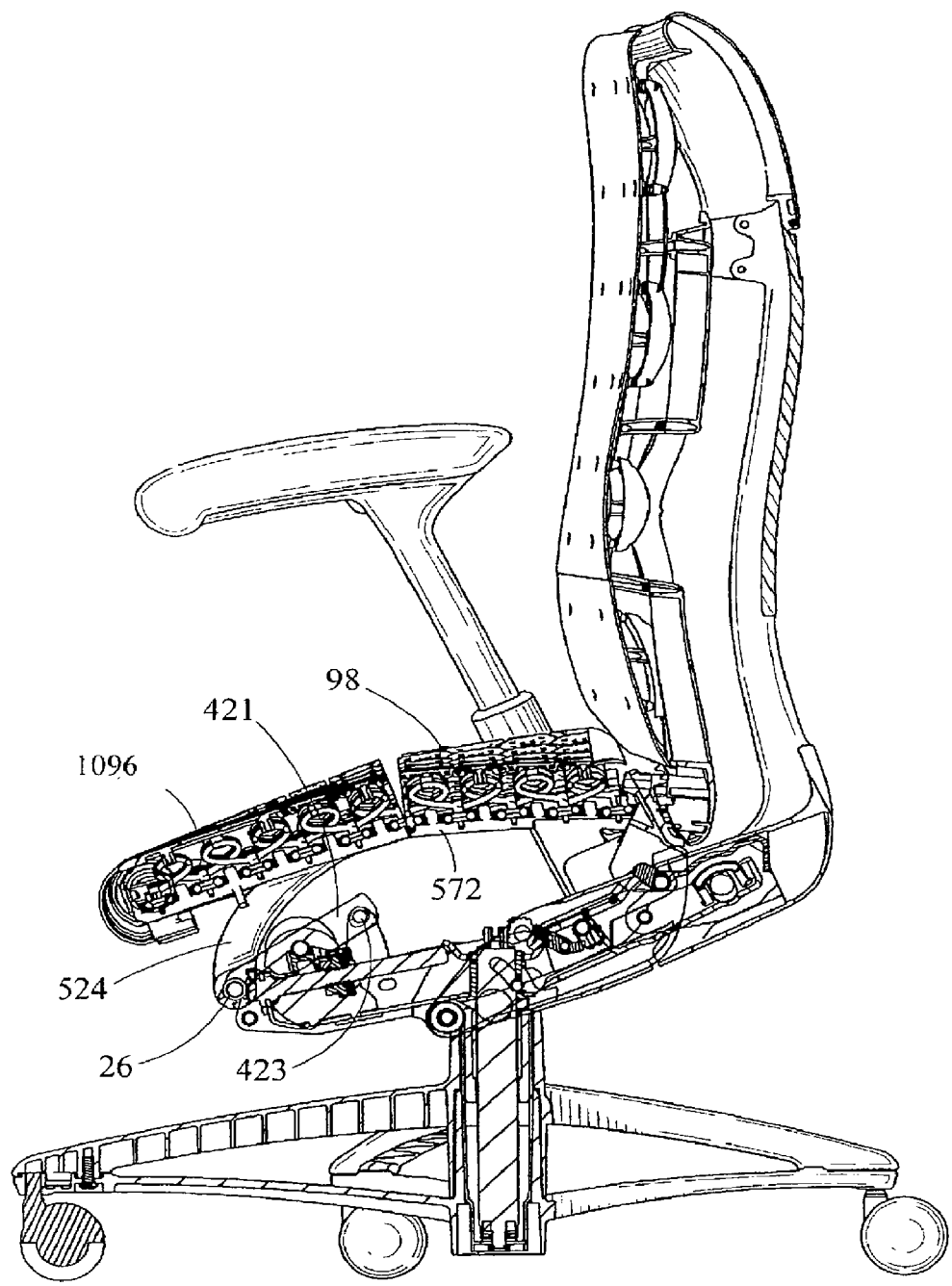
FIG. 77 is a side view of an alternative embodiment of a chair with a forward tilt shown in a forward tilt position.
Figure 78:
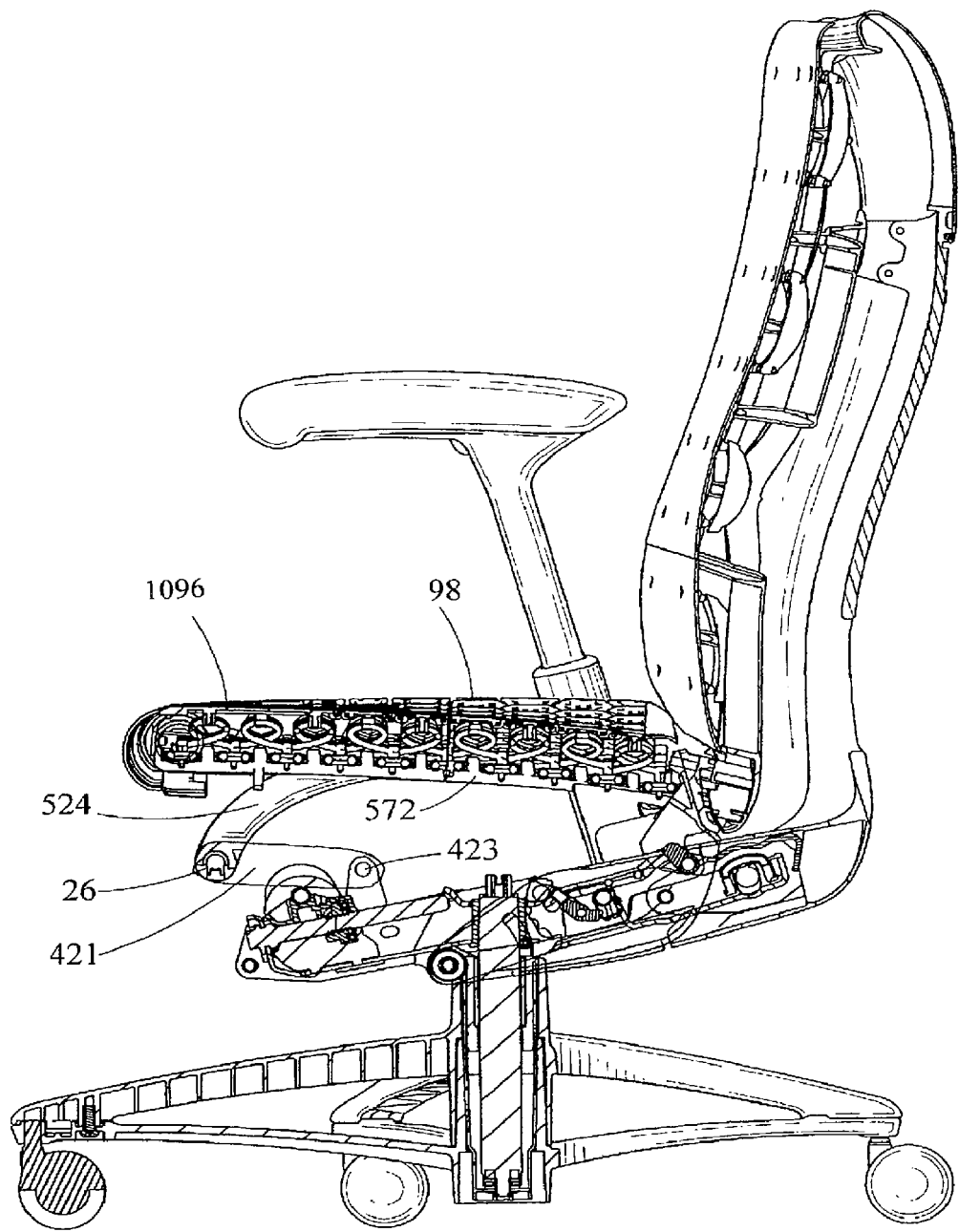
FIG. 78 is a side view of the chair shown in FIG. 77 with the chair in a neutral position.

Referring to FIGS. 77 and 78, an alternative embodiment of the chair is configured with a linkage that allows for a forward tilt of the seat and backrest. In particular, first link 421 his reposition with a first end portion pivotally connected to the second link 524 at the pivot axis 26, and a second end pivotally connected to the tilt housing at an axis 423. As the user tilts forwardly, the first link 423 is pivotable relative to the base component, or tilt control housing, about the axis 423 in a first rotational direction (counter-clockwise when viewed from the left-hand side). At the same time, the second link 524 pivots relative to the third link 572 such that the angle between the upper surface 96 of the front region 62 of the seat and the upper surface 98 of rear region 84 of the seat opens up as the user tilts forwardly, and forms an angle of greater than 180° when the seat is in the forward tilt position. Indeed, in one embodiment, the angle between the upper surface 96 and the upper surface 98 is always maintained at an angle greater than 180°, whether in a forward tilt position, an upright tilt position or a reclined tilt position, with the angle between the rear upper surface and the forward upper surface opening up even more as the user reclines, or tilts forwardly.

Figure 5:
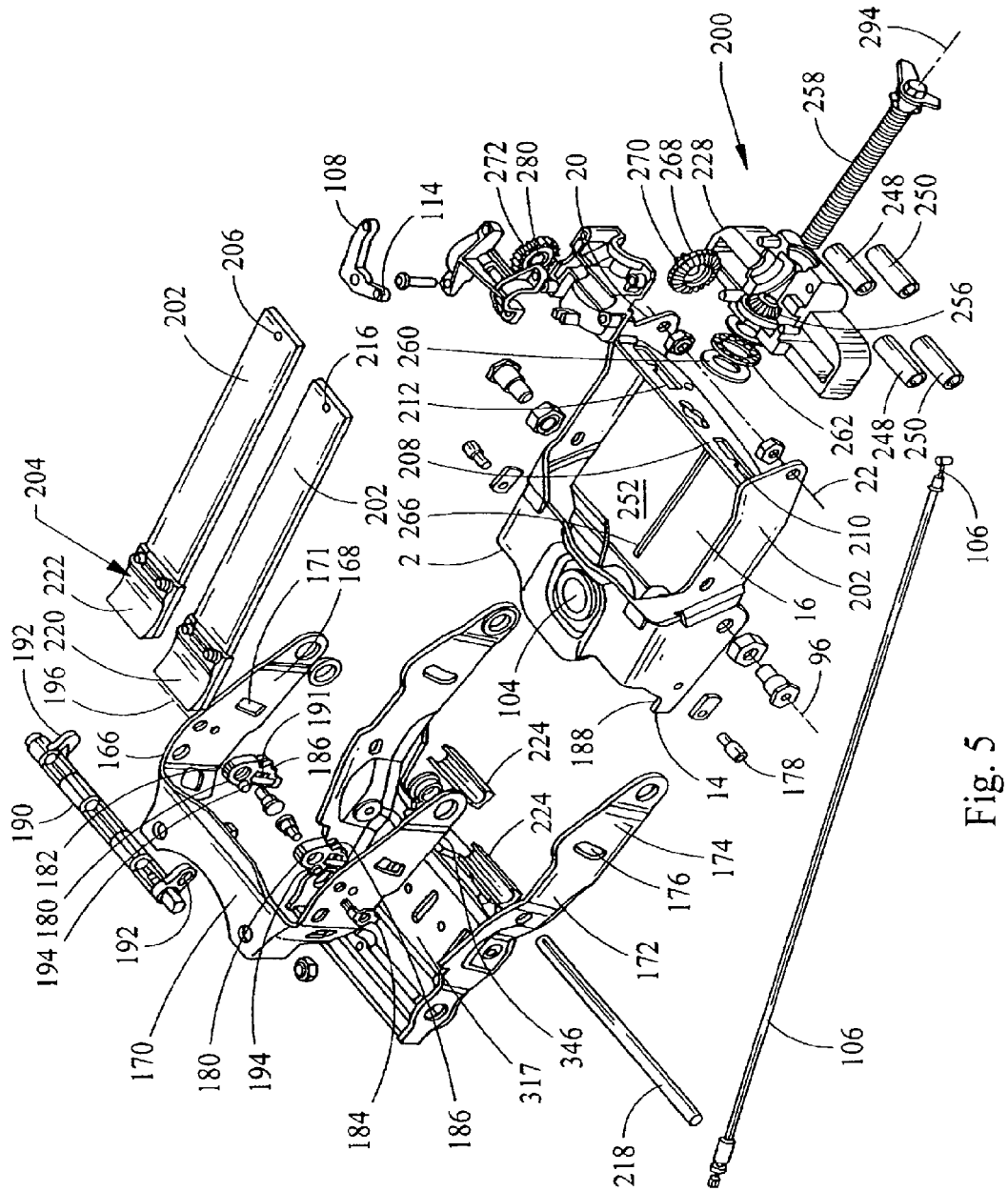
FIG. 5 is an exploded perspective view of a tilt control mechanism.
Figure 9:
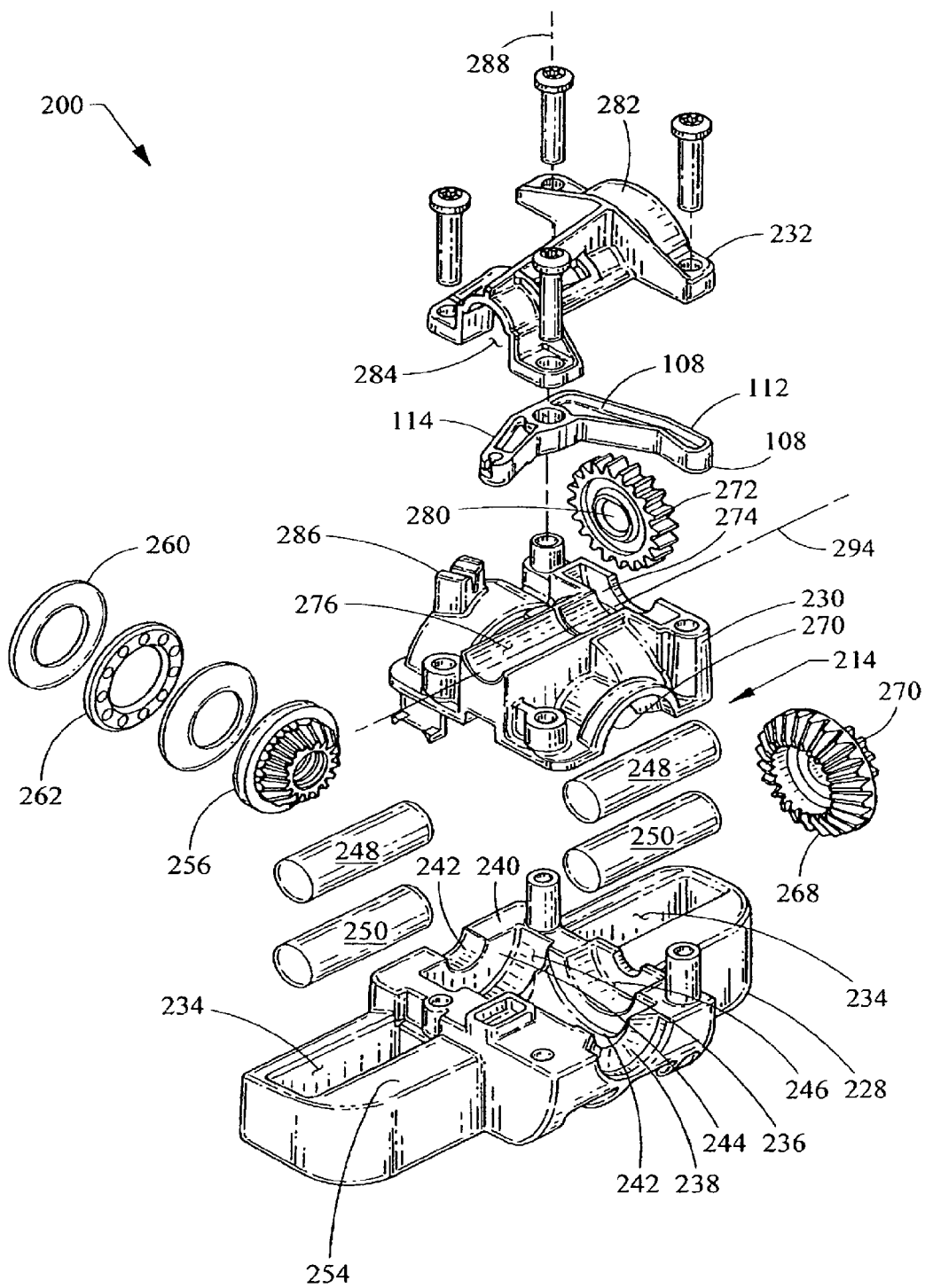
FIG. 9 is an exploded perspective view of a fulcrum assembly.

Additional Base Components:

An adjustable support column 102, preferably pneumatic and shown in FIGS. 1-3D, 5 and 48-54, is mounted to a rear portion of the housing 2 at opening 104. A top portion of the column 102, having a side-actuated lever (not shown), extends into the housing. A cable 106 is connected to the lever, and can be moved within a guide to actuate the lever. An opposite end of the cable is engaged by an arm portion 114 of the lever arm 108 pivotally connected to a fulcrum assembly, as shown in FIGS. 5 and 9. The lever is actuated by a push button 110 extending from the end of a grippable handle 290 connected to an actuator tube. In operation, the user pushes the button 110, which laterally moves a rod that engages an arm 112 and rotates the lever arm 108 about a vertical axis 288. As the lever 108 rotates, the arm portion 114 moves the cable 106 to actuate the support column lever, which in turn allows the support column 102 to extend in response to a gas spring contained therein, or to collapse in response to the weight of the user being applied to the seat. One suitable support column is available from Samhongsa Co. Ltd., otherwise referred to as SHS.

Figures 40, 41:
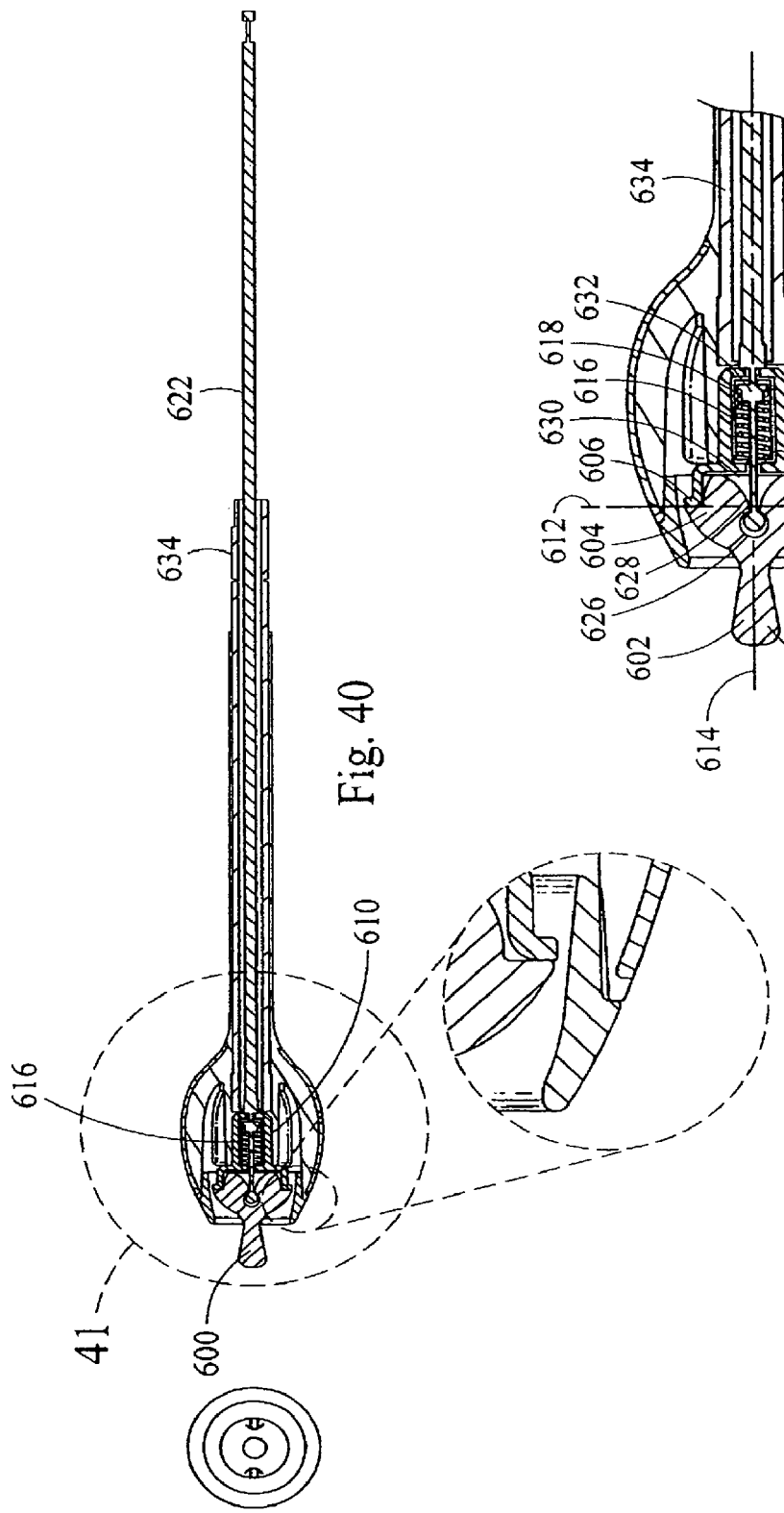
FIG. 40 is a cross-sectional view of an actuator assembly.
FIG. 41 is an enlarged view of the end of the actuator assembly shown in FIG. 40 taken along detail 41.

In an alternative embodiment, shown in FIGS. 40 and 41, the actuator is configured as a joy-stick 600 rather than a push button. The joy stick includes an arm or post portion 602 and a base 604 having a circumferential shoulder 606 that engages an annular support 608 formed on a spring retainer 610. The joy stick 600 is pivotable about any axis lying within a plane 612 defined by the shoulder, i.e., a plane substantially perpendicular to the longitudinal axis 614 the arm of the joy-stick. The joy stick is moveable from an upright position, shown in FIG. 40, to an actuated position, with a spring 616 biasing the joy-stick actuator toward the upright position.

The spring retainer 610 includes an internal cavity 618 having an end wall 620 engaging the spring 616. A cable 622 includes an enlarged end portion 624 connected to the base of the joy stick, preferably by disposing the end portion in a cavity 626 having a narrow throat 628 and a frusto-conical shaped entryway 630. An enlarged spring engaging portion 632 is spaced from the end portion 624 along the length of the cable. In operation, the user grips or pushes on the end of the arm 602 of the joy stick, which pivots about an axis defined by the junction between the shoulder 606 and the annular support 608 of the spring retainer. The spring 616 is compressed between the end wall 620 of the spring retainer and the enlarged portion 632 of the cable, which urges the joy stick back to an upright, or centered position when released by the user. As the user pivots the joy stick 600, the cable 622 is moved relative to a cable guide 634 from a first position to second position and actuates the support column lever, which allows the support column to extend or collapse. The joy stick 600 can be pivoted in any direction about any point along the circumferential shoulder so as to actuate the support column. It should be understood that the joy-stick can be used to actuate other components, and convert a pivoting/rotating movement into a linear actuation, or back to a rotating/pivoting action at the distal end of the cable. A grippable housing 690 surrounds and supports the spring retainer and joy stick. A bezel 636 is secured to the end of the housing, and is open along the axis such that the arm 602 extends outwardly for access by the user.

Referring to FIG. 1, a base 116, preferably a five arm base with casters, is mounted to the bottom of the support column 102 in a conventional manner, although one of skill in the art would understand that other support columns and bases can be used to support the housing, including fixed height support columns and non-rolling bases, including for example a base configured with glides.

With the chair being generally described, the various features of the armrests, the seat, the backrest and the tilt control assembly, along with various controls therefore, will be described in more detail below.

Adjustable Seat Depth:

Referring to FIGS. 7-8, 12-17 and 56-69, the length of the front region 62 of the seat (fore-aft longitudinal measurement) can be adjusted to alter the overall depth (front to back length) of the seat. The seat depth assembly includes a rigid carriage member 118, 718 having a laterally extending support 120, 720 with a leading edge 122, 722. In one embodiment, the leading edge is configured with a plurality of steps 124 as shown in FIGS. 7-8 and 12-17. In the embodiment of FIGS. 56-59, the leading edge is linear, or extends forwardly with a generally convex curvature. In the first embodiment, a center step portion 126 of the leading edge, formed along the lateral centerline of the carriage, extends forwardly, with a plurality of steps 128 (shown as two on each side) disposed progressively rearwardly relative to the center step 126. At the outer lateral edges, one or more steps 130 progressively move forward relative to the rearwardmost step. The carriage is provided with a pair of grippable handles 132, shown as tabs, which extend laterally outwardly and/or upwardly from each side of the seat. The carriage 118 further includes a pair of rearwardly extending slide members 134 that are slidably engaged with the guide/track 44 formed on each of the arms of the front seat frame. The carriage 118 is translatably moveable relative to the front seat frame 24 in the longitudinal direction 50 (fore-aft). The terms "translate," "translatable" and variations thereof, means to move or displace along a path (linear or non-linear (e.g., curved or curvilinear)) from one point to another point spaced apart by some distance. It should be understood that a component that is translated relative to another component can also be rotated relative to that same component, with the translation and rotation occurring simultaneously, successively and/or both simultaneously and successively. In one embodiment, a bushing 136 is secured to the seat frame in the guide 44 for engagement with the slide members.

Figure 57:
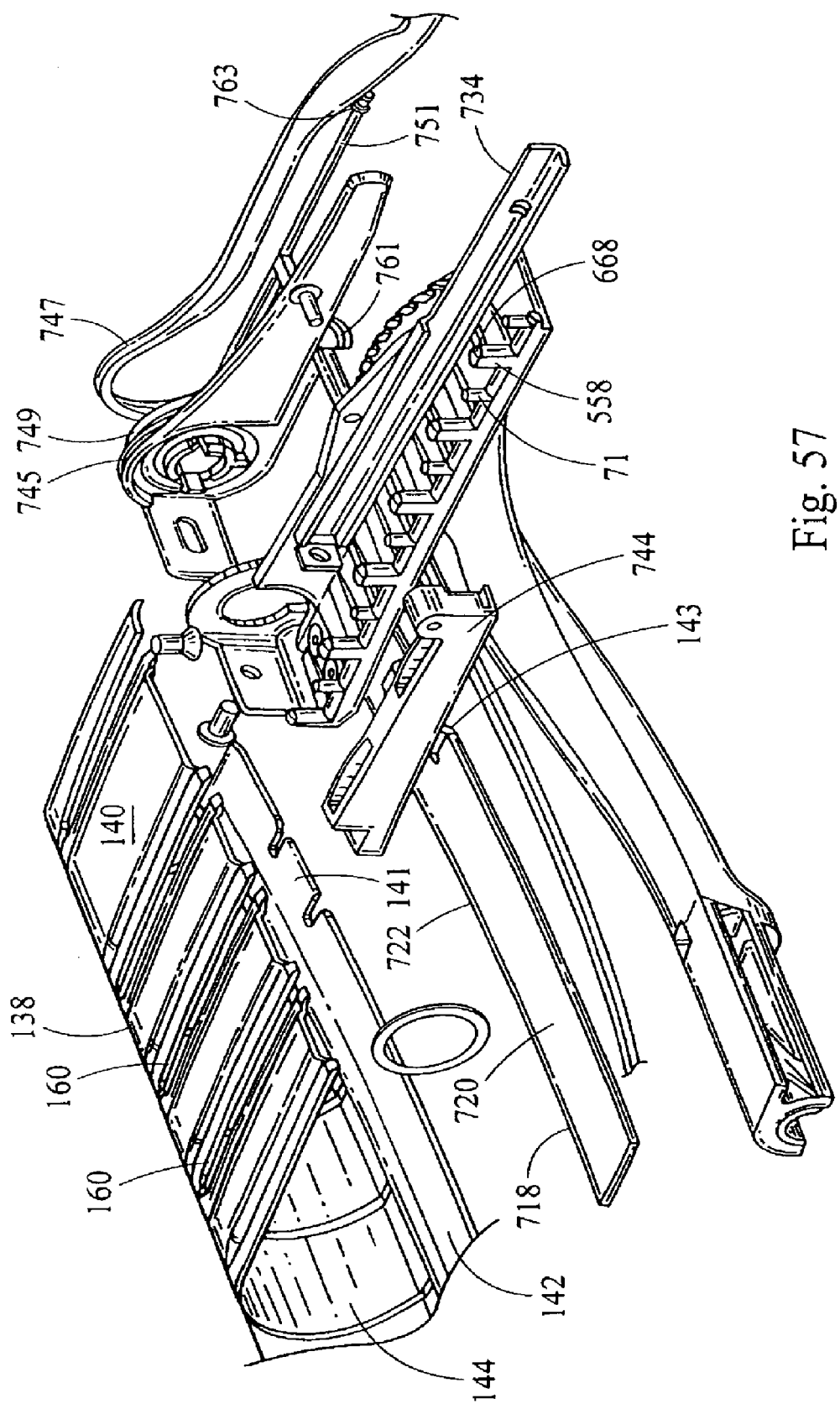
FIG. 57 is a partial, exploded perspective view of a portion of the seat assembly.
Figure 58:
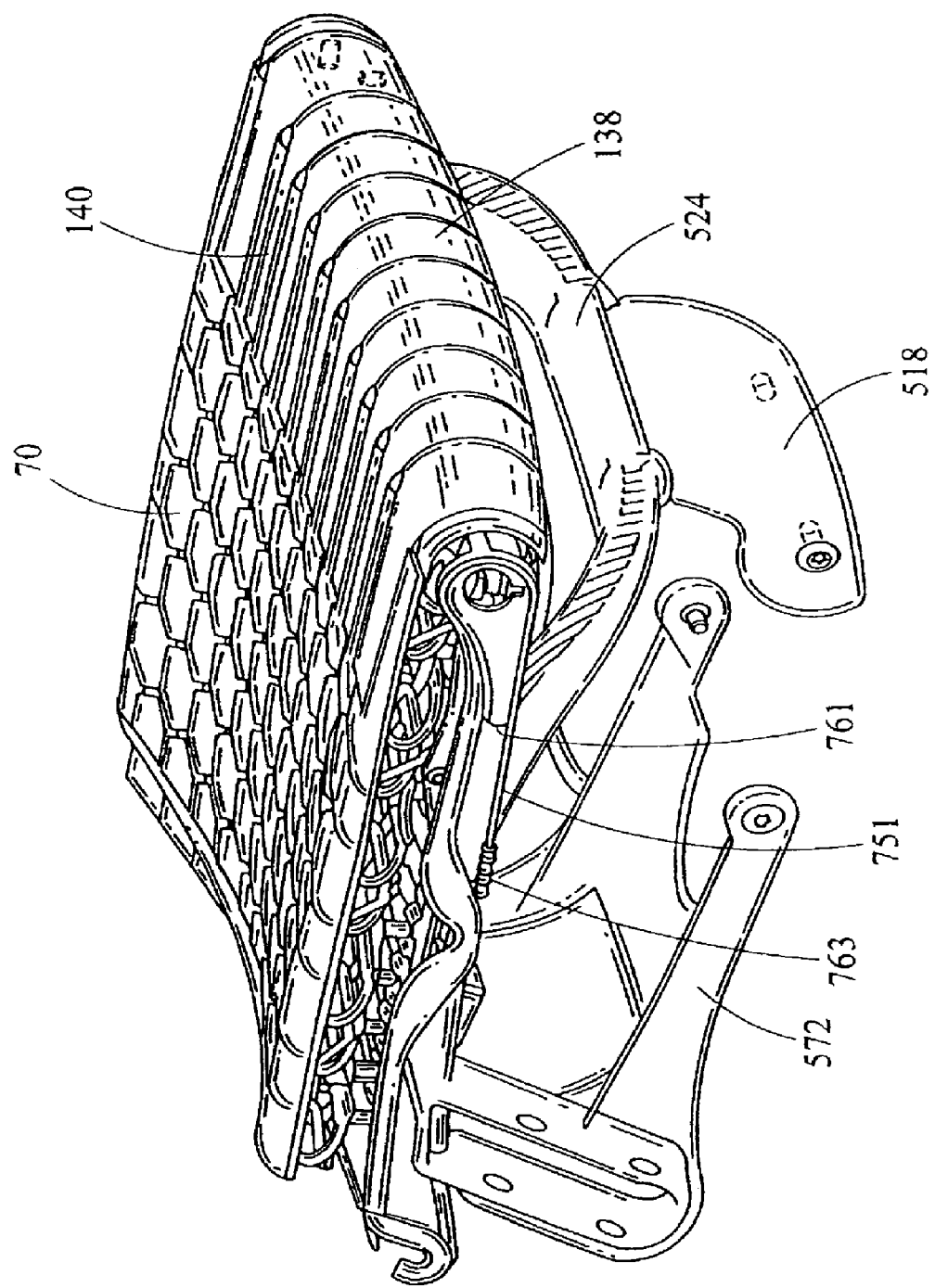
FIG. 58 is a partial, perspective view of the seat.

In the embodiment of FIGS. 57-59, the carriage member 718 includes a pair of opposite circular end flanges each having an opening disposed therethrough. A vertical flange extends inwardly from the forward portion of the end flange and is secured to a track or slide member 734. The slide members are slideable or translatable relative to a guide/track 744, which is secured to the first link or seat frame 524. A pair of end covers 745 each include flexible engagement members that engage the opening in the end flanges of the carriage member. The covers are provided with an opening in which the user can insert a finger or thumb into for gripping and moving the carriage member. A fabric carrier 747 wraps around and is moveable relative to a hub portion 749 formed on the cover. The carrier member includes a pair of tethers 751 that further wrap around a bearing portion 761 on the cover 745. The bearing portion is preferably curved and oriented with a curve about a vertical axis. In this way, the carrier can be rotated about a horizontal axis and then a vertical axis formed by the bearing portion. This ability to slide past surfaces oriented in different planes or about different axes is facilitated by the user of a tether. The end of the tether 751 is formed with a plurality of enlarged portions or stops 763. The tether is inserted into a notch 765 (FIG. 60) on the front of the seat frame, with one of the stops engaging a top surface of the horizontal flange of the frame and being larger than the notch to prevent pull-through. A plurality of stops are provided such that the tether can be set at different initial lengths depending on the size of the seat.

A flexible body support member 138 has an upper first portion 140 slidably/translatably connected to the seat, e.g., the suspended body support member 70, for example with a plurality of fasteners, such as tabs 141 received in an opening 143. As shown in FIGS. 47, 58, 59 and 65, the flexible member has rearwardly extending strips 141 with outboard, laterally extending flanges 139 that are received in openings formed by laterally spaced upper platforms 165 and laterally spaced lower platforms 163. The lower platforms 163 are connected with a base floor 167, with a vertical flange 169 extending upwardly from the base floor to support the upper platform. The flanges 139 are received under the outwardly extending portions of adjacent upper platforms 165, while the main body portion of the strip 141 is supported by the lower platform 163. In this way, the strips 141 are vertically supported, but also allowed to translate or slide relative to the support layer 70.

The flexible member further includes a second portion 142 connected to the carriage 118, with a third curved portion 144 (bullnose) positioned between the first and second portions and forming a leading edge of the flexible member. The flexible member is configured with a plurality of laterally spaced and longitudinally extending slots 160 that define a plurality of longitudinally extending strips 162 as well as strips 141. The flexible member can be made from various plastic materials such as polypropylene or polypropylene blended with KRATON. The flexible member can be configured as a single, integrally formed member with the slots formed therein, or as a plurality of independent, separate strips. Preferably, the widths and number of strips corresponds to the width and number of steps 124 formed on the leading edge 122 of the carriage. The carriage 118 is disposed behind or beneath the flexible member, with the leading edge 122 disposed adjacent to, and in one embodiment, engaging an inner surface of the flexible member, or alternatively a bottom surface of the flexible member, and in particular the strips 162. In an alternative embodiment, the leading edge of the flexible member on the third portion thereof is generally curved in a forwardly convex shape, with the lengths of the strips 162 becoming progressively and individually longer as they move inboard. The leading edge of the seat is defined by the forwardmost portion, or third portion of the strips 162, with the understanding that a cover such as fabric could further be disposed over the strips. In an embodiment where the forwardmost portions of the strips follows the leading edge of the carriage, the leading edge of the seat is non-linear, or convex.

Figure 17:
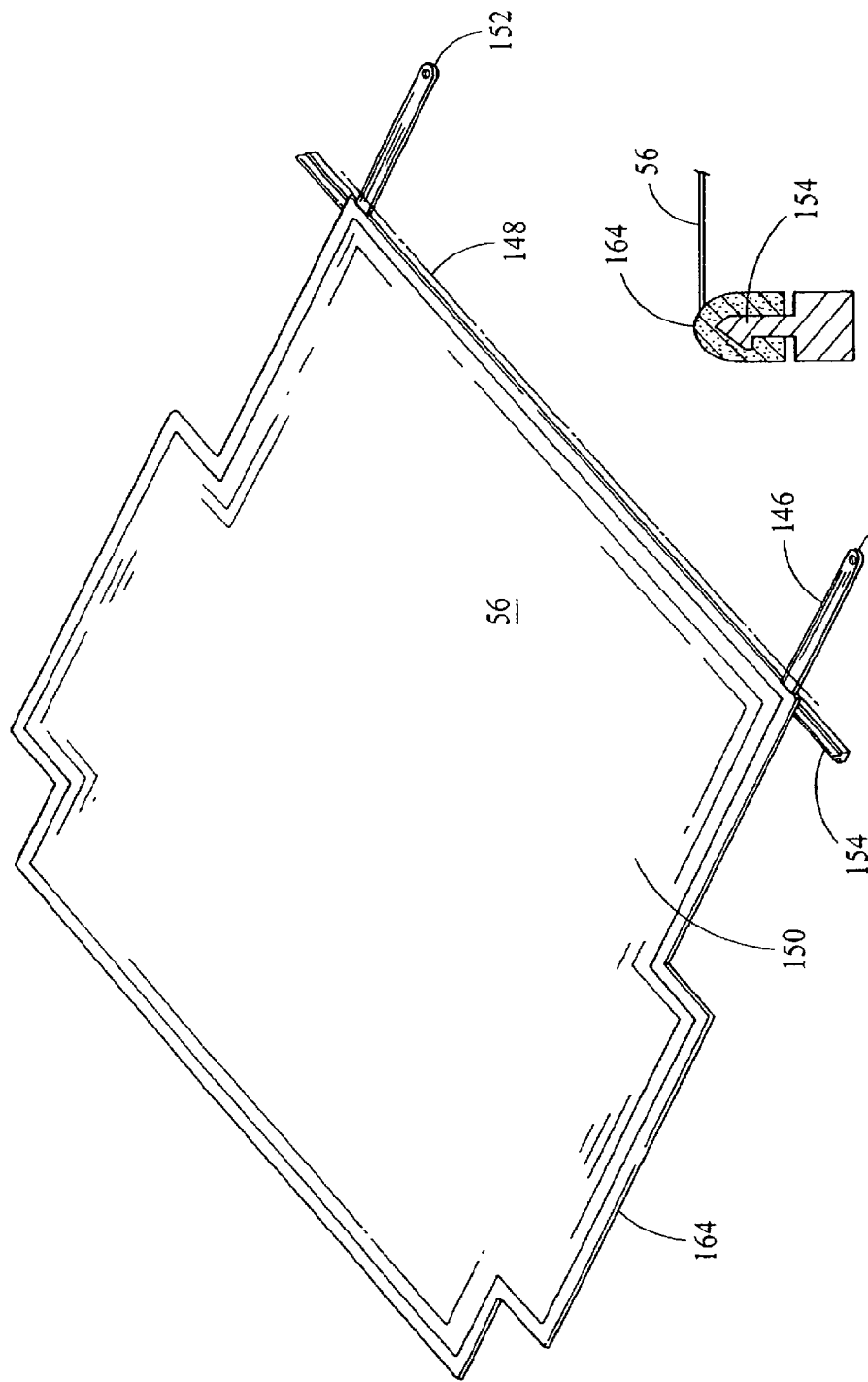
FIG. 17 is a top perspective view of a seat cover.

A cover member 56, best shown in FIG. 17, is disposed over the entirety of the seat, including the rear region 84 and the front region 62. The cover member, preferably configured as a fabric and carrier member, wraps around the flexible member 138 and covers the third curved portion 144 of the flexible member. The fabric is secured on all sides to the carrier member including laterally extending member 165. The cover further includes a first fold 146, shown in FIGS. 16 and 17 as a pair of laterally spaced tethers. As disclosed above, the carrier member can define the first fold. In an alternative embodiment, the first fold is defined by a portion of the fabric extending across the entire width of the cover. The free edge 152 of the first fold, or free end of the tethers (whether formed by the fabric or the carrier member, is anchored to the front seat frame, for example with a rod 154, or to the notch 765 as explained above. The first fold lies along an upper surface 156 of a driving member 158, or inboard of the cover 745. In one embodiment, the driving member 158 is formed by rearwardly extending arm portions of the flexible member 138. In another embodiment, the driving member can be formed by the carriage member.

As shown in FIG. 57, the driving member is formed by the cover 745, which includes the bearing portion 761. The curved bearing portion 761 of the driving member forms a folded edge 148 in the cover member (or carrier member), with a second fold 150 underlying the driving member and the first fold, or lying outboard of the first fold. It should be understood that the actual material of the cover defining the folded edge, as well as the length of the first and second folds, varies and shifts between the first and second folds as the carriage member 118 and connected flexible member 138 move relative to the seat frame. As such, the folded edge 148, as well as the first and second folds 146, 150, are defined by the material forming the edge and folds at any one time. In this embodiment, the tether, or portion of the cover forming the first fold, is preferably non-elastic.

In operation, the user grasps the carriage member 118, e.g., the handles 132, the cover 745, or the front portion of the seat such as the flexible support member or bullnose, and moves the carriage member to a desired longitudinal position defining a corresponding depth of the seat. Various detents or other locking/latching features can be formed on one of the carriage and seat frame to provide a plurality of adjustment positions, or the adjustment can be simply arrested by friction so as to provide an infinite number of adjustment positions.

As the carriage 118 is moved forwardly, for example, the third portion 144 and leading edge of the flexible member 138 also move forwardly, with the length of the first fold 146 of the cover being shortened. At the same time, the upper portion 140 of the flexible member and corresponding portion of the cover lying thereover lengthens, which corresponds to a greater overall seat depth. Conversely, as the user moves the carriage 118 rearwardly, the drive member 158 moves the folded edge 148 rearwardly and thereby increases the length of the first fold 146 as the third portion 144 and leading edge of the flexible member are moved rearwardly, with a corresponding seat depth being reduced.

In an alternative embodiment, the rear edge of the cover or fabric is simply secured to the seat frame, tilt housing or other structure with an extensible, or stretchable tether, for example an elastic tether. For example, the tethers in FIG. 17 can be formed as elastic members. In this embodiment, the cover does not have a first fold. Rather, the elastic tether simply elongates or retracts as the carriage is moved forwardly and rearwardly respectively. In this way, the tether holds the cover against the body support member and allows it to slide past the front, curved portion thereof when the seat depth is lengthened, but then draws the fabric back under the seat as the seat depth is shortened.

The flexible strips 162, along with the stepped leading edge 122 of the carriage, provides a varied suspension force for the user's thighs. In particular, at the region where the steps 128 are formed most rearwardly, the corresponding strips 162 of the flexible member are allowed a greater amount of deflection in response to the weigh of the user. These steps 128 and strips are generally aligned with the longitudinally extending thighs of the user. Conversely, the flexible member 138 is more rigidly supported along the lateral centerline at the step 126, and at the outermost lateral positions at steps 130, due to the steps 126, 130 having a greater forward extent.

Figure 6:
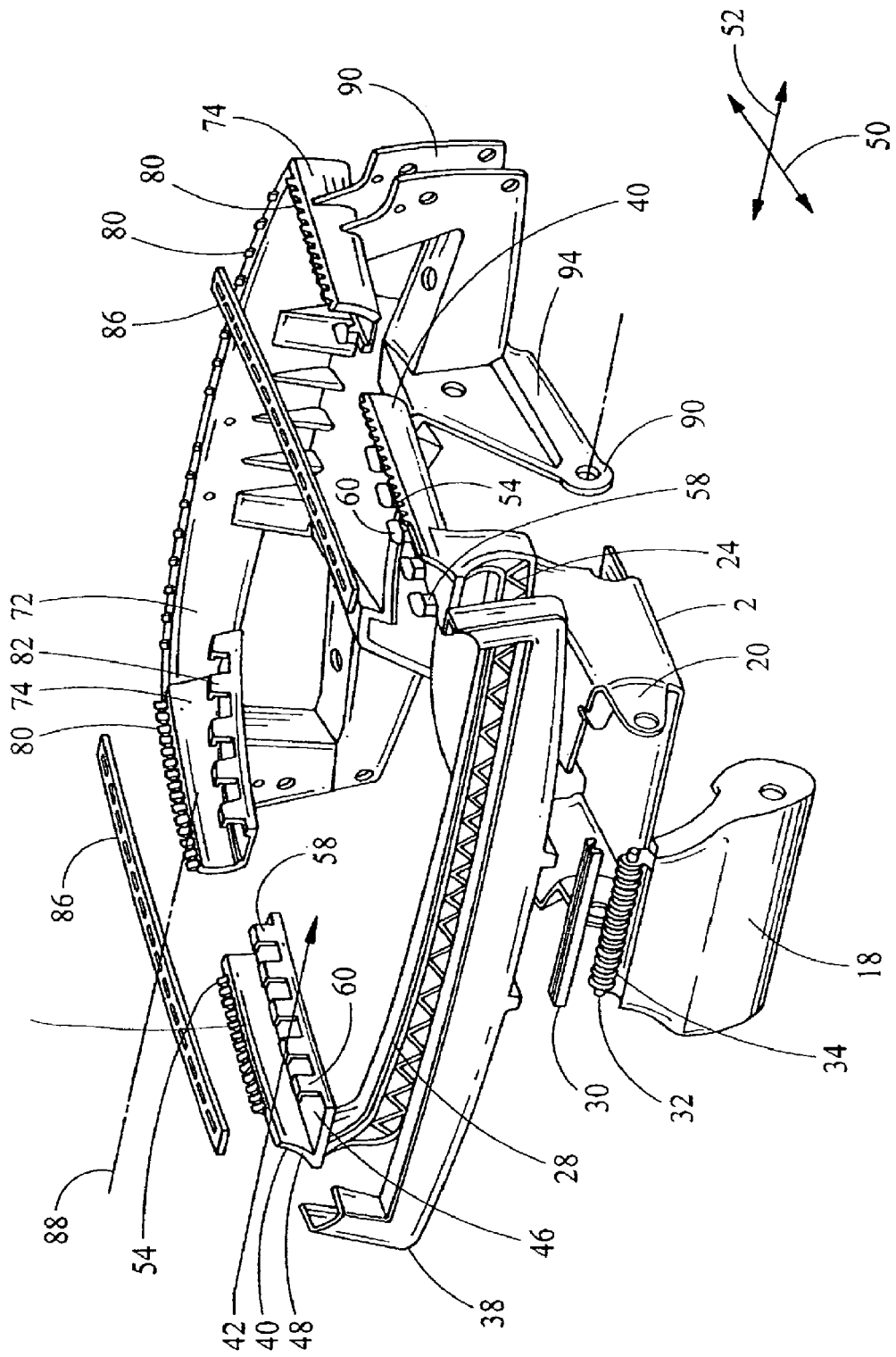
FIG. 6 is an exploded perspective view of various components of the linkage assembly.
Figure 7:
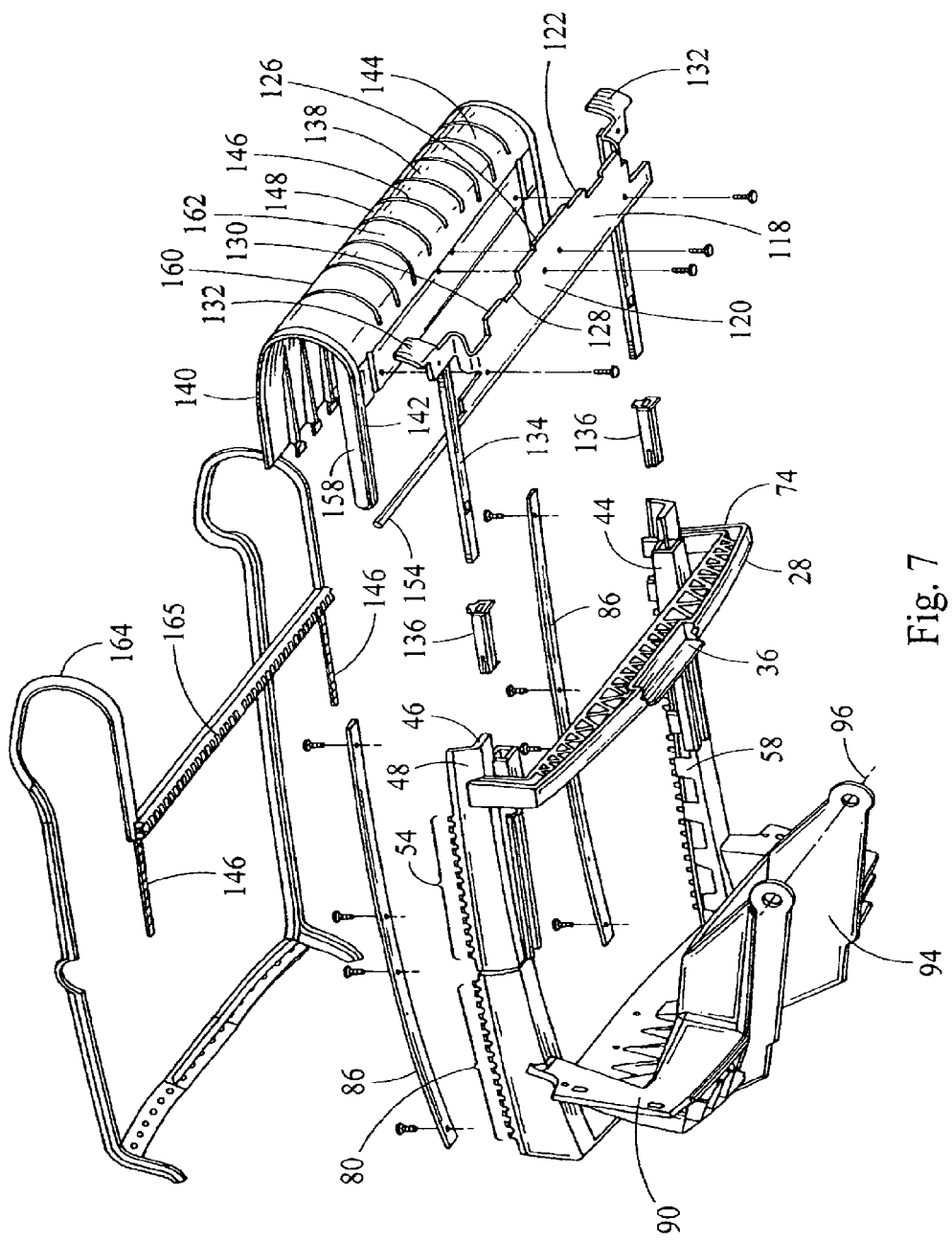
FIG. 7 is a bottom exploded perspective view of the seat support including an adjustable seat depth mechanism.
Figure 8:
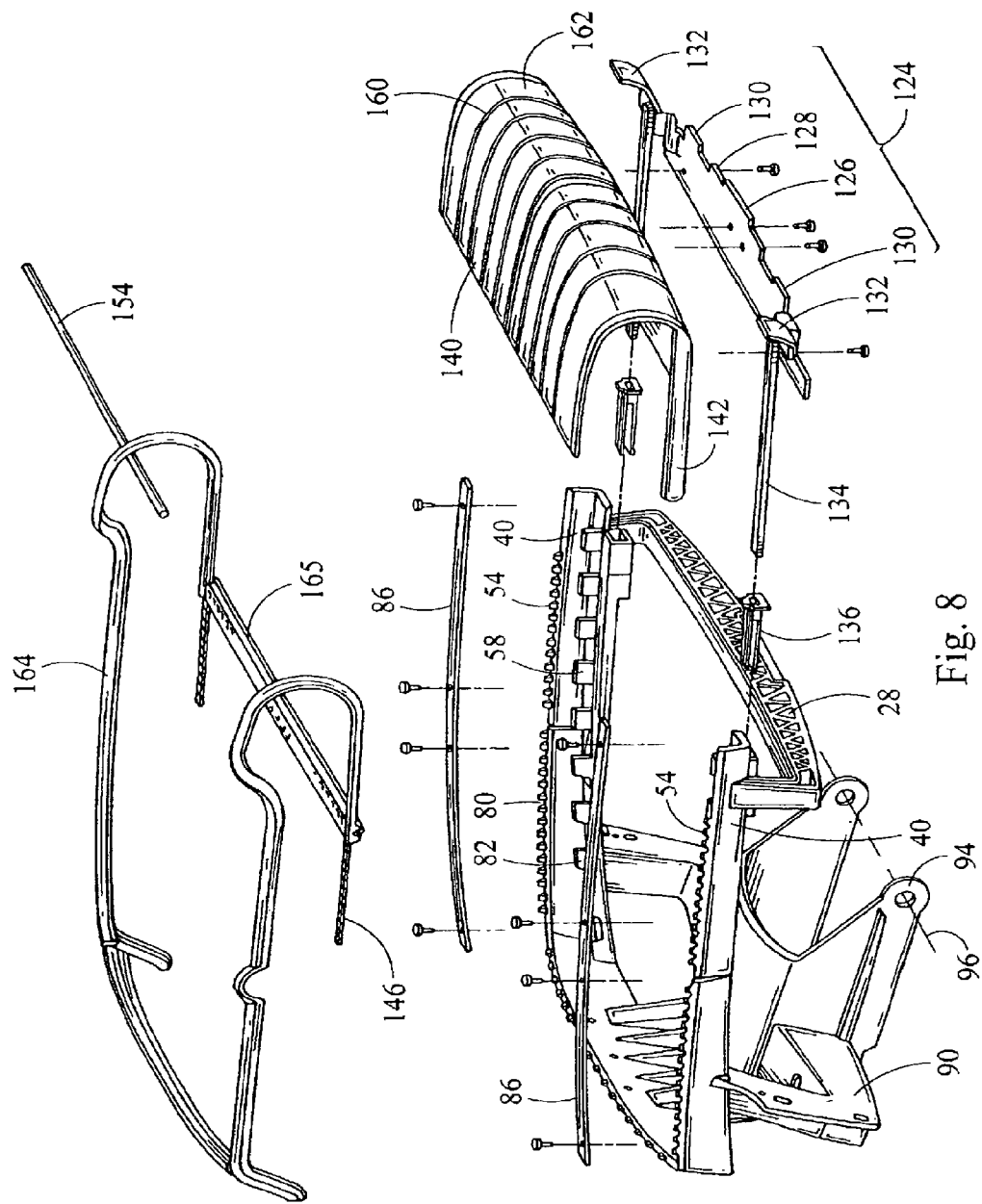
FIG. 8 is a top exploded perspective view of the seat support and seat depth mechanism shown in FIG. 7.

The cover 56 can be secured to the rear and front seat frames, as well as the flexible member, with a carrier member 164, shown in FIGS. 6 and 7, which engages for example and without limitation the fingers 54, 80 formed on the seat frames.

Figure 81:
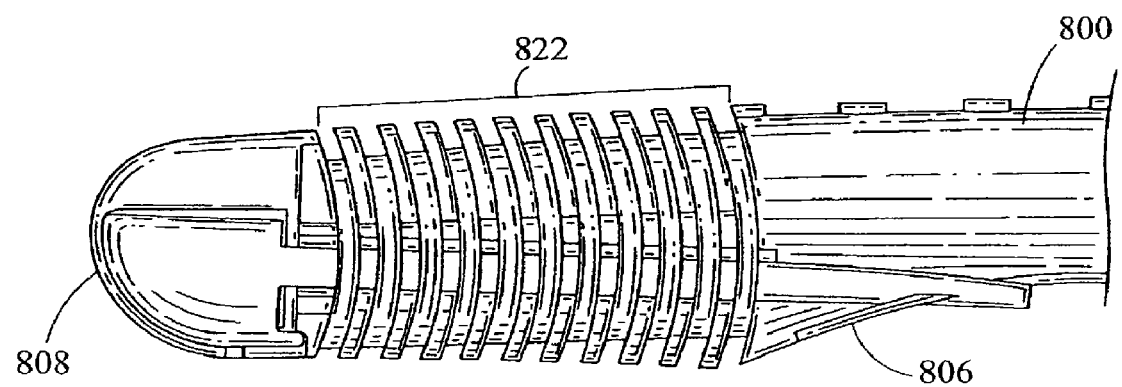
FIG. 81 is a side view of a cover and handle assembly.
Figure 82:
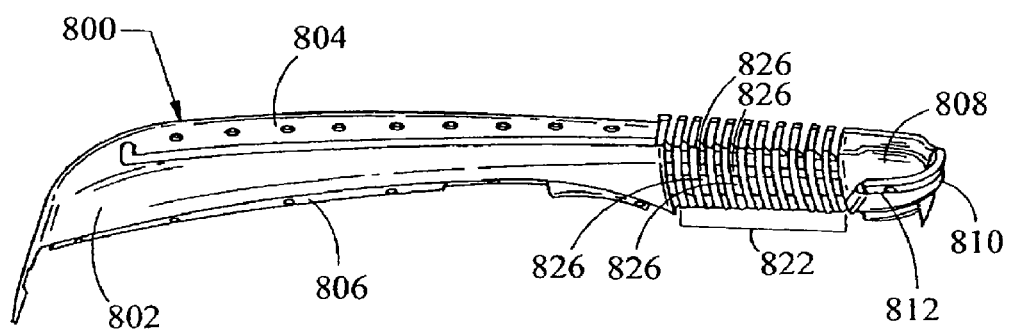
FIG. 82 is an opposite side view of the cover and handle assembly shown in FIG. 81.
Figure 83:
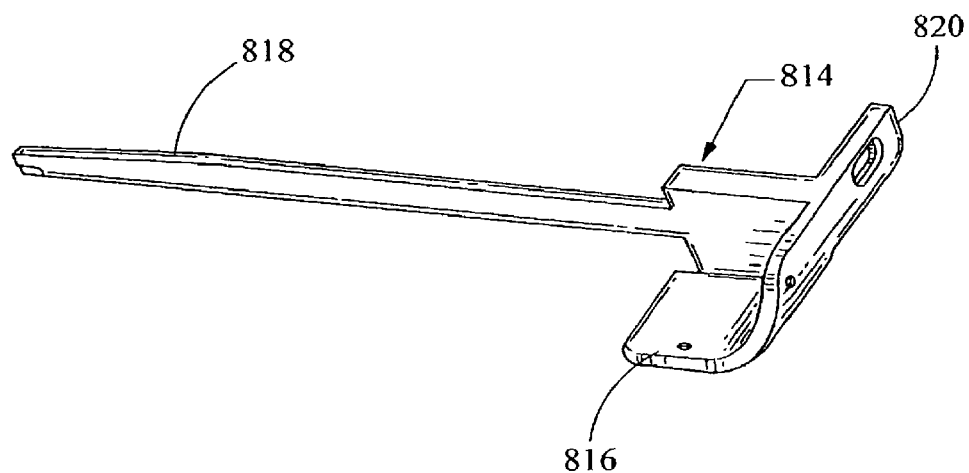
FIG. 83 is a perspective view of the handle shown in FIG. 81.
Figure 84:
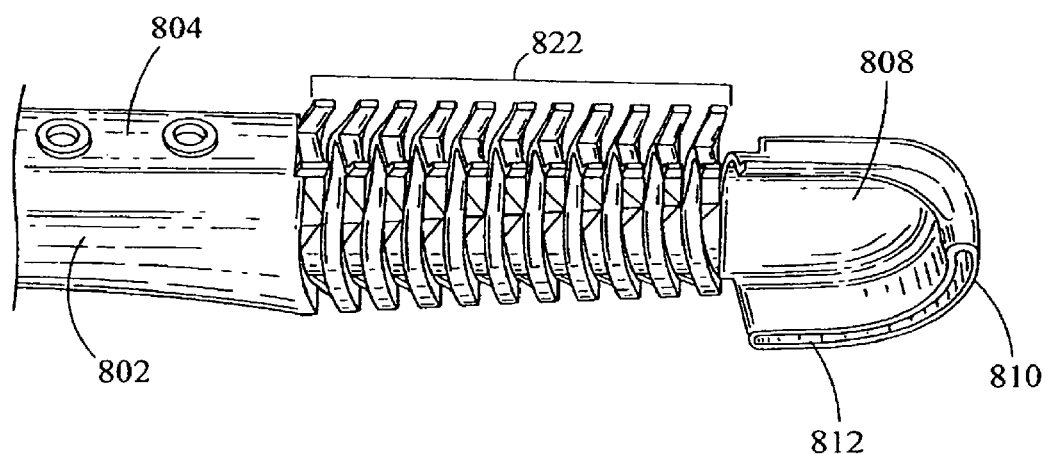
FIG. 84 is a perspective view of the cover shown in FIG. 81.
Figure 100:
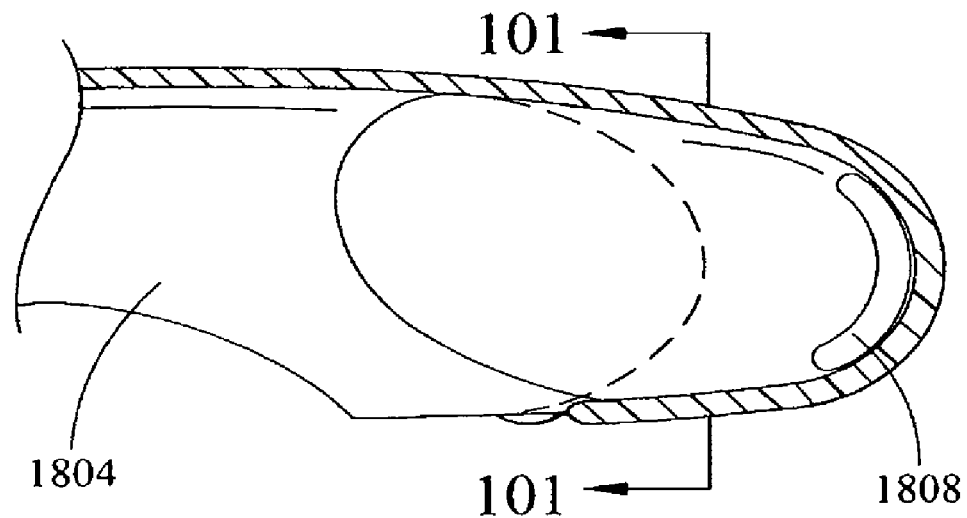
FIG. 100 is a side view of a cover attached to the chair.
Figure 101:
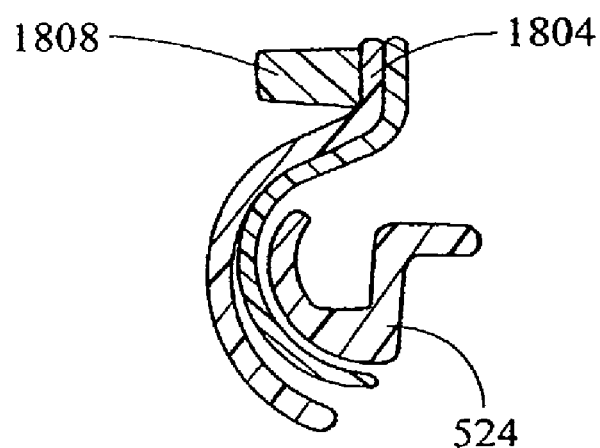
FIG. 101 is a cross-sectional view of the cover and frame taken along line 101-101 of FIG. 100.

Referring to FIGS. 81-84, in an alternative embodiment, a cover 800 includes a rearward side wall portion 802, an upper flange 804 and a lower flange 806. The upper flange 804 is coupled to the suspended body support member 70, for example by bonding or with fasteners and like, while the lower flange is coupled to the seat frames 524, 572. A forward portion 808 of the cover includes a curved grippable portion 810, forming a curved wall having bottom and front portions, and a channel 812 formed laterally therethrough. A handle 814 includes a curved grippable portion 816 shaped to be received in the channel, and a rearwardly extending shaft or post 818. The handle further includes a flange 820 extending laterally inwardly, which is secured to the carriage 718. The post 818 extends rearwardly through a channel formed in and by the cover 800 and extends through an opening of the cover so as to increase the rigidity of the cover as shown in FIGS. 81 and 82. An intermediate portion 822 of the cover includes an expansion or bellows structure, which allows the forward portion 808 to move fore and aft in a longitudinal direction relative to the fixed rear portion 802 of the cover. The expansion structure includes a plurality of vertical ribs 824 connected with connection ribs 826, which allow the vertical ribs to move from a minimum seat depth position, wherein the ribs 824 are proximate each other, to a maximum seat depth position, wherein the ribs are spaced from each other. The cover 800, including the expansion joint, helps limit the access of the user to the interior of the seat, where various pinch points may be created. In addition, the cover 800 provides an unique aesthetic and closure, while still permitting a relative movement or translation of the forward portion of the seat, for example when adjusting the depth of the seat. As shown in FIGS. 100 and 101, the cover 1800 includes a rear cover portion 1804 that closes off the sides of the seat between the seat surface and the lower frame members, and a front cover portion 1808 that is secured to the carriage, with the front cover portion sliding relative to the rear cover portion as the depth of the seat is adjusted. Either the front or rear portion can be positioned exteriorly of the other during the relative sliding movement.

Figure 85:
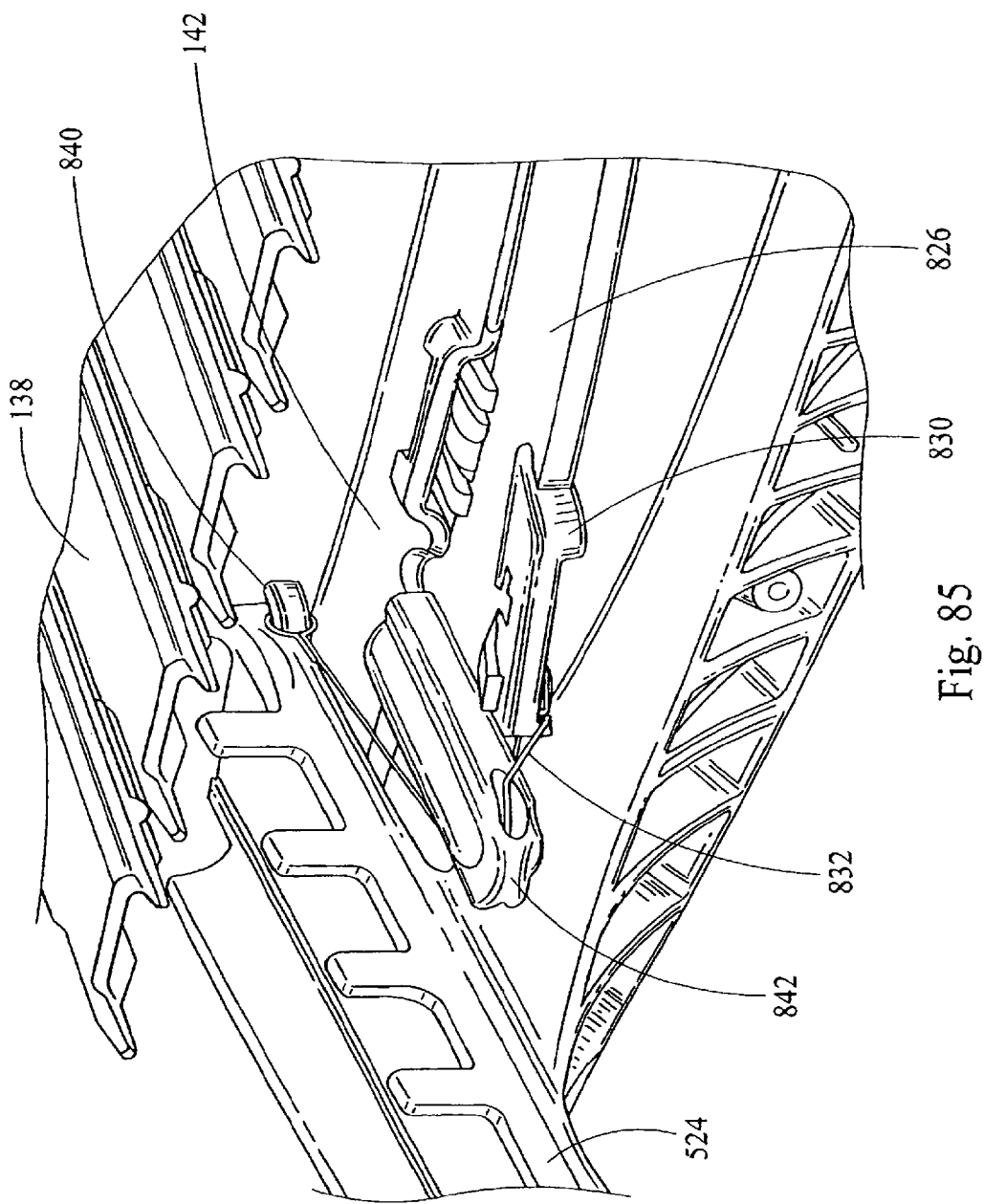
FIG. 85 is a partial perspective view of various seat depth components.
Figure 86:
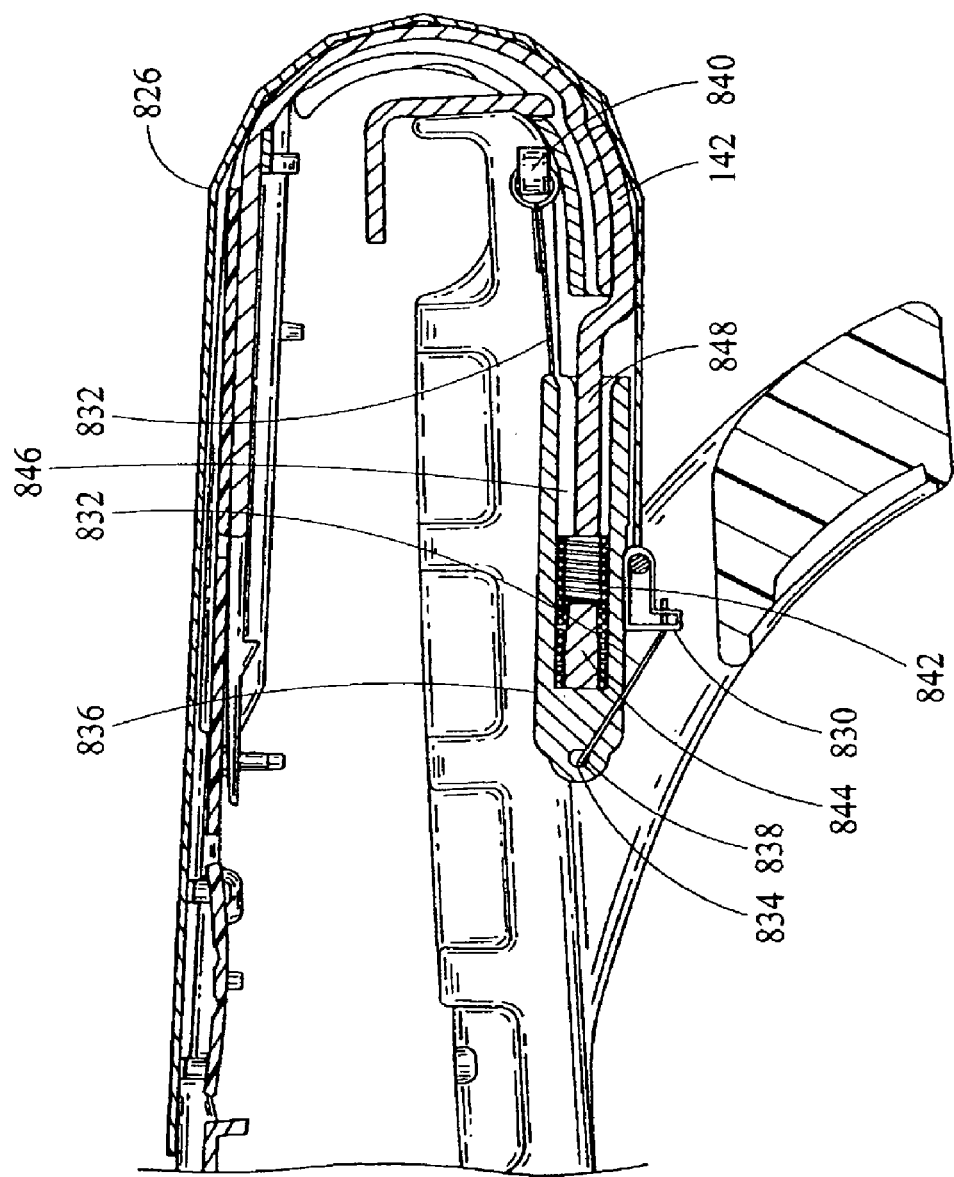
FIG. 86 is a cross-sectional view of the assembly shown in FIG. 85.
Figure 87:
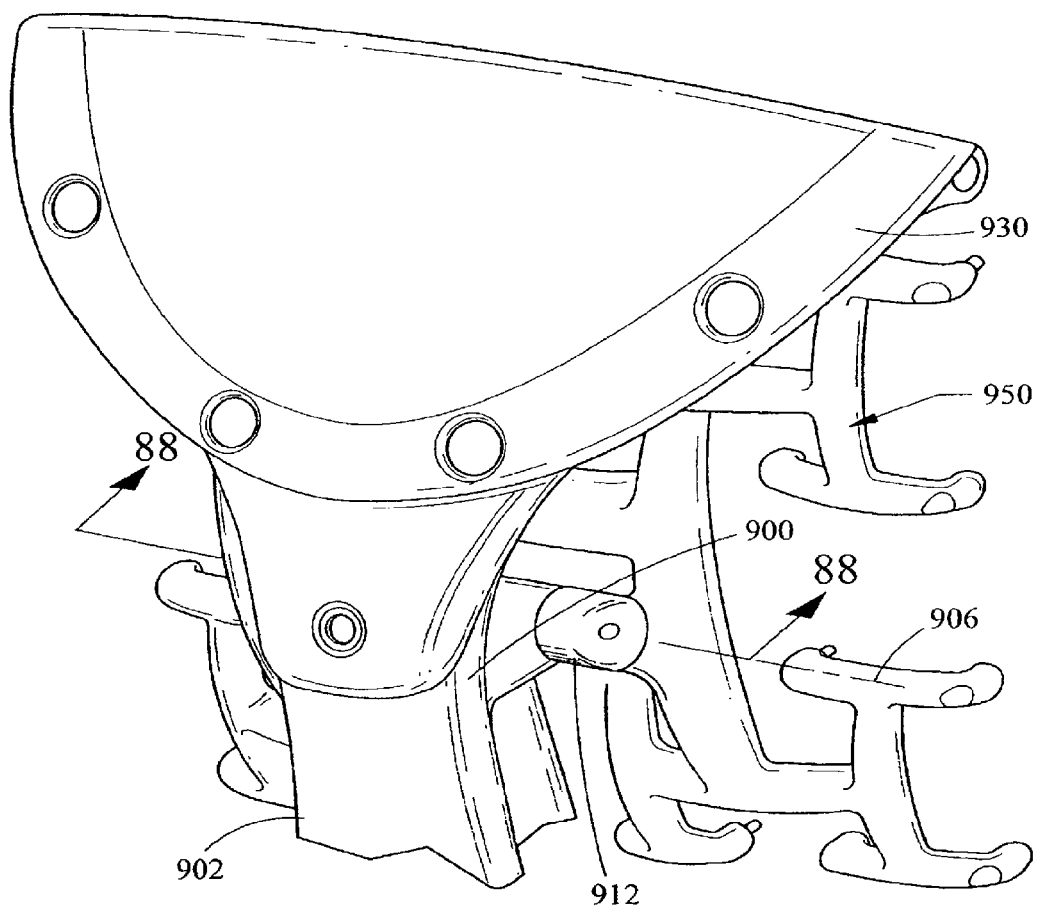
FIG. 87 is a partial perspective view of the upper backrest assembly.
Figure 88:
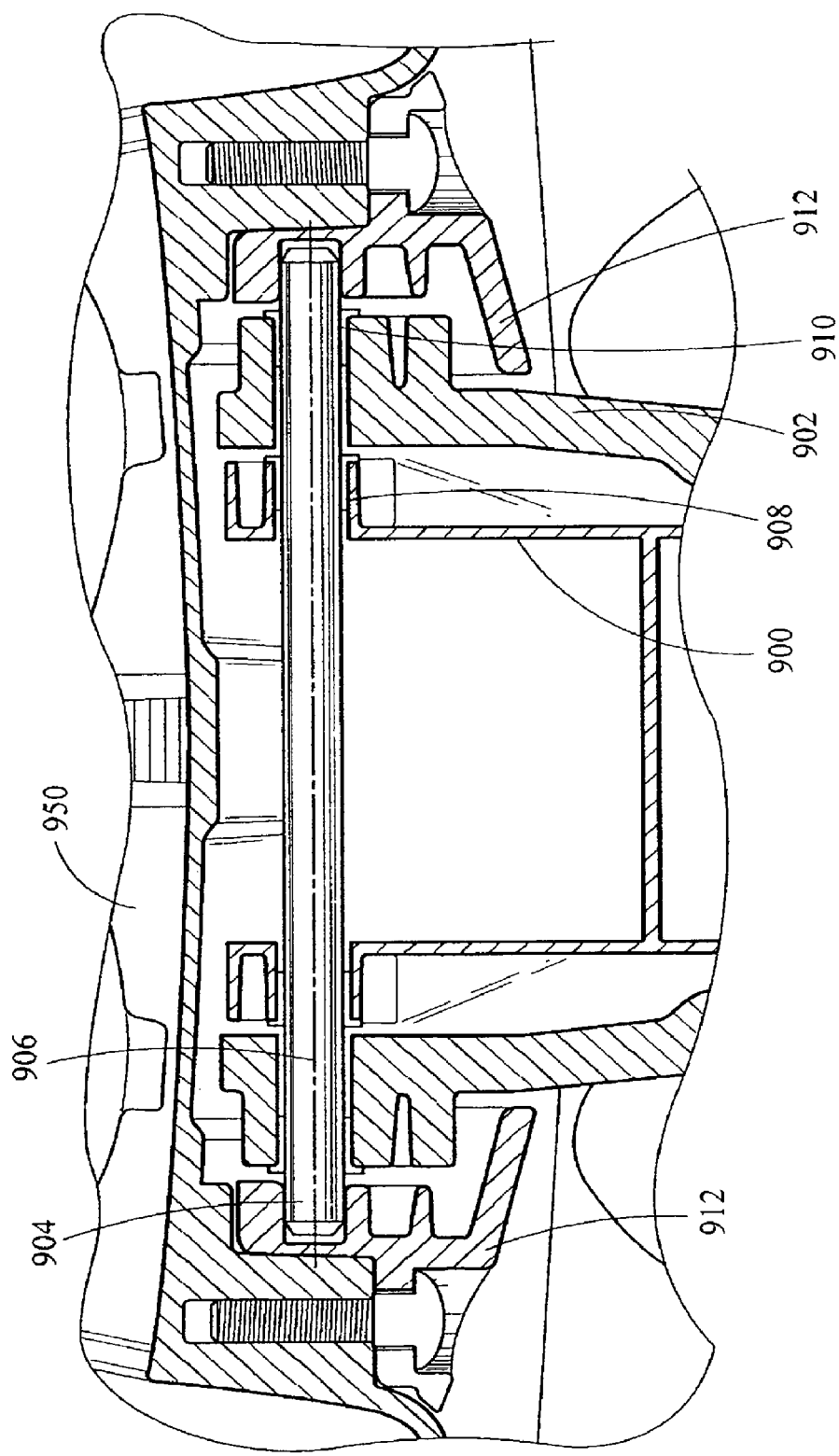
FIG. 88 is a cross-sectional view of the backrest shown in FIG. 87 taken along line 88-88.

Referring to FIGS. 85 and 86, in an alternative embodiment of the seat depth mechanism, the cover member 826, for example a fabric member, includes a laterally extending wire 828 secured to edge portion of the fabric, for example by sewing or heat sealing the wire to the fabric, or by positioning the wire within a fabric loop. A pair of laterally spaced clips 830 are secured to the wire, and thereby to the fabric. Of course, it should be understood that the clips can be secured directly to the fabric without the wire, although the wire provides stability to the fabric as it is moved. A pair of tethers or strings 832 have a first end attached to a respective one of the clips. It should be understood that the tether or string can be secured directly to the cover, for example by bonding or sewing, or can be integrally formed therewith for example as an extension of the cover. In this way, the tether or string are configured as part of the cover or fabric. The strings or tethers extend rearwardly, through an opening 834 formed in a guide member 836. The tether or string 832 slidably moves relative to the guide member through the opening at a folded portion 838 of the string, again forming a portion of the cover. An opposite end of each string is coupled to the seat frame 524, for example by securing a loop of the string to a hook 840 on the frame. A spring 842 is disposed in a channel around a post 844 formed in the spring guide, with the channel 846 which is further disposed on a rearwardly extending tab 848 or protrusion of the flexible member 138, or lower portion 142 thereof. The connection of the two ends of the string 832 to the frame and the flexible member preloads the spring by urging the guide member 836 toward the flexible member 138 against a biasing force of the spring 842. In this way, the string 834 and spring 842 maintain the cover 826 in tension about the flexible member 138 as the flexible member is moved fore and aft between the minimum and maximum seat depth positions with the tether moving/sliding relative to the guide.

Tilt Mechanism:

As shown in FIGS. 5, 10, 21-23 and 42-45, and as mentioned above, the housing 2 includes a lower housing member 16 and an upper housing member 14. A seat support bracket 166 has a pair of forwardly extending pivot arms 168 and a rear support platform 170. The support bracket 166 is connected to the rear seat frame 72, and in particular is fastened to the platform 170, such that the support bracket 166 forms part of the third link. The pivot arms 168 are pivotally connected to the tilt control housing at the fourth pivot axis 96. Each pivot arm has a curved, or arcuate, slot 171 formed therein, with the slot having a generally vertical orientation.

Figure 10:
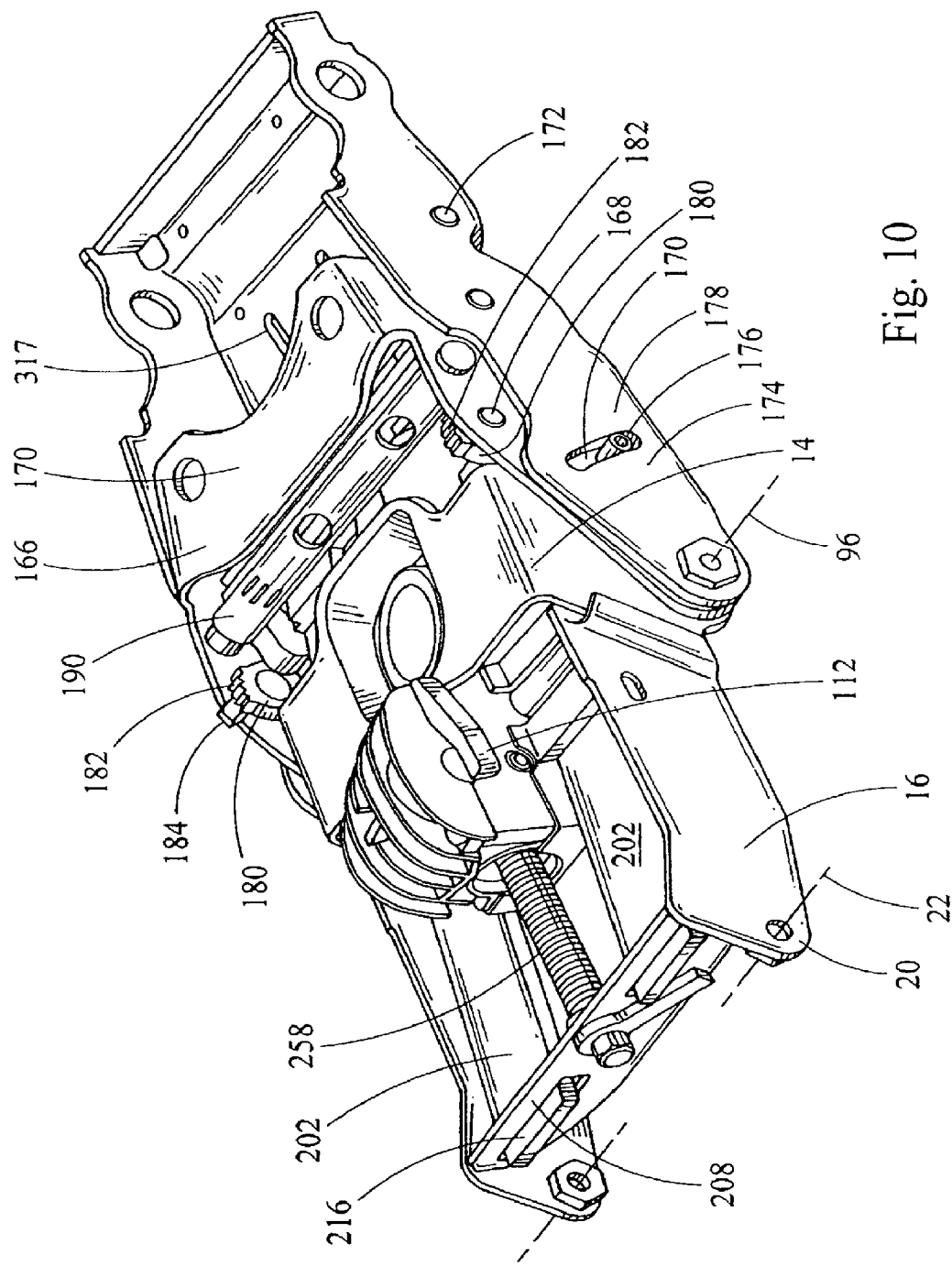
FIG. 10 is a perspective view of a tilt control mechanism.

A back support bracket 172 also includes a pair of forwardly extending pivot arms 174 that are pivotally connected to the tilt control housing at the fourth pivot axis 96. The pivot arms also each have an arcuate slot 176 (or track) that are aligned with the slots 171 in the seat bracket. A forward stop member 178 (or guide) extends through the slots and is secured to the tilt control housing. The brackets 166, 172 pivot about the fourth pivot axis 96, with the stop member 178 engaging a bottom of the slots 171, 176 to limit the forward pivoting or tilting of the seat and back in an upright, normal position as shown in FIG. 10.

A pair of tilt limiters 180, 780 are pivotally secured to the seat bracket about a pivot axis with a pivot member. The tilt limiters have a plurality of indexing detents 182 selectively engaged by a cantilevered spring 184 extending from the seat bracket. The indexing detents can alternatively be located along a side face of the tilt limiter. The tilt limiters further have a plurality of steps 186 formed along a leading edge thereof that are selectively engaged with an edge 188 on the tilt control housing. In this way, the rear tilting of the seat bracket 166, and connected back support bracket 172, are limited by the pivotal position of the tilt limiters 180 relative to the tilt control housing 2. The pivotal location of the tilt limiters 180 is controlled by an actuator 190, configured as a cross tube, rotatably connected to the seat bracket. The actuator 190 includes a pair of lugs with slots 192, with the lugs being connected to corresponding slots 191 on the tilt limiters 180. When rotated, the actuator 190 pivots the tilt limiters 180 about pivot axis 196 to the desired position, with the indexing mechanism (detent 180 and spring 184) corresponding to the various available positions of the tilt limiters.

Figure 39:
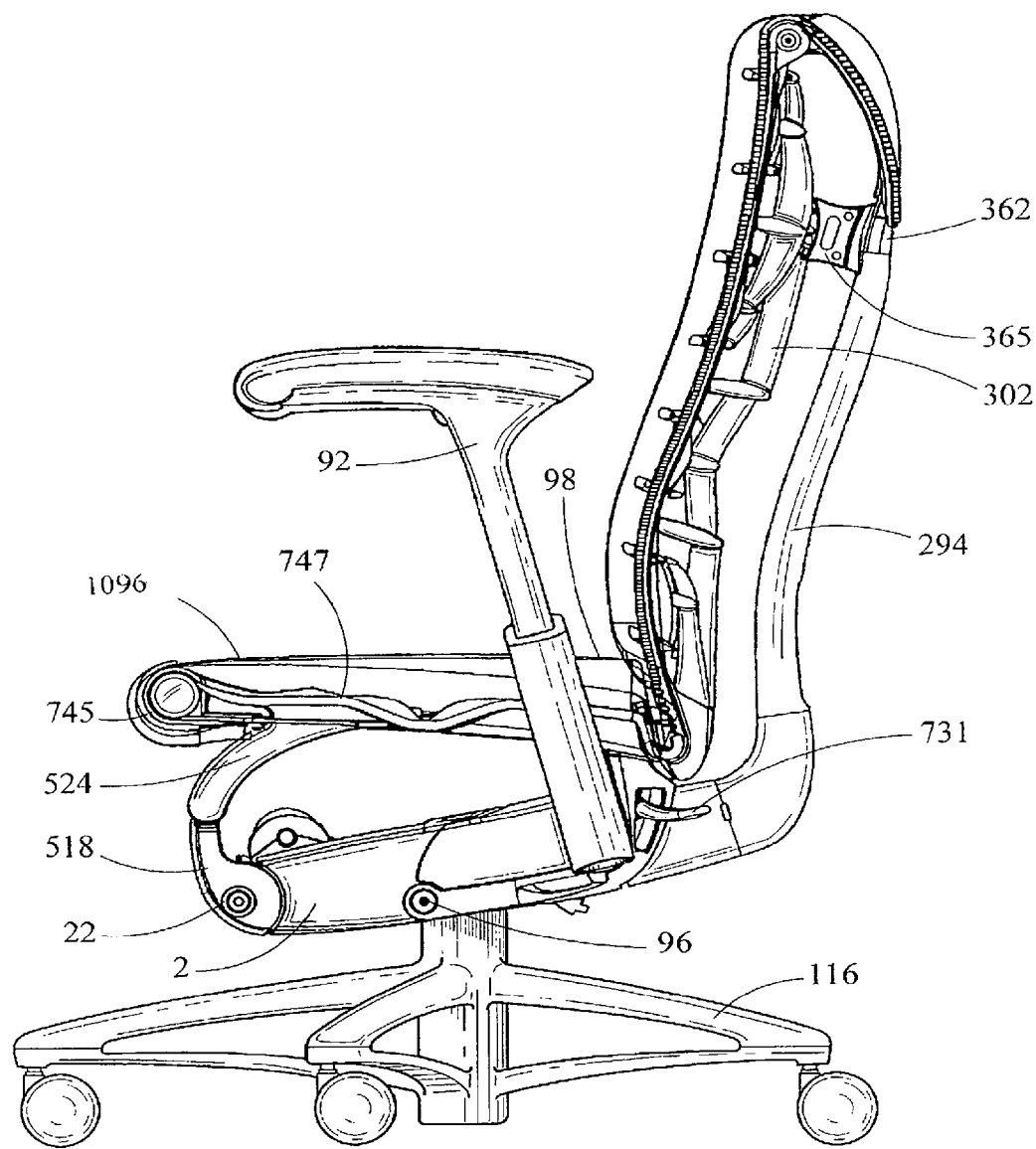
FIG. 39 is a side view of the chair.
Figure 42:
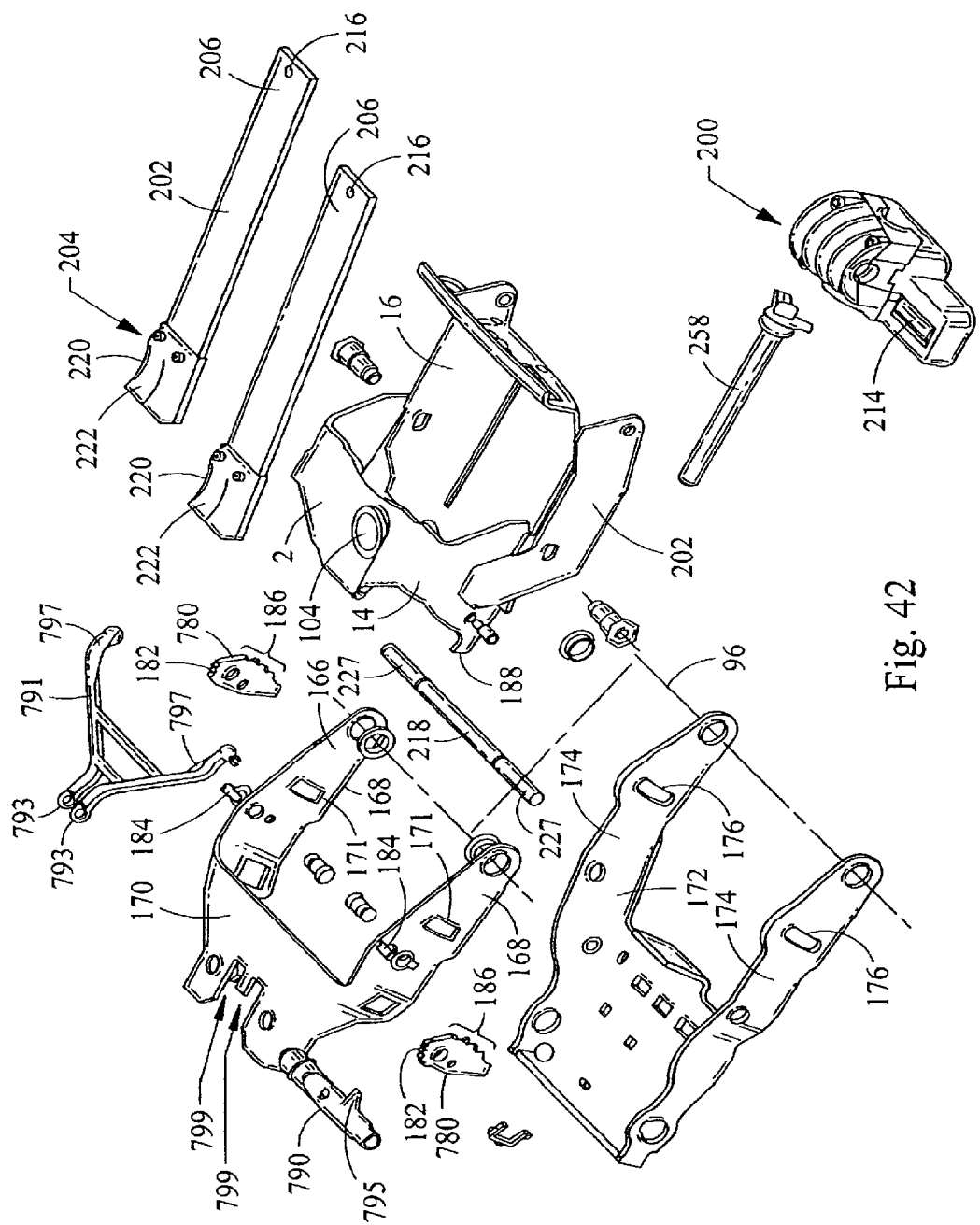
FIG. 42 is an exploded perspective view of another embodiment of a tilt control mechanism.
Figure 43:
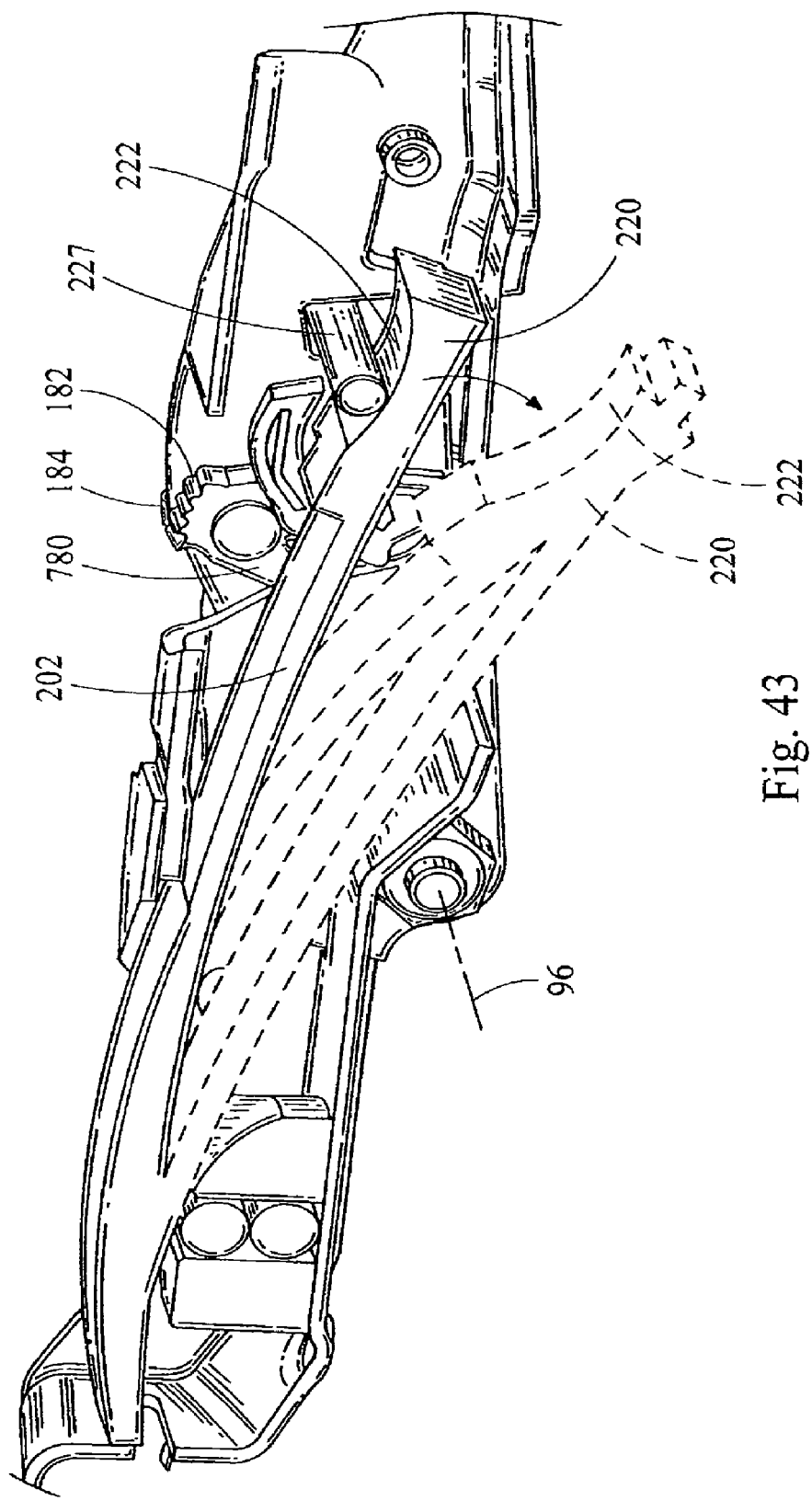
FIG. 43 is a cut-away perspective view of a back support member and leaf spring.

In another embodiment, shown in FIGS. 39 and 42, the actuator 790 is positioned more rearwardly, such that a lever or grippable portion 731 on the actuator is disposed adjacent the location of the hand of the user when their arm is relaxed and allowed to drop or hang vertically, i.e., at a "handfall" position relative to the user. As shown in FIG. 39, the grippable portion is preferably positioned rearwardly of the rear of the seat or alternatively in the rear 10% of the seat depth. A link 791, generally Y-shaped, is connected to the actuator. End portions or lugs 793 of the link are rotatably connected to a lever portion 795 extending radially from the actuator, with arms 797 diverging outwardly from the end portions and having opposite end portions rotatably connected to the tilt limiters 780. The seat bracket 166 is provided with an opening 799, configured as a pair of slots, in the rear portion of the platform 170 that accommodate the lever portion 795 and lugs 793 of the link. In operation, the user rotates the actuator 790 by way of grippable portion 731, which pivots the link 791 and thereby rotates the tilt limiters 780 to a desired position.

As best shown in FIGS. 5, 9 and 42-44, a fulcrum assembly 200 is moveably installed in the tilt control housing beneath a pair of leaf springs 202. The leaf springs are preferably made of a composite material, such as a fiberglass and epoxy matrix, although it should be understood that other resilient materials such as steel would also work. The composite material can be a fibrous composite, a laminated composite or a particulate composite. A suitable composite spring is commercially available from Gordon Plastics, Inc. of Montrose, Colo. under the specification designation of GP68-UD Unidirectional Fiber Reinforced Bar Stock, and sold under the tradename POWER-TUFF. The fiberglass/epoxy matrix bar preferably is unidirectional with a glass content of about 68% and a laminate density of 0.068 lbs./in.$^3$. The bar preferably has a flexstrength of about 135,000 psi, a flex modulus of about 5,000,000 psi, and an ultimate strain of about 2.4%. The use of a composite material bar can help eliminate the problems associated with creep. Another suitable spring is unidirectional fiberglass 70±2% by weight 30% vinyl esther hi-performance resin. The shape, size (width, thickness, length) and material of the springs can be varied to provide various spring characteristics. In addition, the spring can be compression molded in various curved shapes to provide unique tilt balance and ride options. In one embodiment, each spring is approximately 9.25 inches long, 1.85 inches wide and 0.225 inches thick.

In operation, one end 204 of the leaf spring 202 directly biases the back support bracket 172, via a laterally extending rod 218 secured to the back support bracket, and indirectly biases the seat support bracket 166 via the back support bracket in an upward direction so as to thereby support a user sitting in the chair. The opposite end 206 of the spring engages a cross member 208, configured with openings 212 and a pair of locator tabs 210 disposed in openings 216 formed in the springs 202. The cross member is disposed laterally across a front portion of the housing, while an intermediate portion of the spring is supported by the fulcrum member 214. In this way, the springs 202 act as a simply supported beam with a load imparted intermediate the supported ends thereof. To adjust the force applied to the back support, the user moves the fulcrum assembly 200 in a linear, longitudinal direction within the housing. It should be understood that the spring biases the seat support by way of the back support, and that in alternative embodiments, the spring can bias the back support and seat support through a common element, such as with a pivot member that pivotally connects those members, or can directly bias the seat support and also the back support. In any of these embodiments, it should be understood that the springs are biasing each of the seat support and back support, individually and in combination.

As the fulcrum assembly 200, including fulcrum member 214, is moved rearwardly in the housing 2, the distance between the point of support at the fulcrum member 214 and the support member 218 is decreased, so as to correspondingly increase the force applied by the rear end 204 of the spring. Conversely, the fulcrum member 214 can be moved forwardly in the housing 2 to decrease the amount of resistive force applied to the seat support bracket 166 and back support bracket 172 by increasing the beam length, or the distance between the fulcrum member 214 and the support member 218. Since the leaf springs 202 are simply supported at each end, rather being clamped to the housing 2, the pivot rod 218 or both, bending moments are not introduced at the ends of the spring. When clamped, the properties of the spring, and the amount of the clamping, can effect the loading and associated stresses. Moreover, by providing a simply supported spring, tolerances can be relaxed and the curvature of the spring is allowed to undulate as the beam length changes.

Because the leaf springs 202 are disposed in the housing 2 in a side-by-side arrangement, and are preferably formed as flat bars, the housing can be made more compact at lower cost in an aesthetically pleasing way. Moreover, the resistive force of the spring can be adjusted easily and simply by slideably moving the fulcrum assembly 200 within the housing 2. Since the resistive force is determined by the beam length, rather than by prestressing the spring, the adjustment does not require a progressively larger actuation force as is typically associated with torsion springs and bars and compression springs.

Figure 11:
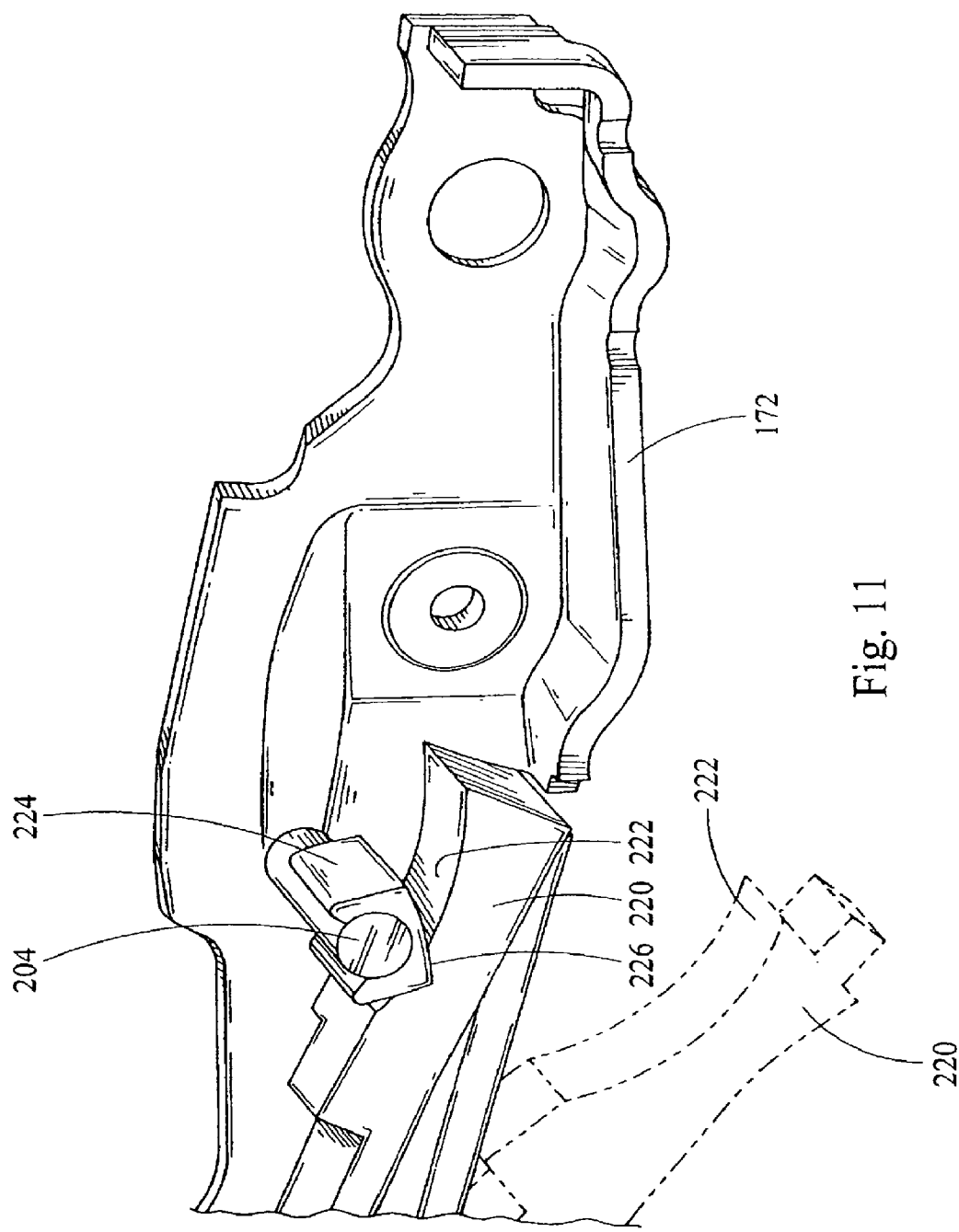
FIG. 11 is a cut-away perspective view of a back support member and leaf spring.
Figure 12:
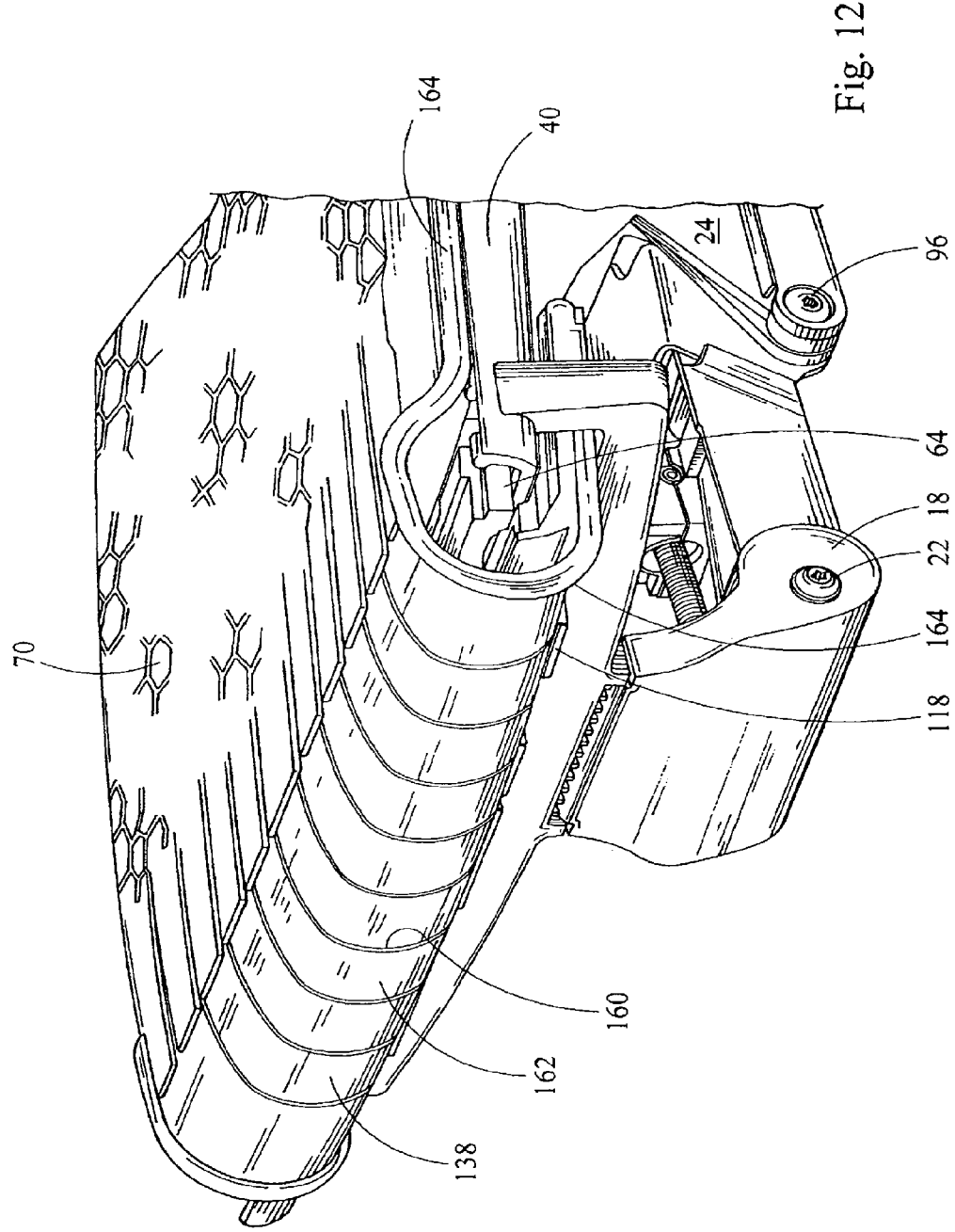
FIG. 12 is a front partial perspective view of the seat and tilt control mechanism.
Figure 13:
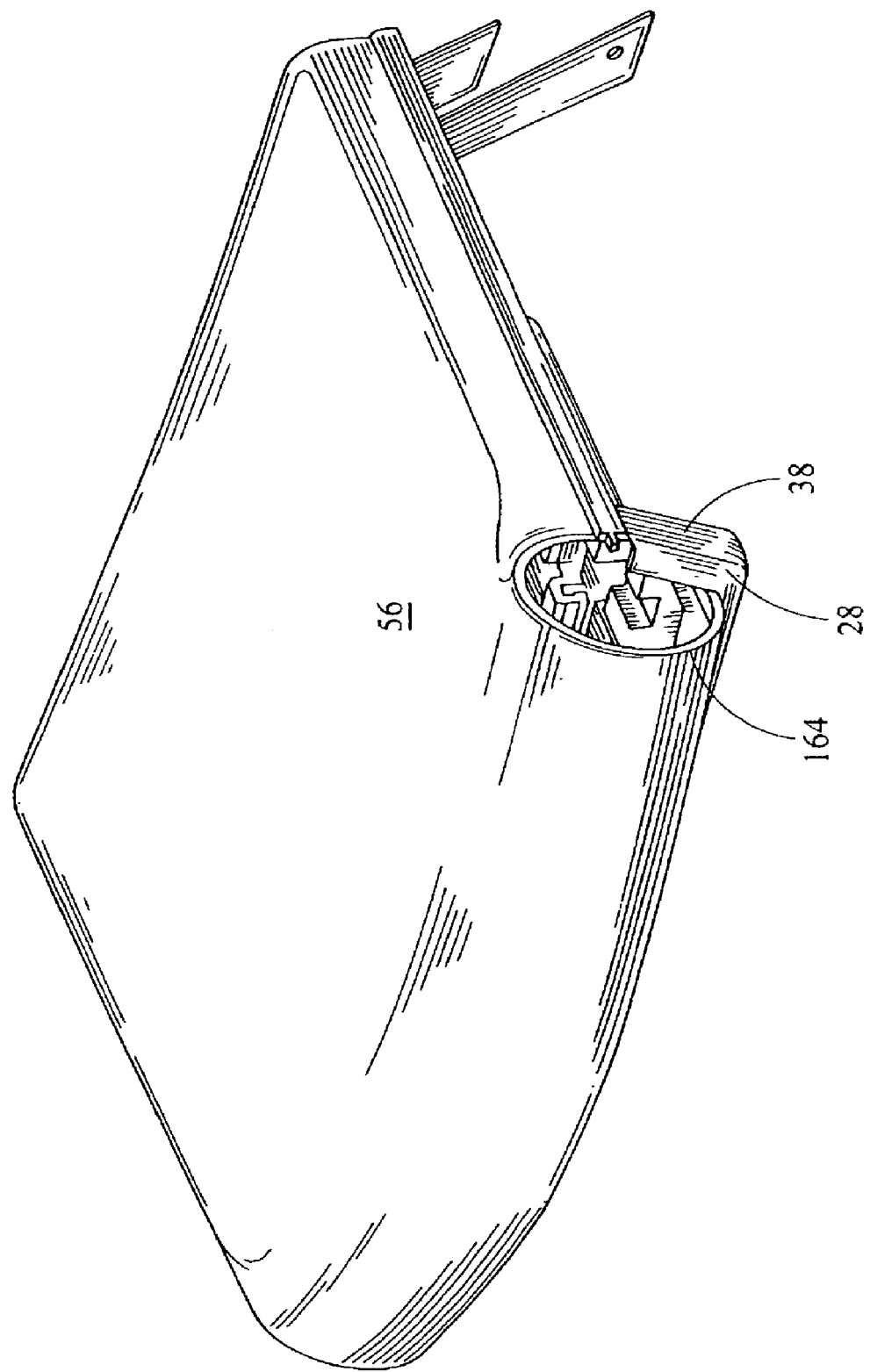
FIG. 13 is a perspective view of a seat member.
Figure 14:
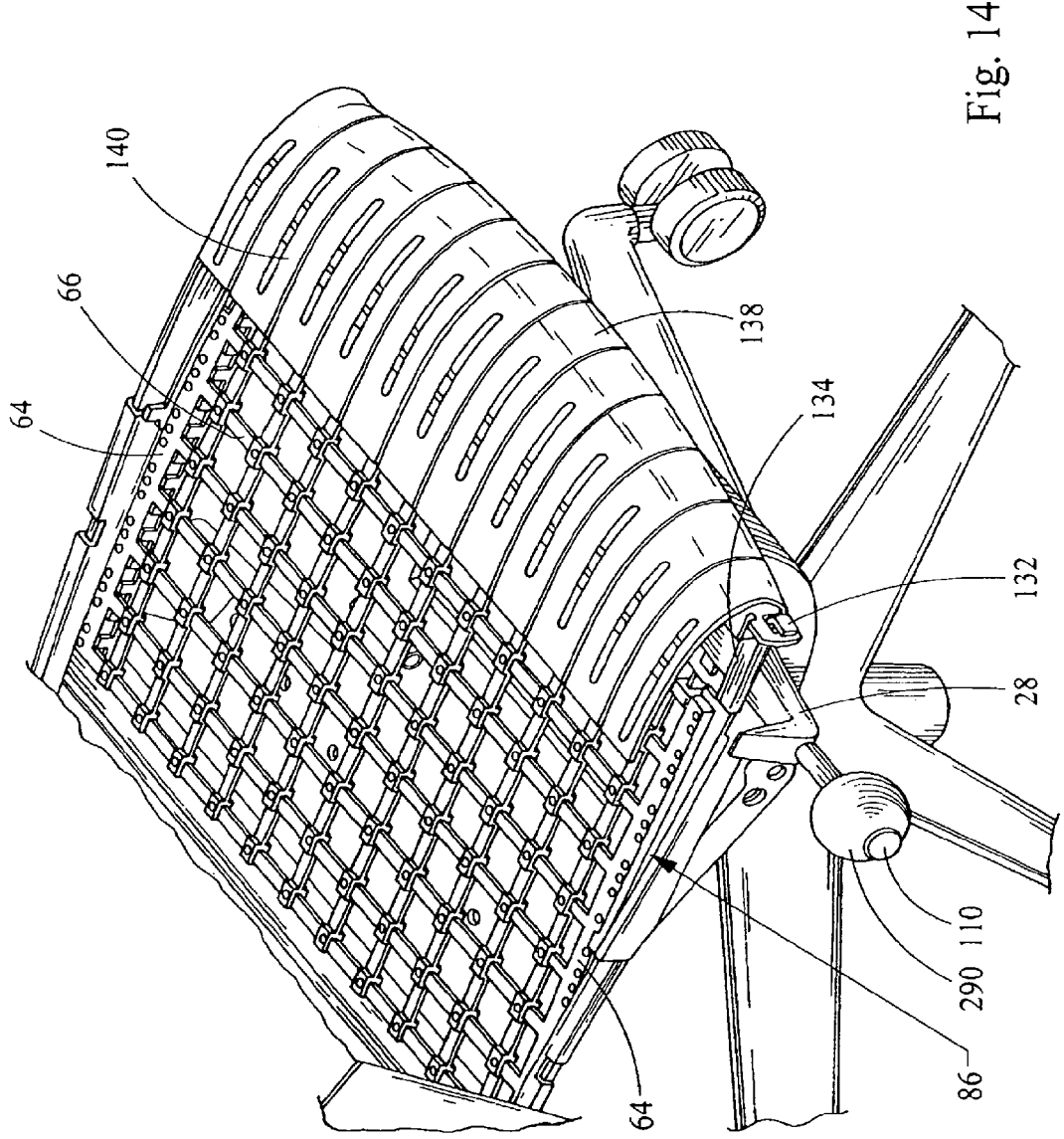
FIG. 14 is a top partial perspective view of the seat.

Referring to FIGS. 5 and 11, the end 204 of the spring is configured with a cam 220 having a concave cam surface 222. FIG. 11 shows the spring in two different biasing positions. The cam surface is formed on an upper surface of the spring. The cam can be integrally formed as part of the spring, or separately configured and connected to the spring with, for example and without limitation, rivets or other mechanical fasteners, adhesives, etc., or any combination thereof. The back support bracket 172, and in particular the rod 218, is configured with a cam follower 224 having a convex cam surface 226. In an alternative embodiment, shown in FIGS. 42 and 43, a separate cam follower is omitted, with the rod 218 itself functioning as the cam follower (or driver), and having a cam surface 227. As the user tilts rearwardly, the cam follower (or driver) 224, 218 rides along the cam 220 with the two cam surfaces 222, 226, 227 contacting each other, such that the cam follower slides rearwardly along the cam surface 222, which drives more deflection into the spring as compared with a flat spring surface. This has the effect of increasing the spring force applied by the spring, which corresponds to an increased torque as the angle of recline increases. In this way, the spring, fulcrum and cam, in combination, provide a balanced ride to the user.

In particular, a balanced ride is achieved for all of the users. Typically, the greatest imbalance will be for a light user at the full recline position and for a heavy user in the forward position. It must be understood that the user will necessarily need to initially adjust the fulcrum member to achieve a balanced ride at any particular recline angle, but that thereafter, the ride will be substantially balanced throughout the defined tilt range without further adjustments of the fulcrum. As such, the chair provides a unique balanced ride that avoids the user having to readjust the biasing force depending on the angle of recline in which they want to user the chair.

It should be understood that, in one embodiment, the applied torque and restoring torque are simply loads being applied over a distance. Accordingly, the balanced ride can also be thought of in terms of an applied force being applied by the user to the body support member at a certain location. Various aspects of the springs and tilt mechanism, or alternative embodiments thereof, are disclosed for example and without limitation in US Pub. No. 2004/0183350A1, which is hereby incorporated herein by reference.

Referring to FIGS. 5, 9, 18-20, 40, 41 and 44 the fulcrum assembly 200 and fulcrum, otherwise referred to as a force adjusting member, includes a base housing 228, an intermediate housing 230, 830, and an upper housing 232, 832. The base housing 228 is configured with a pair of laterally spaced cavities 234 open at both the top and bottom thereof. The base housing also includes a centrally located recess 236 and front and rear walls 238, 240 forming at least a portion of pair of longitudinally spaced openings 242, and one each of a longitudinally and laterally oriented gear recess 244, 246. A pair of laterally extending rollers 248, 250 is disposed in each cavity. The lower roller 250 in each cavity 234 is in contact with the floor 252 or support surface of the housing, while the upper roller 248 in each pair extends above the surface of a side portion 254 of the base member defining the cavity, such that the curved surface of the roller is in contact with a bottom surface of a corresponding spring 202.

A driven bevel gear 256, disposed in the longitudinally oriented gear recess 244 in the base housing, is threadably engaged with a longitudinally extending lead screw 258 non-rotatably secured to a front of the tilt housing, for example with a flange having a button that faces the housing and snaps into an opening formed in the housing. The lead screw 258 extends through the longitudinally extending openings 242. A thrust washer 260 and bearing 262 are disposed between the bevel gear and a rear surface of the rear wall 240 of the base housing 228 so as to allow the bevel gear to easily rotate about the lead screw. A bottom of the base housing is configured with a follower 264 or guide, shown as two posts in FIG. 66, which slides in a track 266 formed in the bottom of the tilt housing.

A laterally oriented drive bevel gear 268 engagingly meshes with the driven bevel gear 256. The drive bevel gear 268 is further integrally configured with, or otherwise connected to, an idler gear 270 disposed on an opposite side of the bevel gear. The intermediate housing 230, 830 traps or encases the bevel gears 256, 268 between the intermediate housing 230, 830 and the base housing 228, and further includes a pair of longitudinally spaced openings 270 that surround the lead screw 258 between the housing components.

A drive pinion gear 272 is disposed in a gear recess 274 formed in the intermediate housing above the idler gear 270. The drive gear 272 engagingly meshes with the idler gear 270. The intermediate housing 230 is configured with a laterally extending opening 276, or half opening, that supports an actuator shaft 278. An end of the shaft 281 and the drive gear are configured with mating D-shaped ends/openings 280, such that rotation of the shaft rotates the drive gear. The shaft and drive gear are disposed between the intermediate housing 230 and the upper housing 232, which is also configured with a gear recess 282 and a laterally extending shaft opening 284. As mentioned above, in the embodiment of FIGS. 5 and 9, a lever arm 108 is pivotally secured between the upper and intermediate housings and is pivotable around a vertical axis 288. An end portion of the arm 112 is aligned with the axis of the actuator shaft extending through the drive gear. The intermediate housing is configured with a cable housing stop 286, such that a cable can be secured to an opposite end of the lever.

Figure 44:
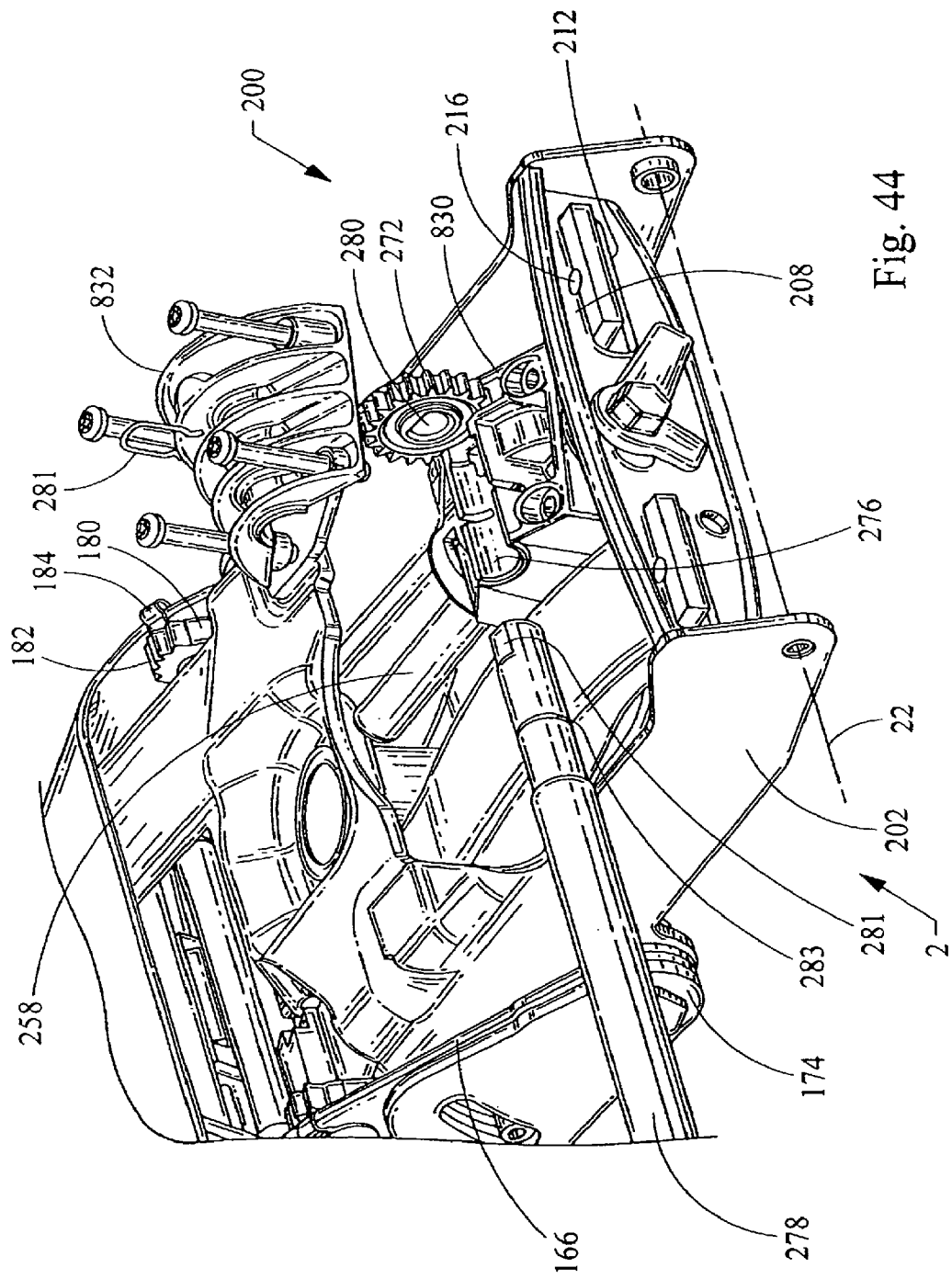
FIG. 44 is a partial exploded perspective view of the tilt control mechanism shown in FIG. 42.

Alternatively, in the embodiment of FIGS. 40, 41 and 44, the cable is translated by the pivoting action of the joy-stick, thereby avoiding the need for the lever arm. As shown in FIG. 44, a retainer clip 281 rotatably engages a circumferential groove formed on the shaft 278, with the clip engaging the intermediate housing with a snap fit so as to prevent the shaft from moving laterally relative to the fulcrum assembly.

In operation, the user rotates the actuator 278 (configured with a grippable member 290) about a laterally extending axis 294, which in turn rotates the drive gear 272. The drive gear rotates the idler gear 270, which rotates the bevel gear 268 about a laterally extending axis 292 parallel to axis 288. The bevel gear 268 rotates the bevel gear 256 about a longitudinally extending axis 294, which threadably engages the lead screw 258 and moves the entire fulcrum assembly 200 in first or second opposite longitudinal (fore-aft) directions 52 to one of a infinite number of predetermined force applying positions. For example the actuator can be moved between first and second adjustment positions so as to move the force adjusting member (fulcrum assembly) between first and second force applying positions. It should be understood that the actuator 278, 290 and fulcrum 214 are infinitely adjustable to an infinite number of adjustment positions and force applying positions respectively.

As the actuator 278, 290 is rotated and the fulcrum assembly 200 moved in one of the first and second longitudinal directions, the actuator is simultaneously translatably moveable relative to the tilt housing with the fulcrum assembly. In this way, the operator is provided with visual indicia about the relative biasing force that will be applied by the springs 202 simply by viewing the position of the actuator 278, 290 relative to the tilt housing 2. In one embodiment, a scale or other indexing indicia (e.g., text "heavy", "medium" or "light" or colors (green for light to read for heavy)), is provided on the housing to further aid the operator in ascertaining the predetermined setting of the force applying member. A cover can be disposed around the housing, and be provided with a longitudinally extending slot in which the shaft 278 travels. Alternatively, as disclosed in FIG. 61, a cover can disposed beneath the shaft, with the upper housing of the fulcrum assembly extending upwardly through a longitudinal opening formed in the cover.

It should be understood that the biasing mechanism can also be used with other springs, such as torsion coil springs tension/compression springs, etc. For example, an actuator acting on an arm of a torsion spring, or against the force of a compression/tension spring, can be moved relative to the housing to provide a visual indicator to the user of the setting of the force applying member before (or while) the user is seated.

Backrest:

Referring to FIGS. 1-4B, 18-38, 42 and 45-54, a back support member includes lower support member 172, configured as the back support bracket referred to above, pivotally connected to the base tilt housing at the pivot axis 96 and an upper support member 294 pivotally connected to the lower support member about a horizontal pivot axis 296 spaced rearwardly from the pivot axis 96. An adjustment mechanism 298 is coupled between the lower and upper support members 172, 294. At least one backrest component 300, shown in one embodiment as a frame 302, is connected to the upper support member 294 adjacent a thoracic region of the backrest component. A lower portion 304 of the frame 302 is fixedly connected to the seat frame 72 along a rear edge thereof. The upper portion of the backrest is flexible relative to the lower portion thereof, as the upper support member pivots about the axis 296. In an alternative embodiment, the upper portion of the frame is pivotally connected to a lower portion. In the embodiment of 2-4B, a lower back support 303 is connected to and extends upwardly from a rear of the seat frame and is secured to the back frame, or backrest, at a lower portion thereof, for example at the lumbar region. The upper support member 294, together with the backrest 300 and frame 302, can be easily removed or disconnected from support member 172 in a knock-down configuration for shipping.

The adjustment mechanism 298 is operable between a plurality of positions, including for example and without limitation a first and second position, and is infinitely adjustable. The upper support member 294 is pivotable relative to the lower support member 172 about the horizontal axis 296 between a corresponding plurality of static support positions as the adjustment mechanism is operated. In various embodiments, the upper support member (and an upper body support surface of the back) is pivotable relative to the lower support member (and a lower body support surface of the back) about 10 degrees from a forwardmost position to a rearwardmost position. In other embodiments, the upper member is adjustable between about 1 degree and 15 degrees, more desirably between about 5 degrees and 15 degrees, and preferably about 10 degrees between the forwardmost and rearwardmost positions.

The upper support member includes a spine member 306 and a bracket 308 disposed and secured in a bottom portion of the spine member. In one embodiment, a tab 310 engages the spine to prevent rotation of the bracket relative to the spine. The bracket can be formed integrally with the spine, or as a separate member. The bracket includes a pair of forwardly extending flanges 312 with openings defining the pivot axis 296. The flanges are pivotally connected to the back support bracket 172 with a pair of pivot pins 314.

A lower housing component 316 is secured to a support platform 317 on the back support bracket 172. The housing component 316 is configured with a lower wedge surface 318. A cover member 320 is secured to the lower housing component, with the cover and lower housing defining a passageway 322 for a rotatable actuator shaft 326, which travels in a slot 319 formed in the bracket 308. An acme shaft 324 is rotatably mounted in the lower housing. Mating ends 328 of the actuator shaft 326 and acme shaft 326 are configured with D-shaped cross-sections, with a moveable collar 330 disposed over the ends to secure the actuator to the shaft. The collar 330 can be translated in a lateral direction 52 to release or lock the ends of the shafts.

Figure 45:
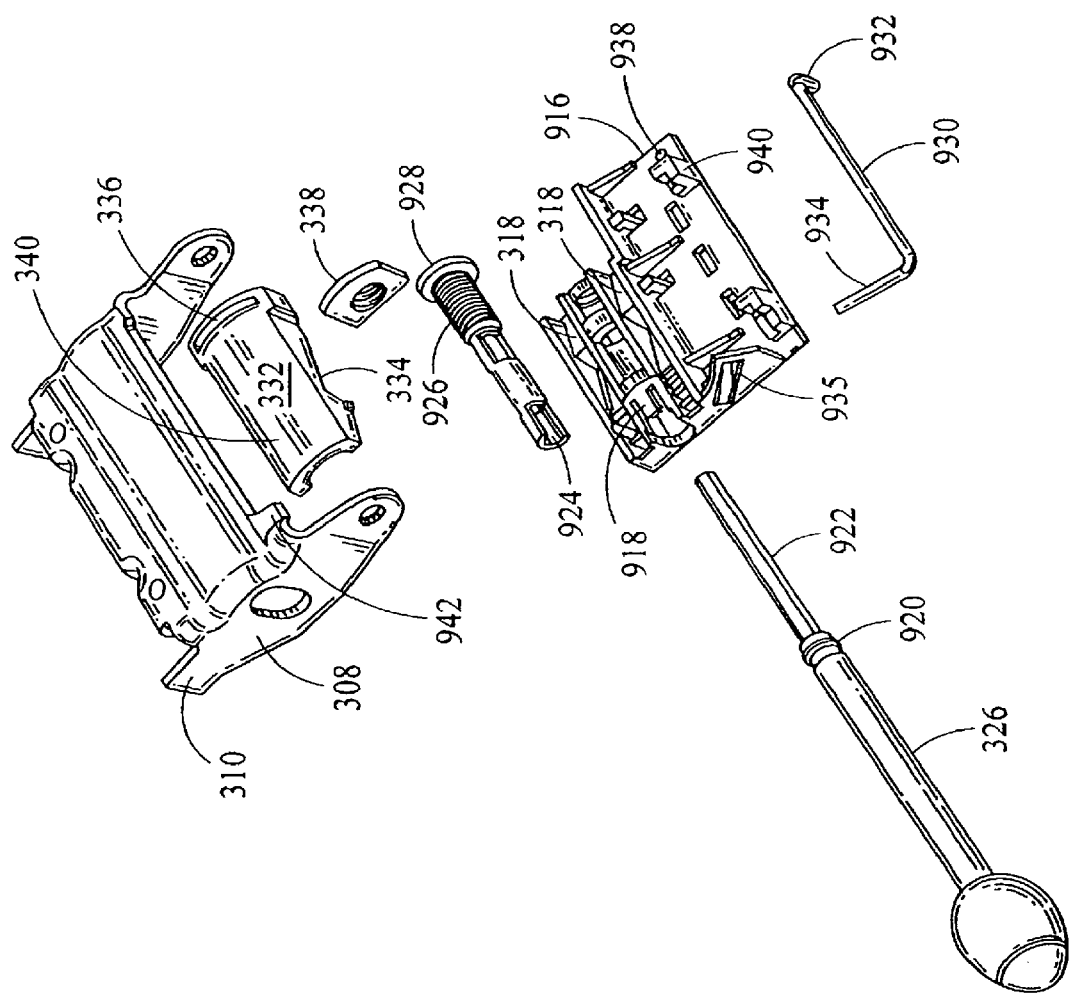
FIG. 45 is an exploded perspective view of another embodiment of a back angle adjustment mechanism.

In an alternative embodiment, shown in FIG. 45, the lower housing component 916 includes a resilient flexible tab member 918 having catch portion. The housing component can be secured to the support bracket with one or more tabs or hooks, for example with a snap fit. The tab member 918 flexes upwardly as the shaft 324 is inserted through an opening in the lower housing component until the catch member engages a circumferential groove 920, or undercut, formed in the shaft. The end portion 922 of the shaft is formed with a key shaped cross-section, such as a hexagonal cross section, and engages a mating cross-section formed by a socket 924 on the acme shaft 926. The acme shaft is inserted through an opening in the housing component 916, with a head 928 of the shaft engaging an end wall of the lower housing component. A torsion spring 930 has a first down-turned end 932 engaging an opening 938 formed in a platform of the lower housing component. A pair of tabs 940 rotatably engage an elongate shaft portion of the spring, while a bent end portion 934 of the spring extends rearwardly such that it engages the top surface of a flange 942 extending forwardly from the upper support member. The spring can be preloaded before assembly by engaging it with a catch member 935.

Figure 18:
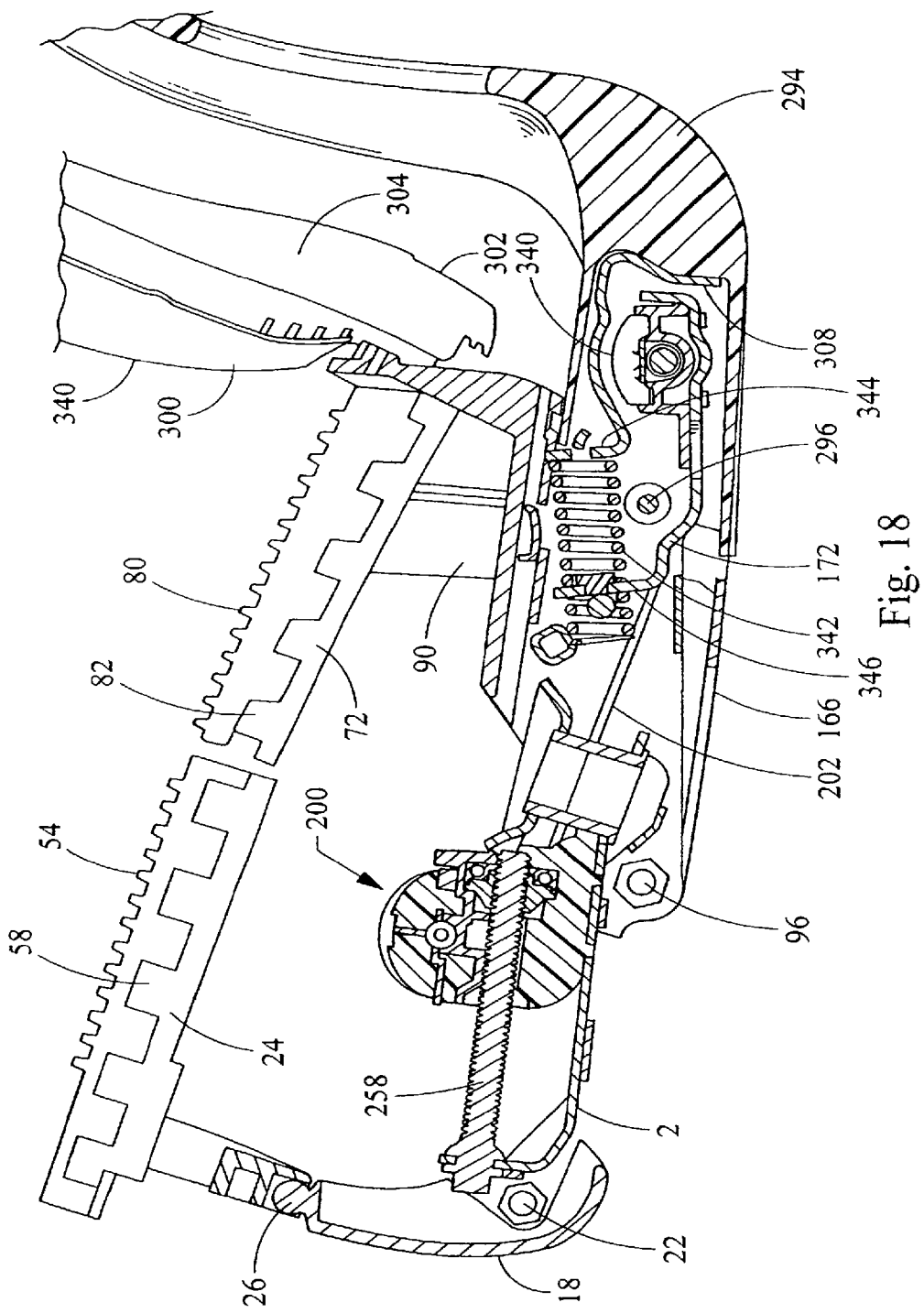
FIG. 18 is a side cut-away view of the seat, tilt control mechanism and back support member in an upright position.

An upper wedge member 332 is disposed over the shaft 324 and includes a slot or socket 336 engaged with a drive member 338, configured as an acme plate threadably engaged with the shaft 324. The drive member 338 can be formed integrally with the upper wedge member or as a separate part, but is considered part of the wedge member in either embodiment. The upper and lower wedge members 316, 332 are configured with opposing wedge surfaces 318, 334 that slide along each other and force the wedge members apart, and in particular, forces the upper wedge member up relative to the lower wedge member as the upper wedge member translates in a lateral direction 52 relative to the lower wedge. It should be understood that in an alternative embodiment, the upper wedge is fixed to the upper support member, and the lower wedge member is translatably moveable in the lateral direction. The upper wedge member 332 has an upper surface 340 that bears against an interior surface of the bracket 308 and causes the upper support member 294 to rotate relative to the lower support member 172 about axis 296 as the wedge members are forced apart. As shown in FIG. 18, a compression spring 342 is disposed between a stop 344 formed on the upper support member, and in particular the bracket 308, and a stop member 346 extending upwardly from the back support bracket. The spring 342 biases the upper support member away from the back support bracket, or lower support member (clockwise as shown in FIG. 18). In essence the spring 342 biases the bracket 308 against the upper surface of the wedge member 340

Figure 21:
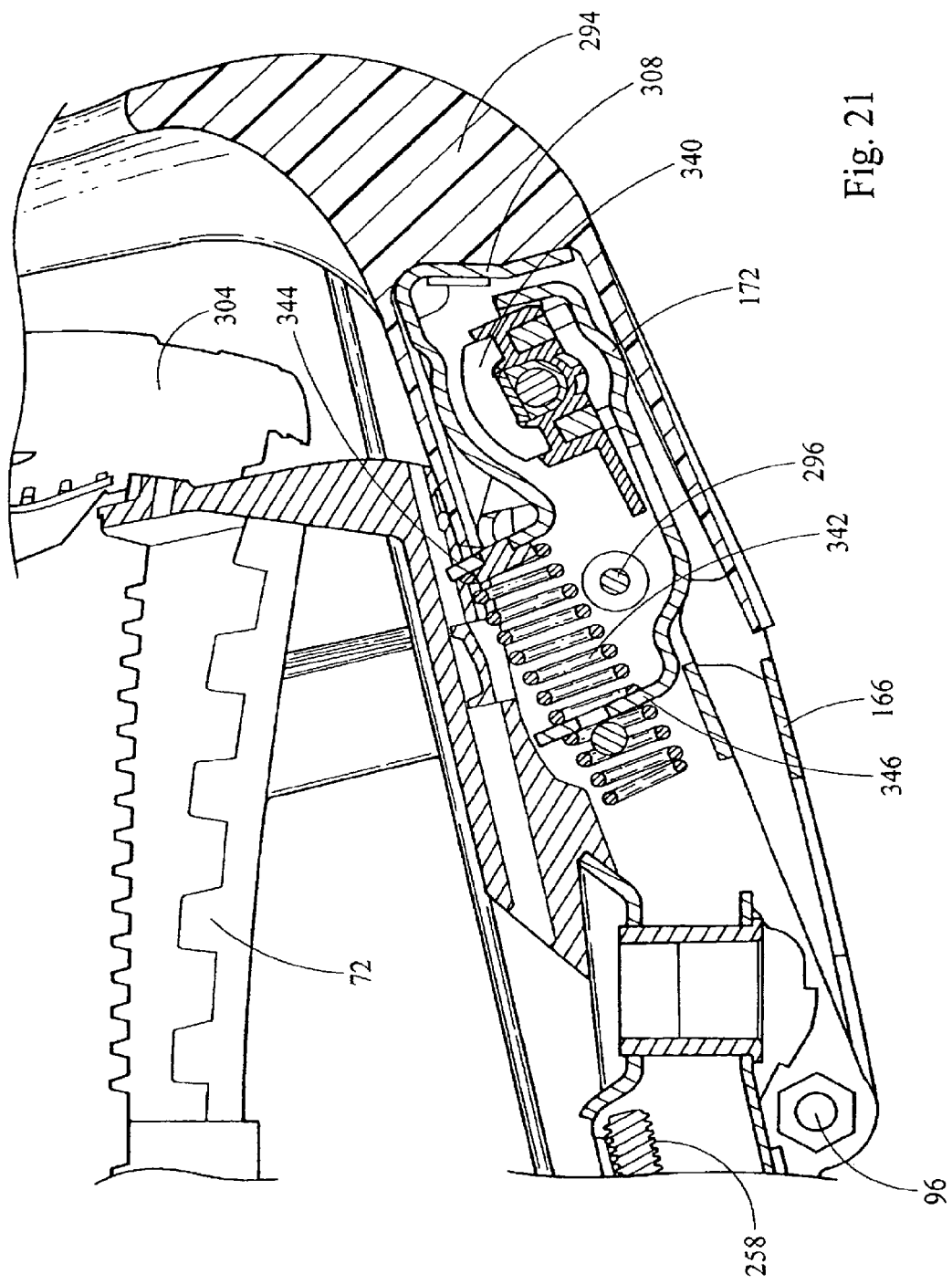
FIG. 21 is a partial, side cut-away view of the back support member in a forward position.
Figure 22:
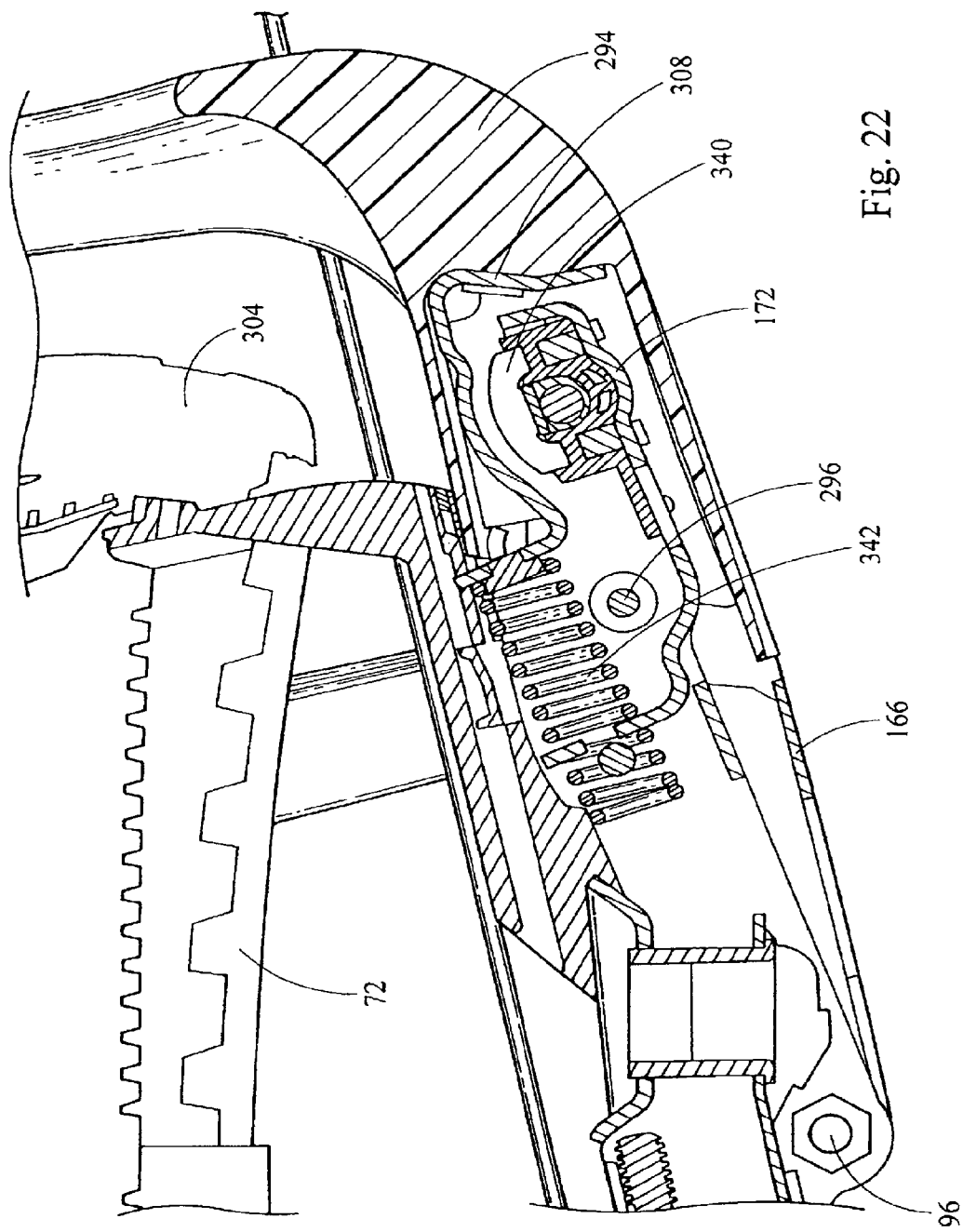
FIG. 22 is a partial, side cut-away view of the back support member in an intermediate, nominal position.
Figure 23:
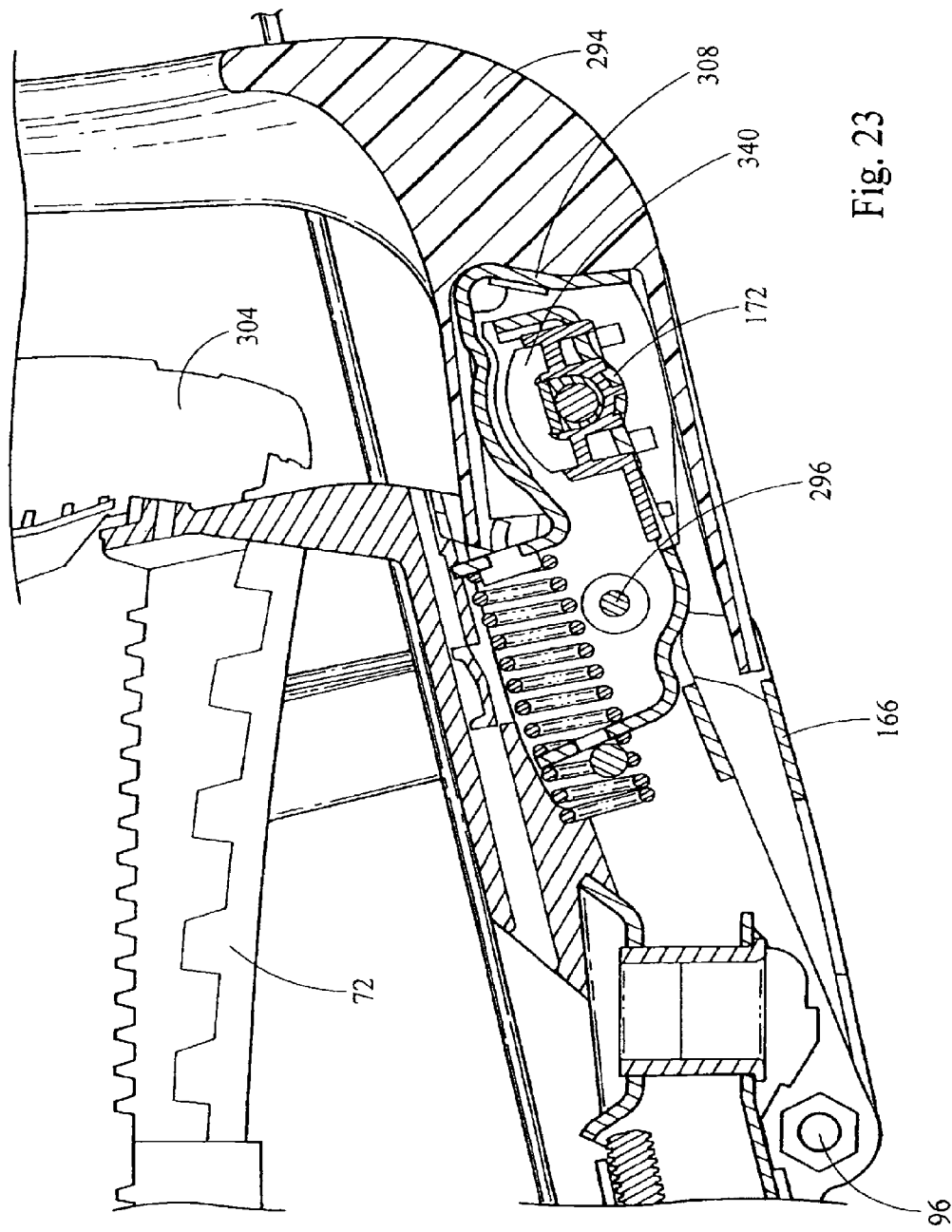
FIG. 23 is a partial, side cut-away view of the back support member in a rearward position.
Figure 24:
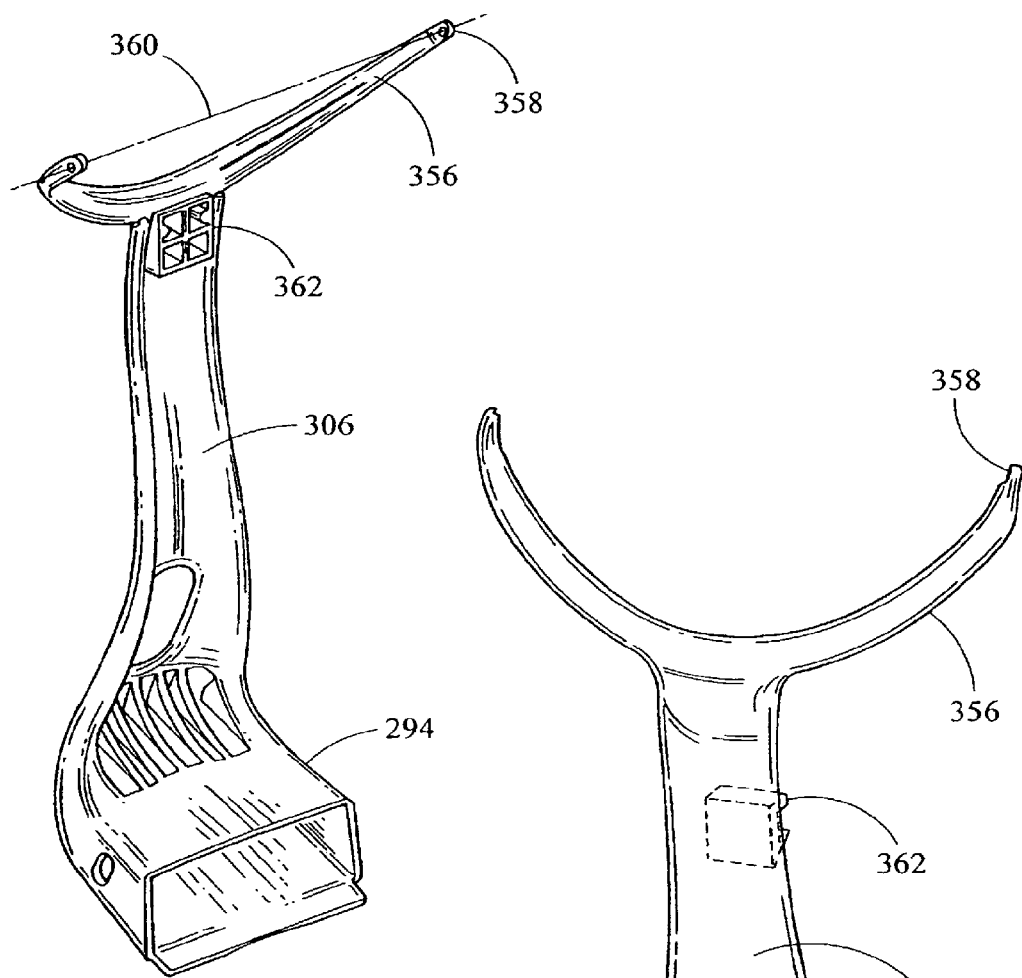
FIG. 24 is a front perspective view of the back support member.
Figure 25:
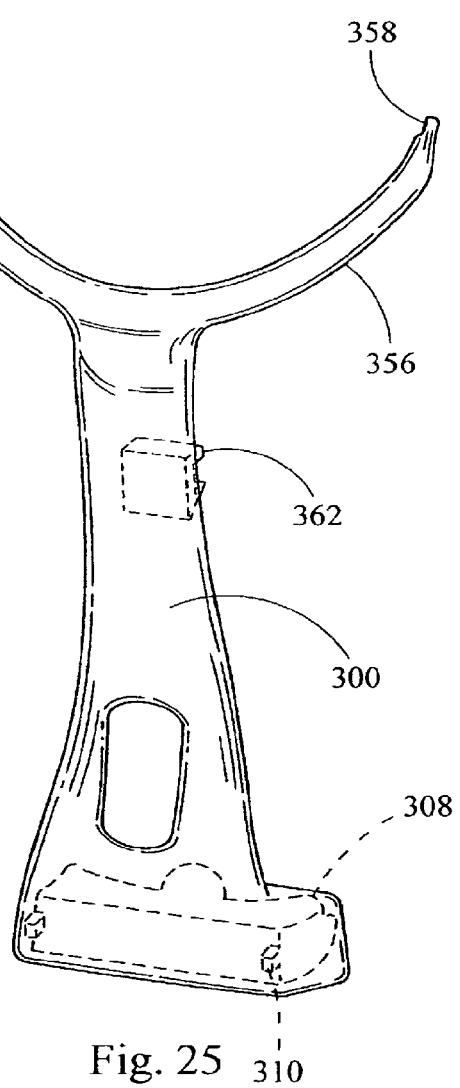
FIG. 25 is a rear perspective view of the back support member.
Figure 26:
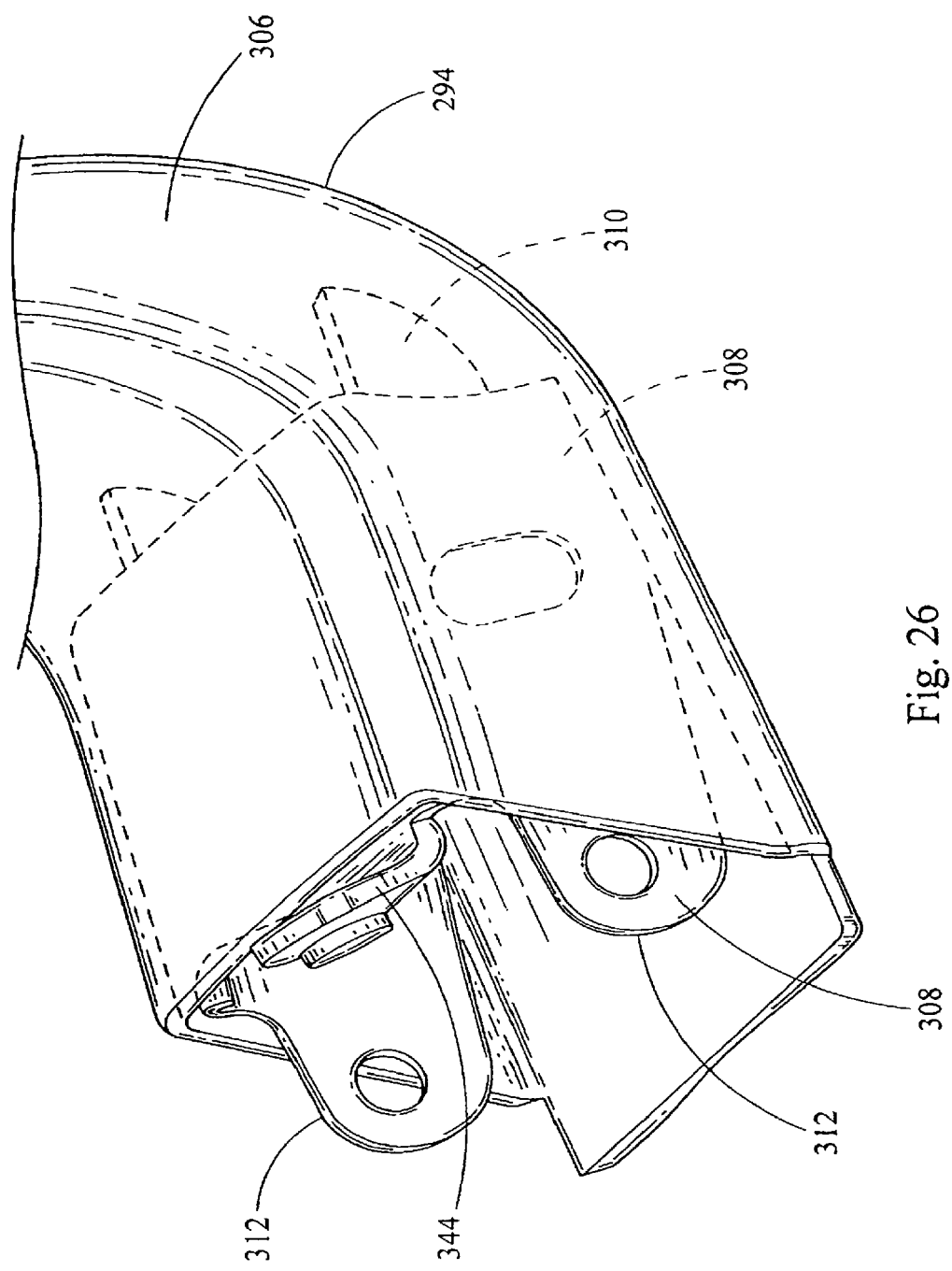
FIG. 26 is a partial perspective view of a lower portion of the upper portion of the back support member.
Figure 27:
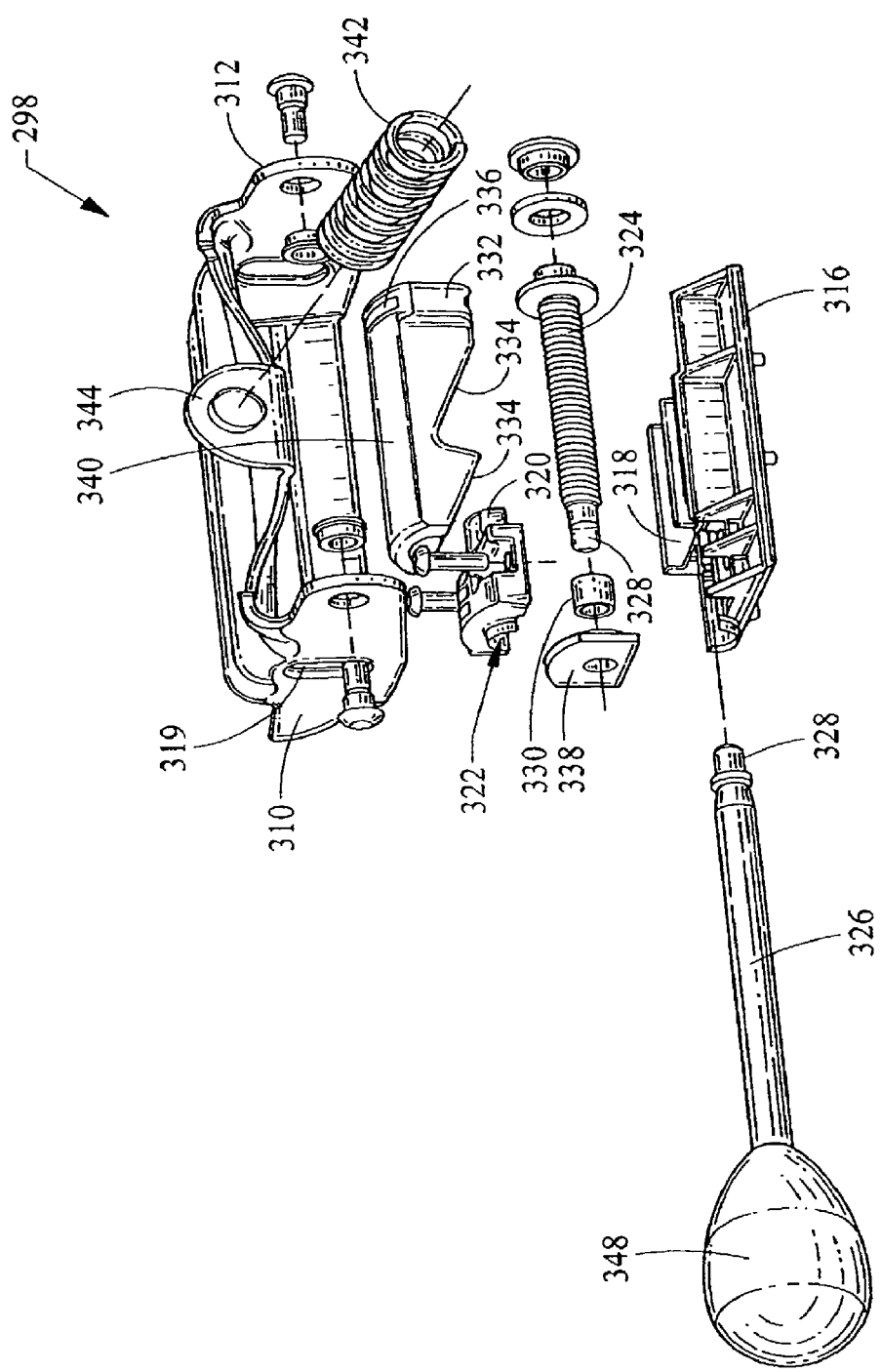
FIG. 27 is an exploded view of a back angle adjuster.
Figure 28:
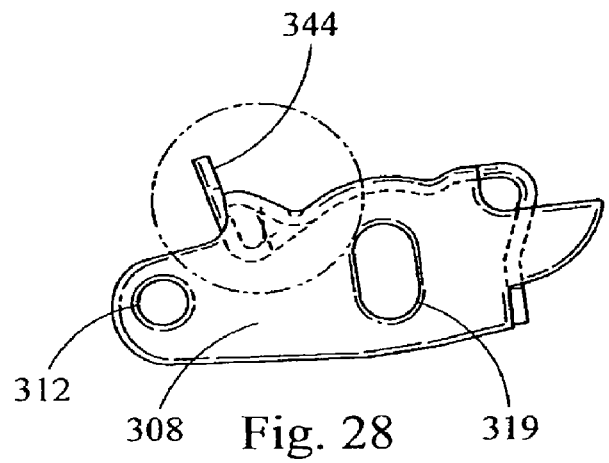
FIG. 28 is a side view of a back support member bracket.
Figure 29:
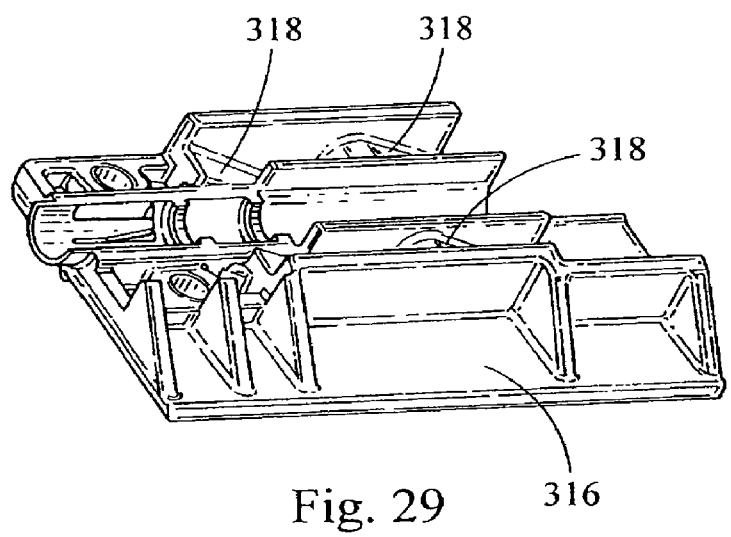
FIG. 29 is a perspective view of a lower wedge component.
Figure 30:
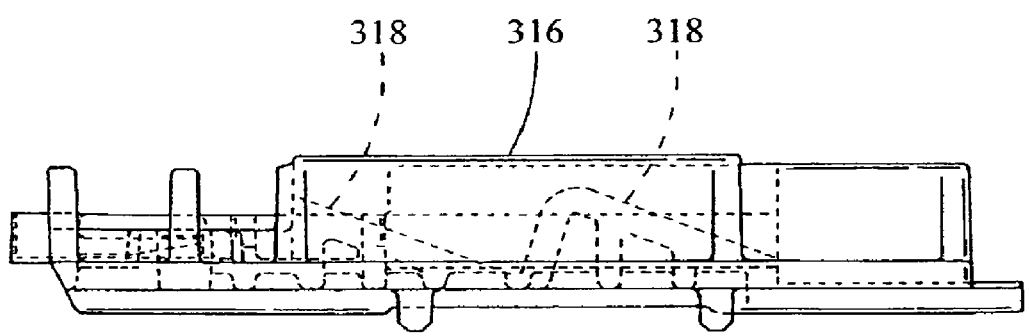
FIG. 30 is a side view of the lower wedge component shown in FIG. 29.
Figure 31:
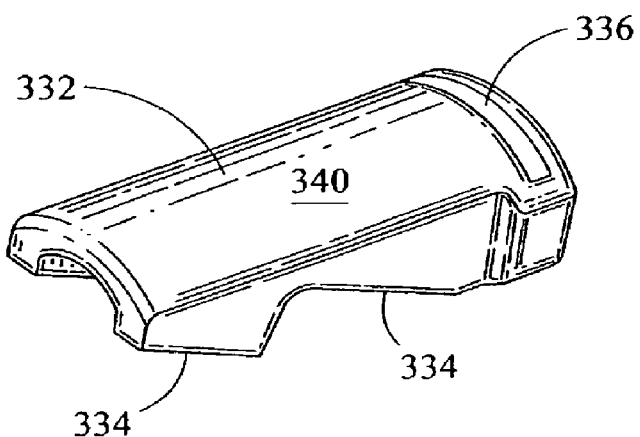
FIG. 31 is a perspective view of an upper wedge component.
Figure 32:
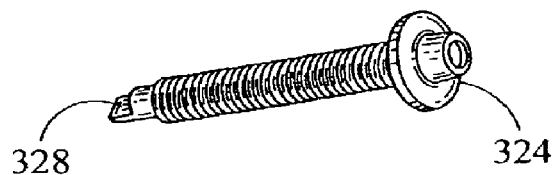
FIG. 32 is a perspective view of a first portion of a wedge actuator.
Figure 33:
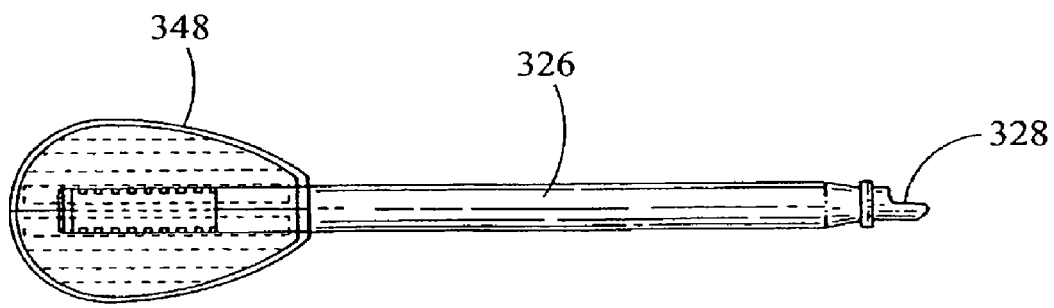
FIG. 33 is a side view of a second portion of a wedge actuator.

In operation, the user rotates the actuator 326, and in particular a grippable portion 348 thereof, in a first or second rotational direction, which causes the shaft 326 to rotate and thereby moves the drive member 338 and associated upper wedge member 332 laterally. As shown in FIGS. 21-23 (and 50, 49 and 48), the upper back support 294 is positioned respectively in a forward, neutral, upright position, a nominal, neutral, upright position and a rearward, neutral, upright position relative to the lower back support 172. In particular, the gap between the back support 294 and the bottom of the seat frame or bracket 168 widens as the back support is pivoted rearwardly to the desired upright position (forward, nominal or rearward), with the angle between the body facing surface 98 of the seat and the body facing surface 340 of the back being adjustable. As the wedge surfaces 318, 334 slide past each other, the upper back support 294 is pivoted relative to the lower back member 172 to a desired setting. Preferably, the actuator 326, configured with the grippable member 348, extends laterally outwardly adjacent a side portion of the seat, or rearwardly thereof, and in particular adjacent or rearwardly of a rear side portion of the seat, such that it is readily accessible to a user seated in the chair. In this way, the initial upright setting of the backrest can be adjusted to accommodate different users with different back and spinal postures/curvatures. This adjustment of the initial angle of the backrest is independent of any of the kinematic/dynamic movements of the backrest relative to the seat, but rather is a static fit adjustment. As such, the forward, nominal or rearward adjustment is then held throughout the tilt range of the chair, for example from the upright position through the intermediate tilt position to the full tilt position.

Figure 3D:
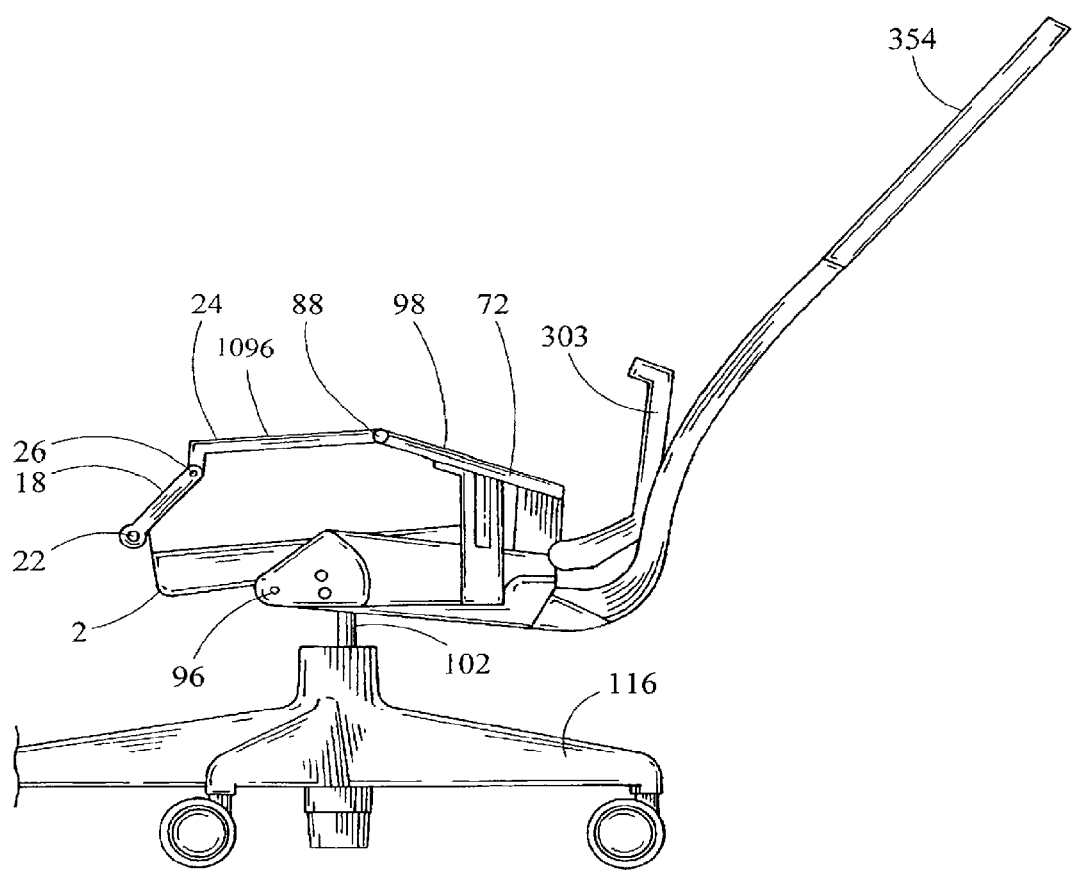
FIG. 3D is a schematic side view of the linkage assembly for the chair shown in FIG. 2 when in a fully reclined position with the upper back support member in an extended position.
Figure 4A:
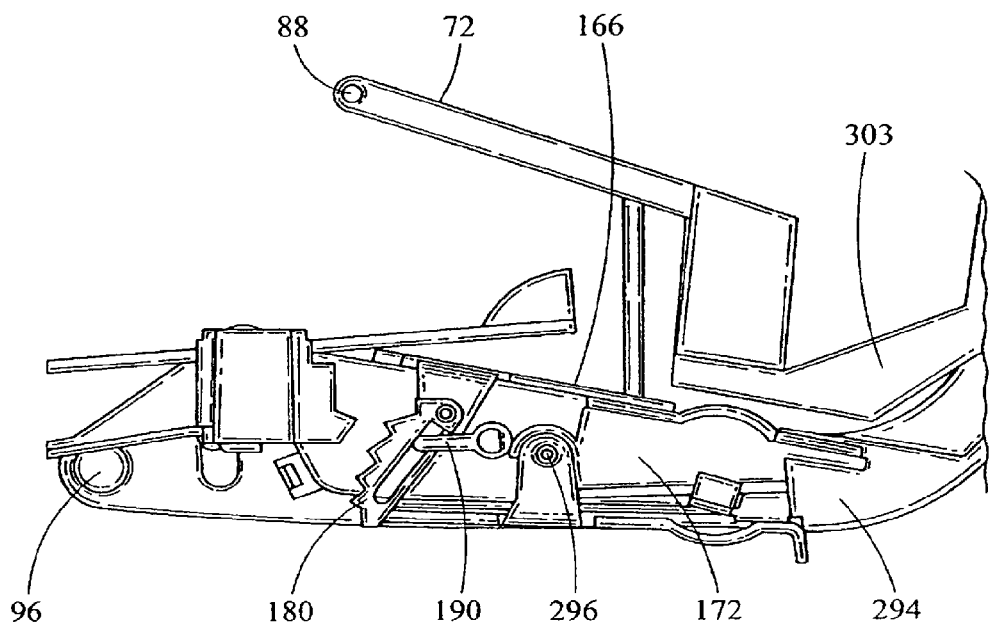
FIG. 4A is an enlarged, partial side view of the back support member in a neutral position.
Figure 4B:
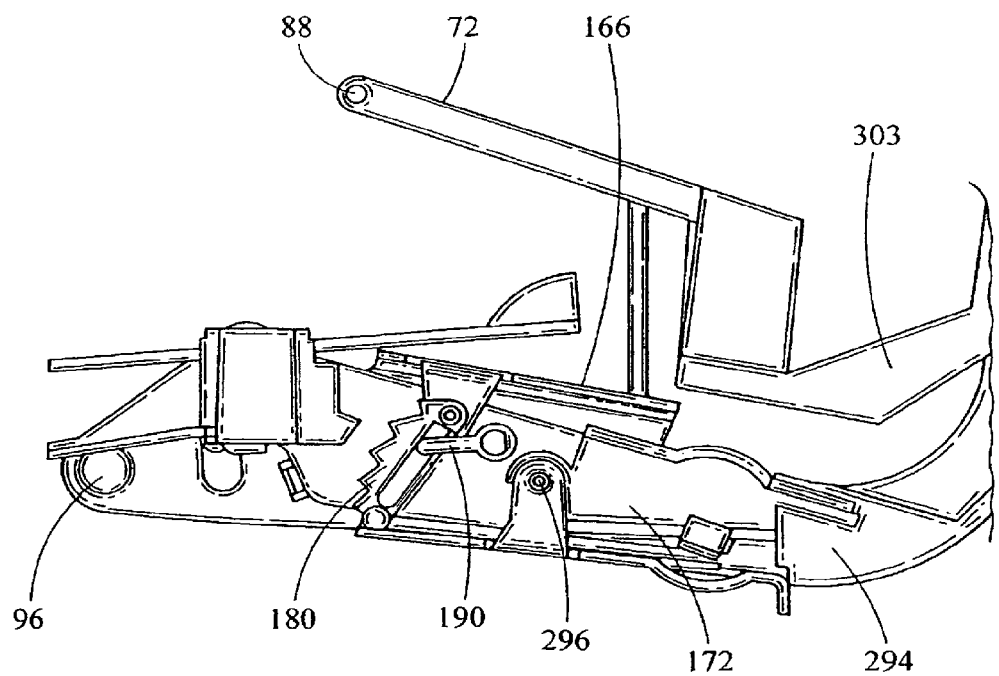
FIG. 4B is an enlarged, partial side view of the back support member in an extended position.
Figure 15:
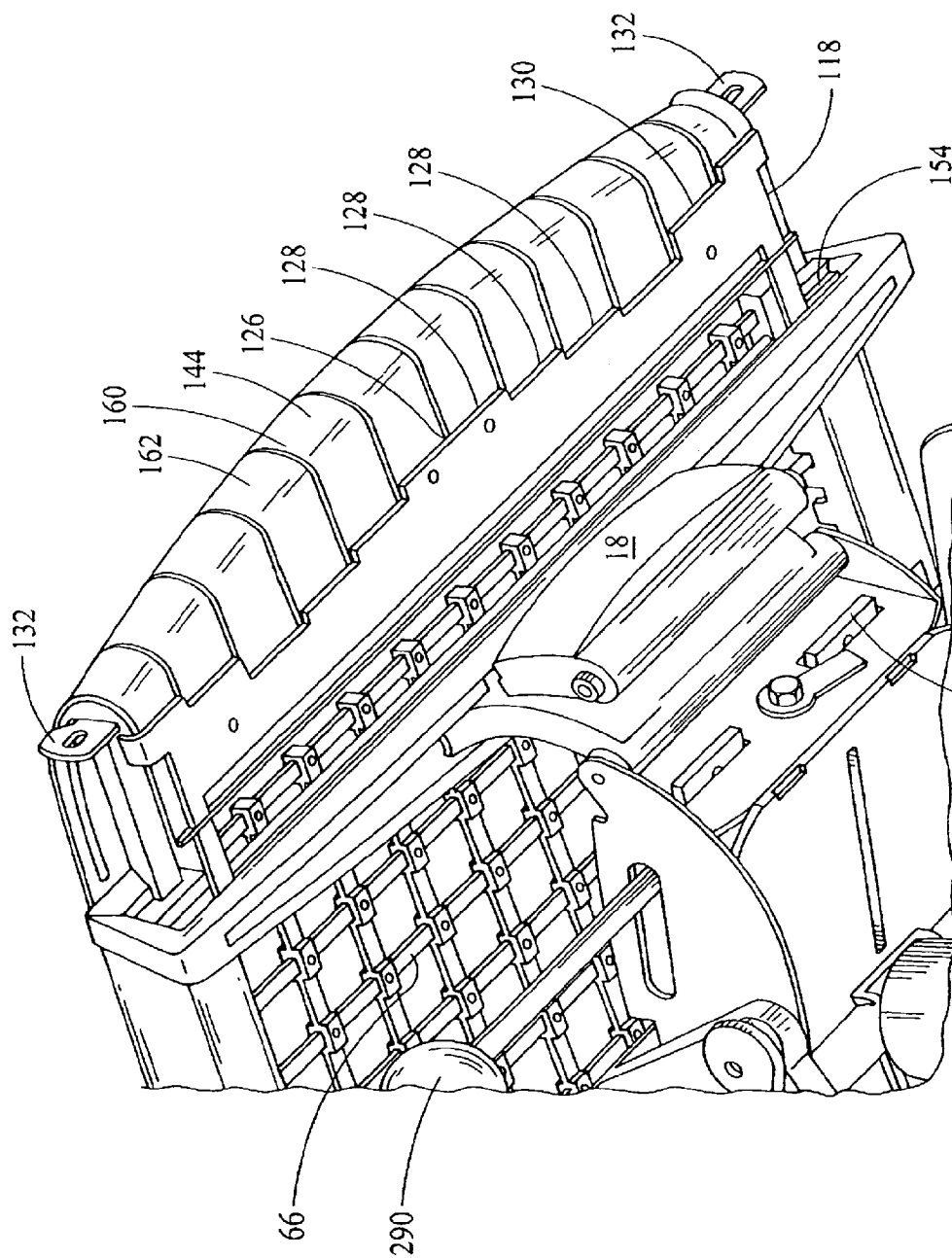
FIG. 15 is a bottom partial perspective view of the seat.
Figure 16:
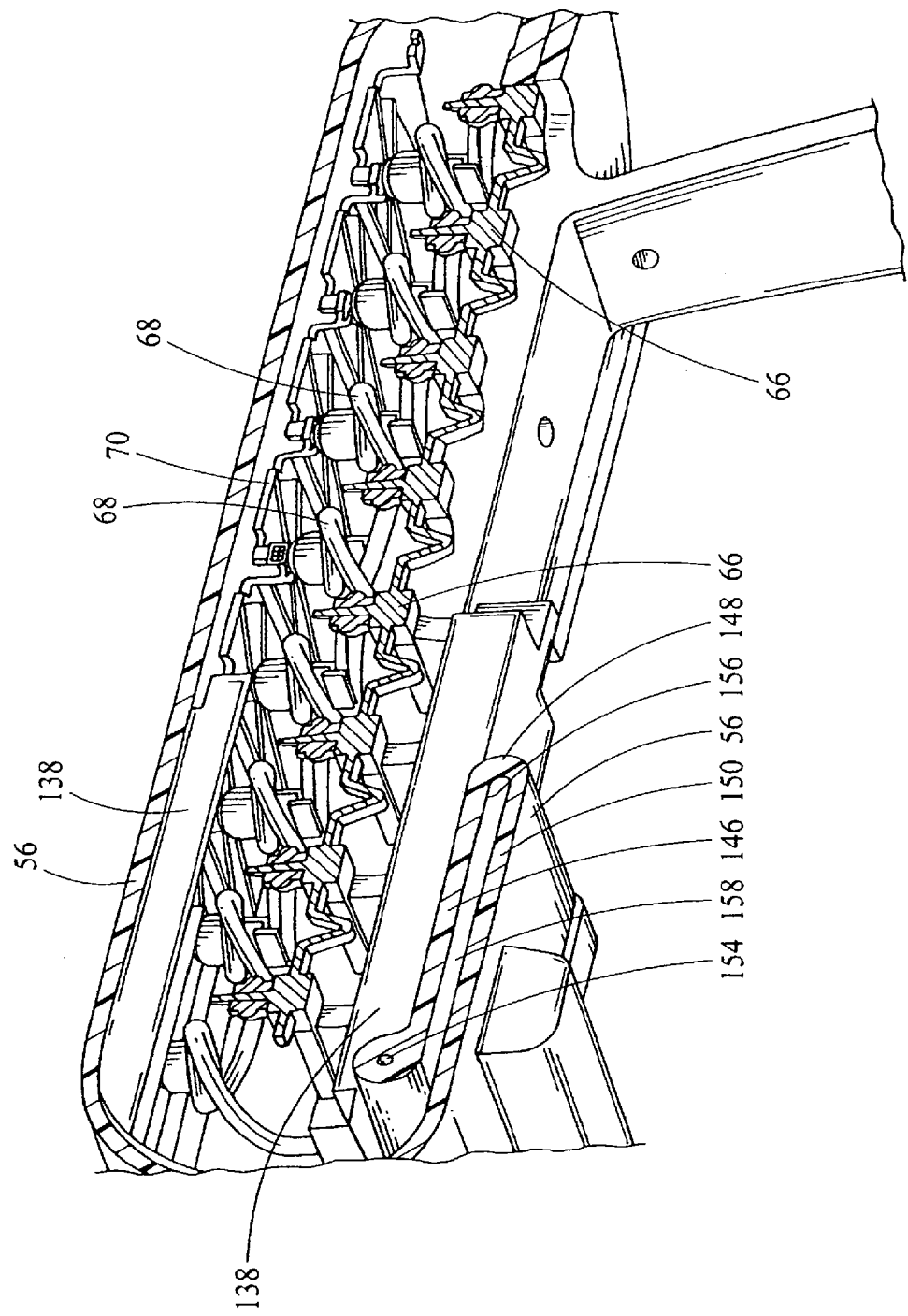
FIG. 16 is a side cut-away view of the seat.
Figure 54:
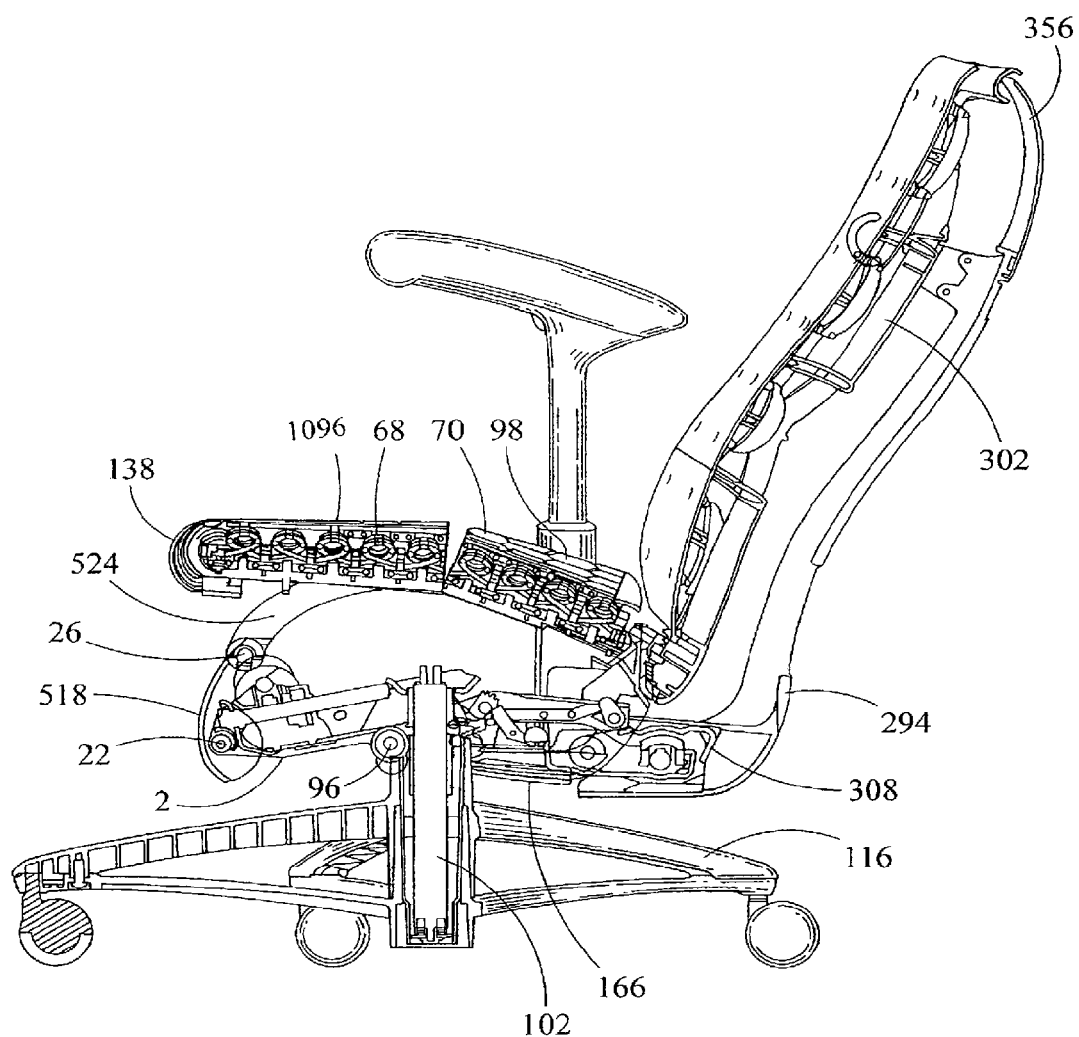
FIG. 54 is a side view of the chair without the fabric cover in a nominal, full recline position, with the upper portion in an extended position.

In addition, the backrest is provided with a mechanism that allows an upper portion 354 of the back to pivot or flex relative to a lower portion 304 of the back between a neutral position and an extended position, as shown in FIGS. 3D, 15 and 54.

The ability of the upper portion to pivot relative to the lower portion is independent of the tilt position of the back. The upper portion 354 is pivotable relative to the lower portion when the tilting of the lower portion is limited or restrained, for example when the pivotable movement of the seat frame 72 or bracket 166, which is fixedly attached to the lower portion 304, is limited. In some instances, the upper portion may be pivotable or flexed to an extended position even when the seat frame or bracket is not restrained, for example when the position or weight of the user balances the seat such that it does not pivot rearwardly against the biasing the force of the springs.

Figure 19:
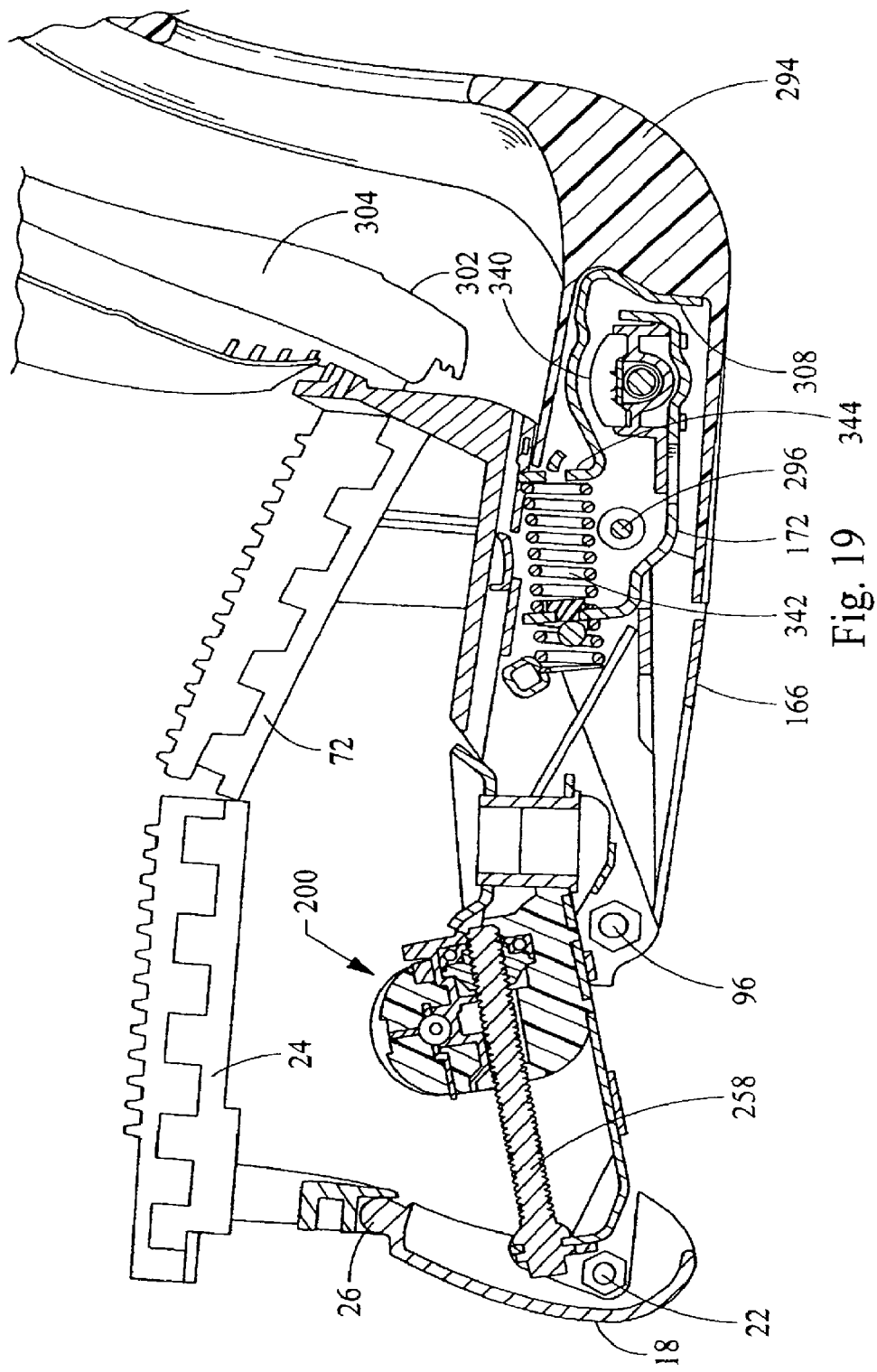
FIG. 19 is a side cut-away view of the seat, tilt control mechanism and back support member in a reclined position, with the back support member in a neutral position.
Figure 20:
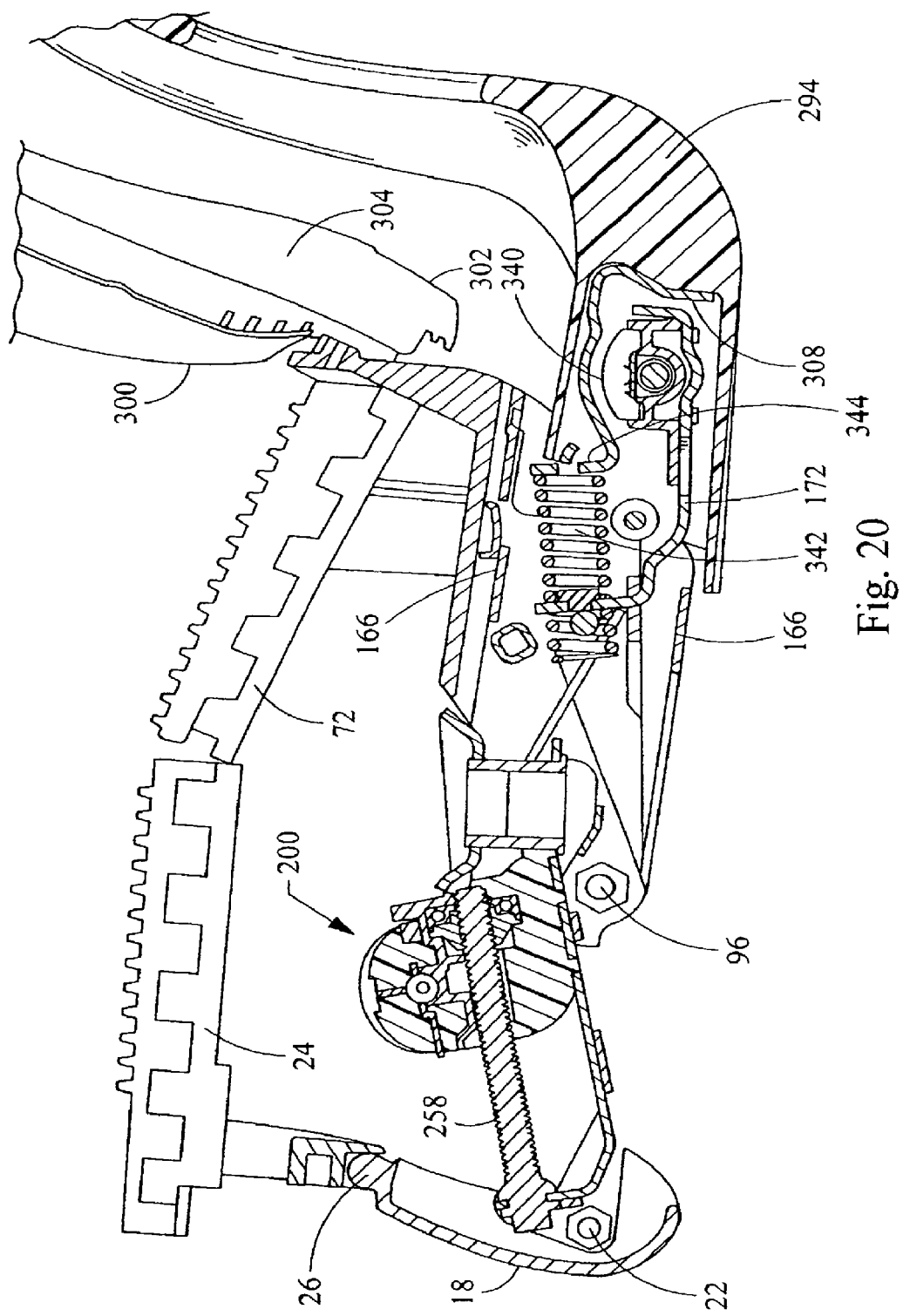
FIG. 20 is a side cut-away view of the seat, tilt control mechanism and back support member in a reclined position, with the back support member in an extended position.

As explained above, the rear tilting of the seat bracket 166 is limited by the position of the tilt limiter 180 or stop member 178 relative to the tilt control housing 2. For example, as shown in FIGS. 18 and 19, the seat is tilted rearwardly from an upright position to a reclined position, wherein the tilt limiter 180, or the engagement of the stop member 178 in the top of the slot 170, prevents further recline of the seat. At this juncture, the use can arch their back, or stretch rearwardly so as to move or pivot the upper portion 354 of the back and upper back support 294 rearwardly relative to the lower portion of the back frame 302 and the seat bracket 166. As the user biases the upper portion 354, the lower back support 172 pivots away from an engagement with the seat bracket 166 against the force of the springs 202, which act of the lower back support 172 as shown in FIGS. 5 and 20. In this way, a single biasing assembly (the pair of leaf springs) biases the seat and back during normal use of the chair, and biases only the upper portion of the back by way of the bracket 172 and support 294 during the extension use of the chair, with the seat being supported by the tilt limiter 180 or stop member 178. In various embodiments, the upper portion can be pivoted relative to the lower portion, or the upper support relative to the seat bracket, between about 2° and 10°, and desirably about 6°.

In essence, the back has three levels of adjustment/range of motion: (1) tilt range—from upright through intermediate recline to full recline (can be arrested in various positions by a tilt limiter); (2) back angle adjustment—from forward to nominal to rearward (independent of tilt range); and (3) thoracic adjustment—neutral v. extended (independent of tilt range and back angle adjustment). The back preferably has a tilt range of about 4° to 22°, and more desirably about 18°. It should be understood that the back is infinitely adjustable throughout the tilt range and back angle adjustment, and is not limited to the three positions listed for each. For example, the tilt range includes an infinite number of intermediate recline positions, although the seating structure can be arrested in a limited number of such positions as defined by the steps of the tilt limiter. Likewise, the back angle includes an infinite number of nominal positions between the forwardmost and rearwardmost positions. Finally, the user can move the thoracic region through a continuous range of positions from the neutral to extended positions, particularly when the seat is restrained by the stop or tilt limiter.

Referring to FIGS. 24-26, 34, 37, 46 and 48, and as mentioned previously, the upper support member 294 includes a spine 306 extending upwardly along a centerline of the back. A pair of arms 356 extend laterally outwardly and upwardly from the spine. A plurality of teeth or tabs 357 extend from the arms for engagement with a carrier member or other covering. The spine is preferably made of aluminum, steel, fiberglass, composites, plastic, or some other rigid but resilient material. The spine can be made of various materials, such as Capron 8233G—33% Glass Filled Nylon 6.

Figure 62:
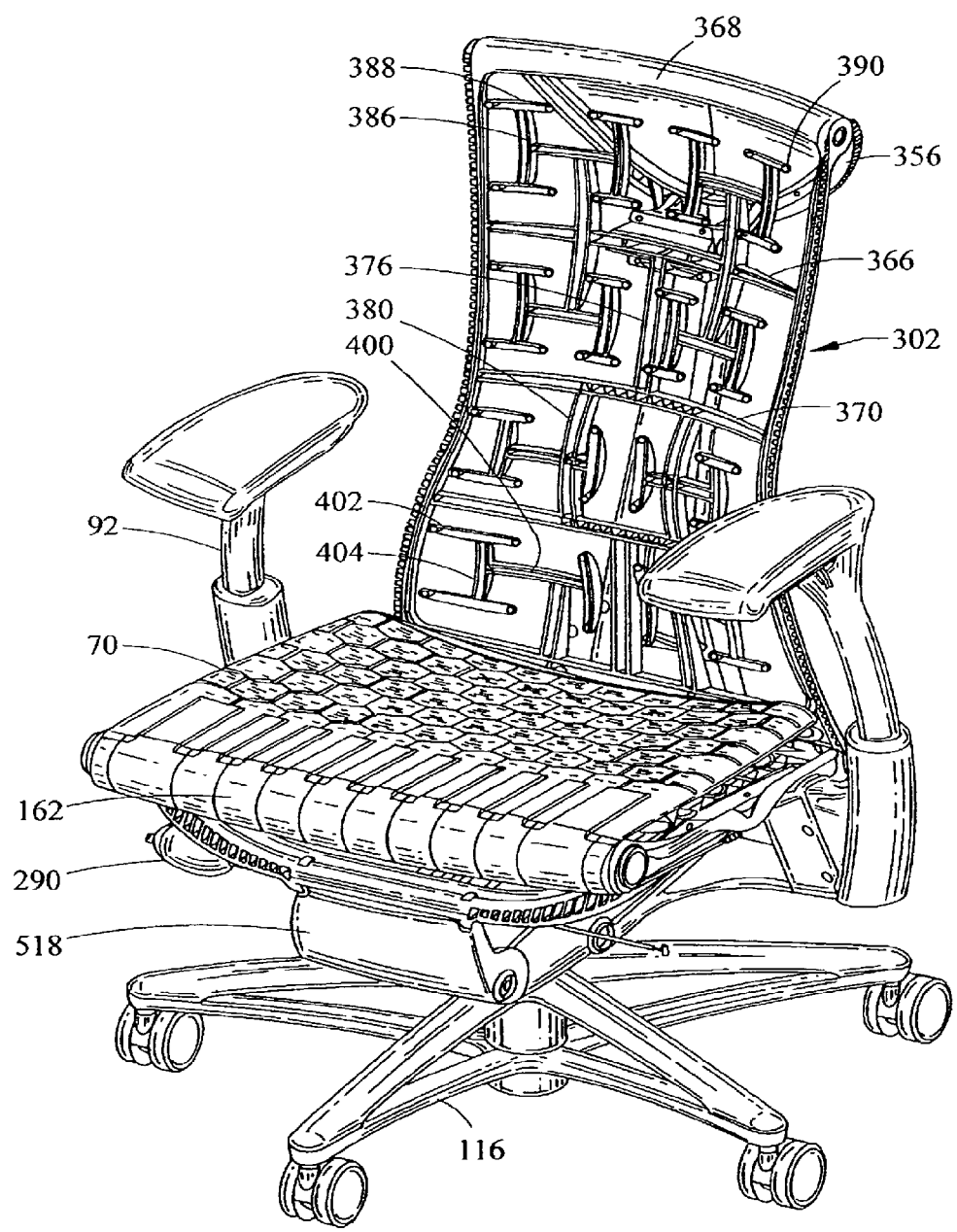
FIG. 62 is a perspective view of the chair without a pad structure or outer cover.
Figure 63:
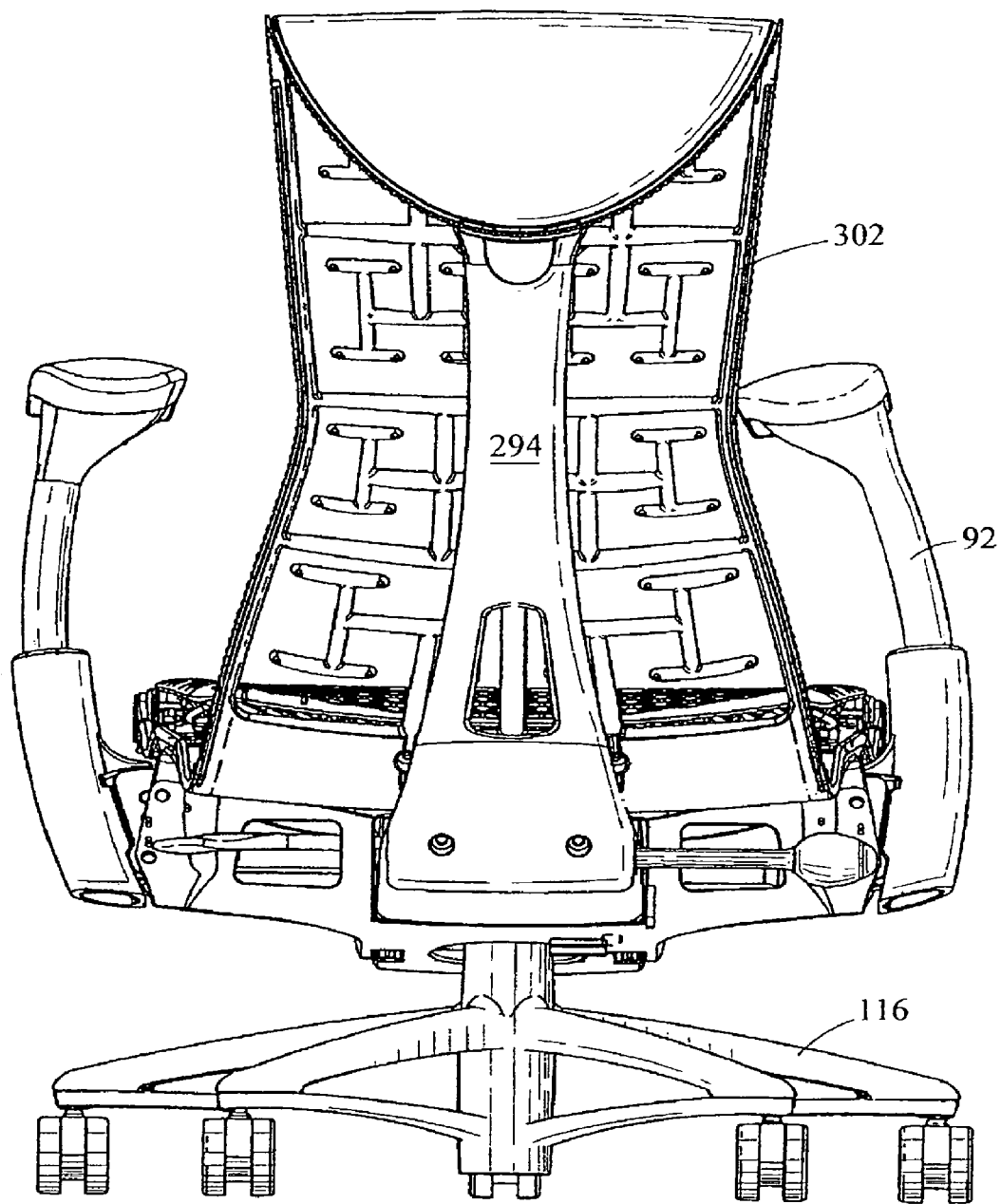
FIG. 63 is a rear view of the chair shown in FIG. 62.
Figure 64:
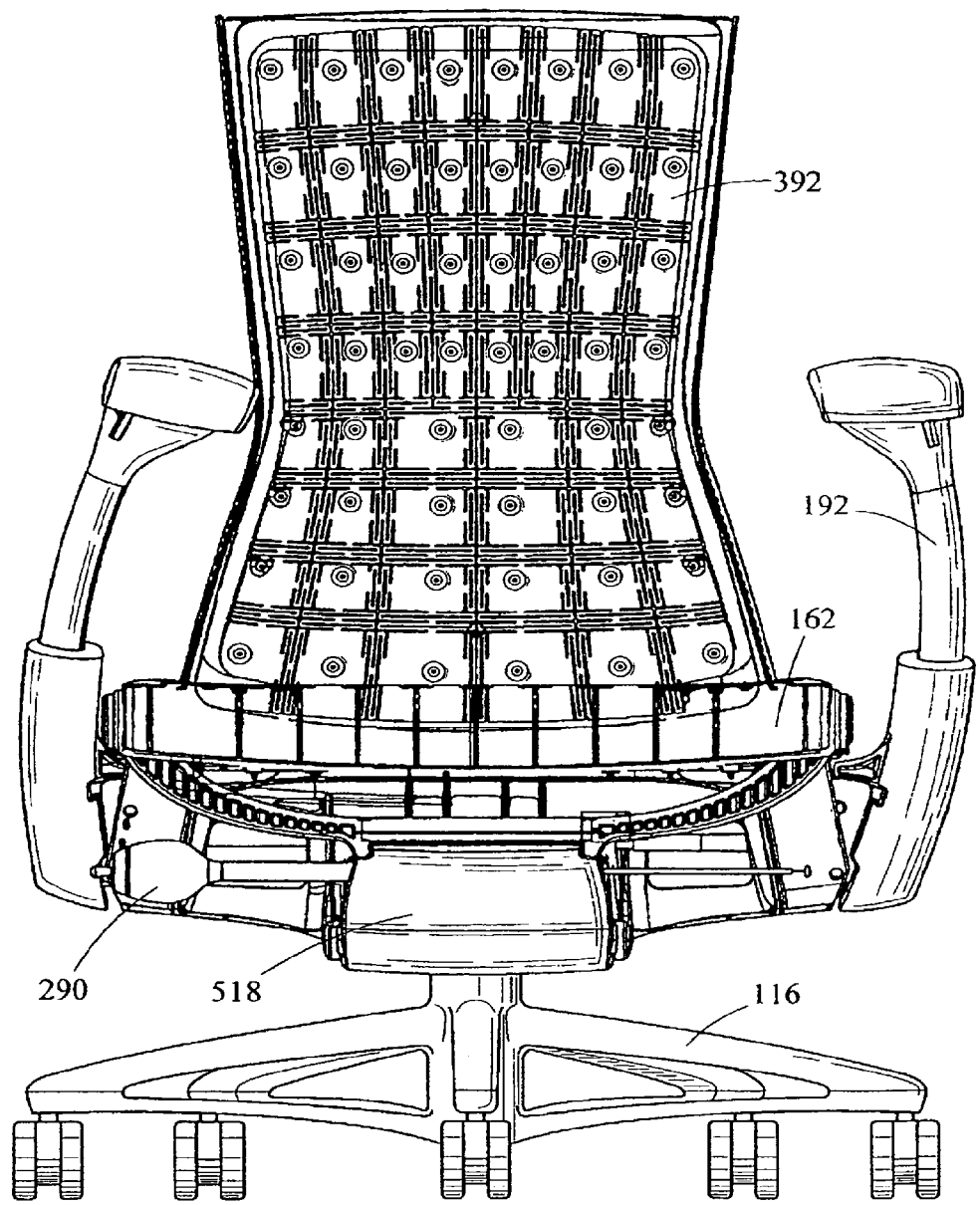
FIG. 64 is a front view of the chair shown in FIG. 62 with the pad structure.
Figure 65:
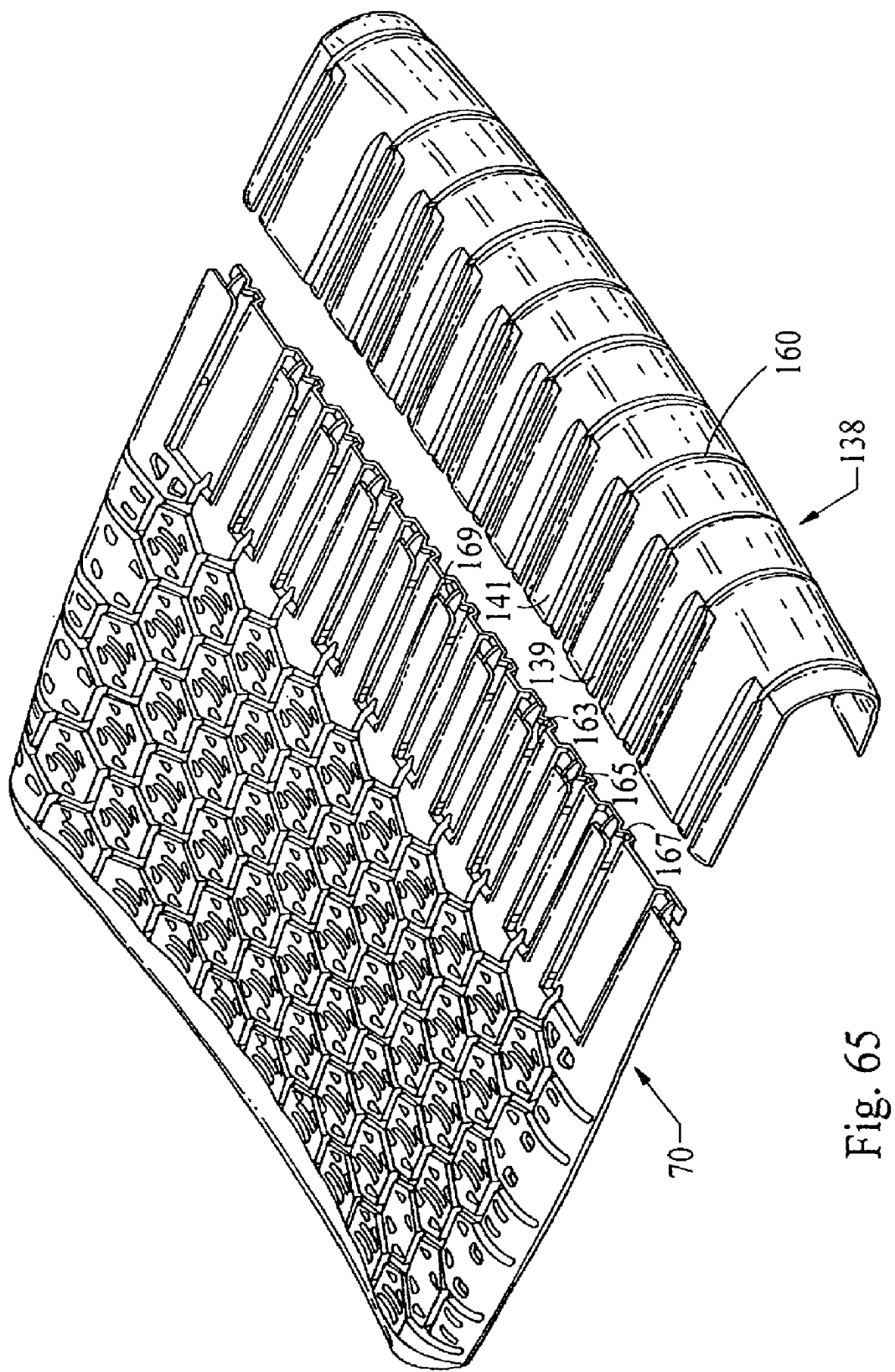
FIG. 65 is an exploded perspective view of a flexible body support member and a load support layer of a suspended pixilated seat structure.
Figure 66:
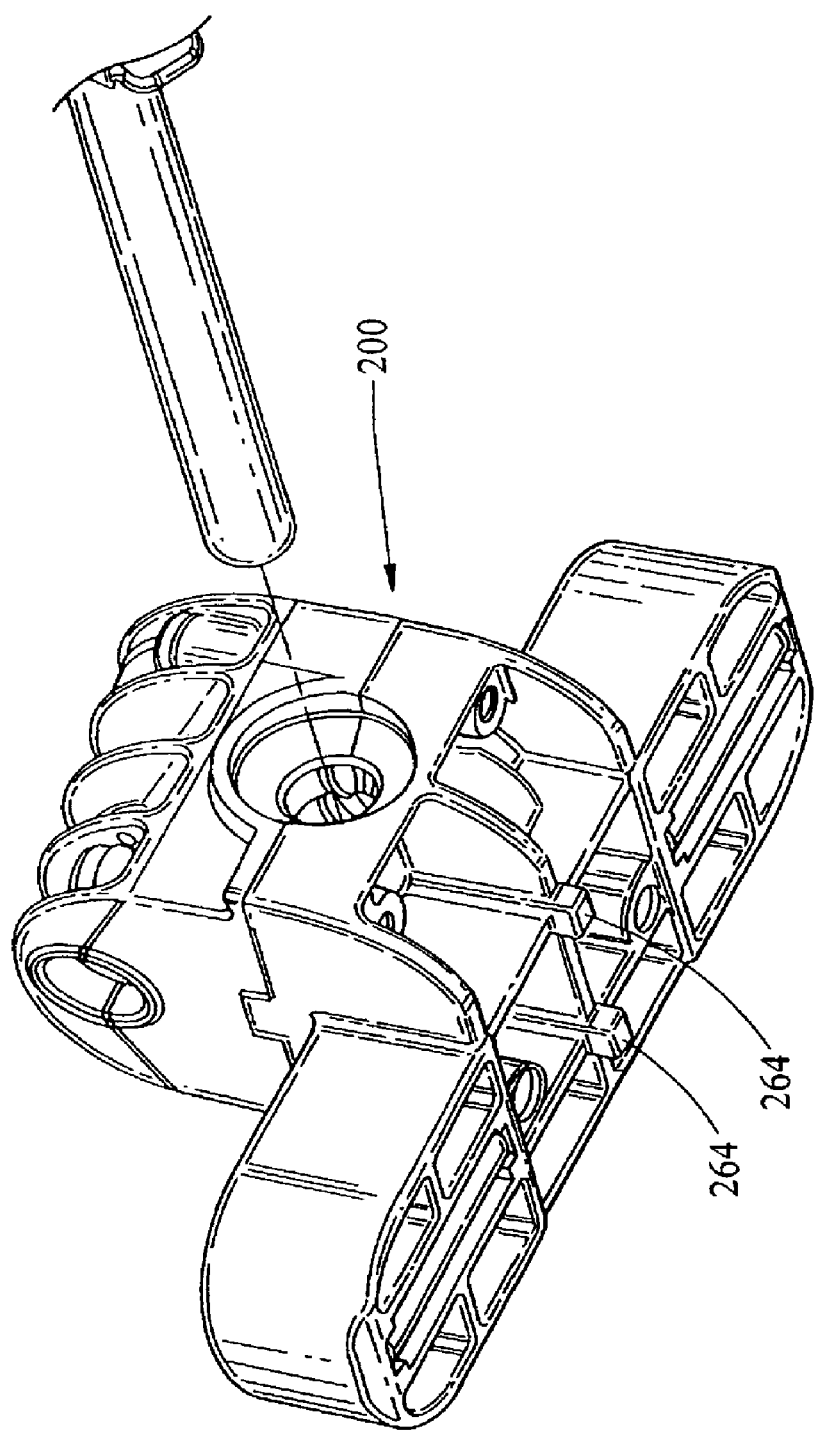
FIG. 66 is a bottom, front perspective view of the fulcrum assembly.
Figure 67:
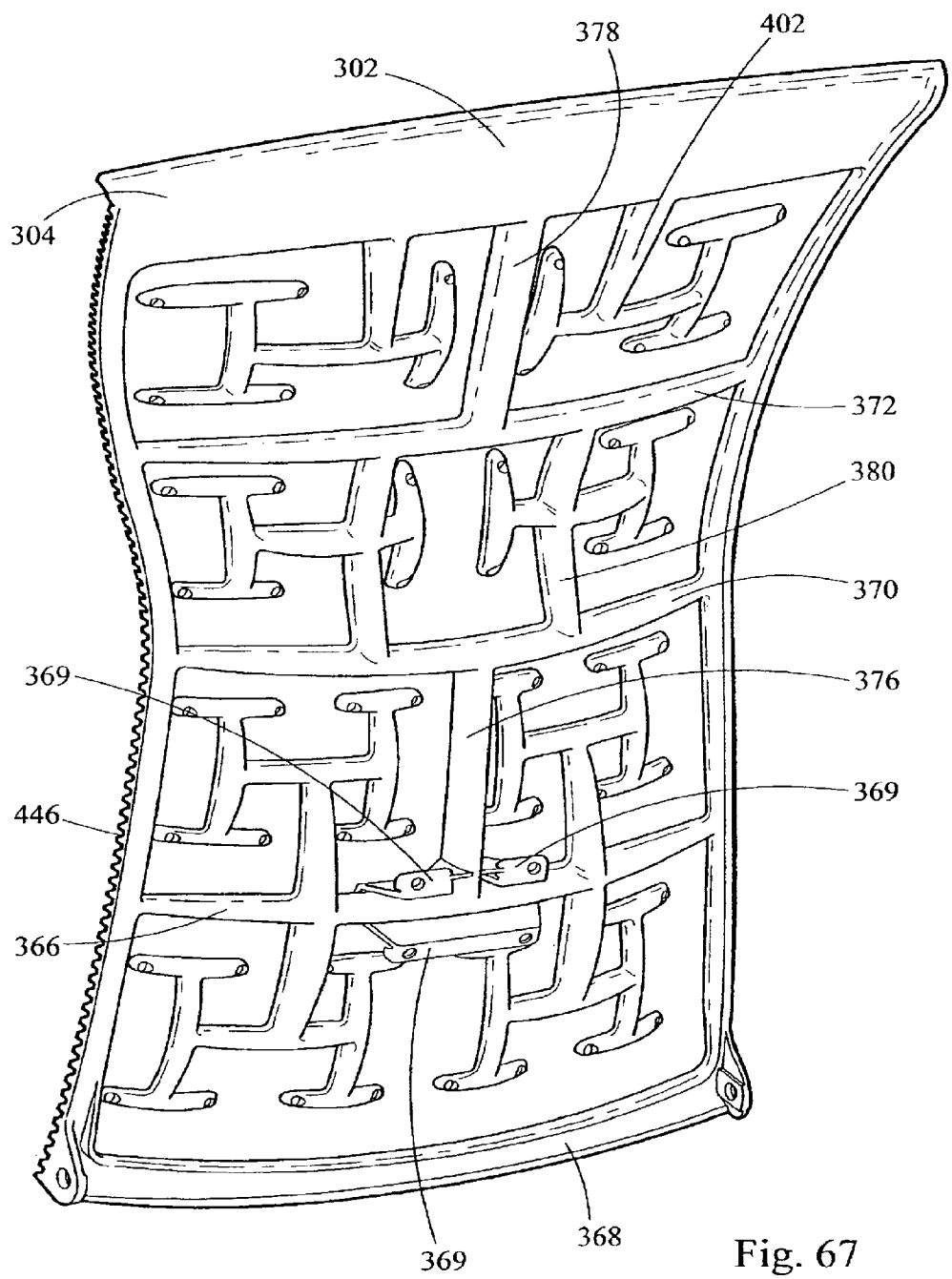
FIG. 67 is a rear perspective view of the back frame.

The ends 358 of the arms are pivotally secured to upper corners 364 of the frame member 302 about a horizontal pivot axis 360. The frame 302 can be made of various plastic, metal or composite materials, including for example and without limitation a nylon material, or a nylon, elastomeric material. An upper thoracic region 362 of the spine is fixedly secured to a first cross member 366 of the frame, for example with screw or other mechanical fasteners, with the first cross member being longitudinally spaced from a top cross member 368 of the frame. As shown in FIGS. 34, 39 and 46-48, the thoracic region 362 is configured with four lugs or flanges 363 that are secured to the cross member 366 with a connector member 365. In one embodiment, as shown in FIGS. 62 and 67, a pair of flanges extend rearwardly from the cross member 366. The flanges formed a generally U or V shape in cross section. The connector 365 can be formed integrally or separately from one or both of the spine 294 and frame 302. Likewise, the thoracic region can be directly secured to the cross member 366 or other component of the frame 302. Second and third cross members 370, 372 are further longitudinally (vertically) spaced between the first cross member and a bottom portion 304 or cross member, which is fixedly secured to the seat frame, as explained previously. The first and second cross members 366, 370, and the third and bottom cross members 372, 374 are each connected with a centrally located connector member 376, 378. Likewise, the second and third cross members 370, 372 are connected with a pair of laterally spaced connector members 380 spaced sideways from the centerline of the back frame.

Figure 96:
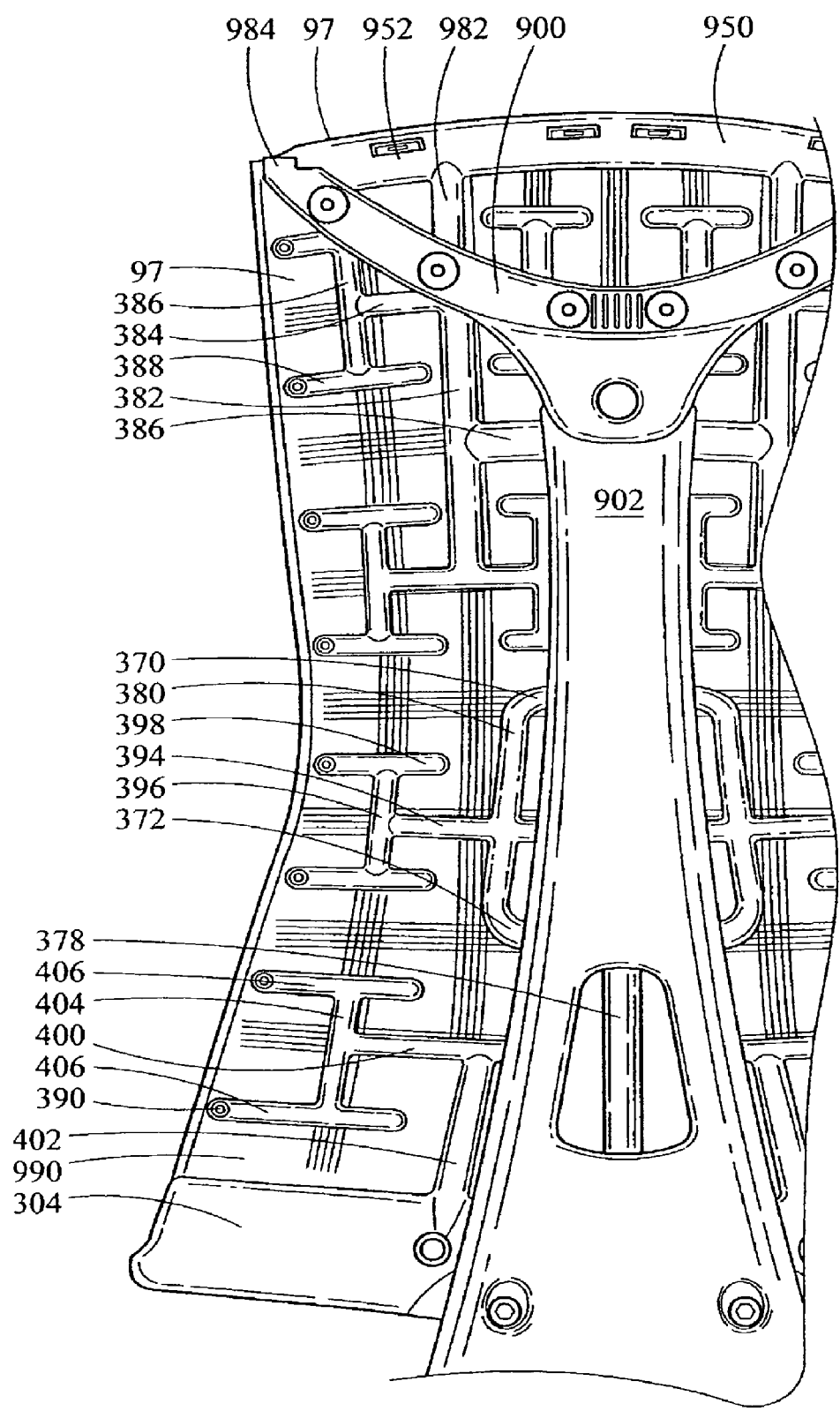
FIG. 96 is a rear perspective view of one embodiment of a backrest structure.

A number of whiffle structures, or levers rotatable about an intermediate fulcrum, are coupled to the frame, or are integrally formed as shown in FIG. 96 as part of the frame without side frame members or portions of cross members extending to the side frame members. For example, a first series of longitudinal levers 382 extends (vertically) from the first cross member in the thoracic region, with the first cross member 366 providing some torsional resistance as the levers rotate in opposite first and second directions about an axis defined by the first cross member. A second series of levers 384 extends laterally from each end of each of the first series of levers, with the first series of levers each providing torsional resistance as the each of the second series of levers rotates in opposite first and second directions. A third series of levers 386 extends laterally from each end of the second series of levers 384, again with the second series of levers providing torsional resistance as each of the third series of levers rotates. Finally, a fourth series of levers 388 extends laterally from each end of each of the third series of levers with the same torsional relationship. Each end 390 of each of the fourth series of levers is configured as a node, with an attachment location configured to be connected to an individual pad. A plurality of the pads are connected to form a unitary pad structure, shown in FIG. 35.

Figure 34:
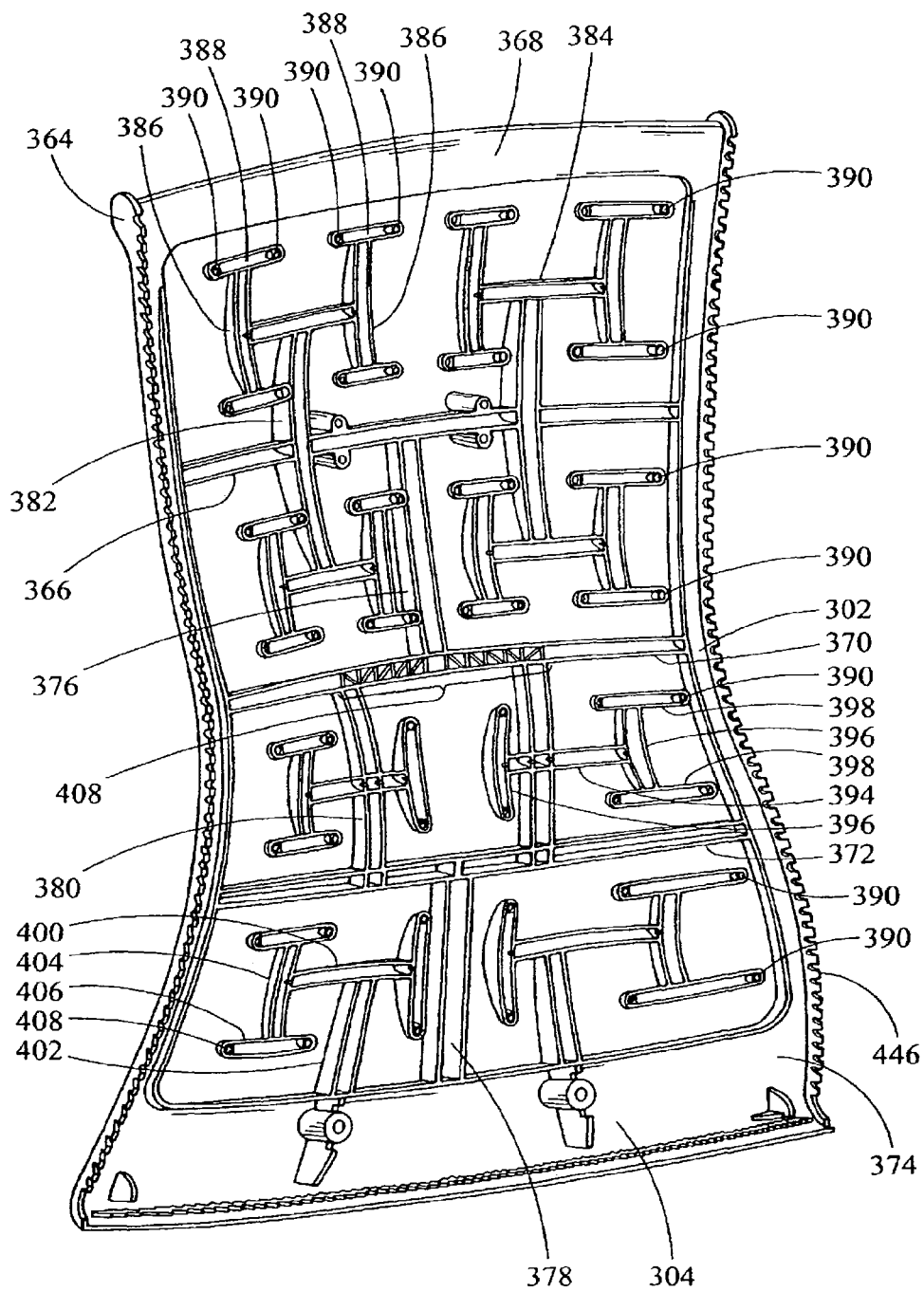
FIG. 34 is a front perspective view of a back suspension structure.

Referring to FIG. 34, a first series of levers 394 extends laterally from the central connecting members 380, with an outer leg being longer than an inner leg of each of the first series of levers. A second series of levers 396 is secured to each end of each of the first series of levers, while a third series of levers 398 is secured only to the ends of the outer second series of levers 396. The inner second series and the third series of levers are each configured with a node 390 at the end of the lever.

Finally, a first series of levers 400 extends laterally from a pair of relatively rigid arms 402 extending longitudinally upwardly from the bottom cross member 304, with an outer leg being longer than an inner leg of each of the first series of levers. A second series of levers 404 is secured to each end of each of the first series of levers, while a third series of levers 406 is secured only to the ends of the outer second series of levers. The inner second series and the third series of levers are each configured with a node 390 at the end of the lever.

Of course, it should be understood that various configurations of levers, with varying numbers of series, can be used to support the back of the user. The preferred embodiment shown in FIG. 34 provides various advantages.

Figure 89:
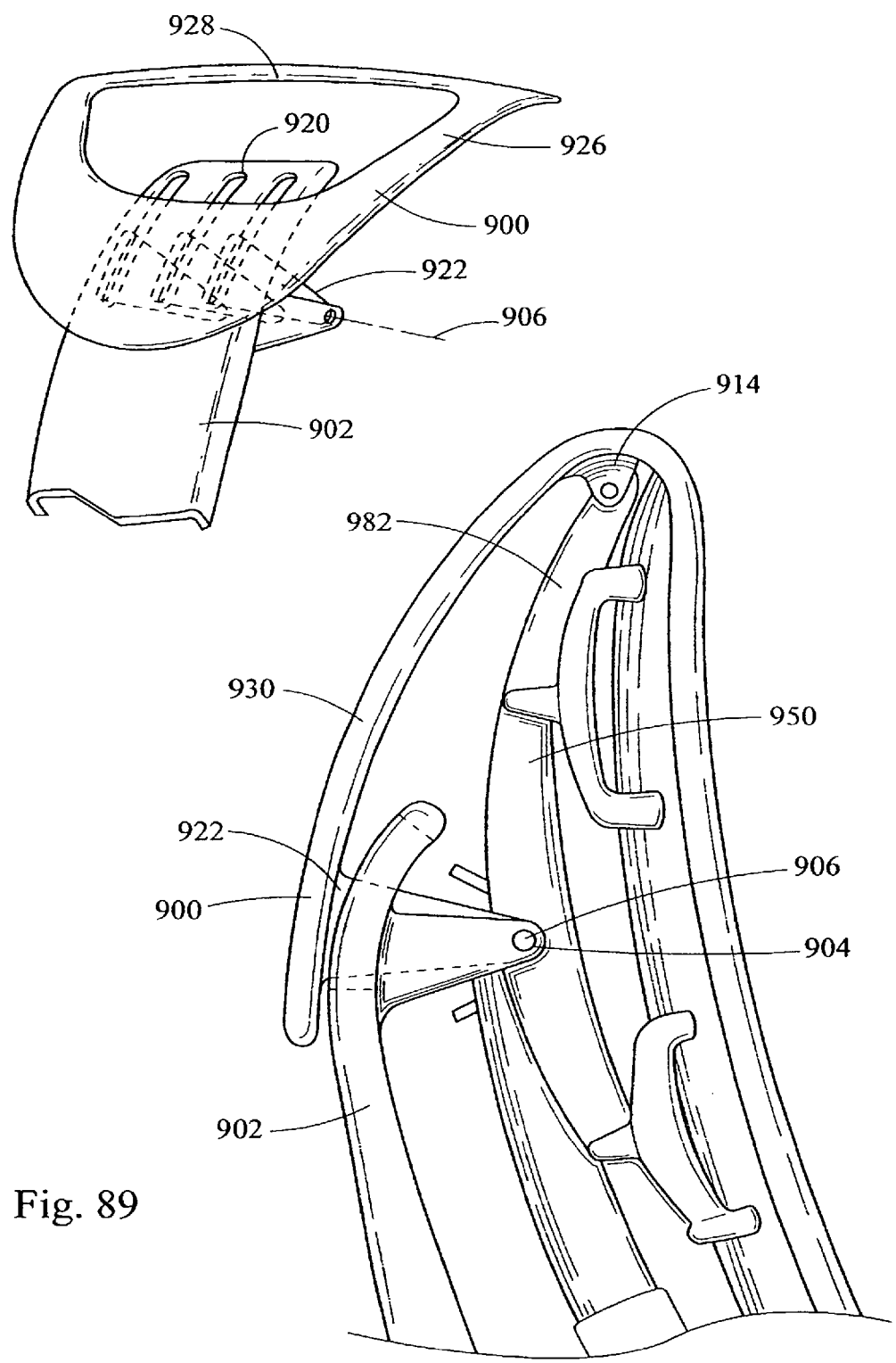
FIG. 89 is a side view of one embodiment of an upper backrest assembly.
Figure 90:
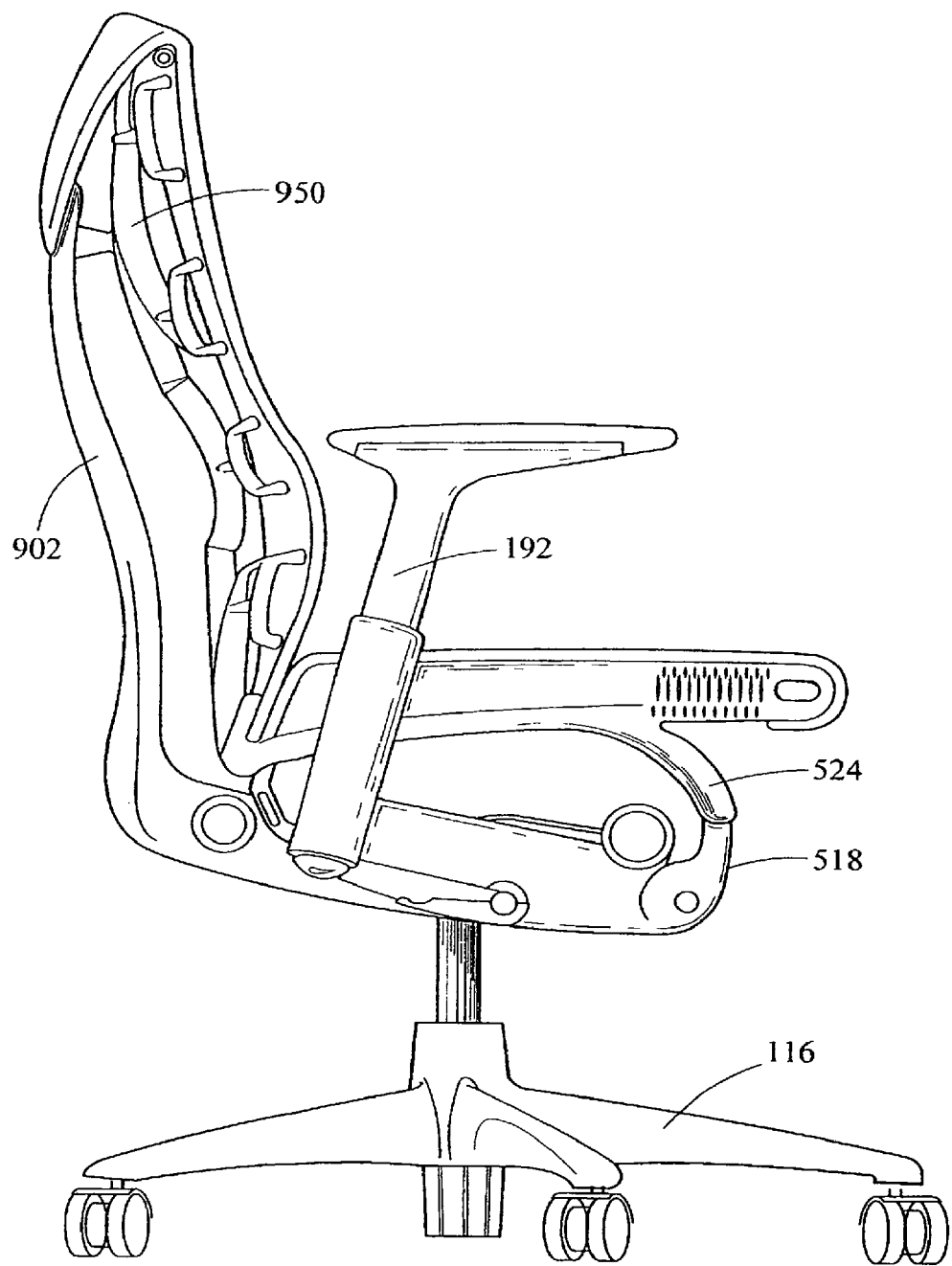
FIG. 90 is a side view of one embodiment of the chair.
Figure 91:
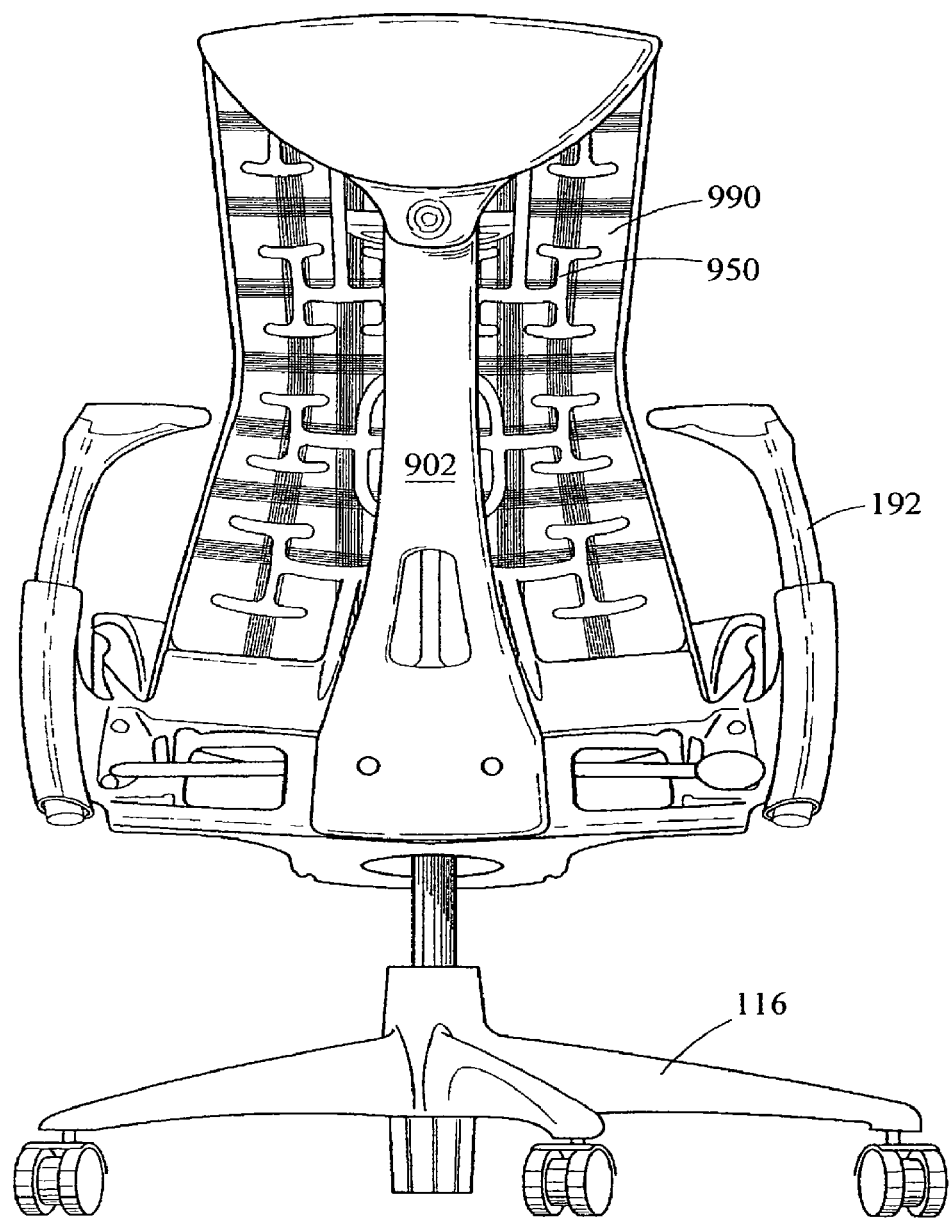
FIG. 91 is a back review of the chair shown in FIG. 90.
Figure 92:
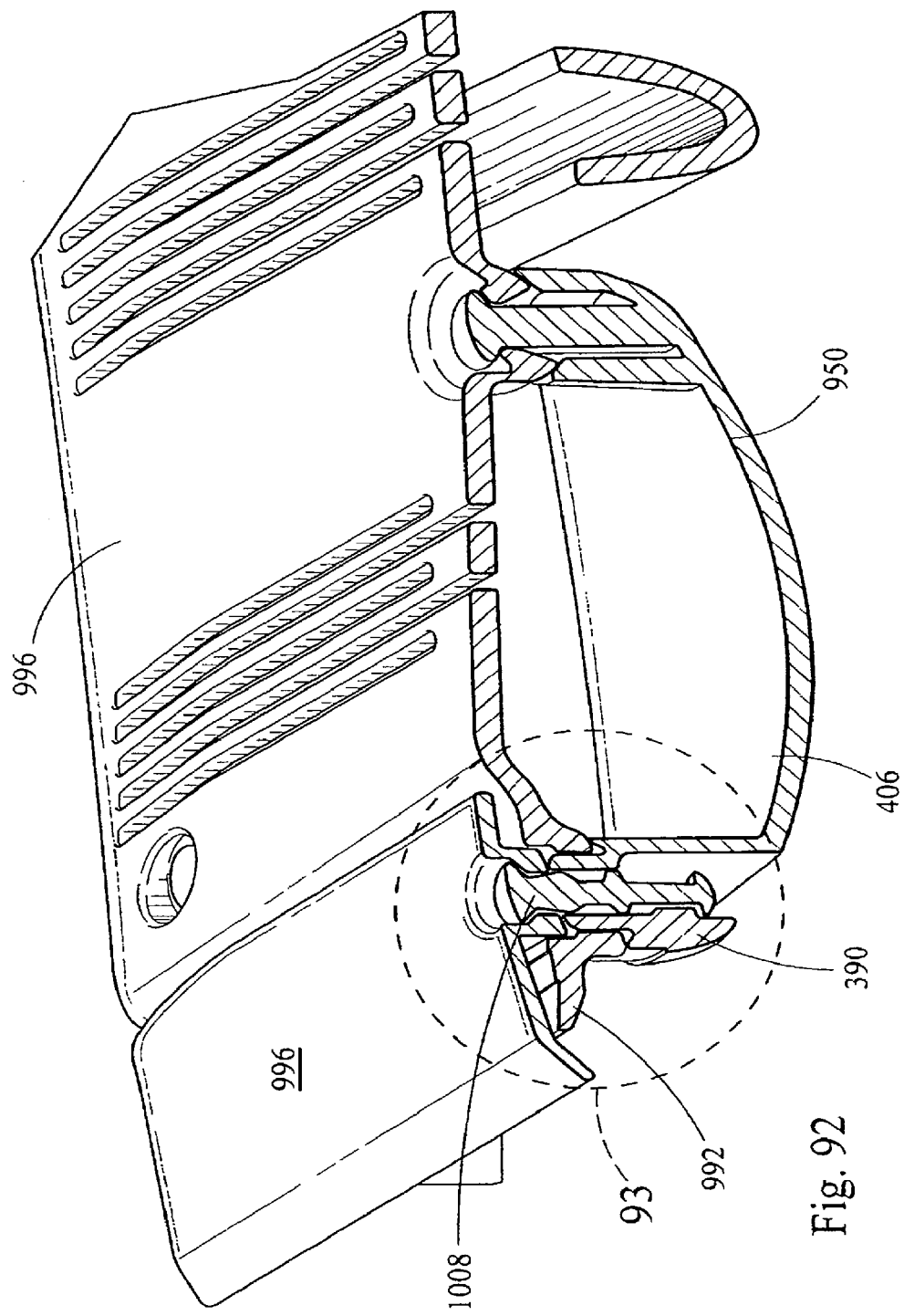
FIG. 92 is a partial cut away view of a portion of a backrest assembly.
Figure 93:
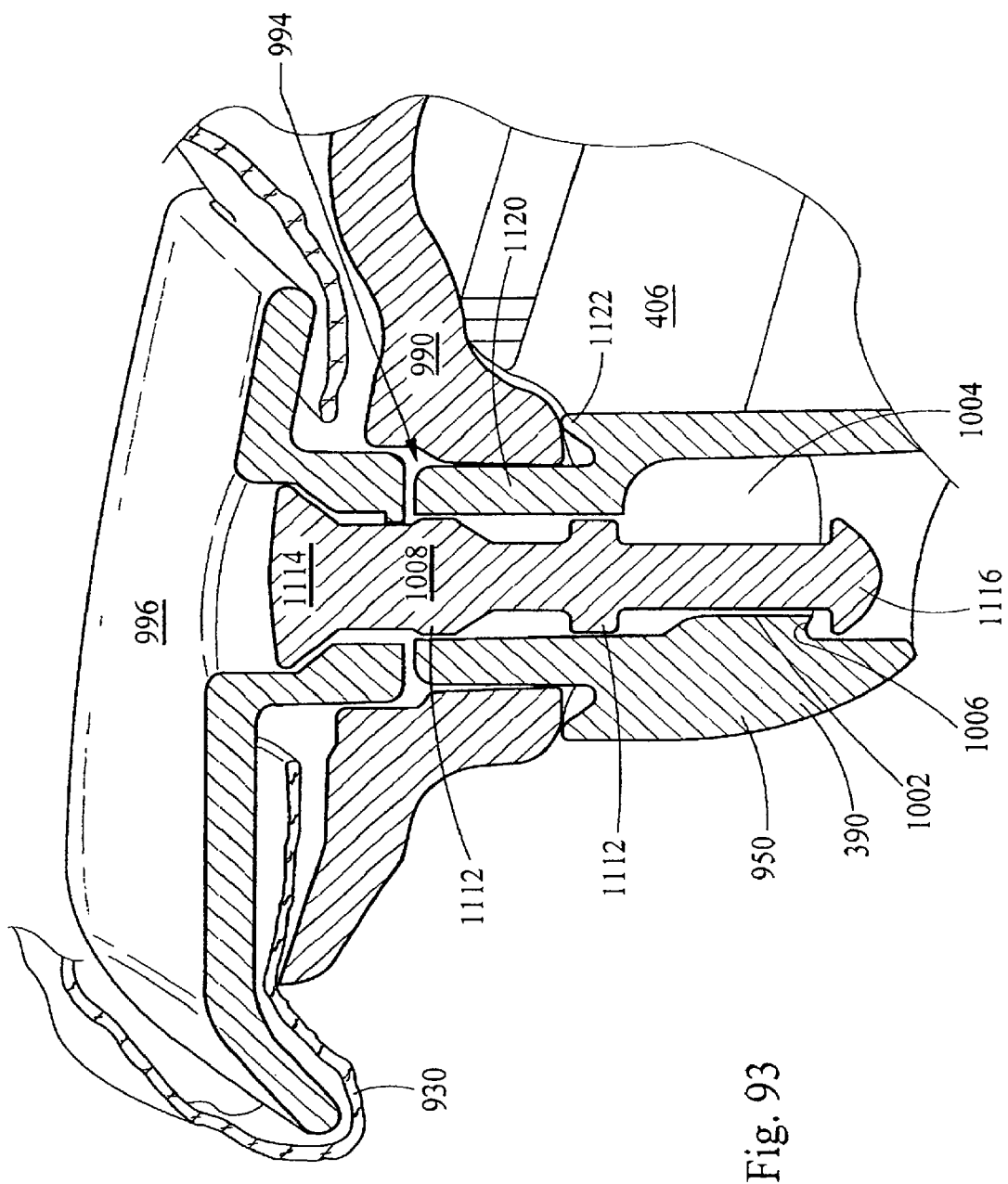
FIG. 93 is an enlarged portion of FIG. 92 taken along line 92.
Figure 97:
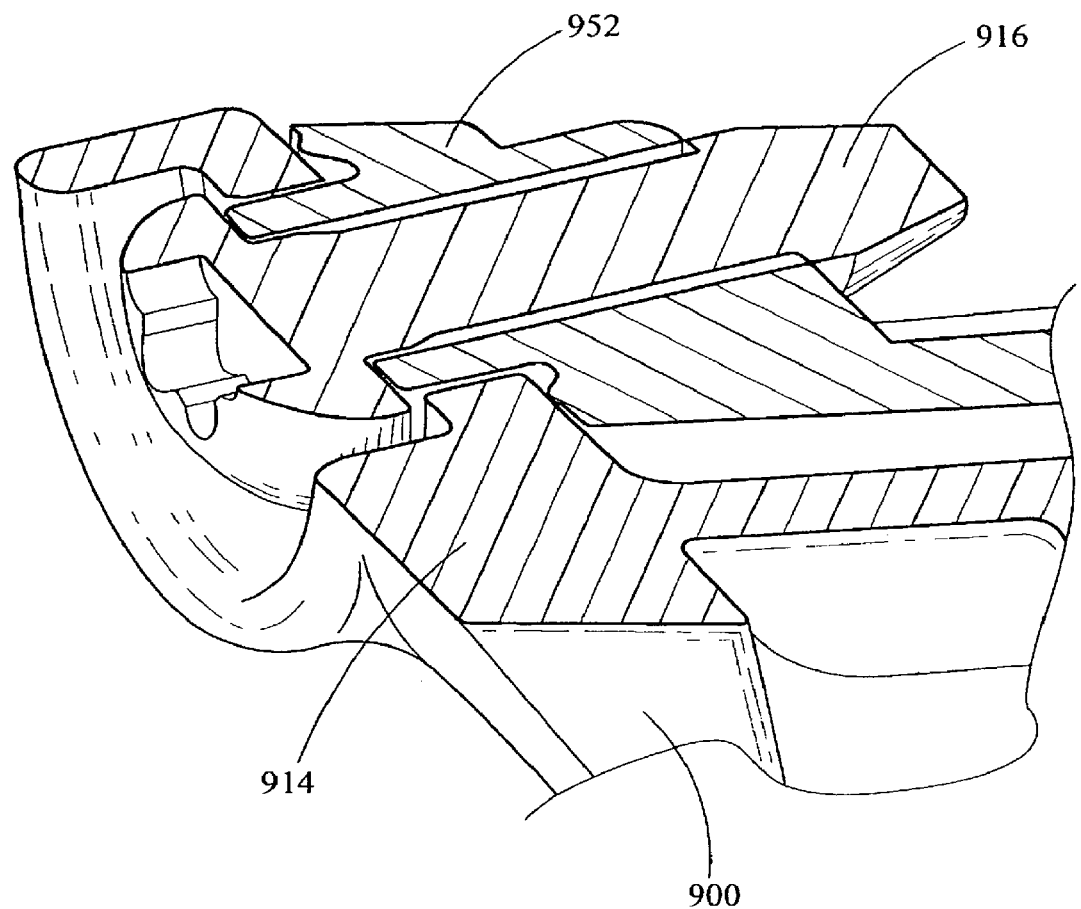
FIG. 97 is an enlarged view of the backrest structure shown in FIG. 96 and taken along line 97.

For example, in one alternative embodiment shown in FIGS. 87-91, 96 and 97, portions of the cross-members and side frame members are omitted. In this embodiment, the arms 900 are formed as a separate antler structure, which is pivotally coupled to the spine 902 with a shaft or axle 904 about a pivot axis 906. A pair of bushings 908, 910 supports the shaft in each of the spine and antler structure. The ends of the shaft 904 are captured in a cap member 912, which is coupled to the lever frame 950 structure, for example with a pair of screws. Of course, it should be understood that the shaft 904 could be coupled to any of the three members (spine 902, antlers 900 or lever frame structure 950), and rotatable relative to the others thereof. In addition, the shaft can be secured to lugs formed in any of the three members, or the shaft can be integrally formed on one of the three members. In any event, the lever frame structure 950 and the antler structure 900 are allowed to pivot relative to the spine 902 about the pivot axis 906. The ends 914 of the antler arms are pivotally secured to a cross member 952 extending between and laterally outwardly from upwardly extending end portion of the outboard levers 982, as shown in FIGS. 96 and 97. A pin 916 or screw is snap fitted to secure the ends 914 of the arms to the cross-member 952, with the arms pivotally bearing on the cross member. Alternatively, as shown in FIG. 89, the ends of the arms 926 can be configured with the cross member 928, which is pivotally secured to the ends of the lever arms 982. In one embodiment, shown in FIG. 89, the spine includes slots 920, which receive lug members 922 extending forwardly from the antler structure and pivotally engaging the shaft 904 about the pivot axis 906. The cover 930, when disposed over the antler structure, forms a rear hood member. The upper thoracic portion of the backrest and hood is allowed to rotate about the pivot axis, thereby conforming to the position of the body of the user as the user tilts rearwardly in the chair.

Each of the cross members, connecting members and levers 366, 370, 372, 378, 380, 376, 382, 384, 386, 388, 394, 396, 398, 400, 402, 404, 406, 982 are preferably configured with a U-shaped cross section. The central portion of the second cross member 370 is further configured with a plurality of ribs 408 that increase the torsional stiffness of the cross member 370, making it more resistant to twisting about a laterally extending axis thereof. In this way, the upper regions of the back, defined between the third cross member 370 and the top cross member 368 tend to rotate or twist about the third cross member, which has less torsional stiffness than the second cross member 370. At the same time, the central connecting member 378 also provides a virtual hinge along the two ends thereof where it is coupled to the cross member 372 and the cross member 374. The members 402 are relatively rigid, thereby maintaining a relatively rigid lower region of the backrest. As such, when the user extends their back by rotating the upper portion 354 of the back, and pivoting the back support 294, the upper portion tends to bend or rotate about the third cross member. At the same time, each of the individual levers can twist or rotate in response to the movement of the user and provide a balanced support for the user's back. As the user rotates upper portion 354, the lower portion 304, for example at levers 406, does not flex or rotate, thereby providing firm support for the lower back and sacral region of the user. At the same time, the lumbar region bends or rotates proportionally to the distance between the lower cross member 374 and the upper cross member 366, thereby providing intermediate support to the lumbar region of the user's back.

Figure 35:
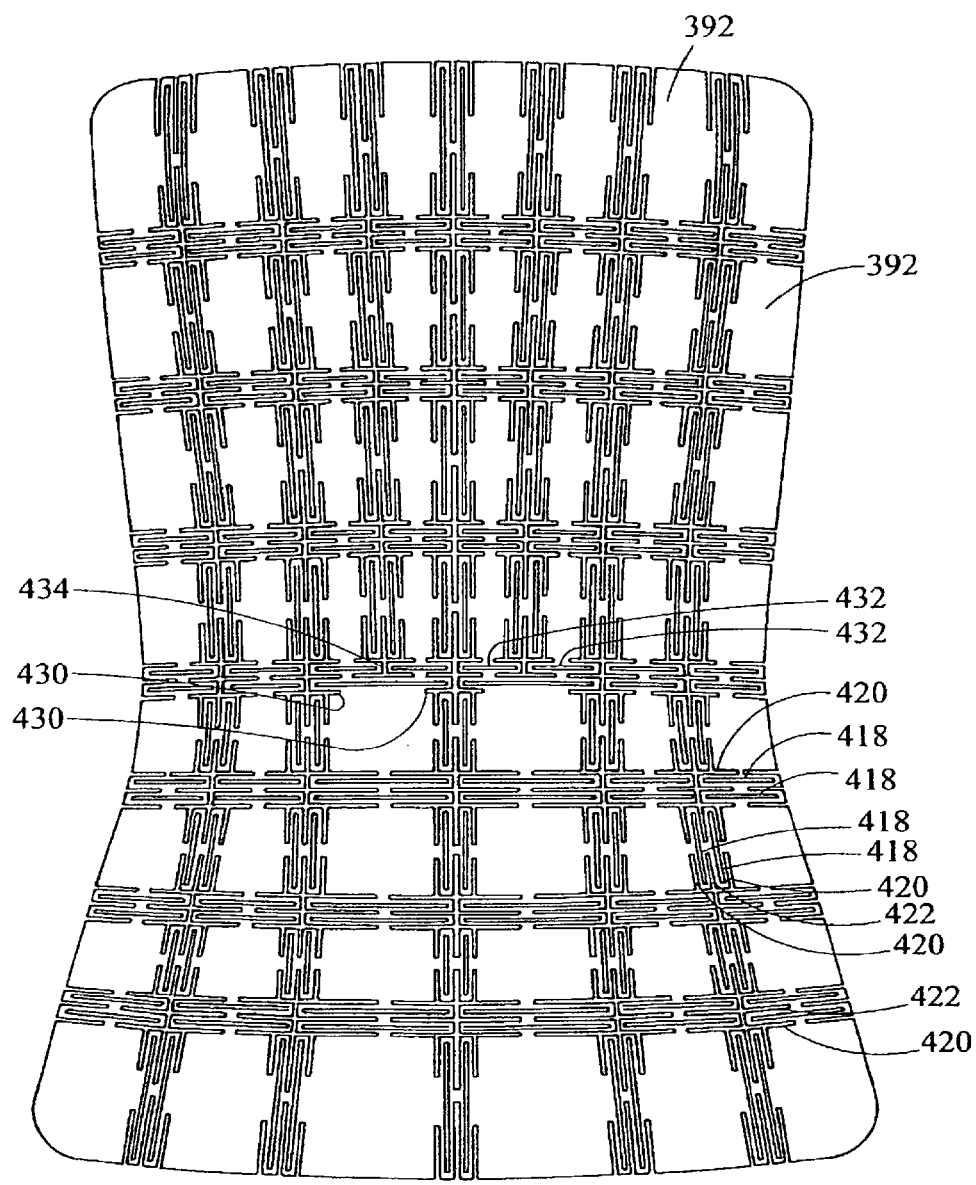
FIG. 35 is front view of a pad structure.
Figure 35A:
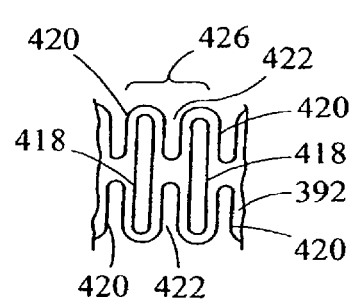
FIG. 35A is an enlarged view of a connector between pads.
Figure 36:
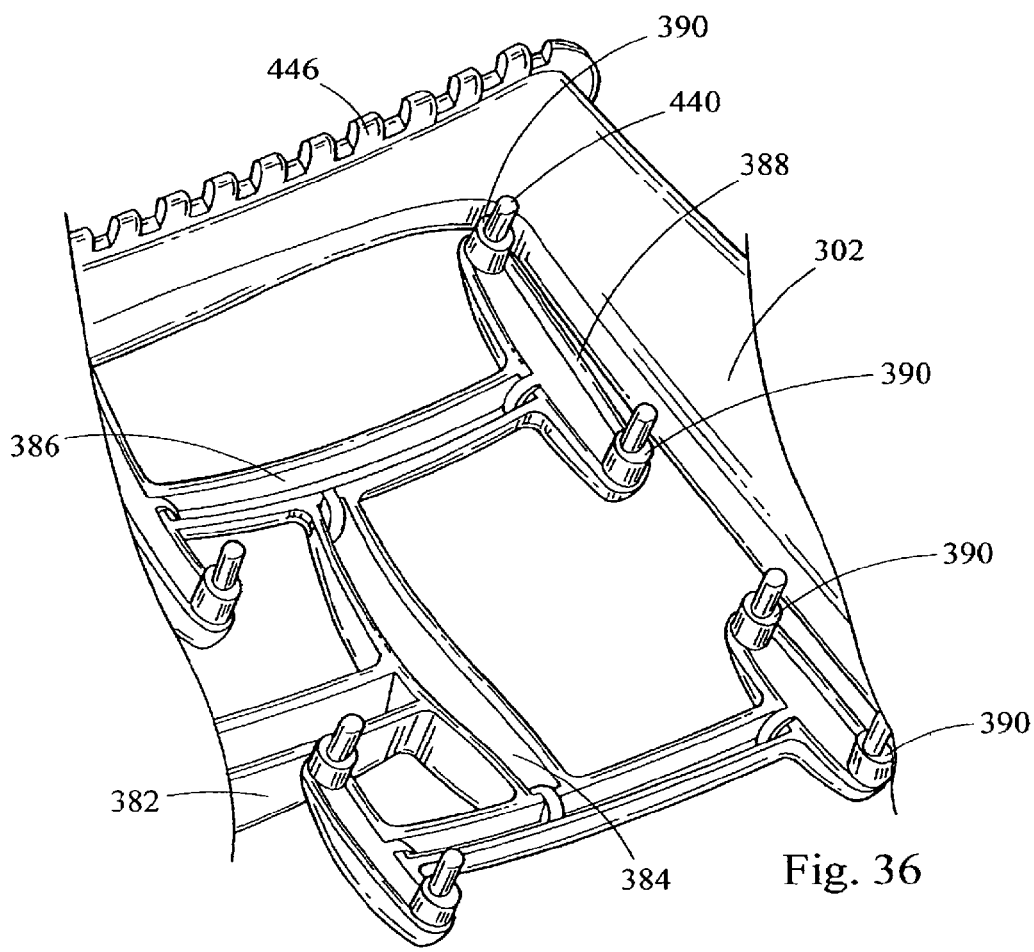
FIG. 36 is an enlarged partial perspective view of a back suspension structure.

Referring to FIGS. 35 and 35A, the pad structure 416 is integrally formed with a plurality of pads 392 corresponding to the number of nodes 390 formed at the ends of the lever structures. A series of slots are formed between the individual pads to allow each pad to flex independently with the corresponding lever node, while maintaining some connectivity between the pads and nodes. In one embodiment, each pad is separated along each side thereof from another pad by a pair of elongated slots or slits 418, and two pairs of spaced apart sets of three slits 420, 422. The pair of elongated slits are disposed between the three slits in each set. The middle slit 422 in each longitudinally and laterally extending set extends across the entirety of the junction between pads and forms part of the middle slit in adjacent sets of the three slits. In addition, the outer slits 420 of the laterally extending sets extend across the entirety of the junction between pads and forms part of the outer slits in adjacent sets of the three slits. The slits form connectors 426 that resemble FIG. 8 structures, with the top and the bottom of the "8" connected to the pad.

Figure 68:
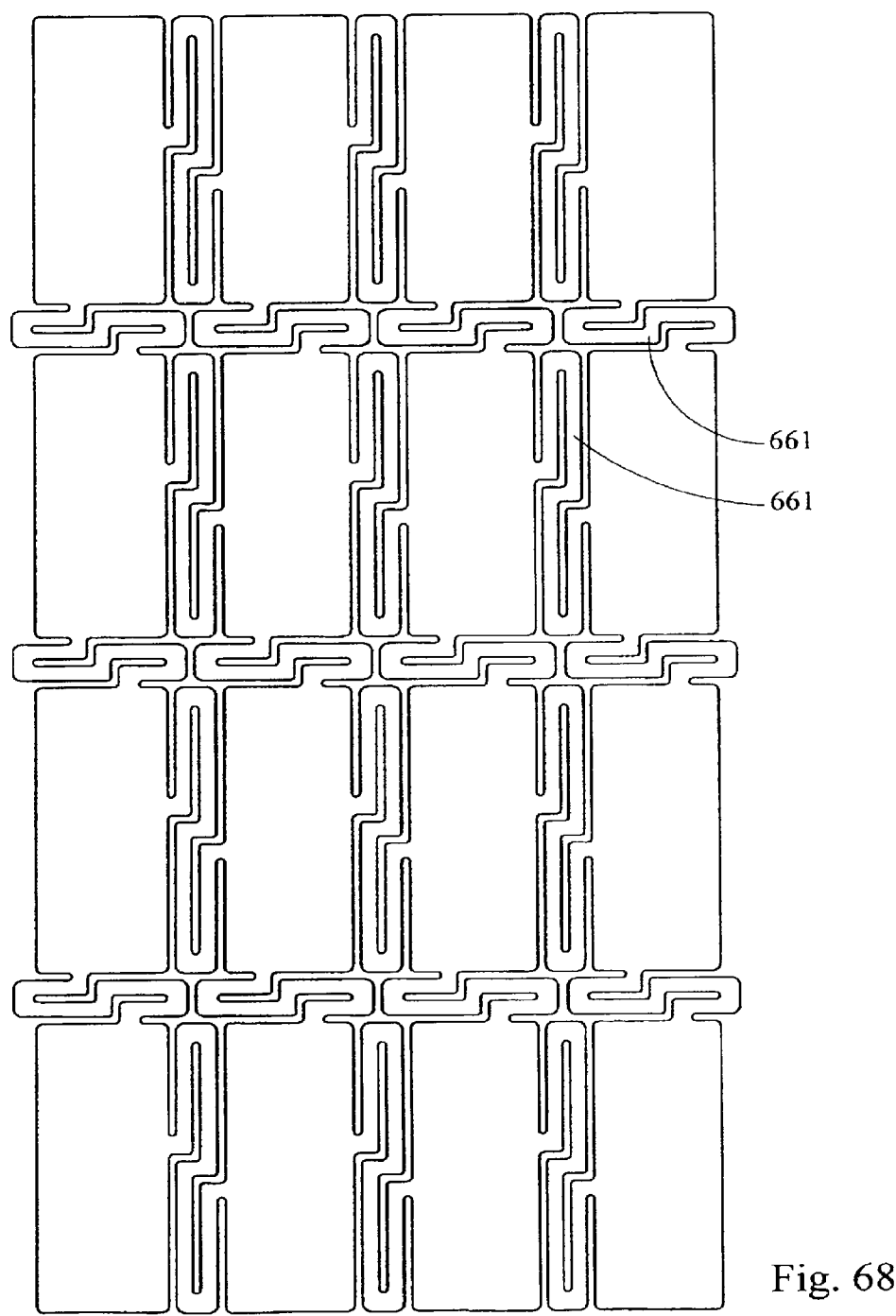
FIG. 68 is portion of an alternative embodiment of a pad structure.
Figure 69:
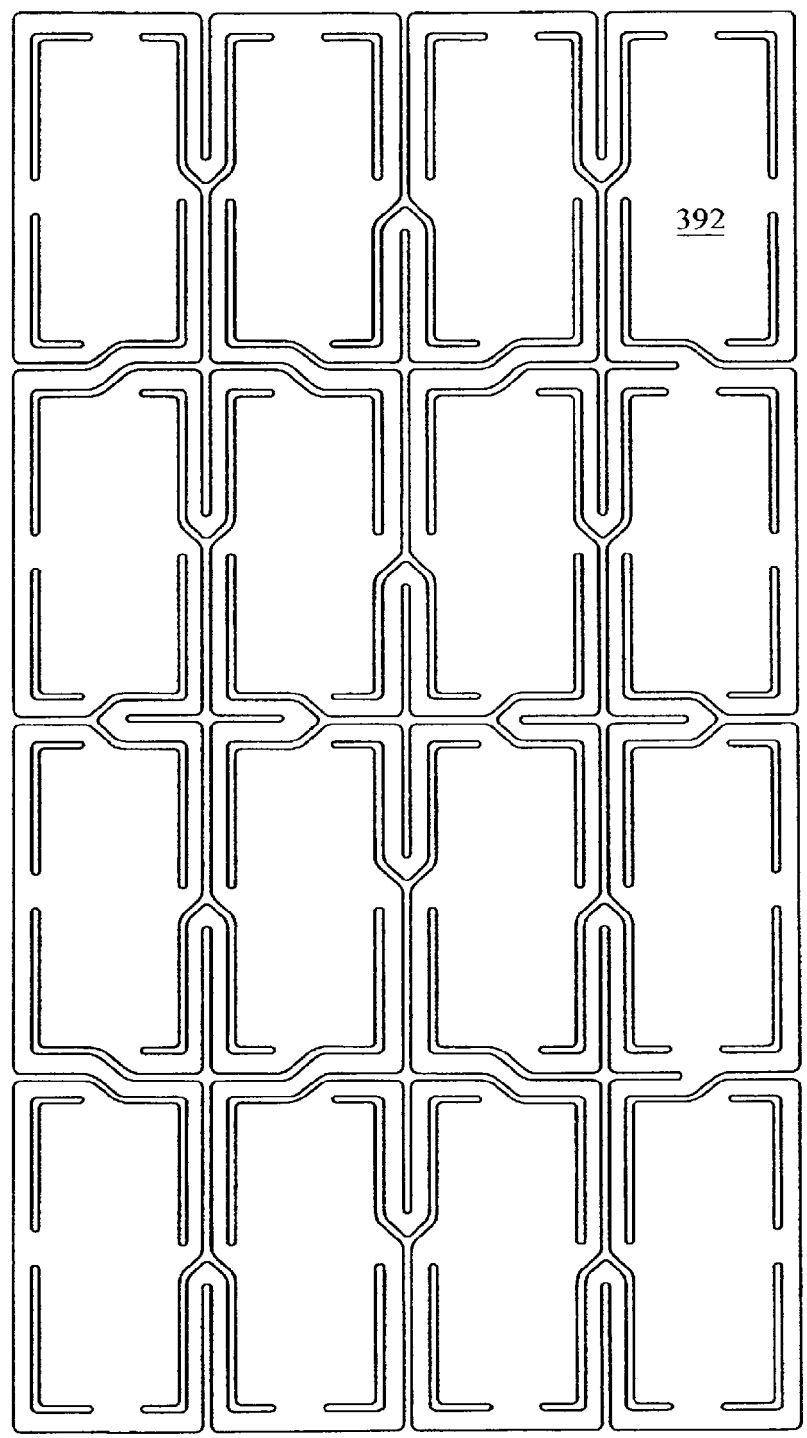
FIG. 69 is portion of an alternative embodiment of a pad structure.
Figure 70:
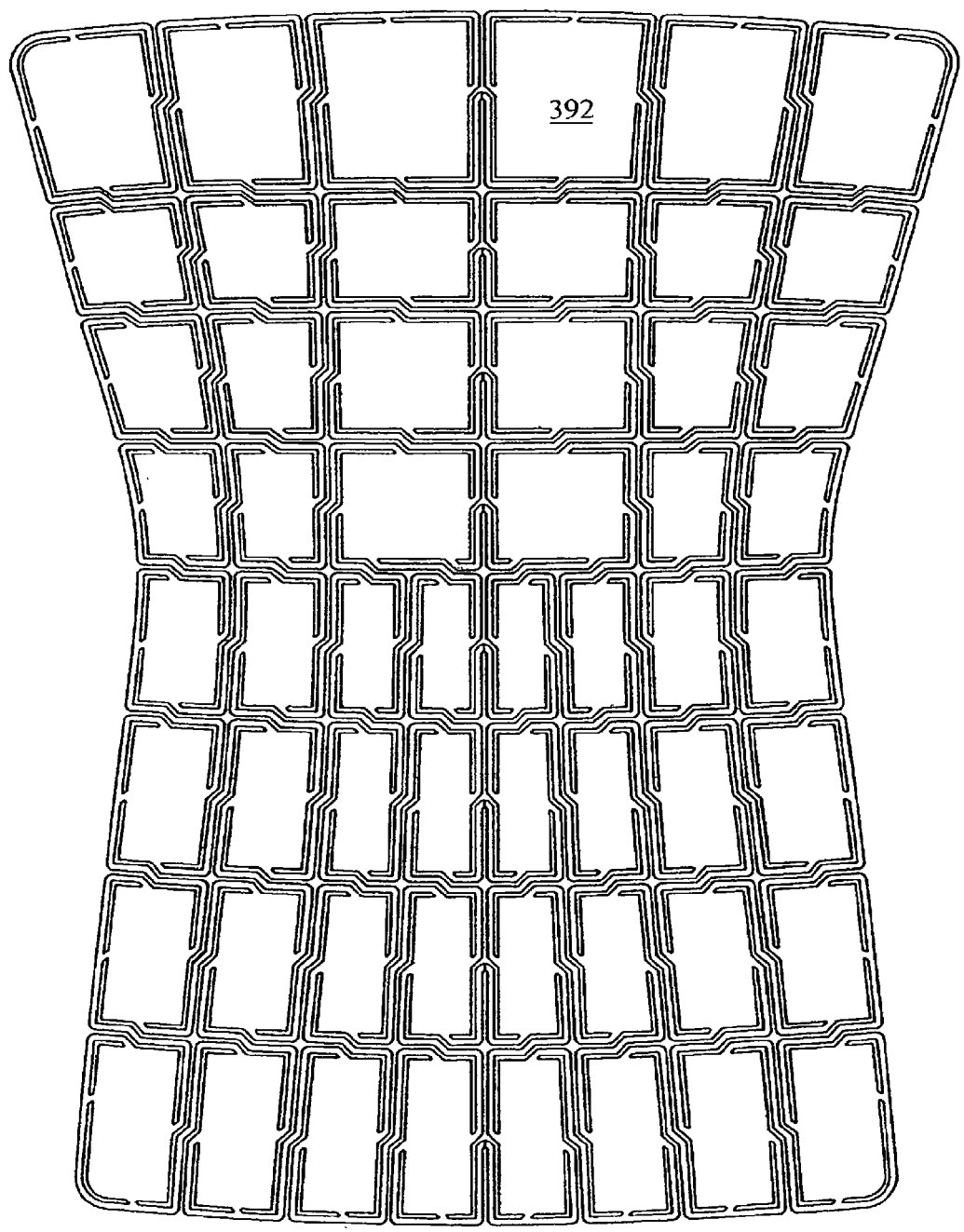
FIG. 70 is portion of an alternative embodiment of a pad structure.

At an approximate mid point of the pad structure, i.e., the portion overlying the second cross member 370, the pad structure transitions from six pads extending laterally across the backrest to eight pads extending laterally across the backrest, with four centrally located pads above the cross member transitioning to two centrally located pads below. In this transition area, a lower, outer third slit 430 is made shorter, and the upper laterally extending slit is split into two slits 432, with the third middle slit 434 not extending into the lower pad structure. Additional decorative openings can be formed in each pad. For example as shown in FIGS. 68-70 and 95, alternative pad structures are shown. In FIG. 68, S-shape strips 661 connect adjacent pads.

Figure 46:
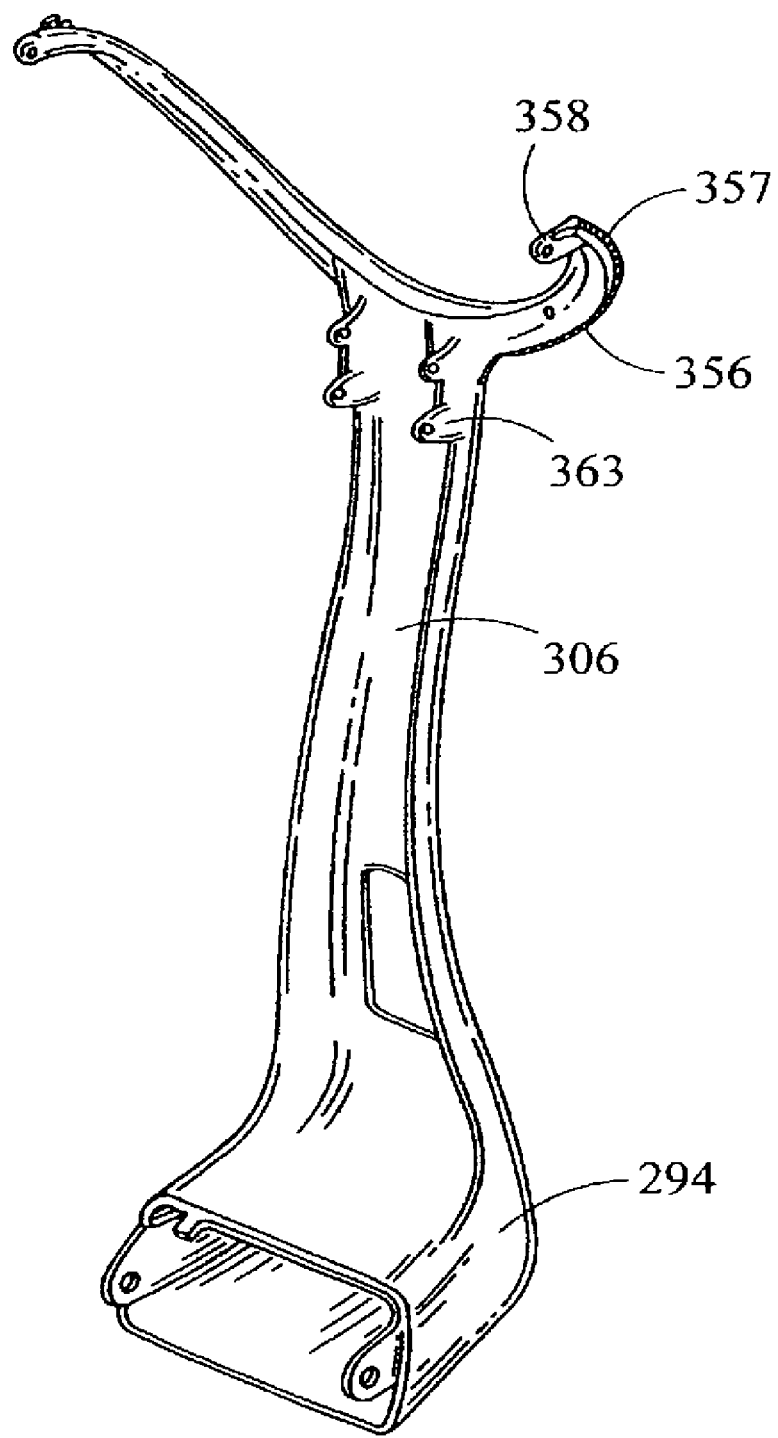
FIG. 46 is a front, perspective view of another embodiment of a back support member.

A rear side of each pad is provided with a socket 438. As best shown in FIG. 46, a rubber grommet 440 is disposed between each pad and a corresponding node 390 of the lever. In one embodiment, the pad structure is formed by a two-shot mold process, with the pad formed, and a rivet molded onto the pad. Conversely, the lever arm can be made from a two-shot mold process. In other embodiments, the pad and frame can be made by way of a two-shot or three-shot process.

Figure 71:
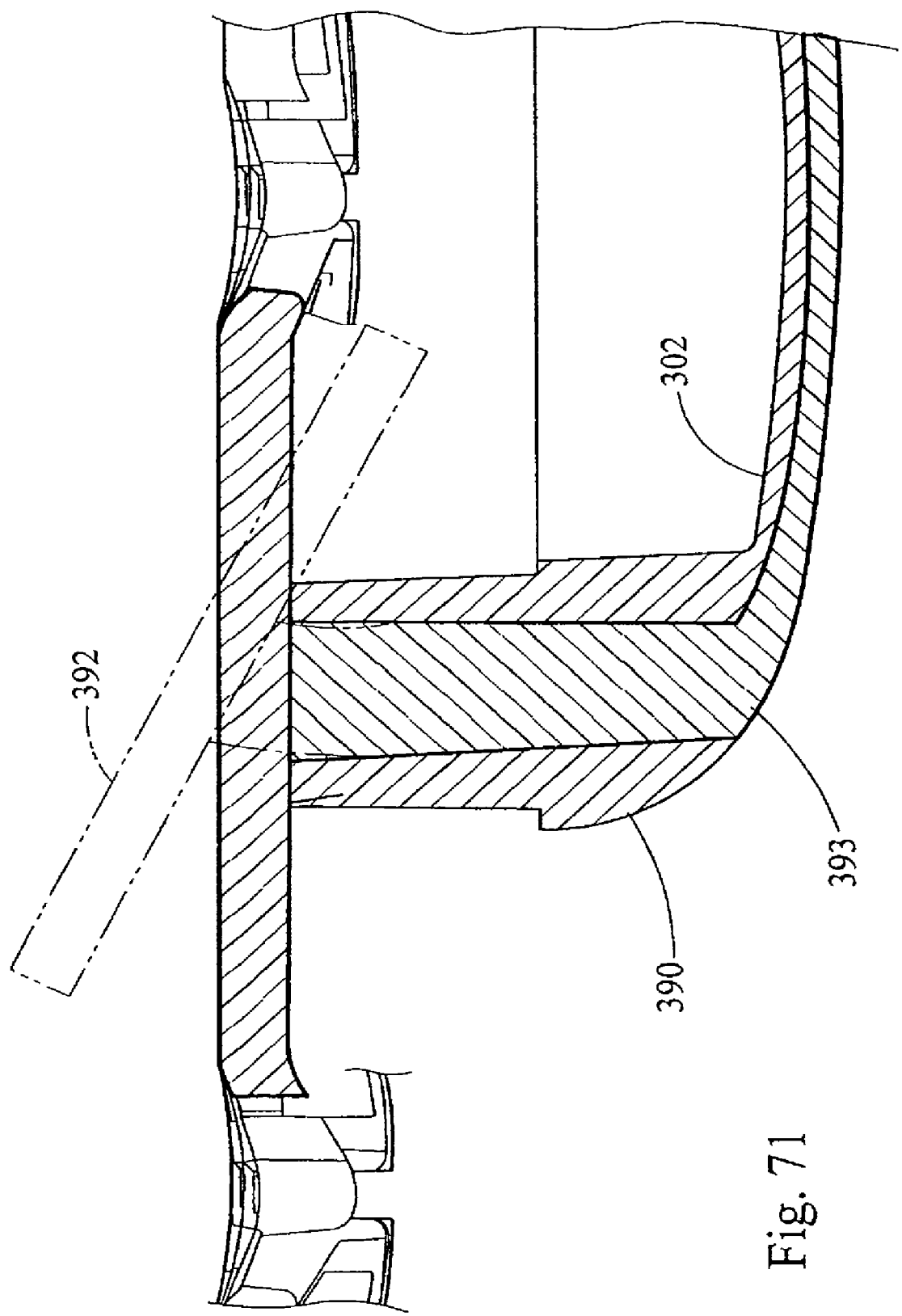
FIG. 71 is an enlarged cross-sectional view of one embodiment of a connection between a pad structure and a backrest frame.

For example, in a three-shot process, and referring to FIG. 71, a compliant material 395 is molded (but not bonded) onto the back side of the molded levers and through an opening 393 in the node 390. The pad structure is then molded and bonded to the resilient material 395. In operation, the pad 392 flexes relative to the node 390 by way of the resilient material.

Figure 72:
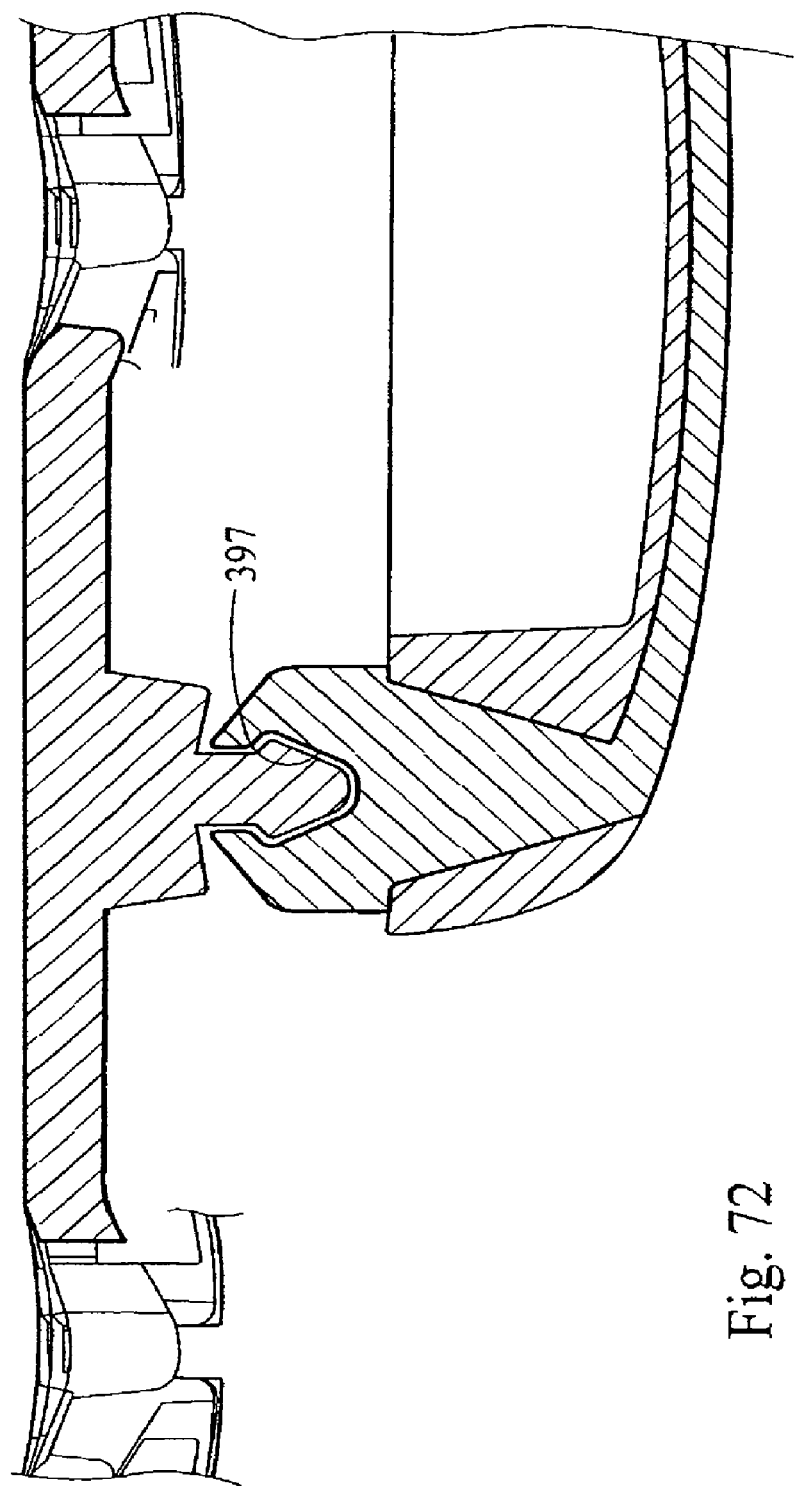
FIG. 72 is an enlarged cross-sectional view of an alternative embodiment of a connection between a pad structure and a backrest frame.

Referring to FIG. 72, a two-shot process includes forming a socket 397 in the resilient/compliant material 395. A post 399 formed on the back side of the pad is engaged with the socket by way of snap-fit.

Figure 73:
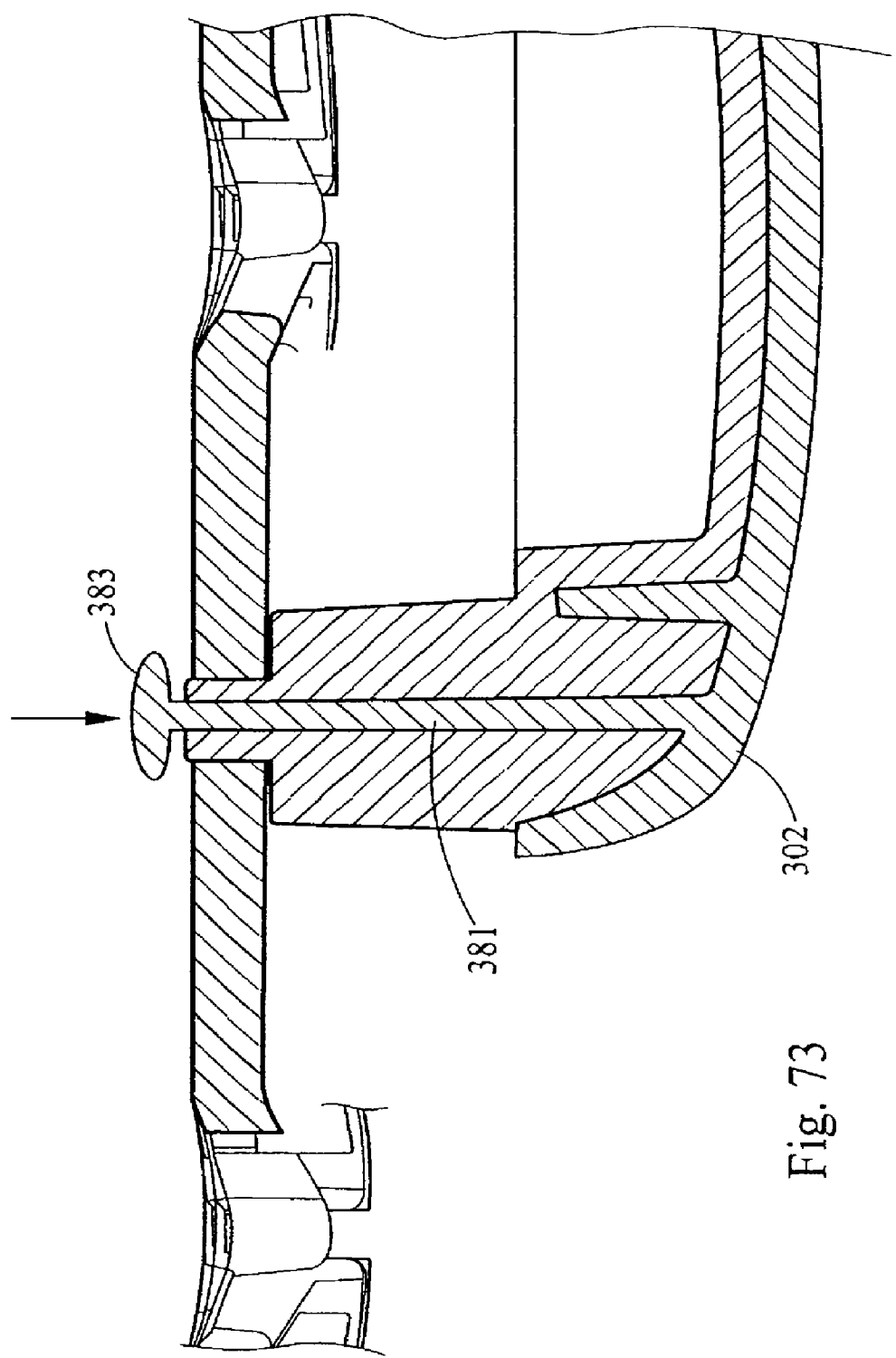
FIG. 73 is an enlarged cross-sectional view of an alternative embodiment of a connection between a pad structure and a backrest frame.

Referring to FIG. 73, another two-shot process includes forming an elongated post 381 that extends through the compliant material and to a front side of the pad 392. The end 383 of the post is deformed, for example by way of heat stake, so as to secure the pad to the resilient material, which also forms an outer post mating with an opening in the pad.

Figure 74:
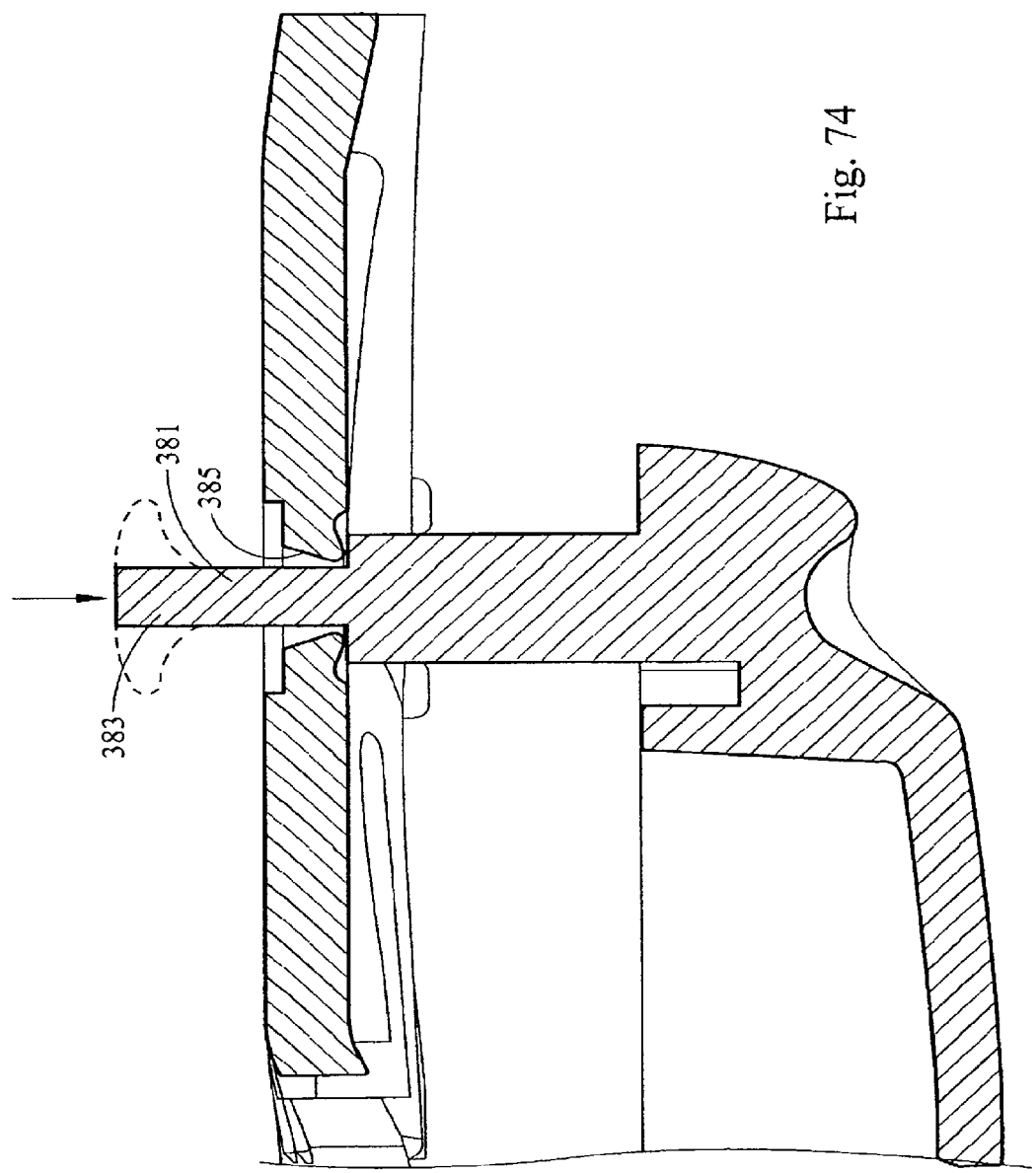
FIG. 74 is an enlarged cross-sectional view of an alternative embodiment of a connection between a pad structure and a backrest frame.

Referring to FIG. 74, instead of using a resilient/compliant material, the pad structure is provided with a geometry that permits rotation or pivoting of the pad relative to a post 381 of the lever node. In particular, the through opening 385 in the pad is tapered or provided with a frusto-conical such that the opening is larger on the front side so the pad can rotate relative to the post. An end 383 of the post is again deformed to secure the pad to the post. A recess is formed in the pad to receive the deformed head and form a flush surface.

Figure 75:
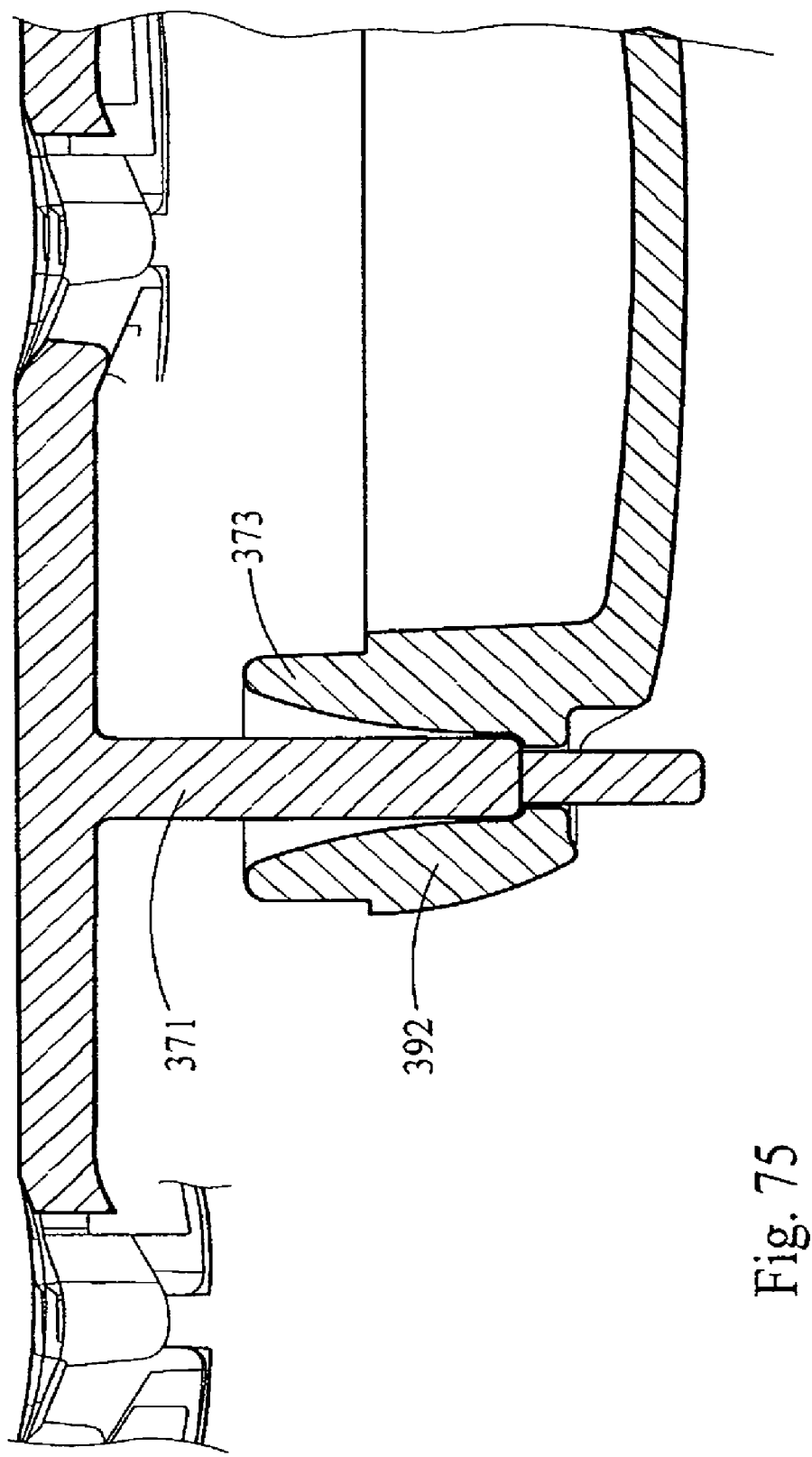
FIG. 75 is an enlarged cross-sectional view of an alternative embodiment of a connection between a pad structure and a backrest frame.

Referring to FIG. 75, a post 371 extends rearwardly from the pad 392. The post can be formed form a compliant, resilient material. The post extends through a socket 373 formed in the lever node 392, with the socket having a tapered or frusto-conical shaped geometry permitting rotation or pivoting of the post relative to the socket. An end portion of the post 371 can be deformed, for example by heating, to secure the pad structure to the frame 302.

Figure 76:
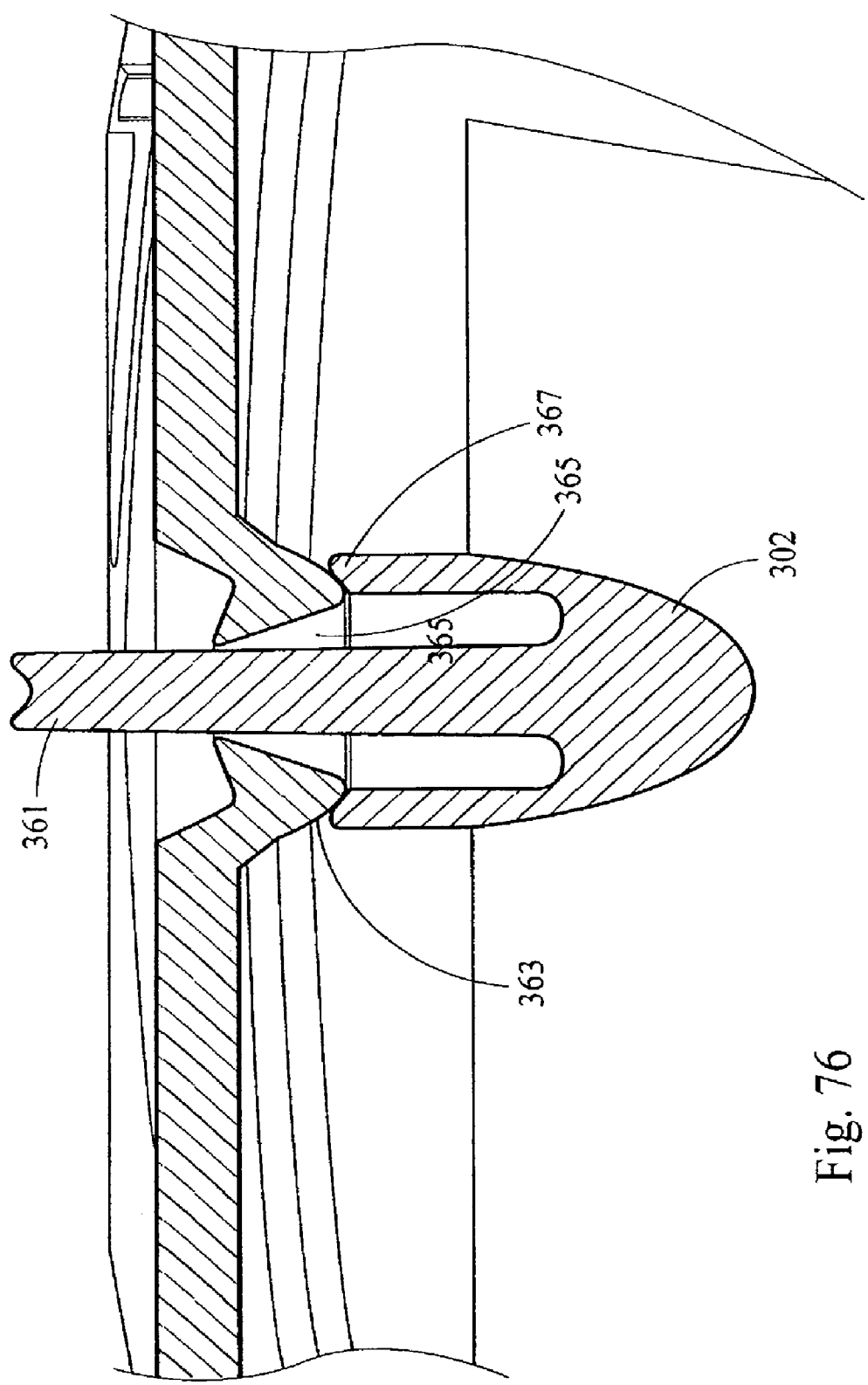
FIG. 76 is an enlarged cross-sectional view of an alternative embodiment of a connection between a pad structure and a backrest frame.

Referring to FIG. 76, the pad structure is provided with a support nodule having an exterior spherical shaped support surface 363 and a through opening 365 with a tapered or frusto-conical shape. The lever or node 392 is provided with a post 361 and a circumferential or annular support rim 367 having a tapered or rounded shoulder that slides relative to the exterior surface 363 of the nodule. The exterior surface 363 and the shape of the through hole 365 permit rotation or pivoting of the pad relative to the lever. The end of the post 361 is deformed to secure the pad to the frame 302.

Figure 37:
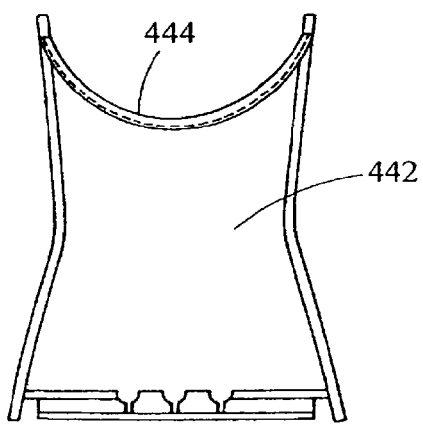
FIG. 37 is a front view of a cover carrier member.
Figure 38:
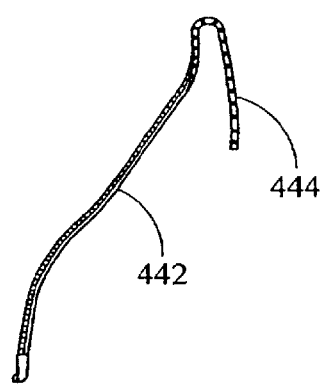
FIG. 38 is a side view of the carrier member shown in FIG. 37.
Figure 55A:
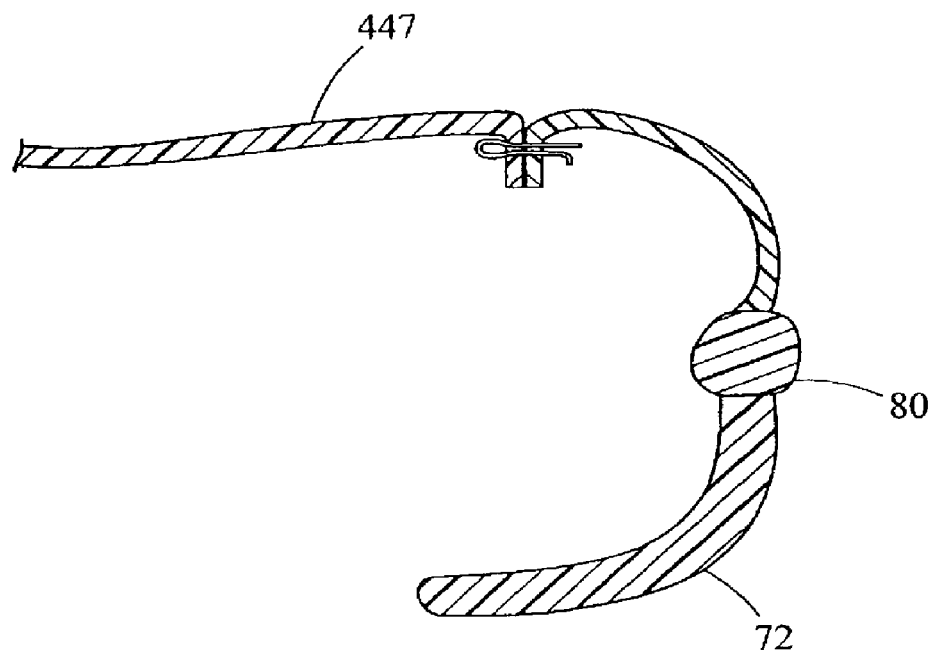
FIGS. 55A and B are partial cross-sectional views of a fabric attachment assembly.
Figure 55B:
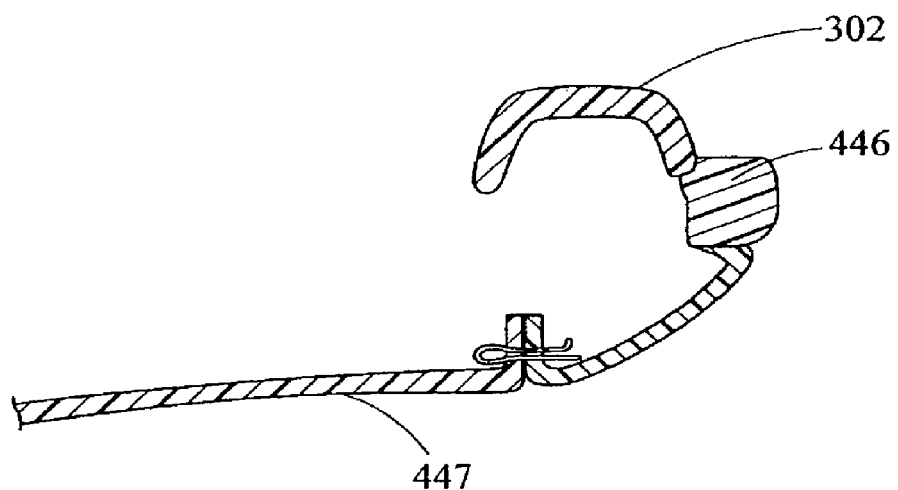

Referring to FIGS. 1 and 37-38, an outer cover 442, such as a fabric layer, is disposed over the body side surface of the pad structure. A carrier member 444 is secured to the peripheral edge of the cover and is engaged with a ribbed peripheral edge 446 of the frame and the arms 357 of the back support to secure the cover to the back. In an alternative embodiment, shown in FIGS. 55A and 55B, a cover having a primary web member 447 is secured to an elastic web component 449, for example by stitching with the seam directed inwardly away from the body-facing surface. The web component 449 in turn has an edge portion 451 that engages the peripheral edge of the frame, whether on the back or the seat.

Figure 94:
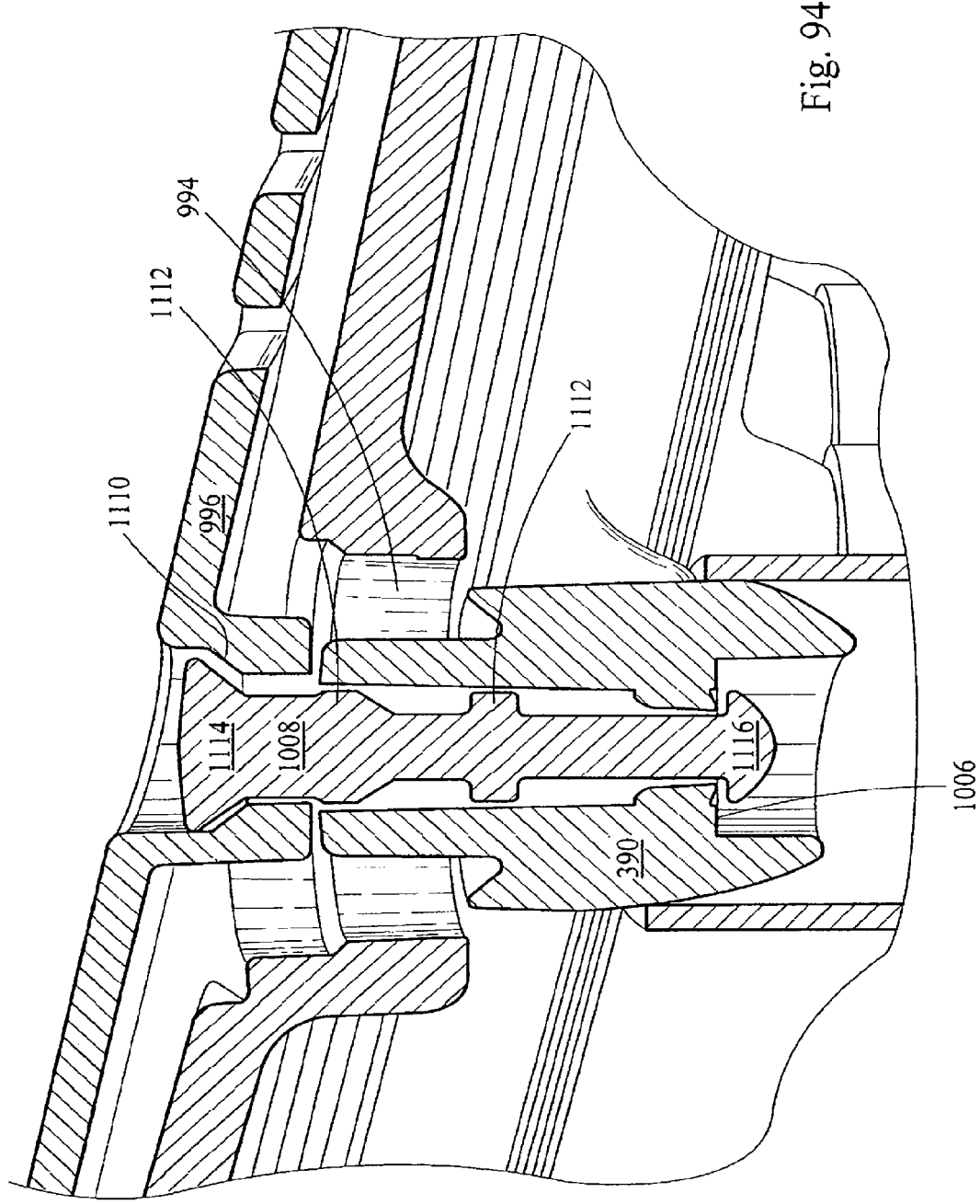
FIG. 94 is a cross-sectional view of the connector assembly shown in FIGS. 92 and 93 taken along a direction substantially perpendicular to the cut away of FIG. 92.
Figure 95:
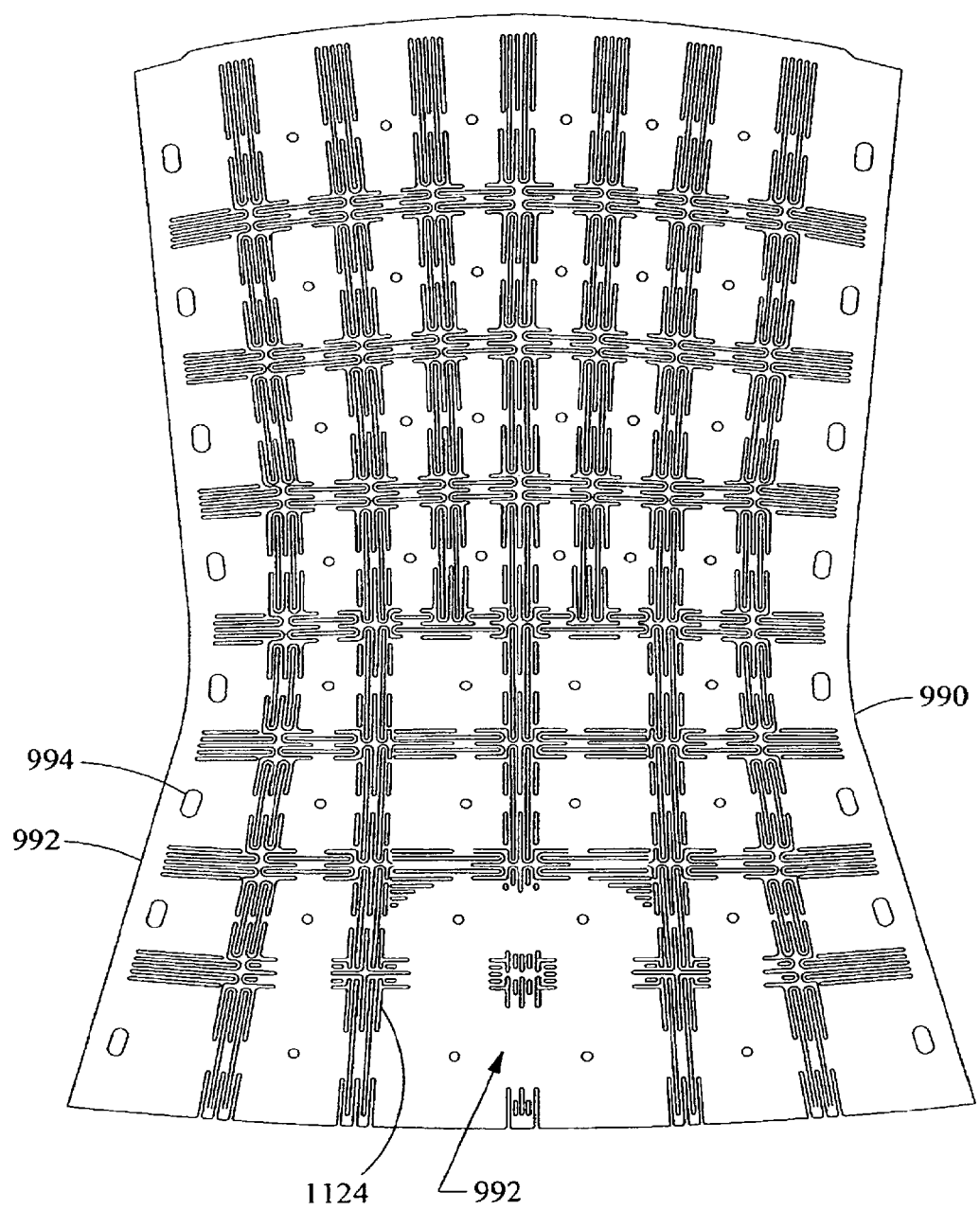
FIG. 95 is an alternative embodiment of the pad structure.

Referring to FIGS. 91-94, where the whiffle structure does not have any side frame members, the fabric is instead secured to the pad structure 990 and lever frame 950. In particular, an edge portion 992 of the outermost pad structure is stepped down from the remainder of the pad structure. An attachment strip 996 is secured to the fabric or outer cover 930, which wraps around the strip and includes an edge portion disposed between the strip and pad structure. The fabric can be further secured to the strip, for example by bonding, stitching, snaps or other mechanical fasteners, or combinations thereof. The end of the lever or node 390 includes an opening or channel therethrough. One portion of the opening 994 includes a ramped portion 1002 formed along a side thereof, with the ramp progressively traversing toward the center of the channel. A recess or void 1004 is positioned on the other side of the channel from the ramp. A catch portion 1006 of shoulder is formed around the bottom of the channel. A fastener 1008 or pin includes a tapered head portion 1114 mating with a tapered mouth 1110 formed in an opening of the fabric strip 996, and a pair of enlarged annular portions 1112 that are disposed in an upper, substantially cylindrical portion of the opening formed in the lever node. The pin further includes a bottom head 1116 portion, or catch, which engages the catch 1006 of the lever with a snap-fit engagement. During installation, the bottom head 1116 slides along the ramp 1002 with the shaft of the fastener bending as the head is biased into the recess 1004 formed opposite thereof until the head 1116 slides past the catch, with the head then snapping back into engagement with the catch portion. In this way, the fabric strip 996 and fabric are secured to the whiffle structure, while providing an aesthetically pleasing and flexible edge. The pad structure 990 includes an opening 994 shaped to received an end or post portion of the node. The node includes an annular shoulder 1120 having a catch portion 1122 disposed around the end or post portion, which engages a bottom or rear surface of the pad structure. When installed, the pin 1008 sandwiches the pad structure 990 and cover 930 between the fabric strip 996 and whiffle structure 950. The opening 994 in the pad structure can be elongated or slotted in at least one direction (e.g., vertical), as shown in FIGS. 94 and 95, so to allow relative motion between the pad structure 990 and whiffle structure 950. In addition, as shown in FIG. 95, the slits 1124 defining the pads do not extend to the edge of the overall pad structure along the sides and top thereof, so as to provide some additional rigidity to the edge portion of the pad structure, for example where the fabric strips are attached. In addition, the slits do not carry through laterally along the bottom of the pad structure between at least the center four pads of the first two rows, or longitudinally between the four pads of the center columns, such that the lower sacral area thereof is provided with additional rigidity.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A seating structure comprising:
  a leaf spring; and
  a body support structure biased by said leaf spring;
  wherein one of said leaf spring and said body support structure has a cam with a concave cam surface, and the other of said leaf spring and said body support structure has a cam follower with a convex cam surface, wherein said cam follower engages said cam, and wherein one of said cam follower and said cam is rearwardly slideable relative to the other of said cam follower and said cam as said leaf spring biases said body support structure.

2. The seating structure of claim 1 wherein said body support structure is pivotally connected to a base component.

3. The seating structure of claim 2 wherein said body support structure comprises a support member for a back.

4. The seating structure of claim 2 wherein said body support structure is coupled to a back and a seat.

5. The seating structure of claim 1 wherein said cam is disposed on said leaf spring and said cam follower is disposed on said body support structure.

6. The seating structure of claim 1 wherein said one of said cam and said cam follower are disposed on a first side of said leaf spring, and further comprising a fulcrum member engaging a second side of said leaf spring opposite said first side, wherein said fulcrum member is longitudinally spaced from said one of said cam and said cam follower along a length of said leaf spring.

7. The seating structure of claim 6 wherein said fulcrum member comprises a curved surface engaging said second side of said leaf spring.

8. The seating structure of claim 6 wherein said first side comprises an upper surface of said leaf spring and said second side comprises a bottom surface of said leaf spring, wherein said fulcrum member is adjustably moveable along a length of said leaf spring toward and away from said one of said cam and said cam follower.

9. A method of biasing a seating structure comprising:
  providing a leaf spring and a body support structure, wherein one of said leaf spring and said body support structure has a cam with a concave cam surface, and the other of said leaf spring and said body support structure has a cam follower with a convex cam surface;

biasing said body support structure with said leaf spring; and engaging said cam with said cam follower, and sliding one of said cam and said cam follower rearwardly relative to the other of said cam and said cam follower.

10. The method of claim 9 further comprising pivoting said body support structure relative to a base component.

11. The method of claim 10 wherein said body support structure comprises a support member for a back.

12. The method of claim 10 wherein said body support structure is coupled to a back and a seat.

13. The method of claim 9 wherein said cam is disposed on said leaf spring and said cam follower is disposed on said body support structure.

14. The method of claim 9 wherein said one of said cam and said cam follower are disposed on a first side of said leaf spring, and further comprising engaging a second side of said leaf spring opposite said first side with a fulcrum member, wherein said fulcrum member is longitudinally spaced from said one of said cam and said cam follower along a length of said leaf spring.

15. The method of claim 14 wherein said fulcrum member comprises a curved surface engaging said second side of said leaf spring.

16. The method of claim 14 further comprising moving said fulcrum member along a length of said leaf spring and thereby adjusting a biasing force of said leaf spring.

17. A seating structure comprising:

a housing;

a leaf spring comprising a cam portion disposed proximate a first end portion of said leaf spring, said cam portion comprising a concave cam surface formed on a first side of said leaf spring, said leaf spring having a second end portion opposite said first end portion supported by said housing;

a cam follower comprising a convex cam surface engaging said concave surface of said cam portion of said leaf spring;

a fulcrum member supported by said housing and engaging a second side of said leaf spring opposite said first side, wherein said fulcrum member is longitudinally spaced from said cam follower along a length of said leaf spring; and a body support structure pivotally coupled to said housing, wherein said body support member is coupled to said cam follower, and wherein one of said cam follower and said cam is rearwardly slideable relative to the other of said cam follower and said cam as said body support structure is pivoted relative to said housing.

18. The seating structure of claim 17 wherein said body support structure comprises a support member for a back.

19. The seating structure of claim 17 wherein said body support structure is coupled to a back and a seat.

20. The seating structure of claim 17 wherein said fulcrum member comprises a curved surface engaging said second side of said leaf spring.

21. The seating structure of claim 17 wherein said first side comprises an upper surface of said leaf spring and said second side comprises a bottom surface of said leaf spring, wherein said fulcrum member is adjustably moveable along a length of said leaf spring toward and away from said cam follower.

* * * * *